US012596218B2

(12) United States Patent
Popovich et al.

(10) Patent No.: US 12,596,218 B2
(45) Date of Patent: Apr. 7, 2026

(54) HOLOGRAPHIC WIDE ANGLE DISPLAY

(71) Applicants: DigiLens Inc., Sunnyvale, CA (US); Rockwell Collins, Inc., Cedar Rapid, IA (US)

(72) Inventors: Milan Momcilo Popovich, Leicester (GB); Jonathan David Waldern, Los Altos Hill, CA (US); Alastair John Grant, San Jose, CA (US); Wyatt L. Hendrick, San Diego, CA (US); James H. Stanley, Palo Alto, CA (US)

(73) Assignees: DigiLens Inc., Sunnyvale, CA (US); Rockwell Collins, Inc., Cedar Rapids, IA (US)

( * ) Notice: Subject to any disclaimer, the term of this patent is extended or adjusted under 35 U.S.C. 154(b) by 110 days.

(21) Appl. No.: 18/330,254

(22) Filed: Jun. 6, 2023

(65) Prior Publication Data

US 2024/0151890 A1 May 9, 2024

Related U.S. Application Data

(63) Continuation of application No. 17/808,206, filed on Jun. 22, 2022, now abandoned, which is a
(Continued)

(51) Int. Cl.
G02B 5/30 (2006.01)
F21V 8/00 (2006.01)
(Continued)

(52) U.S. Cl.
CPC ............. *G02B 5/3083* (2013.01); *G02B 5/32* (2013.01); *G02B 6/0035* (2013.01); *G02B 6/005* (2013.01);
(Continued)

(58) Field of Classification Search
None
See application file for complete search history.

(56) References Cited

U.S. PATENT DOCUMENTS

| | | | |
|---|---|---|---|
| 1,043,938 | A | 11/1912 | Huttenlocher |
| 2,141,884 | A | 12/1938 | Sonnefeld |
| | | (Continued) | |

FOREIGN PATENT DOCUMENTS

| | | |
|---|---|---|
| BR | PI0720469 A2 | 1/2014 |
| CA | 2889727 A1 | 6/2014 |
| | (Continued) | |

OTHER PUBLICATIONS

Extended European Search Report for European Application No. 18897932.2, Search completed Dec. 22, 2021, Mailed Jan. 12, 2022, 8 pgs.
(Continued)

*Primary Examiner* — Jyotsna V Dabbi
(74) *Attorney, Agent, or Firm* — KPPB LLP

(57) ABSTRACT

An apparatus for displaying an image, including: an input image node configured to provide at least a first and a second image modulated lights; and a holographic waveguide device configured to propagate the at least one of the first and second image modulated lights in at least a first direction. The holographic waveguide device includes: at least a first and second interspersed multiplicities of grating elements disposed in at least one layer, the first and second grating elements having respectively a first and a second prescriptions. The first and second multiplicity of grating elements are configured to deflect respectively the first and second image modulated lights out of the at least one layer into respectively a first and a second multiplicities of output rays forming respectively a first and second FOV tiles.

14 Claims, 85 Drawing Sheets

Related U.S. Application Data continuation of application No. 16/849,043, filed on Apr. 15, 2020, now Pat. No. 11,460,621, which is a continuation of application No. 15/048,954, filed on Feb. 19, 2016, now Pat. No. 10,690,915, which is a continuation of application No. 13/869,866, filed on Apr. 24, 2013, now Pat. No. 9,341,846.

(60) Provisional application No. 61/689,907, filed on Jun. 15, 2012, provisional application No. 61/687,436, filed on Apr. 25, 2012.

(51) Int. Cl.

| | | |
|---|---|---|
| *G02B 5/32* | (2006.01) | |
| *G02B 27/00* | (2006.01) | |
| *G02B 27/01* | (2006.01) | |
| *G02B 30/34* | (2020.01) | |
| *G03H 1/22* | (2006.01) | |

(52) U.S. Cl.

CPC ....... *G02B 6/0076* (2013.01); *G02B 27/0081* (2013.01); *G02B 27/0103* (2013.01); *G02B 27/0172* (2013.01); *G02B 27/0176* (2013.01); *G02B 30/34* (2020.01); *G02B 6/0018* (2013.01); *G02B 2027/0112* (2013.01); *G02B 2027/0123* (2013.01); *G02B 2027/013* (2013.01); *G02B 2027/015* (2013.01); *G02B 2027/0174* (2013.01); *G03H 2001/2226* (2013.01); *G03H 2001/2239* (2013.01)

(56) References Cited

U.S. PATENT DOCUMENTS

| | | | |
|---|---|---|---|
| 3,482,498 A | 12/1969 | Becker | |
| 3,620,601 A | 11/1971 | Leonard et al. | |
| 3,741,716 A | 6/1973 | Johne et al. | |
| 3,804,496 A | 4/1974 | Crane et al. | |
| 3,843,231 A | 10/1974 | Borel et al. | |
| 3,851,303 A | 11/1974 | Muller | |
| 3,885,095 A | 5/1975 | Wolfson et al. | |
| 3,940,204 A | 2/1976 | Withrington | |
| 3,965,029 A | 6/1976 | Arora | |
| 3,975,711 A | 8/1976 | McMahon | |
| 4,028,725 A | 6/1977 | Lewis | |
| 4,035,068 A | 7/1977 | Rawson | |
| 4,038,110 A | 7/1977 | Feng | |
| 4,066,334 A | 1/1978 | Fray et al. | |
| 4,082,432 A | 4/1978 | Kirschner | |
| 4,099,841 A | 7/1978 | Ellis | |
| 4,133,152 A | 1/1979 | Penrose | |
| 4,178,074 A | 12/1979 | Heller | |
| 4,218,111 A | 8/1980 | Withrington et al. | |
| 4,232,943 A | 11/1980 | Rogers | |
| 4,248,093 A | 2/1981 | Andersson et al. | |
| 4,251,137 A | 2/1981 | Knop et al. | |
| 4,309,070 A | 1/1982 | St. Leger Searle | |
| 4,322,163 A | 3/1982 | Schiller | |
| 4,386,361 A | 5/1983 | Simmonds | |
| 4,389,612 A | 6/1983 | Simmonds et al. | |
| 4,403,189 A | 9/1983 | Simmonds | |
| 4,403,827 A | 9/1983 | Bryan et al. | |
| 4,418,993 A | 12/1983 | Lipton | |
| 4,472,037 A | 9/1984 | Lipton | |
| 4,523,226 A | 6/1985 | Lipton et al. | |
| 4,544,267 A | 10/1985 | Schiller | |
| 4,562,463 A | 12/1985 | Lipton | |
| 4,566,758 A | 1/1986 | Bos et al. | |
| 4,583,117 A | 4/1986 | Lipton et al. | |
| 4,643,515 A | 2/1987 | Upatnieks | |
| 4,647,967 A | 3/1987 | Kirschner et al. | |
| 4,688,900 A | 8/1987 | Doane et al. | |
| 4,711,512 A | 12/1987 | Upatnieks | |
| 4,714,320 A | 12/1987 | Banbury | |
| 4,728,547 A | 3/1988 | Vaz et al. | |
| 4,729,640 A | 3/1988 | Sakata et al. | |
| 4,741,926 A | 5/1988 | White et al. | |
| 4,743,083 A | 5/1988 | Schimpe | |
| 4,749,256 A | 6/1988 | Bell et al. | |
| 4,765,703 A | 8/1988 | Suzuki et al. | |
| 4,775,218 A | 10/1988 | Wood et al. | |
| 4,784,447 A | 11/1988 | Latta et al. | |
| 4,791,788 A | 12/1988 | Simmonds et al. | |
| 4,792,850 A | 12/1988 | Liptoh et al. | |
| 4,794,021 A | 12/1988 | Potter | |
| 4,799,765 A | 1/1989 | Ferrer | |
| 4,811,414 A | 3/1989 | Fishbine et al. | |
| 4,848,093 A | 7/1989 | Simmonds et al. | |
| 4,852,988 A | 8/1989 | Velez et al. | |
| 4,854,688 A | 8/1989 | Hayford et al. | |
| 4,860,294 A | 8/1989 | Winzer et al. | |
| 4,884,876 A | 12/1989 | Lipton et al. | |
| 4,890,902 A | 1/1990 | Doane et al. | |
| 4,928,301 A | 5/1990 | Smoot | |
| 4,933,976 A | 6/1990 | Fishbine et al. | |
| 4,938,568 A | 7/1990 | Margerum et al. | |
| 4,946,245 A | 8/1990 | Chamberlin et al. | |
| 4,960,311 A | 10/1990 | Moss et al. | |
| 4,964,701 A | 10/1990 | Dorschner et al. | |
| 4,967,268 A | 10/1990 | Lipton et al. | |
| 4,970,129 A | 11/1990 | Ingwall et al. | |
| 4,971,719 A | 11/1990 | Vaz et al. | |
| 4,994,204 A | 2/1991 | Doane et al. | |
| 5,004,323 A | 4/1991 | West | |
| 5,007,711 A | 4/1991 | Wood et al. | |
| 5,009,483 A | 4/1991 | Rockwell et al. | |
| 5,011,624 A | 4/1991 | Yamagishi et al. | |
| 5,016,953 A | 5/1991 | Moss et al. | |
| 5,033,814 A | 7/1991 | Brown et al. | |
| 5,035,734 A | 7/1991 | Honkanen et al. | |
| 5,053,834 A | 10/1991 | Simmonds | |
| 5,063,441 A | 11/1991 | Lipton et al. | |
| 5,076,664 A | 12/1991 | Migozzi | |
| 5,079,416 A | 1/1992 | Filipovich | |
| 5,096,282 A | 3/1992 | Margerum et al. | |
| 5,099,343 A | 3/1992 | Margerum et al. | |
| 5,106,181 A | 4/1992 | Rockwell | |
| 5,109,465 A | 4/1992 | Klopotek | |
| 5,110,034 A | 5/1992 | Simmonds et al. | |
| 5,117,285 A | 5/1992 | Nelson et al. | |
| 5,117,302 A | 5/1992 | Lipton | |
| 5,119,454 A | 6/1992 | McMahon et al. | |
| 5,124,821 A | 6/1992 | Antier et al. | |
| 5,138,687 A | 8/1992 | Horie et al. | |
| 5,139,192 A | 8/1992 | Simmonds et al. | |
| 5,142,357 A | 8/1992 | Lipton et al. | |
| 5,142,644 A | 8/1992 | Vansteenkiste et al. | |
| 5,148,302 A | 9/1992 | Nagano et al. | |
| 5,150,234 A | 9/1992 | Takahashi et al. | |
| 5,151,958 A | 9/1992 | Honkanen | |
| 5,153,751 A | 10/1992 | Ishikawa et al. | |
| 5,159,445 A | 10/1992 | Gitlin et al. | |
| 5,160,523 A | 11/1992 | Honkanen et al. | |
| 5,181,133 A | 1/1993 | Lipton | |
| 5,183,545 A | 2/1993 | Branca et al. | |
| 5,187,597 A | 2/1993 | Kato et al. | |
| 5,193,000 A | 3/1993 | Lipton et al. | |
| 5,198,912 A | 3/1993 | Ingwall et al. | |
| 5,198,914 A | 3/1993 | Arns | |
| 5,200,861 A | 4/1993 | Moskovich et al. | |
| 5,210,624 A | 5/1993 | Matsumoto et al. | |
| 5,210,801 A | 5/1993 | Fournier et al. | |
| 5,218,360 A | 6/1993 | Goetz et al. | |
| 5,218,480 A | 6/1993 | Moskovich et al. | |
| 5,224,198 A * | 6/1993 | Jachimowicz ......... G02B 6/003 |
| | | | 359/13 |
| 5,225,918 A | 7/1993 | Taniguchi et al. | |
| 5,239,372 A | 8/1993 | Lipton | |
| 5,240,636 A | 8/1993 | Doane et al. | |
| 5,241,337 A | 8/1993 | Betensky et al. | |
| 5,242,476 A | 9/1993 | Bartel et al. | |
| 5,243,413 A | 9/1993 | Gitlin et al. | |
| 5,251,048 A | 10/1993 | Doane et al. | |

(56) References Cited

U.S. PATENT DOCUMENTS

| | | |
|---|---|---|
| 5,264,950 A | 11/1993 | West et al. |
| 5,268,792 A | 12/1993 | Kreitzer et al. |
| 5,284,499 A | 2/1994 | Harvey et al. |
| 5,289,315 A | 2/1994 | Makita et al. |
| 5,295,208 A | 3/1994 | Caulfield et al. |
| 5,296,967 A | 3/1994 | Moskovich et al. |
| 5,299,289 A | 3/1994 | Omae et al. |
| 5,303,085 A | 4/1994 | Rallison |
| 5,306,923 A | 4/1994 | Kazmierski et al. |
| 5,309,283 A | 5/1994 | Kreitzer et al. |
| 5,313,330 A | 5/1994 | Betensky |
| 5,315,324 A | 5/1994 | Kubelik et al. |
| 5,315,419 A | 5/1994 | Saupe et al. |
| 5,315,440 A | 5/1994 | Betensky et al. |
| 5,317,405 A | 5/1994 | Kuriki et al. |
| 5,327,269 A | 7/1994 | Tilton et al. |
| 5,329,363 A | 7/1994 | Moskovich et al. |
| 5,335,099 A | 8/1994 | Smith |
| 5,341,230 A | 8/1994 | Smith |
| 5,343,147 A | 8/1994 | Sager et al. |
| 5,351,151 A | 9/1994 | Levy |
| 5,359,362 A | 10/1994 | Lewis et al. |
| 5,363,220 A | 11/1994 | Kuwayama et al. |
| 5,368,770 A | 11/1994 | Saupe et al. |
| 5,369,511 A | 11/1994 | Amos |
| 5,371,626 A | 12/1994 | Betensky |
| 5,400,069 A | 3/1995 | Braun et al. |
| 5,408,346 A | 4/1995 | Trissel et al. |
| 5,410,370 A | 4/1995 | Janssen |
| 5,410,376 A | 4/1995 | Cornsweet et al. |
| 5,416,510 A | 5/1995 | Lipton et al. |
| 5,416,514 A | 5/1995 | Janssen et al. |
| 5,418,584 A | 5/1995 | Larson |
| 5,418,871 A | 5/1995 | Revelli et al. |
| 5,428,480 A | 6/1995 | Betensky et al. |
| 5,437,811 A | 8/1995 | Doane et al. |
| 5,438,357 A | 8/1995 | McNelley |
| 5,452,385 A | 9/1995 | Izumi et al. |
| 5,453,863 A | 9/1995 | West et al. |
| 5,455,693 A | 10/1995 | Wreede et al. |
| 5,455,713 A | 10/1995 | Kreitzer et al. |
| 5,462,700 A | 10/1995 | Beeson et al. |
| 5,463,428 A | 10/1995 | Lipton et al. |
| 5,465,311 A | 11/1995 | Caulfield et al. |
| 5,471,326 A | 11/1995 | Hall et al. |
| 5,473,222 A | 12/1995 | Thoeny et al. |
| 5,476,611 A | 12/1995 | Nolan et al. |
| 5,481,321 A | 1/1996 | Lipton |
| 5,481,385 A | 1/1996 | Zimmerman et al. |
| 5,485,313 A | 1/1996 | Betensky |
| 5,493,430 A | 2/1996 | Lu et al. |
| 5,493,448 A | 2/1996 | Betensky et al. |
| 5,496,621 A | 3/1996 | Makita et al. |
| 5,499,140 A | 3/1996 | Betensky |
| 5,500,671 A | 3/1996 | Andersson et al. |
| 5,500,769 A | 3/1996 | Betensky |
| 5,510,913 A | 4/1996 | Hashimoto et al. |
| 5,515,184 A | 5/1996 | Caulfield et al. |
| 5,516,455 A | 5/1996 | Jacobine et al. |
| 5,524,272 A | 6/1996 | Podowski et al. |
| 5,528,720 A | 6/1996 | Winston et al. |
| 5,530,566 A | 6/1996 | Kumar |
| 5,532,736 A | 7/1996 | Kuriki et al. |
| 5,532,875 A | 7/1996 | Betemsky |
| 5,537,232 A | 7/1996 | Biles |
| RE35,310 E | 8/1996 | Moskovich |
| 5,543,950 A | 8/1996 | Lavrentovich et al. |
| 5,544,268 A | 8/1996 | Bischel et al. |
| 5,559,637 A | 9/1996 | Moskovich et al. |
| 5,572,248 A | 11/1996 | Allen et al. |
| 5,572,250 A | 11/1996 | Lipton et al. |
| 5,576,888 A | 11/1996 | Betensky |
| 5,579,026 A | 11/1996 | Tabata |
| 5,583,795 A | 12/1996 | Smyth |
| 5,585,035 A | 12/1996 | Nerad et al. |
| 5,593,615 A | 1/1997 | Nerad et al. |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,619,586 A | 4/1997 | Sibbald et al. |
| 5,621,529 A | 4/1997 | Gordon et al. |
| 5,621,552 A | 4/1997 | Coates et al. |
| 5,625,495 A | 4/1997 | Moskovich et al. |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,614 A | 9/1997 | Chien et al. |
| 5,668,907 A | 9/1997 | Veligdan |
| 5,677,797 A | 10/1997 | Betensky et al. |
| 5,680,231 A | 10/1997 | Grinberg et al. |
| 5,680,411 A | 10/1997 | Ramdane et al. |
| 5,682,255 A | 10/1997 | Friesem et al. |
| 5,686,931 A | 11/1997 | Fuenfschilling et al. |
| 5,686,975 A | 11/1997 | Lipton |
| 5,691,795 A | 11/1997 | Doane et al. |
| 5,694,230 A | 12/1997 | Welch |
| 5,695,682 A | 12/1997 | Doane et al. |
| 5,701,132 A | 12/1997 | Kollin et al. |
| 5,706,108 A | 1/1998 | Ando et al. |
| 5,706,136 A | 1/1998 | Okuyama et al. |
| 5,707,925 A | 1/1998 | Akada et al. |
| 5,710,645 A | 1/1998 | Phillips et al. |
| 5,724,189 A | 3/1998 | Ferrante |
| 5,724,463 A | 3/1998 | Deacon et al. |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,736,424 A | 4/1998 | Prybyla et al. |
| 5,742,262 A | 4/1998 | Tabata et al. |
| 5,745,266 A | 4/1998 | Smith et al. |
| 5,745,301 A | 4/1998 | Betensky et al. |
| 5,748,272 A | 5/1998 | Tanaka et al. |
| 5,748,277 A | 5/1998 | Huang et al. |
| 5,751,452 A | 5/1998 | Tanaka et al. |
| 5,757,546 A | 5/1998 | Lipton et al. |
| 5,760,931 A | 6/1998 | Saburi et al. |
| 5,760,960 A | 6/1998 | Lin et al. |
| 5,764,414 A | 6/1998 | King et al. |
| 5,771,320 A | 6/1998 | Stone |
| 5,790,288 A | 8/1998 | Jager et al. |
| 5,790,314 A | 8/1998 | Duck et al. |
| 5,798,641 A | 8/1998 | Spagna et al. |
| 5,804,609 A | 9/1998 | Ohnishi et al. |
| 5,808,804 A | 9/1998 | Moskovich |
| 5,812,608 A | 9/1998 | Valimaki et al. |
| 5,822,089 A | 10/1998 | Phillips et al. |
| 5,822,127 A | 10/1998 | Chen et al. |
| 5,825,448 A | 10/1998 | Bos et al. |
| 5,831,700 A | 11/1998 | Li et al. |
| 5,835,661 A | 11/1998 | Tai et al. |
| 5,841,507 A | 11/1998 | Barnes |
| 5,841,587 A | 11/1998 | Moskovich et al. |
| 5,847,787 A | 12/1998 | Fredley et al. |
| 5,856,842 A | 1/1999 | Tedesco |
| 5,857,043 A | 1/1999 | Cook et al. |
| 5,867,238 A | 2/1999 | Miller et al. |
| 5,867,618 A | 2/1999 | Ito et al. |
| 5,868,951 A | 2/1999 | Schuck et al. |
| 5,870,228 A | 2/1999 | Kreitzer et al. |
| 5,875,012 A | 2/1999 | Crawford et al. |
| 5,877,826 A | 3/1999 | Yang et al. |
| 5,886,822 A | 3/1999 | Spitzer |
| 5,892,598 A | 4/1999 | Asakawa et al. |
| 5,892,599 A | 4/1999 | Bahuguna |
| 5,898,511 A | 4/1999 | Mizutani et al. |

(56)  References Cited

U.S. PATENT DOCUMENTS

| | | | |
|---|---|---|---|
| 5,900,987 A | 5/1999 | Kreitzer et al. |
| 5,900,989 A | 5/1999 | Kreitzer |
| 5,903,395 A | 5/1999 | Rallison et al. |
| 5,903,396 A | 5/1999 | Rallison |
| 5,907,416 A | 5/1999 | Hegg et al. |
| 5,907,436 A | 5/1999 | Perry et al. |
| 5,911,018 A | 6/1999 | Bischel et al. |
| 5,917,459 A | 6/1999 | Son et al. |
| 5,926,147 A | 7/1999 | Sehm et al. |
| 5,929,946 A | 7/1999 | Sharp et al. |
| 5,929,960 A | 7/1999 | West et al. |
| 5,930,433 A | 7/1999 | Williamson et al. |
| 5,936,776 A | 8/1999 | Kreitzer |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,949,508 A | 9/1999 | Kumar et al. |
| 5,956,113 A | 9/1999 | Crawford |
| 5,962,147 A | 10/1999 | Shalhub et al. |
| 5,963,375 A | 10/1999 | Kreitzer |
| 5,966,223 A | 10/1999 | Friesem et al. |
| 5,969,874 A | 10/1999 | Moskovich |
| 5,969,876 A | 10/1999 | Kreitzer et al. |
| 5,973,727 A | 10/1999 | McGrew et al. |
| 5,974,162 A | 10/1999 | Metz et al. |
| 5,985,422 A | 11/1999 | Krauter |
| 5,986,746 A | 11/1999 | Metz et al. |
| 5,991,087 A | 11/1999 | Rallison |
| 5,999,089 A | 12/1999 | Carlson et al. |
| 5,999,282 A | 12/1999 | Suzuki et al. |
| 5,999,314 A | 12/1999 | Asakura et al. |
| 6,014,187 A | 1/2000 | Taketomi et al. |
| 6,023,375 A | 2/2000 | Kreitzer |
| 6,042,947 A | 3/2000 | Asakura et al. |
| 6,043,585 A | 3/2000 | Plessky et al. |
| 6,046,585 A | 4/2000 | Simmonds |
| 6,052,540 A | 4/2000 | Koyama |
| 6,061,107 A | 5/2000 | Yang |
| 6,061,463 A | 5/2000 | Metz et al. |
| 6,069,728 A | 5/2000 | Huignard et al. |
| 6,075,626 A | 6/2000 | Mizutani et al. |
| 6,078,427 A | 6/2000 | Fontaine et al. |
| 6,084,998 A | 7/2000 | Straayer |
| 6,094,311 A | 7/2000 | Moskovich |
| 6,097,551 A | 8/2000 | Kreitzer |
| 6,104,448 A | 8/2000 | Doane et al. |
| 6,107,943 A | 8/2000 | Schroeder |
| 6,115,152 A | 9/2000 | Popovich et al. |
| 6,118,908 A | 9/2000 | Bischel et al. |
| 6,121,899 A | 9/2000 | Theriault |
| 6,124,954 A | 9/2000 | Popovich et al. |
| 6,127,066 A | 10/2000 | Ueda et al. |
| 6,128,058 A | 10/2000 | Walton et al. |
| 6,133,971 A | 10/2000 | Silverstein et al. |
| 6,133,975 A | 10/2000 | Li et al. |
| 6,137,630 A | 10/2000 | Tsou et al. |
| 6,141,074 A | 10/2000 | Bos et al. |
| 6,141,154 A | 10/2000 | Kreitzer et al. |
| 6,151,142 A | 11/2000 | Phillips et al. |
| 6,154,190 A | 11/2000 | Yang et al. |
| 6,156,243 A | 12/2000 | Kosuga et al. |
| 6,167,169 A | 12/2000 | Brinkman et al. |
| 6,169,594 B1 | 1/2001 | Aye et al. |
| 6,169,613 B1 | 1/2001 | Amitai et al. |
| 6,169,636 B1 | 1/2001 | Kreitzer et al. |
| 6,172,792 B1 | 1/2001 | Jepsen et al. |
| 6,176,837 B1 | 1/2001 | Foxlin |
| 6,185,015 B1 | 2/2001 | Reinhorn et al. |
| 6,185,016 B1 | 2/2001 | Popovich |
| 6,188,462 B1 | 2/2001 | Lavrentovich et al. |
| 6,191,887 B1 | 2/2001 | Michaloski et al. |
| 6,195,206 B1 | 2/2001 | Yona et al. |
| 6,195,209 B1 | 2/2001 | Kreitzer et al. |
| 6,204,835 B1 | 3/2001 | Yang et al. |
| 6,211,976 B1 | 4/2001 | Popovich et al. |
| 6,215,579 B1 | 4/2001 | Bloom et al. |
| 6,218,316 B1 | 4/2001 | Marsh |
| 6,222,297 B1 | 4/2001 | Perdue |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,266,166 B1 | 7/2001 | Katsumata et al. |
| 6,268,839 B1 | 7/2001 | Yang et al. |
| 6,269,203 B1 | 7/2001 | Davies et al. |
| 6,275,031 B1 | 8/2001 | Simmonds et al. |
| 6,278,429 B1 | 8/2001 | Ruth et al. |
| 6,285,813 B1 | 9/2001 | Schultz et al. |
| 6,297,860 B1 | 10/2001 | Moskovich et al. |
| 6,301,056 B1 | 10/2001 | Kreitzer et al. |
| 6,301,057 B1 | 10/2001 | Kreitzer et al. |
| 6,317,083 B1 | 11/2001 | Johnson et al. |
| 6,317,227 B1 | 11/2001 | Mizutani et al. |
| 6,317,228 B2 | 11/2001 | Popovich et al. |
| 6,317,528 B1 | 11/2001 | Gadkaree et al. |
| 6,320,563 B1 | 11/2001 | Yang et al. |
| 6,321,069 B1 | 11/2001 | Piirainen |
| 6,323,970 B1 | 11/2001 | Popovich |
| 6,323,989 B1 | 11/2001 | Jacobson et al. |
| 6,324,014 B1 | 11/2001 | Moskovich et al. |
| 6,327,089 B1 | 12/2001 | Hosaki et al. |
| 6,330,109 B1 | 12/2001 | Ishii et al. |
| 6,333,819 B1 | 12/2001 | Svedenkrans |
| 6,335,224 B1 | 1/2002 | Peterson et al. |
| 6,339,486 B1 | 1/2002 | Popovich |
| 6,340,540 B1 | 1/2002 | Ueda et al. |
| 6,351,273 B1 | 2/2002 | Lemelson et al. |
| 6,351,333 B2 | 2/2002 | Araki et al. |
| 6,356,172 B1 | 3/2002 | Koivisto et al. |
| 6,356,674 B1 | 3/2002 | Davis et al. |
| 6,359,730 B2 | 3/2002 | Tervonen |
| 6,359,737 B1 | 3/2002 | Stringfellow |
| 6,366,281 B1 | 4/2002 | Lipton et al. |
| 6,366,369 B2 | 4/2002 | Ichikawa et al. |
| 6,366,378 B1 | 4/2002 | Tervonen et al. |
| 6,377,238 B1 | 4/2002 | McPheters |
| 6,377,321 B1 | 4/2002 | Khan et al. |
| 6,388,797 B1 | 5/2002 | Lipton et al. |
| 6,392,812 B1 | 5/2002 | Howard |
| 6,407,724 B2 | 6/2002 | Waldern et al. |
| 6,409,687 B1 | 6/2002 | Foxlin |
| 6,411,444 B1 | 6/2002 | Moskovich et al. |
| 6,414,760 B1 | 7/2002 | Lopez et al. |
| 6,417,971 B1 | 7/2002 | Moskovich et al. |
| 6,421,109 B1 | 7/2002 | Popovich |
| 6,437,563 B1 | 8/2002 | Simmonds et al. |
| 6,445,512 B1 | 9/2002 | Moskovich et al. |
| 6,449,095 B1 | 9/2002 | Ohtaki et al. |
| 6,456,584 B1 | 9/2002 | Nagata et al. |
| 6,470,132 B1 | 10/2002 | Nousiainen et al. |
| 6,473,209 B1 | 10/2002 | Popovich |
| 6,476,974 B1 | 11/2002 | Kreitzer et al. |
| 6,483,303 B2 | 11/2002 | Simmonds et al. |
| 6,486,997 B1 | 11/2002 | Bruzzone et al. |
| 6,504,518 B1 | 1/2003 | Kuwayama et al. |
| 6,504,629 B1 | 1/2003 | Popovich et al. |
| 6,509,937 B1 | 1/2003 | Moskovich et al. |
| 6,510,263 B1 | 1/2003 | Maisenhoelder et al. |
| 6,518,747 B2 | 2/2003 | Sager et al. |
| 6,519,088 B1 | 2/2003 | Lipton |
| 6,522,794 B1 | 2/2003 | Bischel et al. |
| 6,522,795 B1 | 2/2003 | Jordan et al. |
| 6,524,771 B2 | 2/2003 | Maeda et al. |
| 6,529,336 B1 | 3/2003 | Kreitzer et al. |
| 6,534,977 B1 | 3/2003 | Duncan et al. |
| 6,538,775 B1 | 3/2003 | Bowley et al. |
| 6,545,778 B2 | 4/2003 | Ono et al. |
| 6,545,808 B1 | 4/2003 | Ehbets et al. |
| 6,550,949 B1 | 4/2003 | Bauer et al. |
| 6,552,789 B1 | 4/2003 | Modro |
| 6,557,413 B2 | 5/2003 | Nieminen et al. |
| 6,559,813 B1 | 5/2003 | DeLuca et al. |

(56) References Cited

U.S. PATENT DOCUMENTS

| | | |
|---|---|---|
| 6,560,019 B2 | 5/2003 | Nakai |
| 6,563,648 B2 | 5/2003 | Gleckman et al. |
| 6,563,650 B2 | 5/2003 | Moskovich et al. |
| 6,567,014 B1 | 5/2003 | Hansen et al. |
| 6,567,573 B1 | 5/2003 | Domash et al. |
| 6,577,411 B1 | 6/2003 | David et al. |
| 6,577,429 B1 | 6/2003 | Kurtz et al. |
| 6,580,529 B1 | 6/2003 | Amitai et al. |
| 6,583,838 B1 | 6/2003 | Hoke et al. |
| 6,583,873 B1 | 6/2003 | Goncharov et al. |
| 6,587,619 B1 | 7/2003 | Kinoshita |
| 6,594,090 B2 | 7/2003 | Kruschwitz et al. |
| 6,596,193 B2 | 7/2003 | Coates et al. |
| 6,597,176 B2 | 7/2003 | Simmonds et al. |
| 6,597,475 B1 | 7/2003 | Shirakura et al. |
| 6,598,987 B1 | 7/2003 | Parikka |
| 6,600,590 B2 | 7/2003 | Roddy et al. |
| 6,608,720 B1 | 8/2003 | Freeman |
| 6,611,253 B1 | 8/2003 | Cohen |
| 6,618,104 B1 | 9/2003 | Date et al. |
| 6,624,943 B2 | 9/2003 | Nakai et al. |
| 6,625,381 B2 | 9/2003 | Roddy et al. |
| 6,646,772 B1 | 11/2003 | Popovich et al. |
| 6,646,810 B2 | 11/2003 | Harter, Jr. et al. |
| 6,661,495 B1 | 12/2003 | Popovich |
| 6,661,578 B2 | 12/2003 | Hedrick |
| 6,667,134 B1 | 12/2003 | Sutherland et al. |
| 6,674,578 B2 | 1/2004 | Sugiyama et al. |
| 6,677,086 B1 | 1/2004 | Sutehrland et al. |
| 6,678,093 B1 | 1/2004 | Scobey et al. |
| 6,680,720 B1 | 1/2004 | Lee et al. |
| 6,686,815 B1 | 2/2004 | Mirshekarl-Syahkal et al. |
| 6,690,516 B2 | 2/2004 | Aritake et al. |
| 6,692,666 B2 | 2/2004 | Sutherland et al. |
| 6,699,407 B1 | 3/2004 | Sutehrland et al. |
| 6,706,086 B2 | 3/2004 | Emig et al. |
| 6,706,451 B1 | 3/2004 | Sutherland et al. |
| 6,714,329 B2 | 3/2004 | Sekine et al. |
| 6,721,096 B2 | 4/2004 | Bruzzone et al. |
| 6,730,442 B1 | 5/2004 | Sutherland et al. |
| 6,731,434 B1 | 5/2004 | Hua et al. |
| 6,738,105 B1 | 5/2004 | Hannah et al. |
| 6,741,189 B1 | 5/2004 | Gibbons et al. |
| 6,744,478 B1 | 6/2004 | Asakura et al. |
| 6,747,781 B2 | 6/2004 | Trisnadi et al. |
| 6,748,342 B1 | 6/2004 | Dickhaus |
| 6,750,941 B2 | 6/2004 | Satoh et al. |
| 6,750,995 B2 | 6/2004 | Dickson |
| 6,750,996 B2 | 6/2004 | Jagt et al. |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,791,629 B2 | 9/2004 | Moskovich et al. |
| 6,791,739 B2 | 9/2004 | Ramanujan et al. |
| 6,804,066 B1 | 10/2004 | Ha et al. |
| 6,805,490 B2 | 10/2004 | Levola |
| 6,821,457 B1 | 11/2004 | Natarajan et al. |
| 6,822,713 B1 | 11/2004 | Yaroshchuk et al. |
| 6,825,987 B2 | 11/2004 | Repetto et al. |
| 6,829,095 B2 | 12/2004 | Amitai |
| 6,830,789 B2 | 12/2004 | Doane et al. |
| 6,833,955 B2 | 12/2004 | Niv |
| 6,836,369 B2 | 12/2004 | Fujikawa et al. |
| 6,842,563 B2 | 1/2005 | Zhang et al. |
| 6,844,212 B2 | 1/2005 | Bond et al. |
| 6,844,980 B2 | 1/2005 | He et al. |
| 6,844,989 B1 | 1/2005 | Jo et al. |
| 6,847,274 B2 | 1/2005 | Salmela et al. |
| 6,847,488 B2 | 1/2005 | Travis |
| 6,850,210 B1 | 2/2005 | Lipton et al. |
| 6,853,491 B1 | 2/2005 | Ruhle et al. |
| 6,853,493 B2 | 2/2005 | Kreitzer et al. |
| 6,861,107 B2 | 3/2005 | Klasen-memmer et al. |
| 6,864,861 B2 | 3/2005 | Schehrer et al. |
| 6,864,927 B1 | 3/2005 | Cathey |
| 6,864,931 B1 | 3/2005 | Kumar et al. |
| 6,867,888 B2 | 3/2005 | Sutherland et al. |
| 6,873,443 B1 | 3/2005 | Joubert et al. |
| 6,876,791 B2 | 4/2005 | Murashima et al. |
| 6,878,494 B2 | 4/2005 | Sutehrland et al. |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,919,003 B2 | 7/2005 | Ikeda et al. |
| 6,922,267 B2 | 7/2005 | Endo et al. |
| 6,926,429 B2 | 8/2005 | Barlow et al. |
| 6,927,570 B2 | 8/2005 | Simmonds et al. |
| 6,927,694 B1 | 8/2005 | Smith et al. |
| 6,940,361 B1 | 9/2005 | Jokio et al. |
| 6,943,788 B2 | 9/2005 | Tomono |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,952,435 B2 | 10/2005 | Lai et al. |
| 6,958,662 B1 | 10/2005 | Salmela et al. |
| 6,958,868 B1 | 10/2005 | Pender |
| 6,963,454 B1 | 11/2005 | Martins et al. |
| 6,972,788 B1 | 12/2005 | Robertson et al. |
| 6,975,345 B1 | 12/2005 | Lipton et al. |
| 6,980,365 B2 | 12/2005 | Moskovich |
| 6,985,296 B2 | 1/2006 | Lipton et al. |
| 6,987,908 B2 | 1/2006 | Bond et al. |
| 6,999,239 B1 | 2/2006 | Martins et al. |
| 7,002,618 B2 | 2/2006 | Lipton et al. |
| 7,002,753 B2 | 2/2006 | Moskovich et al. |
| 7,003,075 B2 | 2/2006 | Miyake et al. |
| 7,003,187 B2 | 2/2006 | Frick et al. |
| 7,006,732 B2 | 2/2006 | Gunn et al. |
| 7,009,773 B2 | 3/2006 | Chaoulov et al. |
| 7,018,563 B1 | 3/2006 | Sutherland et al. |
| 7,018,686 B2 | 3/2006 | Sutehrland et al. |
| 7,018,744 B2 | 3/2006 | Otaki et al. |
| 7,019,793 B2 | 3/2006 | Moskovich et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,046,439 B2 | 5/2006 | Kaminsky et al. |
| 7,050,674 B2 | 5/2006 | Lee et al. |
| 7,053,735 B2 | 5/2006 | Salmela et al. |
| 7,053,991 B2 | 5/2006 | Sandusky |
| 7,054,045 B2 | 5/2006 | McPheters et al. |
| 7,058,434 B2 | 6/2006 | Wang et al. |
| 7,068,405 B2 | 6/2006 | Sutherland et al. |
| 7,068,898 B2 | 6/2006 | Buretea et al. |
| 7,072,020 B1 | 7/2006 | Sutherland et al. |
| 7,075,273 B2 | 7/2006 | O'Gorman et al. |
| 7,077,984 B1 | 7/2006 | Natarajan et al. |
| 7,081,215 B2 | 7/2006 | Natarajan et al. |
| 7,088,457 B1 | 8/2006 | Zou et al. |
| 7,088,515 B2 | 8/2006 | Lipton |
| 7,095,562 B1 | 8/2006 | Peng et al. |
| 7,099,080 B2 | 8/2006 | Lipton et al. |
| 7,101,048 B2 | 9/2006 | Travis |
| 7,108,383 B1 | 9/2006 | Mitchell et al. |
| 7,110,184 B1 | 9/2006 | Yona et al. |
| 7,119,965 B1 | 10/2006 | Rolland et al. |
| 7,123,418 B2 | 10/2006 | Weber et al. |
| 7,123,421 B1 | 10/2006 | Moskovich et al. |
| 7,126,418 B2 | 10/2006 | Hunton et al. |
| 7,126,583 B1 | 10/2006 | Breed |
| 7,132,200 B1 | 11/2006 | Ueda et al. |
| 7,133,084 B2 | 11/2006 | Moskovich et al. |
| 7,139,109 B2 | 11/2006 | Mukawa |
| RE39,424 E | 12/2006 | Moskovich |
| 7,145,729 B2 | 12/2006 | Kreitzer et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,167,286 B2 | 1/2007 | Anderson et al. |
| 7,167,616 B2 | 1/2007 | Ling et al. |

(56)            References Cited

U.S. PATENT DOCUMENTS

| | | | |
|---|---|---|---|
| 7,175,780 B1 | 2/2007 | Sutherland et al. |
| 7,181,105 B2 | 2/2007 | Teramura et al. |
| 7,181,108 B2 | 2/2007 | Levola |
| 7,184,002 B2 | 2/2007 | Lipton et al. |
| 7,184,615 B2 | 2/2007 | Levola |
| 7,186,567 B1 | 3/2007 | Sutherland et al. |
| 7,190,849 B2 | 3/2007 | Katase |
| 7,198,737 B2 | 4/2007 | Natarajan et al. |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,212,175 B1 | 5/2007 | Magee et al. |
| 7,218,817 B2 | 5/2007 | Magnusson et al. |
| 7,230,767 B2 | 6/2007 | Walck et al. |
| 7,230,770 B2 | 6/2007 | Kreitzer et al. |
| 7,242,527 B2 | 7/2007 | Spitzer et al. |
| 7,248,128 B2 | 7/2007 | Mattila et al. |
| 7,248,765 B2 | 7/2007 | Lee et al. |
| 7,256,915 B2 | 8/2007 | Sutherland et al. |
| 7,259,906 B1 | 8/2007 | Islam |
| 7,265,882 B2 | 9/2007 | Sutherland et al. |
| 7,265,903 B2 | 9/2007 | Sutherland et al. |
| 7,268,946 B2 | 9/2007 | Wang |
| 7,280,722 B2 | 10/2007 | Temkin et al. |
| 7,285,903 B2 | 10/2007 | Cull et al. |
| 7,286,272 B2 | 10/2007 | Mukawa |
| 7,289,069 B2 | 10/2007 | Ranta |
| RE39,911 E | 11/2007 | Moskovich |
| 7,299,983 B2 | 11/2007 | Piikivi |
| 7,301,601 B2 | 11/2007 | Lin et al. |
| 7,312,906 B2 | 12/2007 | Sutherland et al. |
| 7,313,291 B2 | 12/2007 | Okhotnikov et al. |
| D559,250 S | 1/2008 | Pombo |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,333,685 B2 | 2/2008 | Stone et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,349,612 B2 | 3/2008 | Nishii et al. |
| 7,356,218 B2 | 4/2008 | Kato et al. |
| 7,356,224 B2 | 4/2008 | Levner et al. |
| 7,369,911 B1 | 5/2008 | Volant et al. |
| 7,375,870 B2 | 5/2008 | Schorpp |
| 7,375,886 B2 | 5/2008 | Lipton et al. |
| 7,376,068 B1 | 5/2008 | Khoury |
| 7,376,307 B2 | 5/2008 | Singh et al. |
| 7,389,023 B2 | 6/2008 | Yeo et al. |
| 7,391,573 B2 | 6/2008 | Amitai |
| 7,394,865 B2 | 7/2008 | Borran et al. |
| 7,394,961 B2 | 7/2008 | Kornilovich et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,413,678 B1 | 8/2008 | Natarajan et al. |
| 7,413,679 B1 | 8/2008 | Sutherland et al. |
| 7,415,173 B2 | 8/2008 | Kassamakov et al. |
| 7,416,818 B2 | 8/2008 | Sutherland et al. |
| 7,418,170 B2 | 8/2008 | Mukawa et al. |
| 7,420,733 B1 | 9/2008 | Natarajan et al. |
| 7,433,116 B1 | 10/2008 | Islam |
| 7,436,568 B1 | 10/2008 | Kuykendall, Jr. |
| D581,447 S | 11/2008 | Yee |
| 7,447,967 B2 | 11/2008 | Onggosanusi et al. |
| 7,453,612 B2 | 11/2008 | Mukawa |
| 7,454,103 B2 | 11/2008 | Parriaux |
| 7,457,040 B2 | 11/2008 | Amitai |
| 7,466,994 B2 | 12/2008 | Pihlaja et al. |
| 7,477,206 B2 | 1/2009 | Cowan et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,499,217 B2 | 3/2009 | Cakmakci et al. |
| 7,500,104 B2 | 3/2009 | Goland |
| 7,511,891 B2 | 3/2009 | Messerschmidt |
| 7,513,668 B1 | 4/2009 | Peng et al. |
| 7,522,344 B1 | 4/2009 | Curatu et al. |
| 7,525,448 B1 | 4/2009 | Wilson et al. |
| 7,528,385 B2 | 5/2009 | Volodin et al. |
| 7,542,210 B2 | 6/2009 | Chirieleison |
| 7,545,429 B2 | 6/2009 | Travis |
| 7,550,234 B2 | 6/2009 | Otaki et al. |
| 7,558,446 B2 | 7/2009 | Wimberger-friedl et al. |
| 7,567,372 B2 | 7/2009 | Schorpp |
| 7,570,322 B1 | 8/2009 | Sutherland et al. |
| 7,570,405 B1 | 8/2009 | Sutherland et al. |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,583,423 B2 | 9/2009 | Sutherland et al. |
| 7,587,110 B2 | 9/2009 | Singh et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,605,719 B1 | 10/2009 | Wenger et al. |
| 7,605,774 B1 | 10/2009 | Brandt et al. |
| 7,605,882 B1 | 10/2009 | Sutherland et al. |
| 7,616,270 B2 | 11/2009 | Hirabayashi et al. |
| 7,617,022 B1 | 11/2009 | Wood et al. |
| 7,618,750 B2 | 11/2009 | Ueda et al. |
| 7,619,739 B1 | 11/2009 | Sutherland et al. |
| 7,619,825 B1 | 11/2009 | Peng et al. |
| 7,629,086 B2 | 12/2009 | Otaki et al. |
| 7,639,208 B1 | 12/2009 | Ha et al. |
| 7,639,911 B2 | 12/2009 | Lee et al. |
| 7,643,214 B2 | 1/2010 | Amitai |
| 7,643,225 B1 | 1/2010 | Tsai |
| 7,656,585 B1 | 2/2010 | Powell et al. |
| 7,660,047 B1 | 2/2010 | Travis et al. |
| 7,672,024 B2 | 3/2010 | Kuan |
| 7,672,055 B2 | 3/2010 | Amitai |
| 7,672,549 B2 | 3/2010 | Ghosh et al. |
| 7,675,021 B2 | 3/2010 | Lapstun |
| 7,675,684 B1 | 3/2010 | Weissman et al. |
| 7,691,248 B2 | 4/2010 | Ikeda et al. |
| 7,710,622 B2 | 5/2010 | Takabayashi et al. |
| 7,710,654 B2 | 5/2010 | Ashkenazi et al. |
| 7,711,228 B2 | 5/2010 | Noda et al. |
| 7,724,441 B2 | 5/2010 | Amitai |
| 7,724,442 B2 | 5/2010 | Amitai |
| 7,724,443 B2 | 5/2010 | Amitai |
| 7,733,571 B1 | 6/2010 | Li |
| 7,733,572 B1 | 6/2010 | Brown et al. |
| 7,740,387 B2 | 6/2010 | Schultz et al. |
| 7,747,113 B2 | 6/2010 | Mukawa et al. |
| 7,751,122 B2 | 7/2010 | Amitai |
| 7,751,662 B2 | 7/2010 | Kleemann et al. |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,843,642 B2 | 11/2010 | Shaoulov et al. |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,866,869 B2 | 1/2011 | Karakawa |
| 7,872,707 B1 | 1/2011 | Sutherland et al. |

(56) References Cited

U.S. PATENT DOCUMENTS

| 7,872,804 | B2 | 1/2011 | Moon et al. |
| 7,884,593 | B2 | 2/2011 | Simmonds et al. |
| 7,884,985 | B2 | 2/2011 | Amitai et al. |
| 7,887,186 | B2 | 2/2011 | Watanabe |
| 7,903,921 | B2 | 3/2011 | Ostergard |
| 7,907,342 | B2 | 3/2011 | Simmonds et al. |
| 7,920,787 | B2 | 4/2011 | Gentner et al. |
| 7,928,862 | B1 | 4/2011 | Matthews |
| 7,936,513 | B2 | 5/2011 | Wu et al. |
| 7,936,519 | B2 | 5/2011 | Mukawa et al. |
| 7,944,428 | B2 | 5/2011 | Travis |
| 7,944,616 | B2 | 5/2011 | Mukawa |
| 7,949,214 | B2 | 5/2011 | DeJong et al. |
| D640,310 | S | 6/2011 | Suzuki et al. |
| 7,961,117 | B1 | 6/2011 | Zimmerman et al. |
| 7,969,644 | B2 | 6/2011 | Tilleman et al. |
| 7,969,657 | B2 | 6/2011 | Cakmakci et al. |
| 7,970,246 | B2 | 6/2011 | Travis et al. |
| 7,976,208 | B2 | 7/2011 | Travis |
| 7,984,884 | B1 | 7/2011 | Iliev et al. |
| 7,999,982 | B2 | 8/2011 | Endo et al. |
| 8,000,020 | B2 | 8/2011 | Amitai et al. |
| 8,000,491 | B2 | 8/2011 | Brodkin et al. |
| 8,004,765 | B2 | 8/2011 | Amitai |
| 8,014,050 | B2 | 9/2011 | McGrew |
| 8,016,475 | B2 | 9/2011 | Travis |
| 8,018,579 | B1 | 9/2011 | Krah |
| 8,022,942 | B2 | 9/2011 | Bathiche et al. |
| 8,023,783 | B2 | 9/2011 | Mukawa et al. |
| RE42,992 | E | 12/2011 | David |
| 8,073,296 | B2 * | 12/2011 | Mukawa .............. G02B 6/0033 |
| | | | 359/33 |
| 8,077,274 | B2 | 12/2011 | Sutherland et al. |
| 8,079,713 | B2 | 12/2011 | Ashkenazi |
| 8,082,222 | B2 | 12/2011 | Rangarajan et al. |
| 8,086,030 | B2 | 12/2011 | Gordon et al. |
| 8,089,568 | B1 | 1/2012 | Brown et al. |
| 8,093,451 | B2 | 1/2012 | Spangenberg et al. |
| 8,098,439 | B2 | 1/2012 | Amitai et al. |
| 8,105,662 | B2 | 1/2012 | Cherkaoui et al. |
| 8,107,023 | B2 | 1/2012 | Simmonds et al. |
| 8,107,780 | B2 | 1/2012 | Simmonds |
| 8,120,548 | B1 | 2/2012 | Barber |
| 8,120,848 | B2 | 2/2012 | Isano |
| 8,132,948 | B2 | 3/2012 | Owen et al. |
| 8,132,976 | B2 | 3/2012 | Odell et al. |
| 8,134,434 | B2 | 3/2012 | Diederichs et al. |
| 8,136,690 | B2 | 3/2012 | Fang et al. |
| 8,137,981 | B2 | 3/2012 | Andrew et al. |
| 8,142,016 | B2 | 3/2012 | Legerton et al. |
| 8,149,086 | B2 | 4/2012 | Klein et al. |
| 8,152,315 | B2 | 4/2012 | Travis et al. |
| 8,152,353 | B2 | 4/2012 | Yang et al. |
| 8,155,489 | B2 | 4/2012 | Saarikko et al. |
| 8,159,752 | B2 | 4/2012 | Wertheim et al. |
| 8,160,409 | B2 | 4/2012 | Large |
| 8,160,411 | B2 | 4/2012 | Levola et al. |
| D659,137 | S | 5/2012 | Matsumoto |
| 8,167,173 | B1 | 5/2012 | Simmonds et al. |
| 8,186,874 | B2 | 5/2012 | Sinbar et al. |
| 8,188,925 | B2 | 5/2012 | DeJean |
| 8,189,263 | B1 | 5/2012 | Wang et al. |
| 8,189,973 | B2 | 5/2012 | Travis et al. |
| D661,334 | S | 6/2012 | Cho et al. |
| D661,335 | S | 6/2012 | Jeon |
| 8,194,325 | B2 | 6/2012 | Levola et al. |
| 8,199,803 | B2 | 6/2012 | Hauske et al. |
| 8,202,405 | B2 | 6/2012 | Meneghini et al. |
| 8,213,065 | B2 | 7/2012 | Mukawa |
| 8,213,755 | B2 | 7/2012 | Mukawa et al. |
| 8,220,966 | B2 | 7/2012 | Mukawa |
| 8,224,133 | B2 | 7/2012 | Popovich et al. |
| 8,233,204 | B1 | 7/2012 | Robbins et al. |
| 8,253,914 | B2 | 8/2012 | Kajiya et al. |
| 8,254,031 | B2 | 8/2012 | Levola |
| 8,264,498 | B1 | 9/2012 | Vanderkamp et al. |
| 8,294,749 | B2 | 10/2012 | Cable |
| 8,295,710 | B2 | 10/2012 | Marcus |
| 8,301,031 | B2 | 10/2012 | Gentner et al. |
| 8,305,577 | B2 | 11/2012 | Kivioja et al. |
| 8,306,423 | B2 | 11/2012 | Gottwald et al. |
| 8,310,327 | B2 | 11/2012 | Willers et al. |
| 8,314,819 | B2 | 11/2012 | Kimmel et al. |
| 8,314,993 | B2 | 11/2012 | Levola et al. |
| 8,320,032 | B2 | 11/2012 | Levola |
| 8,321,810 | B2 | 11/2012 | Heintze |
| 8,325,166 | B2 | 12/2012 | Akutsu et al. |
| 8,329,773 | B2 | 12/2012 | Fäcke et al. |
| 8,335,040 | B2 | 12/2012 | Mukawa et al. |
| 8,335,414 | B2 | 12/2012 | Zinoviev et al. |
| D673,996 | S | 1/2013 | Kim et al. |
| 8,351,744 | B2 | 1/2013 | Travis et al. |
| 8,354,640 | B2 | 1/2013 | Hamre et al. |
| 8,354,806 | B2 | 1/2013 | Travis et al. |
| 8,355,610 | B2 | 1/2013 | Simmonds |
| 8,369,019 | B2 | 2/2013 | Baker et al. |
| 8,376,548 | B2 | 2/2013 | Schultz |
| 8,382,293 | B2 | 2/2013 | Phillips et al. |
| 8,384,504 | B2 | 2/2013 | Diederichs et al. |
| 8,384,694 | B2 | 2/2013 | Powell et al. |
| 8,384,730 | B1 | 2/2013 | Vanderkamp et al. |
| 8,396,339 | B2 | 3/2013 | Mukawa et al. |
| 8,396,341 | B2 | 3/2013 | Lee et al. |
| 8,398,242 | B2 | 3/2013 | Yamamoto et al. |
| 8,403,490 | B2 | 3/2013 | Sugiyama et al. |
| 8,422,840 | B2 | 4/2013 | Large |
| 8,427,439 | B2 | 4/2013 | Larsen et al. |
| 8,432,363 | B2 | 4/2013 | Saarikko et al. |
| 8,432,372 | B2 | 4/2013 | Butler et al. |
| 8,432,614 | B2 | 4/2013 | Amitai |
| 8,441,731 | B2 | 5/2013 | Sprague |
| 8,447,365 | B1 | 5/2013 | Imanuel |
| 8,466,953 | B2 | 6/2013 | Levola |
| 8,472,119 | B1 | 6/2013 | Kelly |
| 8,472,120 | B2 | 6/2013 | Border et al. |
| 8,477,261 | B2 | 7/2013 | Travis et al. |
| 8,481,130 | B2 | 7/2013 | Harding et al. |
| 8,482,858 | B2 | 7/2013 | Sprague |
| 8,488,246 | B2 | 7/2013 | Border et al. |
| 8,491,121 | B2 | 7/2013 | Tilleman et al. |
| 8,491,136 | B2 | 7/2013 | Travis et al. |
| 8,493,366 | B2 | 7/2013 | Bathiche et al. |
| 8,493,562 | B2 | 7/2013 | Kopp et al. |
| 8,493,662 | B2 | 7/2013 | Noui |
| 8,494,229 | B2 | 7/2013 | Jarvenpaa et al. |
| 8,508,848 | B2 | 8/2013 | Saarikko |
| 8,520,309 | B2 | 8/2013 | Sprague |
| D691,192 | S | 10/2013 | Stanley et al. |
| 8,547,638 | B2 | 10/2013 | Levola |
| 8,548,290 | B2 | 10/2013 | Travers et al. |
| 8,565,560 | B2 | 10/2013 | Popovich et al. |
| D694,310 | S | 11/2013 | Cho et al. |
| D694,311 | S | 11/2013 | Cho et al. |
| 8,578,038 | B2 | 11/2013 | Kaikuranta et al. |
| 8,581,831 | B2 | 11/2013 | Travis |
| 8,582,206 | B2 | 11/2013 | Travis |
| 8,593,734 | B2 | 11/2013 | Laakkonen |
| 8,611,014 | B2 | 12/2013 | Valera et al. |
| 8,619,062 | B2 | 12/2013 | Powell et al. |
| D697,130 | S | 1/2014 | Lövgren |
| 8,633,786 | B2 | 1/2014 | Ermolov et al. |
| 8,634,120 | B2 | 1/2014 | Popovich et al. |
| 8,634,139 | B1 | 1/2014 | Brown et al. |
| 8,639,072 | B2 | 1/2014 | Popovich et al. |
| 8,643,691 | B2 | 2/2014 | Rosenfeld et al. |
| 8,643,948 | B2 | 2/2014 | Amitai et al. |
| 8,649,099 | B2 | 2/2014 | Schultz et al. |
| 8,654,420 | B2 | 2/2014 | Simmonds |
| 8,659,826 | B1 | 2/2014 | Brown et al. |
| D701,206 | S | 3/2014 | Luckey et al. |
| 8,670,029 | B2 | 3/2014 | McEldowney |
| 8,693,087 | B2 | 4/2014 | Nowatzyk et al. |
| 8,698,705 | B2 | 4/2014 | Burke |
| 8,731,350 | B1 | 5/2014 | Lin et al. |

(56) References Cited

U.S. PATENT DOCUMENTS

| | | | |
|---|---|---|---|
| 8,736,802 B2 | 5/2014 | Kajiya et al. |
| 8,736,963 B2 | 5/2014 | Robbins et al. |
| 8,742,952 B1 | 6/2014 | Bold |
| 8,746,008 B1 | 6/2014 | Mauritsen et al. |
| 8,749,886 B2 | 6/2014 | Gupta |
| 8,749,890 B1 | 6/2014 | Wood et al. |
| 8,767,294 B2 | 7/2014 | Chen et al. |
| 8,786,923 B2 | 7/2014 | Chuang et al. |
| 8,810,600 B2 | 8/2014 | Bohn et al. |
| 8,810,913 B2 | 8/2014 | Simmonds et al. |
| 8,810,914 B2 | 8/2014 | Amitai |
| 8,814,691 B2 | 8/2014 | Haddick et al. |
| 8,816,578 B1 | 8/2014 | Peng et al. |
| 8,817,350 B1 | 8/2014 | Robbins et al. |
| 8,824,836 B2 | 9/2014 | Sugiyama |
| 8,830,143 B1 | 9/2014 | Pitchford et al. |
| 8,830,584 B2 | 9/2014 | Saarikko et al. |
| 8,830,588 B1 | 9/2014 | Brown et al. |
| 8,842,368 B2 | 9/2014 | Simmonds et al. |
| 8,859,412 B2 | 10/2014 | Jain |
| 8,872,435 B2 | 10/2014 | Kreitzer et al. |
| 8,873,149 B2 | 10/2014 | Bohn et al. |
| 8,873,150 B2 | 10/2014 | Amitai |
| D718,304 S | 11/2014 | Heinrich |
| D718,366 S | 11/2014 | Mehin et al. |
| 8,885,112 B2 | 11/2014 | Popovich et al. |
| 8,885,997 B2 | 11/2014 | Nguyen et al. |
| 8,902,125 B1 * | 12/2014 | Robbins ................. G09G 5/391 |
| | | 345/3.1 |
| 8,903,207 B1 | 12/2014 | Brown et al. |
| 8,906,088 B2 | 12/2014 | Pugh et al. |
| 8,913,324 B2 | 12/2014 | Schrader |
| 8,913,865 B1 | 12/2014 | Bennett |
| 8,917,453 B2 | 12/2014 | Bohn |
| 8,917,962 B1 | 12/2014 | Nichol et al. |
| 8,929,589 B2 | 1/2015 | Publicover et al. |
| 8,933,144 B2 | 1/2015 | Enomoto et al. |
| 8,934,743 B2 | 1/2015 | Nishiwaki et al. |
| 8,937,771 B2 | 1/2015 | Robbins et al. |
| 8,937,772 B1 | 1/2015 | Burns et al. |
| 8,938,141 B2 | 1/2015 | Magnusson |
| 8,950,867 B2 | 2/2015 | Macnamara |
| 8,964,298 B2 | 2/2015 | Haddick et al. |
| 8,965,152 B2 | 2/2015 | Simmonds |
| D725,102 S | 3/2015 | Lee et al. |
| 8,985,803 B2 | 3/2015 | Bohn |
| 8,989,535 B2 | 3/2015 | Robbins |
| D726,180 S | 4/2015 | Roat et al. |
| 9,019,595 B2 | 4/2015 | Jain |
| 9,025,253 B2 | 5/2015 | Hadad et al. |
| 9,035,344 B2 | 5/2015 | Jain |
| D733,709 S | 7/2015 | Kawai |
| 9,075,184 B2 | 7/2015 | Popovich et al. |
| 9,081,178 B2 | 7/2015 | Simmonds et al. |
| 9,097,890 B2 | 8/2015 | Miller et al. |
| 9,103,978 B2 | 8/2015 | Nishiwaki et al. |
| 9,122,015 B2 | 9/2015 | Shimizu |
| 9,128,226 B2 | 9/2015 | Fattal et al. |
| 9,129,295 B2 | 9/2015 | Border et al. |
| 9,164,290 B2 | 10/2015 | Robbins et al. |
| 9,176,324 B1 | 11/2015 | Scherer et al. |
| 9,188,717 B2 | 11/2015 | Nishiwaki |
| 9,201,270 B2 | 12/2015 | Fattal et al. |
| 9,215,293 B2 | 12/2015 | Miller |
| D746,896 S | 1/2016 | Markovitz et al. |
| 9,239,507 B2 | 1/2016 | Chen et al. |
| 9,244,275 B1 | 1/2016 | Li |
| 9,244,280 B1 | 1/2016 | Tiana et al. |
| 9,244,281 B1 | 1/2016 | Zimmerman et al. |
| D749,074 S | 2/2016 | Cazalet et al. |
| 9,253,359 B2 | 2/2016 | Takahashi |
| 9,269,854 B2 | 2/2016 | Jain |
| D751,551 S | 3/2016 | Ho et al. |
| D752,129 S | 3/2016 | Lee et al. |
| 9,274,338 B2 | 3/2016 | Robbins et al. |
| 9,274,339 B1 | 3/2016 | Brown et al. |
| 9,274,349 B2 | 3/2016 | Popovich et al. |
| D754,782 S | 4/2016 | Kokinakis et al. |
| 9,310,566 B2 | 4/2016 | Valera et al. |
| 9,316,786 B2 | 4/2016 | Nishiwaki et al. |
| 9,329,325 B2 | 5/2016 | Simmonds et al. |
| 9,335,548 B1 | 5/2016 | Cakmakci et al. |
| 9,335,604 B2 | 5/2016 | Popovich et al. |
| 9,341,846 B2 | 5/2016 | Popovich et al. |
| 9,354,366 B2 | 5/2016 | Jain |
| 9,366,862 B2 | 6/2016 | Haddick et al. |
| 9,366,864 B1 | 6/2016 | Brown et al. |
| 9,372,347 B1 | 6/2016 | Levola et al. |
| 9,377,623 B2 | 6/2016 | Robbins et al. |
| 9,377,852 B1 | 6/2016 | Shapiro et al. |
| 9,389,415 B2 | 7/2016 | Fattal et al. |
| 9,400,395 B2 | 7/2016 | Travers et al. |
| 9,423,360 B1 | 8/2016 | Kostamo et al. |
| 9,429,692 B1 | 8/2016 | Saarikko et al. |
| 9,431,794 B2 | 8/2016 | Jain |
| 9,435,961 B2 | 9/2016 | Jiang |
| 9,456,744 B2 | 10/2016 | Popovich et al. |
| 9,459,451 B2 | 10/2016 | Saarikko et al. |
| 9,464,779 B2 | 10/2016 | Popovich et al. |
| 9,465,213 B2 | 10/2016 | Simmonds |
| 9,465,227 B2 | 10/2016 | Popovich et al. |
| 9,484,482 B2 | 11/2016 | Hsu et al. |
| 9,494,799 B2 | 11/2016 | Robbins et al. |
| 9,507,150 B1 | 11/2016 | Stratton et al. |
| 9,513,480 B2 | 12/2016 | Saarikko et al. |
| 9,516,193 B2 | 12/2016 | Aramaki |
| 9,519,089 B1 | 12/2016 | Brown et al. |
| 9,519,115 B2 | 12/2016 | Yashiki et al. |
| 9,523,852 B1 | 12/2016 | Brown et al. |
| 9,535,253 B2 | 1/2017 | Levola et al. |
| 9,541,383 B2 | 1/2017 | Abovitz et al. |
| 9,541,763 B1 | 1/2017 | Heberlein et al. |
| 9,547,174 B2 | 1/2017 | Gao et al. |
| 9,551,468 B2 | 1/2017 | Jones |
| 9,551,874 B2 | 1/2017 | Amitai |
| 9,551,880 B2 | 1/2017 | Amitai |
| 9,599,813 B1 | 3/2017 | Stratton et al. |
| 9,612,403 B2 | 4/2017 | Abovitz et al. |
| 9,632,226 B2 | 4/2017 | Waldern et al. |
| 9,635,352 B1 | 4/2017 | Henry et al. |
| 9,648,313 B1 | 5/2017 | Henry et al. |
| 9,651,368 B2 | 5/2017 | Abovitz et al. |
| 9,664,824 B2 | 5/2017 | Simmonds et al. |
| 9,664,910 B2 | 5/2017 | Mansharof et al. |
| 9,671,612 B2 | 6/2017 | Kress et al. |
| 9,674,413 B1 | 6/2017 | Tiana et al. |
| 9,678,345 B1 | 6/2017 | Melzer et al. |
| 9,679,367 B1 | 6/2017 | Wald |
| 9,715,067 B1 | 7/2017 | Brown et al. |
| 9,715,110 B1 | 7/2017 | Brown et al. |
| D793,468 S | 8/2017 | Yu et al. |
| D795,865 S | 8/2017 | Porter et al. |
| D795,866 S | 8/2017 | Porter et al. |
| 9,726,540 B2 | 8/2017 | Popovich et al. |
| 9,727,772 B2 | 8/2017 | Popovich et al. |
| 9,733,475 B1 | 8/2017 | Brown et al. |
| 9,739,950 B2 | 8/2017 | Sqalli et al. |
| 9,746,688 B2 | 8/2017 | Popovich et al. |
| 9,754,507 B1 | 9/2017 | Wenger et al. |
| 9,762,895 B1 | 9/2017 | Henry et al. |
| 9,766,465 B1 | 9/2017 | Tiana et al. |
| 9,785,231 B1 | 10/2017 | Zimmerman |
| 9,791,694 B1 | 10/2017 | Haverkamp et al. |
| 9,791,696 B2 | 10/2017 | Woltman et al. |
| 9,791,703 B1 | 10/2017 | Vallius et al. |
| 9,804,316 B2 | 10/2017 | Drolet et al. |
| 9,804,389 B2 | 10/2017 | Popovich et al. |
| 9,823,423 B2 | 11/2017 | Waldern et al. |
| 9,857,605 B2 | 1/2018 | Popovich et al. |
| 9,874,931 B1 | 1/2018 | Koenck et al. |
| 9,891,436 B2 | 2/2018 | Wall et al. |
| 9,899,800 B2 | 2/2018 | Ferrotti et al. |
| 9,915,825 B2 | 3/2018 | Robbins et al. |
| 9,933,684 B2 | 4/2018 | Brown et al. |

(56) References Cited

U.S. PATENT DOCUMENTS

| | | | |
|---|---|---|---|
| 9,939,577 B2 | 4/2018 | Inoue et al. |
| 9,939,628 B2 | 4/2018 | Basset et al. |
| 9,959,818 B2 | 5/2018 | Bohn |
| 9,977,247 B1 | 5/2018 | Brown et al. |
| 9,989,763 B2 | 6/2018 | Woltman et al. |
| 10,025,093 B2 | 7/2018 | Wall et al. |
| D827,641 S | 9/2018 | Morisawa |
| 10,067,347 B2 | 9/2018 | Vallius et al. |
| 10,088,675 B1 | 10/2018 | Brown et al. |
| 10,088,686 B2 | 10/2018 | Robbins et al. |
| 10,089,516 B2 | 10/2018 | Popovich et al. |
| 10,095,045 B2 | 10/2018 | Robbins et al. |
| 10,107,966 B1 | 10/2018 | Horibe et al. |
| 10,114,220 B2 | 10/2018 | Grey et al. |
| 10,126,552 B2 | 11/2018 | Brown et al. |
| 10,145,533 B2 | 12/2018 | Popovich et al. |
| 10,156,681 B2 | 12/2018 | Waldern et al. |
| 10,162,181 B2 | 12/2018 | Webster et al. |
| 10,185,154 B2 | 1/2019 | Popovich et al. |
| D840,454 S | 2/2019 | Han et al. |
| 10,197,804 B2 | 2/2019 | Stenberg et al. |
| 10,209,517 B2 | 2/2019 | Popovich et al. |
| 10,216,061 B2 | 2/2019 | Popovich et al. |
| 10,234,696 B2 | 3/2019 | Popovich et al. |
| 10,241,330 B2 | 3/2019 | Popovich et al. |
| 10,241,332 B2 | 3/2019 | Vallius |
| 10,247,943 B1 | 4/2019 | Yu et al. |
| 10,281,725 B2 | 5/2019 | Yokoyama |
| 10,330,777 B2 | 6/2019 | Popovich et al. |
| 10,345,519 B1 | 7/2019 | Miller et al. |
| 10,359,627 B2 | 7/2019 | Wall et al. |
| 10,359,635 B2 | 7/2019 | Grey et al. |
| 10,359,736 B2 | 7/2019 | Popovich et al. |
| D855,687 S | 8/2019 | Villalpando |
| D859,510 S | 9/2019 | Harmon et al. |
| 10,409,144 B2 | 9/2019 | Popovich et al. |
| 10,423,222 B2 | 9/2019 | Popovich et al. |
| 10,423,813 B2 | 9/2019 | Popovich et al. |
| 10,437,051 B2 | 10/2019 | Popovich et al. |
| 10,437,064 B2 | 10/2019 | Popovich et al. |
| 10,444,510 B1 | 10/2019 | Lee et al. |
| 10,459,145 B2 | 10/2019 | Popovich et al. |
| 10,459,311 B2 | 10/2019 | Popovich et al. |
| D871,494 S | 12/2019 | Yamada et al. |
| 10,509,241 B1 | 12/2019 | Robbins et al. |
| D872,170 S | 1/2020 | Evans et al. |
| D872,794 S | 1/2020 | Wilkins |
| 10,527,797 B2 | 1/2020 | Waldern et al. |
| 10,532,594 B2 | 1/2020 | Akahane et al. |
| 10,545,346 B2 | 1/2020 | Waldern et al. |
| 10,551,616 B2 | 2/2020 | Wall et al. |
| 10,560,688 B2 | 2/2020 | Robbins |
| 10,569,449 B1 | 2/2020 | Curts et al. |
| 10,578,876 B1 | 3/2020 | Lam et al. |
| 10,591,756 B2 | 3/2020 | Popovich et al. |
| 10,598,938 B1 | 3/2020 | Huang et al. |
| D880,575 S | 4/2020 | Thixton |
| 10,613,268 B1 | 4/2020 | Colburn et al. |
| 10,642,058 B2 | 5/2020 | Popovich et al. |
| 10,649,119 B2 | 5/2020 | Mohanty et al. |
| 10,670,876 B2 | 6/2020 | Popovich et al. |
| 10,678,053 B2 | 6/2020 | Waldern et al. |
| 10,690,831 B2 | 6/2020 | Calafiore |
| 10,690,851 B2 | 6/2020 | Waldern et al. |
| 10,690,915 B2 | 6/2020 | Popovich et al. |
| 10,690,916 B2 | 6/2020 | Popovich et al. |
| 10,698,214 B2 | 6/2020 | Vallius et al. |
| 10,705,281 B2 | 7/2020 | Fattal et al. |
| 10,712,571 B2 | 7/2020 | Popovich et al. |
| 10,725,312 B2 | 7/2020 | Popovich et al. |
| 10,732,351 B2 | 8/2020 | Colburn et al. |
| 10,732,569 B2 | 8/2020 | Waldern et al. |
| 10,746,989 B2 | 8/2020 | Brown et al. |
| 10,747,982 B2 | 8/2020 | Popovich et al. |
| 10,795,160 B1 | 10/2020 | Stanley et al. |
| 10,823,887 B1 | 11/2020 | Calafiore et al. |
| 10,859,768 B2 | 12/2020 | Popovich et al. |
| 10,859,837 B2 | 12/2020 | Adema et al. |
| 10,890,707 B2 | 1/2021 | Waldern et al. |
| 10,914,950 B2 | 2/2021 | Waldern et al. |
| 10,942,430 B2 | 3/2021 | Waldern et al. |
| 10,983,257 B2 | 4/2021 | Colburn et al. |
| 10,983,340 B2 | 4/2021 | Popovich et al. |
| 10,983,346 B2 | 4/2021 | Vallius et al. |
| 11,009,699 B2 | 5/2021 | Popovich et al. |
| 11,103,892 B1 | 8/2021 | Liao et al. |
| 11,106,048 B2 | 8/2021 | Popovich et al. |
| 11,107,972 B2 | 8/2021 | Diest et al. |
| 11,137,603 B2 | 10/2021 | Zhang |
| 11,175,512 B2 | 11/2021 | Waldern et al. |
| 11,194,098 B2 | 12/2021 | Waldern et al. |
| 11,194,159 B2 | 12/2021 | Popovich et al. |
| 11,194,162 B2 | 12/2021 | Waldern et al. |
| 11,204,540 B2 | 12/2021 | Popovich et al. |
| 11,231,544 B2 | 1/2022 | Lin et al. |
| 11,243,333 B1 | 2/2022 | Ouderkirk et al. |
| 11,256,155 B2 | 2/2022 | Popovich et al. |
| 11,281,013 B2 | 3/2022 | Popovich et al. |
| 11,300,795 B1 | 4/2022 | Stanley et al. |
| 11,306,193 B1 | 4/2022 | Lane et al. |
| 11,307,357 B2 | 4/2022 | Mohanty |
| 11,307,432 B2 | 4/2022 | Popovich et al. |
| 11,320,571 B2 | 5/2022 | Brown et al. |
| 11,340,386 B1 | 5/2022 | Ouderkirk et al. |
| 11,378,732 B2 | 7/2022 | Waldern et al. |
| 11,391,950 B2 | 7/2022 | Calafiore |
| 11,402,801 B2 | 8/2022 | Waldern et al. |
| 11,442,222 B2 | 9/2022 | Waldern et al. |
| 11,448,937 B2 | 9/2022 | Brown et al. |
| 11,460,621 B2 | 10/2022 | Popovich et al. |
| 11,480,788 B2 | 10/2022 | Popovich et al. |
| 11,487,131 B2 | 11/2022 | Popovich et al. |
| 11,513,350 B2 | 11/2022 | Waldern et al. |
| 11,543,594 B2 | 1/2023 | Grant et al. |
| 11,561,409 B2 | 1/2023 | Popovich et al. |
| 11,573,483 B2 | 2/2023 | Waldern et al. |
| 11,579,455 B2 | 2/2023 | Stanley et al. |
| 11,586,046 B2 | 2/2023 | Waldern et al. |
| 11,592,614 B2 | 2/2023 | Waldern et al. |
| 11,604,314 B2 | 3/2023 | Popovich et al. |
| 12,140,764 B2 | 11/2024 | Popovich et al. |
| 2001/0024177 A1 | 9/2001 | Popovich |
| 2001/0033400 A1 | 10/2001 | Sutherland et al. |
| 2001/0036012 A1 | 11/2001 | Nakai et al. |
| 2001/0043163 A1 | 11/2001 | Waldern et al. |
| 2001/0046142 A1 | 11/2001 | Van Santen et al. |
| 2001/0050756 A1 | 12/2001 | Lipton et al. |
| 2002/0003509 A1 | 1/2002 | Lipton et al. |
| 2002/0009299 A1 | 1/2002 | Lipton |
| 2002/0011969 A1 | 1/2002 | Lipton et al. |
| 2002/0012064 A1 | 1/2002 | Yamaguchi |
| 2002/0018040 A1 | 2/2002 | Aye et al. |
| 2002/0021407 A1 | 2/2002 | Elliott |
| 2002/0021461 A1 | 2/2002 | Ono et al. |
| 2002/0036825 A1 | 3/2002 | Lipton et al. |
| 2002/0047837 A1 | 4/2002 | Suyama et al. |
| 2002/0071472 A1 | 6/2002 | Dickson et al. |
| 2002/0075240 A1 | 6/2002 | Lieberman et al. |
| 2002/0076154 A1 | 6/2002 | Maisenhoelder et al. |
| 2002/0093701 A1 | 7/2002 | Zhang et al. |
| 2002/0110077 A1 | 8/2002 | Drobot et al. |
| 2002/0126332 A1 | 9/2002 | Popovich |
| 2002/0127497 A1 | 9/2002 | Brown et al. |
| 2002/0131175 A1 | 9/2002 | Yagi et al. |
| 2002/0150032 A1 | 10/2002 | Nishiuchi et al. |
| 2002/0150337 A1 | 10/2002 | Fujimaki |
| 2002/0167462 A1 | 11/2002 | Lewis et al. |
| 2002/0196332 A1 | 12/2002 | Lipton et al. |
| 2003/0007070 A1 | 1/2003 | Lipton et al. |
| 2003/0025881 A1 | 2/2003 | Hwang |
| 2003/0030912 A1 | 2/2003 | Gleckman et al. |
| 2003/0038912 A1 | 2/2003 | Broer et al. |
| 2003/0039422 A1 | 2/2003 | Nisley et al. |
| 2003/0039442 A1 | 2/2003 | Bond et al. |

(56) References Cited

U.S. PATENT DOCUMENTS

| | | |
|---|---|---|
| 2003/0058490 A1 | 3/2003 | Brotherton-ratcliffe et al. |
| 2003/0063042 A1 | 4/2003 | Friesem et al. |
| 2003/0063884 A1 | 4/2003 | Smith et al. |
| 2003/0067685 A1 | 4/2003 | Niv |
| 2003/0076590 A1 | 4/2003 | Kramer |
| 2003/0076950 A1 | 4/2003 | Usman et al. |
| 2003/0086670 A1 | 5/2003 | Moridaira et al. |
| 2003/0107809 A1 | 6/2003 | Chen et al. |
| 2003/0129542 A1 | 7/2003 | Shih et al. |
| 2003/0149346 A1 | 8/2003 | Arnone et al. |
| 2003/0175004 A1 | 9/2003 | Garito et al. |
| 2003/0184868 A1 | 10/2003 | Geist |
| 2003/0193709 A1 | 10/2003 | Mallya et al. |
| 2003/0197154 A1 | 10/2003 | Manabe et al. |
| 2003/0197157 A1 | 10/2003 | Sutherland et al. |
| 2003/0202247 A1 | 10/2003 | Niv et al. |
| 2003/0206329 A1 | 11/2003 | Ikeda et al. |
| 2003/0228019 A1 | 12/2003 | Eichler et al. |
| 2004/0004767 A1 | 1/2004 | Song |
| 2004/0004989 A1 | 1/2004 | Shigeoka |
| 2004/0012833 A1 | 1/2004 | Newswanger et al. |
| 2004/0047938 A1 | 3/2004 | Kosuga et al. |
| 2004/0057138 A1 | 3/2004 | Tanijiri et al. |
| 2004/0075830 A1 | 4/2004 | Miyake et al. |
| 2004/0087049 A1 | 5/2004 | Gill et al. |
| 2004/0089842 A1 | 5/2004 | Sutehrland et al. |
| 2004/0108971 A1 | 6/2004 | Waldern et al. |
| 2004/0109234 A1 | 6/2004 | Levola |
| 2004/0112862 A1 | 6/2004 | Willson et al. |
| 2004/0125454 A1 | 7/2004 | Kawasaki et al. |
| 2004/0130797 A1 | 7/2004 | Leigh |
| 2004/0141217 A1 | 7/2004 | Endo et al. |
| 2004/0156008 A1 | 8/2004 | Reznikov et al. |
| 2004/0174348 A1 | 9/2004 | David |
| 2004/0175627 A1 | 9/2004 | Sutherland et al. |
| 2004/0179764 A1 | 9/2004 | Melikechi et al. |
| 2004/0184156 A1 | 9/2004 | Gunn et al. |
| 2004/0188617 A1 | 9/2004 | Devitt et al. |
| 2004/0200368 A1 | 10/2004 | Ogino et al. |
| 2004/0208446 A1 | 10/2004 | Bond et al. |
| 2004/0208466 A1 | 10/2004 | Mossberg et al. |
| 2004/0225025 A1 | 11/2004 | Sullivan et al. |
| 2004/0263969 A1 | 12/2004 | Lipton et al. |
| 2004/0263971 A1 | 12/2004 | Lipton et al. |
| 2005/0007639 A1 | 1/2005 | Natarajan et al. |
| 2005/0018304 A1 | 1/2005 | Lipton et al. |
| 2005/0047705 A1 | 3/2005 | Domash et al. |
| 2005/0079663 A1 | 4/2005 | Masutani et al. |
| 2005/0083564 A1 | 4/2005 | Mallya et al. |
| 2005/0105909 A1 | 5/2005 | Stone |
| 2005/0122395 A1 | 6/2005 | Lipton et al. |
| 2005/0134404 A1 | 6/2005 | Kajiya et al. |
| 2005/0135747 A1 | 6/2005 | Greiner et al. |
| 2005/0136260 A1 | 6/2005 | Garcia |
| 2005/0141066 A1 | 6/2005 | Ouchi |
| 2005/0141811 A1 | 6/2005 | Yang et al. |
| 2005/0169579 A1 | 8/2005 | Temkin et al. |
| 2005/0174321 A1 | 8/2005 | Ikeda et al. |
| 2005/0180687 A1 | 8/2005 | Amitai |
| 2005/0195276 A1 | 9/2005 | Lipton et al. |
| 2005/0218377 A1 | 10/2005 | Lawandy |
| 2005/0231774 A1 | 10/2005 | Hayashi et al. |
| 2005/0232530 A1 | 10/2005 | Kekas |
| 2005/0254752 A1 | 11/2005 | Domash et al. |
| 2005/0259217 A1 | 11/2005 | Lin et al. |
| 2005/0259302 A9 | 11/2005 | Metz et al. |
| 2005/0259944 A1 | 11/2005 | Anderson et al. |
| 2005/0265585 A1 | 12/2005 | Rowe |
| 2005/0269481 A1 | 12/2005 | David et al. |
| 2005/0271258 A1 | 12/2005 | Rowe |
| 2005/0286133 A1 | 12/2005 | Lipton |
| 2006/0002274 A1 | 1/2006 | Kihara et al. |
| 2006/0012878 A1 | 1/2006 | Lipton et al. |
| 2006/0013977 A1 | 1/2006 | Duke et al. |
| 2006/0043938 A1 | 3/2006 | O'Gorman et al. |
| 2006/0055993 A1 | 3/2006 | Kobayashi et al. |
| 2006/0093012 A1 | 5/2006 | Singh et al. |
| 2006/0093793 A1 | 5/2006 | Miyakawa et al. |
| 2006/0114564 A1 | 6/2006 | Sutherland et al. |
| 2006/0119837 A1 | 6/2006 | Raguin et al. |
| 2006/0119916 A1 | 6/2006 | Sutherland et al. |
| 2006/0126179 A1 | 6/2006 | Levola |
| 2006/0132914 A1 | 6/2006 | Weiss et al. |
| 2006/0142455 A1 | 6/2006 | Agarwal et al. |
| 2006/0146422 A1 | 7/2006 | Koike |
| 2006/0159864 A1 | 7/2006 | Natarajan et al. |
| 2006/0164593 A1 | 7/2006 | Peyghambarian et al. |
| 2006/0171647 A1 | 8/2006 | Ye et al. |
| 2006/0177180 A1 | 8/2006 | Tazawa et al. |
| 2006/0181683 A1 | 8/2006 | Bhowmik et al. |
| 2006/0191293 A1 | 8/2006 | Kuczma |
| 2006/0215244 A1 | 9/2006 | Yosha et al. |
| 2006/0215976 A1 | 9/2006 | Singh et al. |
| 2006/0221063 A1 | 10/2006 | Ishihara |
| 2006/0221448 A1 | 10/2006 | Nivon et al. |
| 2006/0228073 A1 | 10/2006 | Mukawa et al. |
| 2006/0262250 A1 | 11/2006 | Hobbs |
| 2006/0268104 A1 | 11/2006 | Cowan et al. |
| 2006/0268412 A1 | 11/2006 | Downing et al. |
| 2006/0279662 A1 | 12/2006 | Kapellner et al. |
| 2006/0284974 A1 | 12/2006 | Lipton et al. |
| 2006/0285205 A1 | 12/2006 | Lipton et al. |
| 2006/0291021 A1 | 12/2006 | Mukawa |
| 2006/0291052 A1 | 12/2006 | Lipton et al. |
| 2006/0292493 A1 | 12/2006 | Shinotsuka et al. |
| 2007/0012777 A1 | 1/2007 | Tsikos et al. |
| 2007/0019152 A1 | 1/2007 | Caputo et al. |
| 2007/0019297 A1 | 1/2007 | Stewart et al. |
| 2007/0034600 A1 | 2/2007 | Willson et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0053032 A1 | 3/2007 | Popovich |
| 2007/0070476 A1 | 3/2007 | Yamada et al. |
| 2007/0070504 A1 | 3/2007 | Akutsu et al. |
| 2007/0070859 A1 | 3/2007 | Hirayama |
| 2007/0089625 A1 | 4/2007 | Grinberg et al. |
| 2007/0097502 A1 | 5/2007 | Lipton et al. |
| 2007/0109400 A1 | 5/2007 | Woodgate et al. |
| 2007/0109401 A1 | 5/2007 | Lipton et al. |
| 2007/0115553 A1 | 5/2007 | Chang-Hasnain et al. |
| 2007/0116409 A1 | 5/2007 | Bryan et al. |
| 2007/0127348 A1 | 6/2007 | Ooi et al. |
| 2007/0133089 A1 | 6/2007 | Lipton et al. |
| 2007/0133920 A1 | 6/2007 | Lee et al. |
| 2007/0133983 A1 | 6/2007 | Traff |
| 2007/0146624 A1 | 6/2007 | Duston et al. |
| 2007/0146625 A1 | 6/2007 | Ooi et al. |
| 2007/0154153 A1 | 7/2007 | Fomitchov et al. |
| 2007/0160325 A1 | 7/2007 | Son et al. |
| 2007/0177007 A1 | 8/2007 | Lipton et al. |
| 2007/0182915 A1 | 8/2007 | Osawa et al. |
| 2007/0183650 A1 | 8/2007 | Lipton et al. |
| 2007/0188602 A1 | 8/2007 | Cowan et al. |
| 2007/0188837 A1 | 8/2007 | Shimizu et al. |
| 2007/0195409 A1 | 8/2007 | Yun et al. |
| 2007/0206155 A1 | 9/2007 | Lipton |
| 2007/0211164 A1 | 9/2007 | Olsen et al. |
| 2007/0236560 A1 | 10/2007 | Lipton et al. |
| 2007/0237456 A1 | 10/2007 | Blauvelt et al. |
| 2007/0247687 A1 | 10/2007 | Handschy et al. |
| 2007/0258138 A1 | 11/2007 | Cowan et al. |
| 2007/0263169 A1 | 11/2007 | Lipton |
| 2008/0001909 A1 | 1/2008 | Lim |
| 2008/0018851 A1 | 1/2008 | Lipton et al. |
| 2008/0024598 A1 | 1/2008 | Perlin et al. |
| 2008/0043334 A1 | 2/2008 | Itzkovitch et al. |
| 2008/0049100 A1 | 2/2008 | Lipton et al. |
| 2008/0062259 A1 | 3/2008 | Lipton et al. |
| 2008/0063808 A1 | 3/2008 | Stumpe et al. |
| 2008/0089073 A1 | 4/2008 | Hikmet |
| 2008/0106775 A1 | 5/2008 | Amitai et al. |
| 2008/0106779 A1 | 5/2008 | Peterson et al. |
| 2008/0117289 A1 | 5/2008 | Schowengerdt et al. |

(56) References Cited

U.S. PATENT DOCUMENTS

| | | |
|---|---|---|
| 2008/0136916 A1 | 6/2008 | Wolff |
| 2008/0136923 A1 | 6/2008 | Inbar et al. |
| 2008/0138013 A1 | 6/2008 | Parriaux |
| 2008/0143964 A1 | 6/2008 | Cowan et al. |
| 2008/0143965 A1 | 6/2008 | Cowan et al. |
| 2008/0149517 A1 | 6/2008 | Lipton et al. |
| 2008/0151370 A1 | 6/2008 | Cook et al. |
| 2008/0151379 A1 | 6/2008 | Amitai |
| 2008/0186573 A1 | 8/2008 | Lipton |
| 2008/0186574 A1 | 8/2008 | Robinson et al. |
| 2008/0186604 A1 | 8/2008 | Amitai |
| 2008/0193085 A1 | 8/2008 | Singh et al. |
| 2008/0198471 A1 | 8/2008 | Amitai |
| 2008/0225187 A1 | 9/2008 | Yamanaka |
| 2008/0226281 A1 | 9/2008 | Lipton |
| 2008/0239067 A1 | 10/2008 | Lipton |
| 2008/0239068 A1 | 10/2008 | Lipton |
| 2008/0273081 A1 | 11/2008 | Lipton |
| 2008/0278812 A1 | 11/2008 | Amitai |
| 2008/0285137 A1 | 11/2008 | Simmonds et al. |
| 2008/0285140 A1 | 11/2008 | Amitai |
| 2008/0297731 A1 | 12/2008 | Powell et al. |
| 2008/0297807 A1 | 12/2008 | Feldman et al. |
| 2008/0298649 A1 | 12/2008 | Ennis et al. |
| 2008/0298740 A1 | 12/2008 | Hlousek et al. |
| 2008/0303895 A1 | 12/2008 | Akka et al. |
| 2008/0303896 A1 | 12/2008 | Lipton et al. |
| 2008/0304111 A1 | 12/2008 | Queenan et al. |
| 2008/0309586 A1 | 12/2008 | Vitale |
| 2008/0316303 A1 | 12/2008 | Chiu et al. |
| 2008/0316375 A1 | 12/2008 | Lipton et al. |
| 2009/0001632 A1 | 1/2009 | Stumpe et al. |
| 2009/0010135 A1 | 1/2009 | Ushiro et al. |
| 2009/0017424 A1 | 1/2009 | Yoeli et al. |
| 2009/0019222 A1 | 1/2009 | Verma et al. |
| 2009/0052017 A1 | 2/2009 | Sasaki |
| 2009/0052046 A1 | 2/2009 | Amitai |
| 2009/0052047 A1 | 2/2009 | Amitai |
| 2009/0067774 A1 | 3/2009 | Magnusson |
| 2009/0074356 A1 | 3/2009 | Sanchez et al. |
| 2009/0097122 A1 | 4/2009 | Niv |
| 2009/0097127 A1 | 4/2009 | Amitai |
| 2009/0116790 A1 | 5/2009 | Mossberg et al. |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128495 A1 | 5/2009 | Kong et al. |
| 2009/0128781 A1 | 5/2009 | Li |
| 2009/0128902 A1 | 5/2009 | Niv et al. |
| 2009/0128911 A1 | 5/2009 | Itzkovitch et al. |
| 2009/0136246 A1 | 5/2009 | Murakami |
| 2009/0141324 A1 | 6/2009 | Mukawa |
| 2009/0153437 A1 | 6/2009 | Aharoni |
| 2009/0169152 A1 | 7/2009 | Oestergard |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0242021 A1 | 10/2009 | Petkie et al. |
| 2009/0296218 A1 | 12/2009 | Ryytty |
| 2009/0303599 A1 | 12/2009 | Levola |
| 2009/0316246 A1 | 12/2009 | Asai et al. |
| 2010/0014312 A1 | 1/2010 | Travis et al. |
| 2010/0039796 A1 | 2/2010 | Mukawa |
| 2010/0053565 A1 | 3/2010 | Mizushima et al. |
| 2010/0060551 A1 | 3/2010 | Sugiyama et al. |
| 2010/0060990 A1 | 3/2010 | Wertheim et al. |
| 2010/0065726 A1 | 3/2010 | Zhong et al. |
| 2010/0079841 A1 | 4/2010 | Levola |
| 2010/0079865 A1 | 4/2010 | Saarikko et al. |
| 2010/0084261 A1 | 4/2010 | Lee et al. |
| 2010/0086256 A1 | 4/2010 | Ben Bakir et al. |
| 2010/0092124 A1 | 4/2010 | Magnusson et al. |
| 2010/0096562 A1 | 4/2010 | Klunder et al. |
| 2010/0097674 A1 | 4/2010 | Kasazumi et al. |
| 2010/0097820 A1 | 4/2010 | Owen et al. |
| 2010/0103078 A1 | 4/2010 | Mukawa et al. |
| 2010/0134534 A1 | 6/2010 | Seesselberg et al. |
| 2010/0135615 A1 | 6/2010 | Ho et al. |
| 2010/0136319 A1 | 6/2010 | Imai et al. |
| 2010/0141555 A1 | 6/2010 | Rorberg et al. |
| 2010/0141905 A1 | 6/2010 | Burke |
| 2010/0149073 A1 | 6/2010 | Chaum et al. |
| 2010/0165465 A1 | 7/2010 | Levola |
| 2010/0165660 A1 | 7/2010 | Weber et al. |
| 2010/0171680 A1 | 7/2010 | Lapidot et al. |
| 2010/0177388 A1 | 7/2010 | Cohen et al. |
| 2010/0202725 A1 | 8/2010 | Popovich et al. |
| 2010/0214659 A1 | 8/2010 | Levola |
| 2010/0220293 A1 | 9/2010 | Mizushima et al. |
| 2010/0225834 A1 | 9/2010 | Li |
| 2010/0225876 A1 | 9/2010 | Escuti et al. |
| 2010/0231532 A1 | 9/2010 | Nho et al. |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0232016 A1 | 9/2010 | Landa et al. |
| 2010/0245756 A1 | 9/2010 | Sugihara et al. |
| 2010/0245757 A1 | 9/2010 | Sugihara et al. |
| 2010/0246003 A1 | 9/2010 | Simmonds et al. |
| 2010/0246004 A1 | 9/2010 | Simmonds |
| 2010/0246993 A1 | 9/2010 | Rieger et al. |
| 2010/0253987 A1 | 10/2010 | Leopold et al. |
| 2010/0260030 A1 | 10/2010 | Yuyama et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0284090 A1 | 11/2010 | Simmonds |
| 2010/0284180 A1 | 11/2010 | Popovich et al. |
| 2010/0296163 A1 | 11/2010 | Saarikko |
| 2010/0299814 A1 | 12/2010 | Celona et al. |
| 2010/0315719 A1 | 12/2010 | Saarikko et al. |
| 2010/0321781 A1 | 12/2010 | Levola et al. |
| 2010/0322555 A1 | 12/2010 | Vermeulen et al. |
| 2011/0001895 A1 | 1/2011 | Dahl |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0032602 A1 | 2/2011 | Rothenberg et al. |
| 2011/0032618 A1 | 2/2011 | Handerek et al. |
| 2011/0032706 A1 | 2/2011 | Mukawa |
| 2011/0038024 A1 | 2/2011 | Wang et al. |
| 2011/0050548 A1 | 3/2011 | Blumenfeld et al. |
| 2011/0063604 A1 | 3/2011 | Hamre et al. |
| 2011/0096401 A1 | 4/2011 | Levola |
| 2011/0102711 A1 | 5/2011 | Sutherland et al. |
| 2011/0103762 A1 | 5/2011 | Lee et al. |
| 2011/0109880 A1 | 5/2011 | Nummela |
| 2011/0157707 A1 | 6/2011 | Tilleman et al. |
| 2011/0164221 A1 | 7/2011 | Tilleman et al. |
| 2011/0187293 A1 | 8/2011 | Travis et al. |
| 2011/0211239 A1 | 9/2011 | Mukawa et al. |
| 2011/0216255 A1 | 9/2011 | Miyauchi et al. |
| 2011/0221656 A1 | 9/2011 | Haddick et al. |
| 2011/0232211 A1 | 9/2011 | Farahi |
| 2011/0235179 A1 | 9/2011 | Simmonds |
| 2011/0235365 A1 | 9/2011 | McCollum et al. |
| 2011/0236803 A1 | 9/2011 | Weiser et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0249309 A1 | 10/2011 | McPheters et al. |
| 2011/0274435 A1 | 11/2011 | Fini et al. |
| 2011/0299075 A1 | 12/2011 | Meade et al. |
| 2011/0310356 A1 | 12/2011 | Vallius |
| 2012/0007979 A1 | 1/2012 | Schneider et al. |
| 2012/0027347 A1 | 2/2012 | Mathal et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |

(56) References Cited

U.S. PATENT DOCUMENTS

| | | |
|---|---|---|
| 2012/0062998 A1 | 3/2012 | Schultz et al. |
| 2012/0067864 A1 | 3/2012 | Kusuda et al. |
| 2012/0075168 A1 | 3/2012 | Osterhout et al. |
| 2012/0081789 A1 | 4/2012 | Mukawa et al. |
| 2012/0092632 A1 | 4/2012 | McLeod et al. |
| 2012/0099203 A1 | 4/2012 | Boubis et al. |
| 2012/0105634 A1 | 5/2012 | Meidan et al. |
| 2012/0105740 A1 | 5/2012 | Jannard et al. |
| 2012/0120493 A1 | 5/2012 | Simmonds et al. |
| 2012/0127577 A1 | 5/2012 | Desserouer |
| 2012/0162549 A1 | 6/2012 | Gao et al. |
| 2012/0162764 A1 | 6/2012 | Shimizu |
| 2012/0176665 A1 | 7/2012 | Song et al. |
| 2012/0183888 A1 | 7/2012 | Oliveira et al. |
| 2012/0194420 A1 | 8/2012 | Osterhout et al. |
| 2012/0200532 A1 | 8/2012 | Powell et al. |
| 2012/0206811 A1 | 8/2012 | Mukawa et al. |
| 2012/0206937 A1 | 8/2012 | Travis et al. |
| 2012/0207432 A1 | 8/2012 | Travis et al. |
| 2012/0207434 A1 | 8/2012 | Large |
| 2012/0214089 A1 | 8/2012 | Hönel et al. |
| 2012/0214090 A1 | 8/2012 | Weiser et al. |
| 2012/0218481 A1 | 8/2012 | Popovich et al. |
| 2012/0224062 A1 | 9/2012 | Lacoste et al. |
| 2012/0235884 A1 | 9/2012 | Miller et al. |
| 2012/0235886 A1 | 9/2012 | Border et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0281943 A1 | 11/2012 | Popovich et al. |
| 2012/0290973 A1 | 11/2012 | Robertson et al. |
| 2012/0294037 A1 | 11/2012 | Holman et al. |
| 2012/0300311 A1 | 11/2012 | Simmonds et al. |
| 2012/0320460 A1 | 12/2012 | Levola |
| 2012/0326950 A1 | 12/2012 | Park et al. |
| 2012/0328234 A1 | 12/2012 | Lu et al. |
| 2013/0016324 A1 | 1/2013 | Travis |
| 2013/0016362 A1 | 1/2013 | Gong et al. |
| 2013/0021392 A1 | 1/2013 | Travis |
| 2013/0021586 A1 | 1/2013 | Lippey |
| 2013/0027006 A1 | 1/2013 | Holloway et al. |
| 2013/0033485 A1 | 2/2013 | Kollin et al. |
| 2013/0039619 A1 | 2/2013 | Laughlin |
| 2013/0044376 A1 | 2/2013 | Valera et al. |
| 2013/0051730 A1 | 2/2013 | Travers et al. |
| 2013/0059233 A1 | 3/2013 | Askham |
| 2013/0069850 A1 | 3/2013 | Mukawa et al. |
| 2013/0077049 A1 | 3/2013 | Bohn |
| 2013/0088637 A1 | 4/2013 | Duparre |
| 2013/0093893 A1 | 4/2013 | Schofield et al. |
| 2013/0101253 A1 | 4/2013 | Popovich et al. |
| 2013/0107186 A1 | 5/2013 | Ando et al. |
| 2013/0117377 A1 | 5/2013 | Miller |
| 2013/0125027 A1 | 5/2013 | Abovitz et al. |
| 2013/0128230 A1 | 5/2013 | Macnamara |
| 2013/0138275 A1 | 5/2013 | Nauman et al. |
| 2013/0141934 A1 | 6/2013 | Hartung |
| 2013/0141937 A1 | 6/2013 | Katsuta et al. |
| 2013/0143336 A1 | 6/2013 | Jain |
| 2013/0163089 A1 | 6/2013 | Bohn |
| 2013/0163928 A1 | 6/2013 | Wang et al. |
| 2013/0170031 A1 | 7/2013 | Bohn et al. |
| 2013/0176704 A1 | 7/2013 | Lanman et al. |
| 2013/0184904 A1 | 7/2013 | Gadzinski |
| 2013/0200710 A1 | 8/2013 | Robbins |
| 2013/0207887 A1 | 8/2013 | Raffle et al. |
| 2013/0224634 A1 | 8/2013 | Berneth et al. |
| 2013/0229717 A1 | 9/2013 | Amitai |
| 2013/0249895 A1 | 9/2013 | Westerinen et al. |
| 2013/0250207 A1 | 9/2013 | Bohn |
| 2013/0250380 A1 | 9/2013 | Fujikawa et al. |
| 2013/0250430 A1 | 9/2013 | Robbins et al. |
| 2013/0250431 A1 | 9/2013 | Robbins et al. |
| 2013/0257848 A1 | 10/2013 | Westerinen et al. |
| 2013/0258701 A1 | 10/2013 | Westerinen et al. |
| 2013/0267309 A1 | 10/2013 | Robbins et al. |
| 2013/0271731 A1 | 10/2013 | Popovich et al. |
| 2013/0277890 A1 | 10/2013 | Bowman et al. |
| 2013/0286053 A1 | 10/2013 | Fleck et al. |
| 2013/0300997 A1 | 11/2013 | Popovich et al. |
| 2013/0301014 A1 | 11/2013 | DeJong et al. |
| 2013/0305437 A1 | 11/2013 | Weller et al. |
| 2013/0308185 A1 | 11/2013 | Robinson et al. |
| 2013/0312811 A1 | 11/2013 | Aspnes et al. |
| 2013/0314789 A1 | 11/2013 | Saarikko et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2013/0342525 A1 | 12/2013 | Benko et al. |
| 2014/0002514 A1 | 1/2014 | Richards |
| 2014/0003762 A1 | 1/2014 | Macnamara |
| 2014/0009809 A1 | 1/2014 | Pyun et al. |
| 2014/0022616 A1 | 1/2014 | Popovich et al. |
| 2014/0024159 A1 | 1/2014 | Jain |
| 2014/0027006 A1 | 1/2014 | Foley et al. |
| 2014/0037242 A1 | 2/2014 | Popovich et al. |
| 2014/0043672 A1 | 2/2014 | Clarke et al. |
| 2014/0043689 A1 | 2/2014 | Mason |
| 2014/0055845 A1 | 2/2014 | Jain |
| 2014/0063055 A1 | 3/2014 | Osterhout et al. |
| 2014/0064655 A1 | 3/2014 | Nguyen et al. |
| 2014/0071538 A1 | 3/2014 | Muller |
| 2014/0098010 A1 | 4/2014 | Travis |
| 2014/0104665 A1 | 4/2014 | Popovich et al. |
| 2014/0104685 A1 | 4/2014 | Bohn et al. |
| 2014/0118647 A1 | 5/2014 | Momonoi et al. |
| 2014/0126029 A1 | 5/2014 | Fuetterer |
| 2014/0126175 A1 | 5/2014 | Amitai et al. |
| 2014/0130132 A1 | 5/2014 | Cahill et al. |
| 2014/0138581 A1 | 5/2014 | Archetti et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0154614 A1 | 6/2014 | Xie et al. |
| 2014/0160576 A1 | 6/2014 | Robbins et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0168783 A1 | 6/2014 | Luebke et al. |
| 2014/0172296 A1 | 6/2014 | Shtukater |
| 2014/0176528 A1 | 6/2014 | Robbins |
| 2014/0177023 A1 | 6/2014 | Gao et al. |
| 2014/0185286 A1 | 7/2014 | Popovich et al. |
| 2014/0198128 A1 | 7/2014 | Hong et al. |
| 2014/0198896 A1 | 7/2014 | Hemmendorff et al. |
| 2014/0204455 A1 | 7/2014 | Popovich et al. |
| 2014/0211322 A1 | 7/2014 | Bohn et al. |
| 2014/0218468 A1 | 8/2014 | Gao et al. |
| 2014/0218801 A1 | 8/2014 | Simmonds et al. |
| 2014/0232759 A1 | 8/2014 | Simmonds et al. |
| 2014/0240834 A1 | 8/2014 | Mason |
| 2014/0240842 A1 | 8/2014 | Nguyen et al. |
| 2014/0255662 A1 | 9/2014 | Enomoto et al. |
| 2014/0267420 A1 | 9/2014 | Schowengerdt et al. |
| 2014/0268017 A1 | 9/2014 | Sweis et al. |
| 2014/0268353 A1 | 9/2014 | Fujimura et al. |
| 2014/0300947 A1 | 10/2014 | Fattal et al. |
| 2014/0300960 A1 | 10/2014 | Santori et al. |
| 2014/0300966 A1 | 10/2014 | Travers et al. |
| 2014/0327970 A1 | 11/2014 | Bohn et al. |
| 2014/0330159 A1 | 11/2014 | Costa et al. |
| 2014/0367719 A1 | 12/2014 | Jain |
| 2014/0375542 A1 | 12/2014 | Robbins et al. |
| 2014/0375789 A1 | 12/2014 | Lou et al. |
| 2014/0375790 A1 | 12/2014 | Robbins et al. |
| 2015/0001677 A1 | 1/2015 | Palumbo et al. |
| 2015/0003796 A1 | 1/2015 | Bennett |
| 2015/0009550 A1 | 1/2015 | Misago et al. |
| 2015/0010265 A1 | 1/2015 | Popovich et al. |
| 2015/0015946 A1 | 1/2015 | Muller |
| 2015/0016777 A1 | 1/2015 | Abovitz et al. |
| 2015/0035744 A1 | 2/2015 | Robbins et al. |
| 2015/0036068 A1 | 2/2015 | Fattal et al. |

(56)                References Cited

U.S. PATENT DOCUMENTS

| | | |
|---|---|---|
| 2015/0058791 A1 | 2/2015 | Robertson et al. |
| 2015/0062675 A1 | 3/2015 | Ayres et al. |
| 2015/0062707 A1 | 3/2015 | Simmonds et al. |
| 2015/0086163 A1 | 3/2015 | Valera et al. |
| 2015/0086907 A1 | 3/2015 | Mizuta et al. |
| 2015/0107671 A1 | 4/2015 | Bodan et al. |
| 2015/0109763 A1 | 4/2015 | Shinkai et al. |
| 2015/0125109 A1 | 5/2015 | Robbins et al. |
| 2015/0148728 A1 | 5/2015 | Sallum et al. |
| 2015/0160529 A1 | 6/2015 | Popovich et al. |
| 2015/0167868 A1 | 6/2015 | Boncha |
| 2015/0177443 A1 | 6/2015 | Faecke et al. |
| 2015/0177686 A1 | 6/2015 | Lee et al. |
| 2015/0177688 A1 | 6/2015 | Popovich et al. |
| 2015/0185475 A1 | 7/2015 | Saarikko et al. |
| 2015/0211960 A1 | 7/2015 | Shimizu |
| 2015/0219834 A1 | 8/2015 | Nichol et al. |
| 2015/0235447 A1 | 8/2015 | Abovitz et al. |
| 2015/0235448 A1 | 8/2015 | Schowengerdt et al. |
| 2015/0243068 A1 | 8/2015 | Solomon |
| 2015/0247975 A1 | 9/2015 | Abovitz et al. |
| 2015/0260994 A1 | 9/2015 | Akutsu et al. |
| 2015/0262424 A1 | 9/2015 | Tabaka et al. |
| 2015/0268399 A1 | 9/2015 | Futterer |
| 2015/0268415 A1 | 9/2015 | Schowengerdt et al. |
| 2015/0277375 A1 | 10/2015 | Large et al. |
| 2015/0285682 A1 | 10/2015 | Popovich et al. |
| 2015/0288129 A1 | 10/2015 | Jain |
| 2015/0289762 A1 | 10/2015 | Popovich et al. |
| 2015/0309264 A1 | 10/2015 | Abovitz et al. |
| 2015/0316768 A1 | 11/2015 | Simmonds |
| 2015/0338689 A1 | 11/2015 | Min et al. |
| 2015/0346490 A1 | 12/2015 | Tekolste et al. |
| 2015/0346495 A1 | 12/2015 | Welch et al. |
| 2015/0355394 A1 | 12/2015 | Leighton et al. |
| 2016/0003847 A1 | 1/2016 | Ryan et al. |
| 2016/0004090 A1 | 1/2016 | Popovich et al. |
| 2016/0018673 A1 | 1/2016 | Wang |
| 2016/0026253 A1 | 1/2016 | Bradski et al. |
| 2016/0033705 A1 | 2/2016 | Fattal |
| 2016/0033706 A1 | 2/2016 | Fattal et al. |
| 2016/0038992 A1 | 2/2016 | Arthur et al. |
| 2016/0041387 A1 | 2/2016 | Valera et al. |
| 2016/0055822 A1 | 2/2016 | Bell |
| 2016/0060529 A1 | 3/2016 | Hegmann et al. |
| 2016/0077338 A1 | 3/2016 | Robbins et al. |
| 2016/0085008 A1 | 3/2016 | Banerjee et al. |
| 2016/0085300 A1 | 3/2016 | Robbins et al. |
| 2016/0097959 A1 | 4/2016 | Bruizeman et al. |
| 2016/0116739 A1 | 4/2016 | TeKolste et al. |
| 2016/0124223 A1 | 5/2016 | Shinbo et al. |
| 2016/0124241 A1 | 5/2016 | Popovich et al. |
| 2016/0132025 A1 | 5/2016 | Taff et al. |
| 2016/0147067 A1 | 5/2016 | Hua et al. |
| 2016/0170226 A1 | 6/2016 | Popovich et al. |
| 2016/0178901 A1 | 6/2016 | Ishikawa |
| 2016/0195664 A1 | 7/2016 | Fattal et al. |
| 2016/0195720 A1 | 7/2016 | Travis et al. |
| 2016/0209648 A1 | 7/2016 | Haddick et al. |
| 2016/0209657 A1 | 7/2016 | Popovich et al. |
| 2016/0231568 A1 | 8/2016 | Saarikko et al. |
| 2016/0231570 A1 | 8/2016 | Levola et al. |
| 2016/0238772 A1 | 8/2016 | Waldern et al. |
| 2016/0266398 A1 | 9/2016 | Poon et al. |
| 2016/0274356 A1 | 9/2016 | Mason |
| 2016/0274362 A1 | 9/2016 | Tinch et al. |
| 2016/0283773 A1 | 9/2016 | Popovich et al. |
| 2016/0291328 A1 | 10/2016 | Popovich et al. |
| 2016/0299344 A1 | 10/2016 | Dobschal et al. |
| 2016/0320536 A1 | 11/2016 | Simmonds et al. |
| 2016/0327705 A1 | 11/2016 | Simmonds et al. |
| 2016/0336033 A1 | 11/2016 | Tanaka |
| 2016/0341964 A1 | 11/2016 | Amitai |
| 2016/0363840 A1 | 12/2016 | Mizoguchi et al. |
| 2016/0370615 A1 | 12/2016 | Wu et al. |
| 2016/0377879 A1 | 12/2016 | Popovich et al. |
| 2017/0003505 A1 | 1/2017 | Vallius et al. |
| 2017/0010466 A1 | 1/2017 | Klug et al. |
| 2017/0010488 A1 | 1/2017 | Klug et al. |
| 2017/0030550 A1 | 2/2017 | Popovich et al. |
| 2017/0031160 A1 | 2/2017 | Popovich et al. |
| 2017/0031171 A1 | 2/2017 | Vallius et al. |
| 2017/0032166 A1 | 2/2017 | Raguin et al. |
| 2017/0034435 A1 | 2/2017 | Vallius |
| 2017/0038579 A1 | 2/2017 | Yeoh et al. |
| 2017/0052374 A1 | 2/2017 | Waldern et al. |
| 2017/0052376 A1 | 2/2017 | Amitai et al. |
| 2017/0059759 A1 | 3/2017 | Ayres et al. |
| 2017/0059775 A1 | 3/2017 | Coles et al. |
| 2017/0102543 A1 | 4/2017 | Vallius |
| 2017/0115487 A1 | 4/2017 | Travis et al. |
| 2017/0123208 A1 | 5/2017 | Vallius |
| 2017/0131460 A1 | 5/2017 | Lin et al. |
| 2017/0131545 A1 | 5/2017 | Wall et al. |
| 2017/0131546 A1 | 5/2017 | Woltman et al. |
| 2017/0131551 A1 | 5/2017 | Robbins et al. |
| 2017/0138789 A1 | 5/2017 | Ivanov |
| 2017/0160546 A1 | 6/2017 | Bull et al. |
| 2017/0160548 A1 | 6/2017 | Woltman et al. |
| 2017/0176747 A1 | 6/2017 | Vallius et al. |
| 2017/0180404 A1 | 6/2017 | Bersch et al. |
| 2017/0180408 A1 | 6/2017 | Yu et al. |
| 2017/0192246 A9 | 7/2017 | Popovich et al. |
| 2017/0192499 A1 | 7/2017 | Trail |
| 2017/0199333 A1 | 7/2017 | Waldern et al. |
| 2017/0212295 A1 | 7/2017 | Vasylyev |
| 2017/0219841 A1 | 8/2017 | Popovich et al. |
| 2017/0235142 A1 | 8/2017 | Wall et al. |
| 2017/0236463 A1 | 8/2017 | Chi et al. |
| 2017/0255257 A1 | 9/2017 | Tiana et al. |
| 2017/0270637 A1 | 9/2017 | Perreault et al. |
| 2017/0276940 A1 | 9/2017 | Popovich et al. |
| 2017/0299793 A1 | 10/2017 | Fattal |
| 2017/0299794 A1 | 10/2017 | Fattal |
| 2017/0299860 A1 | 10/2017 | Wall et al. |
| 2017/0299865 A1 | 10/2017 | Vallius et al. |
| 2017/0307800 A1 | 10/2017 | Fattal |
| 2017/0322426 A1 | 11/2017 | Tervo |
| 2017/0329075 A1 | 11/2017 | Yeoh et al. |
| 2017/0329140 A1 | 11/2017 | Yeoh et al. |
| 2017/0356801 A1 | 12/2017 | Popovich et al. |
| 2017/0357841 A1 | 12/2017 | Popovich et al. |
| 2018/0003805 A1 | 1/2018 | Popovich et al. |
| 2018/0011324 A1 | 1/2018 | Popovich et al. |
| 2018/0052277 A1 | 2/2018 | Schowengerdt et al. |
| 2018/0059305 A1 | 3/2018 | Popovich et al. |
| 2018/0067251 A1 | 3/2018 | Baldwin et al. |
| 2018/0067318 A1 | 3/2018 | St. Hilaire |
| 2018/0074265 A1 | 3/2018 | Waldern et al. |
| 2018/0074340 A1 | 3/2018 | Robbins et al. |
| 2018/0074352 A1 | 3/2018 | Popovich et al. |
| 2018/0081190 A1 | 3/2018 | Lee et al. |
| 2018/0082644 A1 | 3/2018 | Bohn |
| 2018/0088325 A1 | 3/2018 | Brown et al. |
| 2018/0095283 A1 | 4/2018 | Takeda et al. |
| 2018/0107011 A1 | 4/2018 | Lu et al. |
| 2018/0112097 A1 | 4/2018 | Raghavanpillai et al. |
| 2018/0113303 A1 | 4/2018 | Popovich et al. |
| 2018/0120669 A1 | 5/2018 | Popovich et al. |
| 2018/0129060 A1 | 5/2018 | Lee et al. |
| 2018/0143438 A1 | 5/2018 | Oh |
| 2018/0143449 A1 | 5/2018 | Popovich et al. |
| 2018/0164583 A1 | 6/2018 | Wall et al. |
| 2018/0172995 A1 | 6/2018 | Lee et al. |
| 2018/0188542 A1 | 7/2018 | Waldern et al. |
| 2018/0188691 A1 | 7/2018 | Fattal |
| 2018/0203230 A1 | 7/2018 | Vallius et al. |
| 2018/0210198 A1 | 7/2018 | Brown et al. |
| 2018/0210205 A1 | 7/2018 | Grey et al. |
| 2018/0210396 A1 | 7/2018 | Popovich et al. |
| 2018/0232048 A1 | 8/2018 | Popovich et al. |
| 2018/0246354 A1 | 8/2018 | Popovich et al. |
| 2018/0252869 A1 | 9/2018 | Ayres et al. |
| 2018/0265774 A1 | 9/2018 | Huang et al. |

(56) References Cited

U.S. PATENT DOCUMENTS

| | | |
|---|---|---|
| 2018/0275350 A1 | 9/2018 | Oh et al. |
| 2018/0275402 A1 | 9/2018 | Popovich et al. |
| 2018/0275410 A1 | 9/2018 | Yeoh et al. |
| 2018/0284440 A1 | 10/2018 | Popovich et al. |
| 2018/0299678 A1 | 10/2018 | Singer et al. |
| 2018/0338131 A1 | 11/2018 | Robbins |
| 2018/0348524 A1 | 12/2018 | Blum et al. |
| 2018/0373115 A1 | 12/2018 | Brown et al. |
| 2019/0041634 A1 | 2/2019 | Popovich et al. |
| 2019/0042827 A1 | 2/2019 | Popovich et al. |
| 2019/0064526 A1 | 2/2019 | Connor |
| 2019/0064735 A1 | 2/2019 | Waldern et al. |
| 2019/0072723 A1 | 3/2019 | Waldern et al. |
| 2019/0072767 A1 | 3/2019 | Vallius et al. |
| 2019/0094548 A1 | 3/2019 | Nicholson et al. |
| 2019/0113751 A9 | 4/2019 | Waldern et al. |
| 2019/0113829 A1 | 4/2019 | Waldern et al. |
| 2019/0114484 A1 | 4/2019 | Keech et al. |
| 2019/0121027 A1 | 4/2019 | Popovich et al. |
| 2019/0129085 A1 | 5/2019 | Waldern et al. |
| 2019/0162962 A1 | 5/2019 | Leighton et al. |
| 2019/0162963 A1 | 5/2019 | Leighton et al. |
| 2019/0171031 A1 | 6/2019 | Popovich et al. |
| 2019/0179153 A1 | 6/2019 | Popovich et al. |
| 2019/0187474 A1 | 6/2019 | Bhargava et al. |
| 2019/0187538 A1 | 6/2019 | Popovich et al. |
| 2019/0188471 A1 | 6/2019 | Osterhout et al. |
| 2019/0212195 A9 | 7/2019 | Popovich et al. |
| 2019/0212557 A1 | 7/2019 | Waldern et al. |
| 2019/0212573 A1 | 7/2019 | Popovich et al. |
| 2019/0212588 A1 | 7/2019 | Waldern et al. |
| 2019/0212589 A1 | 7/2019 | Waldern et al. |
| 2019/0212596 A1 | 7/2019 | Waldern et al. |
| 2019/0212597 A1 | 7/2019 | Waldern et al. |
| 2019/0212698 A1 | 7/2019 | Waldern et al. |
| 2019/0212699 A1 | 7/2019 | Waldern et al. |
| 2019/0219822 A1 | 7/2019 | Popovich et al. |
| 2019/0226830 A1 | 7/2019 | Edwin et al. |
| 2019/0243142 A1 | 8/2019 | Tekolste et al. |
| 2019/0243209 A1 | 8/2019 | Perreault et al. |
| 2019/0265486 A1 | 8/2019 | Hansotte et al. |
| 2019/0278224 A1 | 9/2019 | Schlottau et al. |
| 2019/0285796 A1 | 9/2019 | Waldern et al. |
| 2019/0293880 A1 | 9/2019 | Nishiwaki et al. |
| 2019/0319426 A1 | 10/2019 | Lu et al. |
| 2019/0324202 A1 | 10/2019 | Colburn et al. |
| 2019/0339558 A1 | 11/2019 | Waldern et al. |
| 2019/0361096 A1 | 11/2019 | Popovich et al. |
| 2020/0012839 A1 | 1/2020 | Popovich et al. |
| 2020/0018875 A1 | 1/2020 | Mohanty et al. |
| 2020/0026072 A1 | 1/2020 | Brown et al. |
| 2020/0026074 A1 | 1/2020 | Waldern et al. |
| 2020/0033190 A1 | 1/2020 | Popovich et al. |
| 2020/0033801 A1 | 1/2020 | Waldern et al. |
| 2020/0033802 A1 | 1/2020 | Popovich et al. |
| 2020/0041787 A1 | 2/2020 | Popovich et al. |
| 2020/0041791 A1 | 2/2020 | Shipton et al. |
| 2020/0057353 A1 | 2/2020 | Popovich et al. |
| 2020/0064637 A1 | 2/2020 | Popovich et al. |
| 2020/0081317 A1 | 3/2020 | Popovich et al. |
| 2020/0089319 A1 | 3/2020 | Popovich et al. |
| 2020/0096772 A1 | 3/2020 | Adema et al. |
| 2020/0103661 A1 | 4/2020 | Kamakura |
| 2020/0116997 A1 | 4/2020 | Lee et al. |
| 2020/0142131 A1 | 5/2020 | Waldern et al. |
| 2020/0150469 A1 | 5/2020 | Popovich et al. |
| 2020/0158943 A1 | 5/2020 | Calafiore |
| 2020/0159023 A1 | 5/2020 | Bhargava et al. |
| 2020/0159026 A1 | 5/2020 | Waldern et al. |
| 2020/0183163 A1 | 6/2020 | Waldern et al. |
| 2020/0183200 A1 | 6/2020 | Diest et al. |
| 2020/0192088 A1 | 6/2020 | Yu et al. |
| 2020/0201042 A1 | 6/2020 | Wang et al. |
| 2020/0201051 A1 | 6/2020 | Popovich et al. |
| 2020/0209483 A1 | 7/2020 | Mohanty |
| 2020/0209630 A1 | 7/2020 | Schultz et al. |
| 2020/0225471 A1 | 7/2020 | Waldern et al. |
| 2020/0241304 A1 | 7/2020 | Popovich et al. |
| 2020/0247016 A1 | 8/2020 | Calafiore |
| 2020/0247017 A1 | 8/2020 | Waldern et al. |
| 2020/0249484 A1 | 8/2020 | Waldern et al. |
| 2020/0249491 A1 | 8/2020 | Popovich et al. |
| 2020/0249568 A1 | 8/2020 | Rao et al. |
| 2020/0264378 A1 | 8/2020 | Grant et al. |
| 2020/0271973 A1 | 8/2020 | Waldern et al. |
| 2020/0292745 A1 | 9/2020 | Waldern et al. |
| 2020/0292840 A1 | 9/2020 | Popovich et al. |
| 2020/0319404 A1 | 10/2020 | Waldern et al. |
| 2020/0333606 A1 | 10/2020 | Popovich et al. |
| 2020/0341194 A1 | 10/2020 | Waldern et al. |
| 2020/0341272 A1 | 10/2020 | Popovich et al. |
| 2020/0348519 A1 | 11/2020 | Waldern et al. |
| 2020/0348531 A1 | 11/2020 | Popovich et al. |
| 2020/0363771 A1 | 11/2020 | Waldern et al. |
| 2020/0372236 A1 | 11/2020 | Popovich et al. |
| 2020/0386947 A1 | 12/2020 | Waldern et al. |
| 2020/0400946 A1 | 12/2020 | Waldern et al. |
| 2020/0400951 A1 | 12/2020 | Zhang |
| 2020/0409151 A1 | 12/2020 | Calafiore |
| 2021/0026297 A1 | 1/2021 | Waldern et al. |
| 2021/0033857 A1 | 2/2021 | Waldern et al. |
| 2021/0055551 A1 | 2/2021 | Chi et al. |
| 2021/0063634 A1 | 3/2021 | Waldern et al. |
| 2021/0063672 A1 | 3/2021 | Bodiya |
| 2021/0088705 A1 | 3/2021 | Drazic et al. |
| 2021/0109285 A1 | 4/2021 | Jiang et al. |
| 2021/0109353 A1 | 4/2021 | Nicholson et al. |
| 2021/0191122 A1 | 6/2021 | Yaroshchuk et al. |
| 2021/0199873 A1 | 7/2021 | Shi et al. |
| 2021/0199971 A1 | 7/2021 | Lee et al. |
| 2021/0216040 A1 | 7/2021 | Waldern et al. |
| 2021/0223585 A1 | 7/2021 | Waldern et al. |
| 2021/0231874 A1 | 7/2021 | Popovich et al. |
| 2021/0231955 A1 | 7/2021 | Waldern et al. |
| 2021/0238374 A1 | 8/2021 | Ye et al. |
| 2021/0239984 A1 | 8/2021 | Popovich et al. |
| 2021/0247560 A1 | 8/2021 | Waldern et al. |
| 2021/0247620 A1 | 8/2021 | Popovich et al. |
| 2021/0247719 A1 | 8/2021 | Waldern et al. |
| 2021/0255463 A1 | 8/2021 | Popovich et al. |
| 2021/0278739 A1 | 9/2021 | Brown et al. |
| 2021/0349328 A1 | 11/2021 | Popovich et al. |
| 2021/0364803 A1 | 11/2021 | Schowengerdt et al. |
| 2021/0364836 A1 | 11/2021 | Waldern et al. |
| 2021/0405299 A1 | 12/2021 | Grant et al. |
| 2021/0405365 A1 | 12/2021 | Popovich et al. |
| 2021/0405514 A1 | 12/2021 | Waldern et al. |
| 2022/0019015 A1 | 1/2022 | Calafiore et al. |
| 2022/0043287 A1 | 2/2022 | Grant et al. |
| 2022/0057749 A1 | 2/2022 | Popovich et al. |
| 2022/0075196 A1 | 3/2022 | Waldern et al. |
| 2022/0075242 A1 | 3/2022 | Popovich et al. |
| 2022/0082739 A1 | 3/2022 | Franke et al. |
| 2022/0091323 A1 | 3/2022 | Yaroshchuk et al. |
| 2022/0099898 A1 | 3/2022 | Waldern et al. |
| 2022/0155623 A1 | 5/2022 | Waldern et al. |
| 2022/0163728 A1 | 5/2022 | Waldern et al. |
| 2022/0163801 A1 | 5/2022 | Waldern et al. |
| 2022/0187692 A1 | 6/2022 | Popovich et al. |
| 2022/0204790 A1 | 6/2022 | Zhang et al. |
| 2022/0206232 A1 | 6/2022 | Zhang et al. |
| 2022/0214503 A1 | 7/2022 | Waldern et al. |
| 2022/0214551 A1 | 7/2022 | Popovich et al. |
| 2022/0244559 A1 | 8/2022 | Popovich et al. |
| 2022/0260838 A1 | 8/2022 | Popovich et al. |
| 2022/0283376 A1 | 9/2022 | Waldern et al. |
| 2022/0283377 A1 | 9/2022 | Popovich et al. |
| 2022/0283378 A1 | 9/2022 | Waldern et al. |
| 2022/0308352 A1 | 9/2022 | Stanley et al. |
| 2022/0317356 A1 | 10/2022 | Popovich et al. |
| 2023/0027493 A1 | 1/2023 | Shams et al. |
| 2023/0078253 A1 | 3/2023 | Waldern et al. |
| 2023/0081115 A1 | 3/2023 | Brown et al. |
| 2023/0221493 A1 | 7/2023 | Grant et al. |

(56)  References Cited

U.S. PATENT DOCUMENTS

| 2023/0314810 | A1 | 10/2023 | Delapp et al. |
| 2024/0012247 | A1 | 1/2024 | Popovich et al. |
| 2024/0295703 | A1 | 9/2024 | Grant et al. |

FOREIGN PATENT DOCUMENTS

| CA | 105408801 | A | 3/2016 |
| CA | 105408802 | A | 3/2016 |
| CN | 1066936 | A | 12/1992 |
| CN | 1320217 | A | 10/2001 |
| CN | 1357010 | A | 7/2002 |
| CN | 1886680 | A | 12/2006 |
| CN | 101031619 | A | 9/2007 |
| CN | 200944140 | Y | 9/2007 |
| CN | 101103297 | A | 1/2008 |
| CN | 101151562 | A | 3/2008 |
| CN | 101263412 | A | 9/2008 |
| CN | 100492099 | C | 5/2009 |
| CN | 101589326 | A | 11/2009 |
| CN | 101688977 | A | 3/2010 |
| CN | 101726857 | A | 6/2010 |
| CN | 101793555 | A | 8/2010 |
| CN | 101881936 | A | 11/2010 |
| CN | 101910900 | A | 12/2010 |
| CN | 101945612 | A | 1/2011 |
| CN | 102314092 | A | 1/2012 |
| CN | 102360093 | A | 2/2012 |
| CN | 102393548 | A | 3/2012 |
| CN | 102498425 | A | 6/2012 |
| CN | 102608762 | A | 7/2012 |
| CN | 102782563 | A | 11/2012 |
| CN | 102928981 | A | 2/2013 |
| CN | 103000188 | A | 3/2013 |
| CN | 103031557 | A | 4/2013 |
| CN | 103185970 | A | 7/2013 |
| CN | 103562802 | A | 2/2014 |
| CN | 103777282 | A | 5/2014 |
| CN | 103823267 | A | 5/2014 |
| CN | 103959133 | A | 7/2014 |
| CN | 104035157 | A | 9/2014 |
| CN | 104040308 | A | 9/2014 |
| CN | 104040410 | A | 9/2014 |
| CN | 104136952 | A | 11/2014 |
| CN | 104204901 | A | 12/2014 |
| CN | 104246626 | A | 12/2014 |
| CN | 303019849 | | 12/2014 |
| CN | 104520751 | A | 4/2015 |
| CN | 303217936 | | 5/2015 |
| CN | 104956252 | A | 9/2015 |
| CN | 105074537 | A | 11/2015 |
| CN | 105074539 | A | 11/2015 |
| CN | 105190407 | A | 12/2015 |
| CN | 105229514 | A | 1/2016 |
| CN | 105393159 | A | 3/2016 |
| CN | 105408803 | A | 3/2016 |
| CN | 105531716 | A | 4/2016 |
| CN | 105705981 | A | 6/2016 |
| CN | 105940451 | A | 9/2016 |
| CN | 106125308 | A | 11/2016 |
| CN | 106575034 | A | 4/2017 |
| CN | 106716223 | A | 5/2017 |
| CN | 106842397 | A | 6/2017 |
| CN | 106950744 | A | 7/2017 |
| CN | 107466372 | A | 12/2017 |
| CN | 107533137 | A | 1/2018 |
| CN | 107873086 | A | 4/2018 |
| CN | 108107506 | A | 6/2018 |
| CN | 108474945 | A | 8/2018 |
| CN | 108681067 | A | 10/2018 |
| CN | 108780224 | A | 11/2018 |
| CN | 109073889 | A | 12/2018 |
| CN | 109154717 | A | 1/2019 |
| CN | 208621784 | U | 3/2019 |
| CN | 103823267 | B | 5/2019 |
| CN | 110383117 | A | 10/2019 |
| CN | 107873086 | B | 3/2020 |
| CN | 111025657 | A | 4/2020 |
| CN | 111323867 | A | 6/2020 |
| CN | 111386495 | A | 7/2020 |
| CN | 111566571 | A | 8/2020 |
| CN | 305973971 | S | 8/2020 |
| CN | 111615655 | A | 9/2020 |
| CN | 111684362 | A | 9/2020 |
| CN | 111902768 | A | 11/2020 |
| CN | 107466372 | B | 1/2021 |
| CN | 109073889 | B | 4/2021 |
| CN | 108780224 | B | 8/2021 |
| CN | 113424095 | A | 9/2021 |
| CN | 108474945 | B | 10/2021 |
| CN | 113692544 | A | 11/2021 |
| CN | 113728075 | A | 11/2021 |
| CN | 113728258 | A | 11/2021 |
| CN | 113759555 | A | 12/2021 |
| CN | 111684362 | B | 3/2022 |
| CN | 114207492 | A | 3/2022 |
| CN | 114341686 | A | 4/2022 |
| CN | 114341729 | A | 4/2022 |
| CN | 109154717 | B | 5/2022 |
| CN | 111566571 | B | 5/2022 |
| CN | 114450608 | A | 5/2022 |
| CN | 114721242 | A | 7/2022 |
| CN | 111386495 | B | 12/2022 |
| CN | 116149058 | A | 5/2023 |
| CN | 113692544 | B | 4/2025 |
| DE | 19751190 | A1 | 5/1999 |
| DE | 10221837 | A1 | 12/2003 |
| DE | 102006003785 | A1 | 7/2007 |
| DE | 102006036831 | A1 | 2/2008 |
| DE | 102012108424 | A1 | 3/2014 |
| DE | 102013209436 | A1 | 11/2014 |
| EM | 001747551-0002 | | 8/2012 |
| EM | 007234190-0001 | | 11/2019 |
| EP | 0795775 | A2 | 9/1997 |
| EP | 0822441 | A2 | 2/1998 |
| EP | 1347641 | A1 | 9/2003 |
| EP | 1413972 | A1 | 4/2004 |
| EP | 1526709 | A2 | 4/2005 |
| EP | 1748305 | A1 | 1/2007 |
| EP | 1938152 | A1 | 7/2008 |
| EP | 1413972 | B1 | 10/2008 |
| EP | 2110701 | A1 | 10/2009 |
| EP | 2196729 | A1 | 6/2010 |
| EP | 2225592 | A1 | 9/2010 |
| EP | 2244114 | A1 | 10/2010 |
| EP | 2326983 | A1 | 6/2011 |
| EP | 2381290 | A1 | 10/2011 |
| EP | 1828832 | B1 | 5/2013 |
| EP | 2733517 | A1 | 5/2014 |
| EP | 1573369 | B1 | 7/2014 |
| EP | 2748670 | A1 | 7/2014 |
| EP | 2634605 | B1 | 10/2015 |
| EP | 2929378 | A1 | 10/2015 |
| EP | 2748670 | B1 | 11/2015 |
| EP | 2995986 | A1 | 3/2016 |
| EP | 1402298 | B1 | 9/2016 |
| EP | 2995986 | B1 | 4/2017 |
| EP | 3198192 | A1 | 8/2017 |
| EP | 3245444 | A1 | 11/2017 |
| EP | 3245551 | A2 | 11/2017 |
| EP | 3248026 | A1 | 11/2017 |
| EP | 3256888 | A1 | 12/2017 |
| EP | 3359999 | A1 | 8/2018 |
| EP | 2494388 | B1 | 11/2018 |
| EP | 3398007 | A1 | 11/2018 |
| EP | 3433658 | A1 | 1/2019 |
| EP | 3433659 | A1 | 1/2019 |
| EP | 2842003 | B1 | 2/2019 |
| EP | 3499278 | A1 | 6/2019 |
| EP | 3245551 | B1 | 9/2019 |
| EP | 3548939 | A2 | 10/2019 |
| EP | 3698214 | | 8/2020 |
| EP | 3710876 | A1 | 9/2020 |
| EP | 3710887 | A1 | 9/2020 |
| EP | 3710893 | A1 | 9/2020 |

(56) References Cited

FOREIGN PATENT DOCUMENTS

| | | | |
|---|---|---|---|
| EP | 3710894 A1 | 9/2020 |
| EP | 3245444 B1 | 9/2021 |
| EP | 3894938 A1 | 10/2021 |
| EP | 3924759 A1 | 12/2021 |
| EP | 3927793 A1 | 12/2021 |
| EP | 3938821 A1 | 1/2022 |
| EP | 3980825 A1 | 4/2022 |
| EP | 4004615 A1 | 6/2022 |
| EP | 4004646 A1 | 6/2022 |
| EP | 4022370 A1 | 7/2022 |
| EP | 2831659 B1 | 5/2023 |
| FI | 20176157 A1 | 6/2019 |
| FI | 20176158 A1 | 6/2019 |
| FI | 20176161 A1 | 6/2019 |
| FR | 2677463 A1 | 12/1992 |
| FR | 2975506 A1 | 11/2012 |
| GB | 2115178 A | 9/1983 |
| GB | 2140935 A | 12/1984 |
| GB | 2500631 A | 10/2013 |
| GB | 2508661 A | 6/2014 |
| GB | 2509536 A | 7/2014 |
| GB | 2512077 A | 9/2014 |
| GB | 2514658 A | 12/2014 |
| HK | 1204684 A1 | 11/2015 |
| HK | 1205563 A1 | 12/2015 |
| HK | 1205793 A1 | 12/2015 |
| HK | 1206101 A1 | 12/2015 |
| JP | S49092850 U | 8/1974 |
| JP | 57089722 A | 6/1982 |
| JP | 02186319 A | 7/1990 |
| JP | 03239384 A | 10/1991 |
| JP | H04303812 A | 10/1992 |
| JP | H04303813 A | 10/1992 |
| JP | H05066427 A | 3/1993 |
| JP | 5-224018 A | 9/1993 |
| JP | 06294952 A | 10/1994 |
| JP | 7-66383 A | 3/1995 |
| JP | 07098439 A | 4/1995 |
| JP | H07239412 A | 9/1995 |
| JP | 0990312 A | 4/1997 |
| JP | H09185313 A | 7/1997 |
| JP | 2689851 B2 | 12/1997 |
| JP | H10503279 A | 3/1998 |
| JP | 10096903 A | 4/1998 |
| JP | H10105030 A | 4/1998 |
| JP | H1164636 A | 3/1999 |
| JP | 11109320 A | 4/1999 |
| JP | 11142806 A | 5/1999 |
| JP | 2953444 B2 | 9/1999 |
| JP | 2000056259 A | 2/2000 |
| JP | 2000511306 A | 8/2000 |
| JP | 2000261706 A | 9/2000 |
| JP | 2000267042 A | 9/2000 |
| JP | 2000321962 A | 11/2000 |
| JP | 2000515996 A | 11/2000 |
| JP | 2001027739 A | 1/2001 |
| JP | 2001296503 A | 10/2001 |
| JP | 2002090858 A | 3/2002 |
| JP | 2002122906 A | 4/2002 |
| JP | 2002156617 A | 5/2002 |
| JP | 2002162598 A | 6/2002 |
| JP | 2002520648 A | 7/2002 |
| JP | 2002523802 A | 7/2002 |
| JP | 2002529790 A | 9/2002 |
| JP | 2002311379 A | 10/2002 |
| JP | 2003066428 A | 3/2003 |
| JP | 2003270419 A | 9/2003 |
| JP | 2003315540 A | 11/2003 |
| JP | 2004021071 A | 1/2004 |
| JP | 2004133074 A | 4/2004 |
| JP | 2004157245 A | 6/2004 |
| JP | 2005222963 A | 8/2005 |
| JP | 2006350129 A | 12/2006 |
| JP | 2007011057 A | 1/2007 |
| JP | 2007094175 A | 4/2007 |
| JP | 2007199699 A | 8/2007 |
| JP | 2007219106 A | 8/2007 |
| JP | 2007279313 A | 10/2007 |
| JP | 2008511702 A | 4/2008 |
| JP | 2008112187 A | 5/2008 |
| JP | 2008517323 A | 5/2008 |
| JP | 2008145619 A | 6/2008 |
| JP | 2008233226 A | 10/2008 |
| JP | 2009036955 A | 2/2009 |
| JP | 2009515225 A | 4/2009 |
| JP | 2009132221 A | 6/2009 |
| JP | 2009133999 A | 6/2009 |
| JP | 2009211091 A | 9/2009 |
| JP | 4367775 B2 | 11/2009 |
| JP | 2010044326 A | 2/2010 |
| JP | 2010256631 A | 11/2010 |
| JP | 2011505052 A | 2/2011 |
| JP | 2011075681 A | 4/2011 |
| JP | 2011158907 A | 8/2011 |
| JP | 2011164545 A | 8/2011 |
| JP | 2011523452 A | 8/2011 |
| JP | 2011187108 A | 9/2011 |
| JP | 2011232510 A | 11/2011 |
| JP | 2012137616 A | 7/2012 |
| JP | 2012163642 A | 8/2012 |
| JP | 2012533089 A | 12/2012 |
| JP | 2013061480 A | 4/2013 |
| JP | 5303928 B2 | 10/2013 |
| JP | 2013235256 A | 11/2013 |
| JP | 2014132328 A | 7/2014 |
| JP | 5588794 B2 | 8/2014 |
| JP | 5646748 B2 | 11/2014 |
| JP | 2015053163 A | 3/2015 |
| JP | 2015523586 A | 8/2015 |
| JP | 2015172713 A | 10/2015 |
| JP | 2016030503 A | 3/2016 |
| JP | 2017528739 A | 9/2017 |
| JP | 2018508037 A | 3/2018 |
| JP | 2018512562 A | 5/2018 |
| JP | 2018131608 A | 8/2018 |
| JP | 2018533069 A | 11/2018 |
| JP | 2019512745 A | 5/2019 |
| JP | 2019520595 A | 7/2019 |
| JP | 6598269 B2 | 10/2019 |
| JP | 6680793 B2 | 3/2020 |
| JP | 2020512578 A | 4/2020 |
| JP | 2020514783 A | 5/2020 |
| JP | 1664536 S | 7/2020 |
| JP | 6734933 B2 | 7/2020 |
| JP | 2020-537187 A | 12/2020 |
| JP | 2021509488 A | 3/2021 |
| JP | 2021509736 A | 4/2021 |
| JP | 2021509737 A | 4/2021 |
| JP | 2021509739 A | 4/2021 |
| JP | 6895451 B2 | 6/2021 |
| JP | 2022509083 A | 1/2022 |
| JP | 2022513896 A | 2/2022 |
| JP | 2022-520472 A | 3/2022 |
| JP | 2022-523365 A | 4/2022 |
| JP | 2022-525165 A | 5/2022 |
| JP | 2022091982 A | 6/2022 |
| JP | 2022535460 A | 8/2022 |
| JP | 2022543571 A | 10/2022 |
| JP | 2022546413 A | 11/2022 |
| JP | 7250799 B2 | 3/2023 |
| JP | 7612592 B2 | 12/2024 |
| KR | 20060132474 A | 12/2006 |
| KR | 100803288 B1 | 2/2008 |
| KR | 20100092059 A | 8/2010 |
| KR | 20140140063 A | 12/2014 |
| KR | 20140142337 A | 12/2014 |
| KR | 20170031357 A | 3/2017 |
| KR | 20170039655 A | 4/2017 |
| KR | 30-1061010 S | 5/2020 |
| KR | 10-2020-0106932 A | 9/2020 |
| KR | 10-2020-0108030 A | 9/2020 |
| KR | 2020-0106170 A | 9/2020 |
| KR | 20200104402 A | 9/2020 |
| KR | 20210100174 A | 8/2021 |

(56) References Cited

FOREIGN PATENT DOCUMENTS

| | | | |
|---|---|---|---|
| KR | 10-2021-0127237 | A | 10/2021 |
| KR | 10-2021-0138609 | A | 11/2021 |
| KR | 20210134763 | A | 11/2021 |
| KR | 10-2022-0036963 | A | 3/2022 |
| KR | 1020220038452 | A | 3/2022 |
| KR | 10-2022-0054386 | A | 5/2022 |
| TW | 200535633 | A | 11/2005 |
| TW | 200801583 | A | 1/2008 |
| TW | 201314263 | A | 4/2013 |
| TW | 201600943 | A | 1/2016 |
| TW | 201604601 | A | 2/2016 |
| WO | 9216880 | A1 | 10/1992 |
| WO | 1997001133 | A1 | 1/1997 |
| WO | 1997027519 | A1 | 7/1997 |
| WO | 1998004650 | A1 | 2/1998 |
| WO | 1999009440 | A1 | 2/1999 |
| WO | 9931658 | A1 | 6/1999 |
| WO | 1999052002 | A1 | 10/1999 |
| WO | 2000016136 | A1 | 3/2000 |
| WO | 2000023830 | A1 | 4/2000 |
| WO | 2000023832 | A1 | 4/2000 |
| WO | 2000023847 | A1 | 4/2000 |
| WO | 2000028369 | A2 | 5/2000 |
| WO | 2000028369 | A3 | 10/2000 |
| WO | 2001050200 | A2 | 7/2001 |
| WO | 2001090822 | A1 | 11/2001 |
| WO | 2002082168 | A1 | 10/2002 |
| WO | 2003081320 | A1 | 10/2003 |
| WO | 2004023174 | A2 | 3/2004 |
| WO | 2004053531 | A3 | 11/2004 |
| WO | 2004102226 | A2 | 11/2004 |
| WO | 2004109349 | A2 | 12/2004 |
| WO | 2004109349 | A3 | 1/2005 |
| WO | 2005001753 | A1 | 1/2005 |
| WO | 2005006065 | A8 | 1/2005 |
| WO | 2005006065 | A3 | 2/2005 |
| WO | 2005047988 | A1 | 5/2005 |
| WO | 2005073798 | A1 | 8/2005 |
| WO | 2005093493 | A1 | 10/2005 |
| WO | 2006002870 | A1 | 1/2006 |
| WO | 2006064301 | A1 | 6/2006 |
| WO | 2006064325 | A1 | 6/2006 |
| WO | 2006064334 | A1 | 6/2006 |
| WO | 2006102073 | A2 | 9/2006 |
| WO | 2006132614 | A1 | 12/2006 |
| WO | 2006102073 | A3 | 1/2007 |
| WO | 2007015141 | A2 | 2/2007 |
| WO | 2007029032 | A1 | 3/2007 |
| WO | 2007085682 | A1 | 8/2007 |
| WO | 2007130130 | A2 | 11/2007 |
| WO | 2007141587 | A1 | 12/2007 |
| WO | 2007141589 | A1 | 12/2007 |
| WO | 2008011066 | A2 | 1/2008 |
| WO | 2008038058 | A1 | 4/2008 |
| WO | 2008011066 | A9 | 5/2008 |
| WO | 2008081070 | A1 | 7/2008 |
| WO | 2008100545 | A2 | 8/2008 |
| WO | 2008011066 | A3 | 12/2008 |
| WO | 2009013597 | A2 | 1/2009 |
| WO | 2009013597 | A3 | 1/2009 |
| WO | 2009077802 | A1 | 6/2009 |
| WO | 2009077803 | A1 | 6/2009 |
| WO | 2009101238 | A1 | 8/2009 |
| WO | 2007130130 | A3 | 9/2009 |
| WO | 2009155437 | A1 | 12/2009 |
| WO | 2009155437 | A8 | 3/2010 |
| WO | 2010023444 | A1 | 3/2010 |
| WO | 2010057219 | A1 | 5/2010 |
| WO | 2010067114 | A1 | 6/2010 |
| WO | 2010067117 | A1 | 6/2010 |
| WO | 2010078856 | A1 | 7/2010 |
| WO | 2010104692 | A2 | 9/2010 |
| WO | 2010122330 | A1 | 10/2010 |
| WO | 2010125337 | A2 | 11/2010 |
| WO | 2010125337 | A3 | 11/2010 |
| WO | 2010131046 | A1 | 11/2010 |
| WO | 2011012825 | A1 | 2/2011 |
| WO | 2011032005 | A2 | 3/2011 |
| WO | 2011042711 | A2 | 4/2011 |
| WO | 2011051660 | A1 | 5/2011 |
| WO | 2011055109 | A2 | 5/2011 |
| WO | 2011042711 | A3 | 6/2011 |
| WO | 2011073673 | A1 | 6/2011 |
| WO | 2011107831 | A1 | 9/2011 |
| WO | 2011110821 | A1 | 9/2011 |
| WO | 2011131978 | A1 | 10/2011 |
| WO | 2012052352 | A1 | 4/2012 |
| WO | 2012062658 | A1 | 5/2012 |
| WO | 2012136970 | A1 | 10/2012 |
| WO | 2012158950 | A1 | 11/2012 |
| WO | 2012172295 | A1 | 12/2012 |
| WO | 2013027004 | A1 | 2/2013 |
| WO | 2013027006 | A1 | 2/2013 |
| WO | 2013033274 | A1 | 3/2013 |
| WO | 2013034879 | A1 | 3/2013 |
| WO | 2013049012 | A1 | 4/2013 |
| WO | 2013054972 | A1 | 4/2013 |
| WO | 2013102759 | A2 | 7/2013 |
| WO | 2013163347 | A1 | 10/2013 |
| WO | 2013167864 | A1 | 11/2013 |
| WO | 2013190257 | A1 | 12/2013 |
| WO | 2014064427 | A1 | 5/2014 |
| WO | 2014080155 | A1 | 5/2014 |
| WO | 2014085734 | A1 | 6/2014 |
| WO | 2014090379 | A1 | 6/2014 |
| WO | 2014091200 | A1 | 6/2014 |
| WO | 2014093601 | A1 | 6/2014 |
| WO | 2014100182 | A1 | 6/2014 |
| WO | 2014113506 | A1 | 7/2014 |
| WO | 2014116615 | A1 | 7/2014 |
| WO | 2014130383 | A1 | 8/2014 |
| WO | 2014144526 | A2 | 9/2014 |
| WO | 2014156167 | A1 | 10/2014 |
| WO | 2014159621 | A1 | 10/2014 |
| WO | 2014164901 | A1 | 10/2014 |
| WO | 2014176695 | A1 | 11/2014 |
| WO | 2014179632 | A1 | 11/2014 |
| WO | 2014188149 | A1 | 11/2014 |
| WO | 2014209733 | A1 | 12/2014 |
| WO | 2014209819 | A1 | 12/2014 |
| WO | 2014209820 | A1 | 12/2014 |
| WO | 2014209821 | A1 | 12/2014 |
| WO | 2014210349 | A1 | 12/2014 |
| WO | 2015006784 | A2 | 1/2015 |
| WO | 2015015138 | A1 | 2/2015 |
| WO | 2015017291 | A1 | 2/2015 |
| WO | 2015069553 | A1 | 5/2015 |
| WO | 2015081313 | A2 | 6/2015 |
| WO | 2015117039 | A1 | 8/2015 |
| WO | 2015145119 | A1 | 10/2015 |
| WO | 2016010289 | A1 | 1/2016 |
| WO | 2016020630 | A2 | 2/2016 |
| WO | 2016020643 | A1 | 2/2016 |
| WO | 2016025350 | A1 | 2/2016 |
| WO | 2016020630 | A3 | 3/2016 |
| WO | 2016042283 | A1 | 3/2016 |
| WO | 2016044193 | A1 | 3/2016 |
| WO | 2016046514 | A1 | 3/2016 |
| WO | 2016048729 | A1 | 3/2016 |
| WO | 2016054092 | A1 | 4/2016 |
| WO | 2016069606 | A1 | 5/2016 |
| WO | 2016087442 | A1 | 6/2016 |
| WO | 2016103263 | A1 | 6/2016 |
| WO | 2016111706 | A1 | 7/2016 |
| WO | 2016111707 | A1 | 7/2016 |
| WO | 2016111708 | A1 | 7/2016 |
| WO | 2016111709 | A1 | 7/2016 |
| WO | 2016113533 | A2 | 7/2016 |
| WO | 2016113534 | A1 | 7/2016 |
| WO | 2016116733 | A1 | 7/2016 |
| WO | 2016118107 | A1 | 7/2016 |
| WO | 2016122679 | A1 | 8/2016 |

(56) References Cited

FOREIGN PATENT DOCUMENTS

| | | | |
|---|---|---|---|
| WO | 2016130509 | A1 | 8/2016 |
| WO | 2016135434 | A1 | 9/2016 |
| WO | 2016113533 | A3 | 10/2016 |
| WO | 2016156776 | A1 | 10/2016 |
| WO | 2016162606 | A1 | 10/2016 |
| WO | 2016181108 | A1 | 11/2016 |
| WO | 2016046514 | A8 | 4/2017 |
| WO | 2017060665 | A1 | 4/2017 |
| WO | 2017094129 | A1 | 6/2017 |
| WO | 2017120320 | A1 | 7/2017 |
| WO | 2017134412 | A1 | 8/2017 |
| WO | 2017160367 | A1 | 9/2017 |
| WO | 2017162999 | A1 | 9/2017 |
| WO | 2017178781 | A1 | 10/2017 |
| WO | 2017180403 | A1 | 10/2017 |
| WO | 2017180923 | A1 | 10/2017 |
| WO | 2017182771 | A1 | 10/2017 |
| WO | 2017203200 | A1 | 11/2017 |
| WO | 2017203201 | A1 | 11/2017 |
| WO | 2017207987 | A1 | 12/2017 |
| WO | 2018102834 | A2 | 6/2018 |
| WO | 2018102834 | A3 | 6/2018 |
| WO | 2018096359 | A3 | 7/2018 |
| WO | 2018129398 | A1 | 7/2018 |
| WO | 2017162999 | A8 | 8/2018 |
| WO | 2018150163 | A1 | 8/2018 |
| WO | 2018206487 | A1 | 11/2018 |
| WO | 2019046649 | A1 | 3/2019 |
| WO | 2019077307 | A1 | 4/2019 |
| WO | 2019079350 | A2 | 4/2019 |
| WO | 2019079350 | A3 | 4/2019 |
| WO | 2019046649 | A8 | 5/2019 |
| WO | 2019122806 | A1 | 6/2019 |
| WO | 2019135784 | A1 | 7/2019 |
| WO | 2019135796 | A1 | 7/2019 |
| WO | 2019135837 | A1 | 7/2019 |
| WO | 2019136470 | A1 | 7/2019 |
| WO | 2019136471 | A1 | 7/2019 |
| WO | 2019136473 | A1 | 7/2019 |
| WO | 2019171038 | A1 | 9/2019 |
| WO | 2019185973 | A1 | 10/2019 |
| WO | 2019185975 | A1 | 10/2019 |
| WO | 2019185976 | A1 | 10/2019 |
| WO | 2019185977 | A1 | 10/2019 |
| WO | 2019217453 | A1 | 11/2019 |
| WO | 2020023779 | A1 | 1/2020 |
| WO | 2020123506 | A1 | 6/2020 |
| WO | 2020149956 | A1 | 7/2020 |
| WO | 2020163524 | A1 | 8/2020 |
| WO | 2020168348 | A1 | 8/2020 |
| WO | 2020172681 | A1 | 8/2020 |
| WO | 2020186113 | A1 | 9/2020 |
| WO | 2020212682 | A1 | 10/2020 |
| WO | 2020219092 | A1 | 10/2020 |
| WO | 2020227236 | A1 | 11/2020 |
| WO | 2020247930 | A1 | 12/2020 |
| WO | 2021016371 | A1 | 1/2021 |
| WO | 2021021926 | A1 | 2/2021 |
| WO | 2021032982 | A1 | 2/2021 |
| WO | 2021032983 | A1 | 2/2021 |
| WO | 2021041949 | A1 | 3/2021 |
| WO | 2021044121 | A1 | 3/2021 |
| WO | 2021138607 | A1 | 7/2021 |
| WO | 2021242898 | A1 | 12/2021 |
| WO | 2021262759 | A1 | 12/2021 |
| WO | 2022015878 | A1 | 1/2022 |
| WO | 2022099312 | A1 | 5/2022 |
| WO | 2022109615 | A1 | 5/2022 |
| WO | 2022150841 | A1 | 7/2022 |
| WO | 2022187870 | A1 | 9/2022 |
| WO | 2022187870 | A9 | 10/2022 |

OTHER PUBLICATIONS

Extended European Search Report for European Application No. 19897355.4, Search completed Jul. 12, 2022, Mailed Jul. 21, 2022, 08 pgs.

Extended European Search Report for European Application No. 20760111.3, Search completed Sep. 19, 2022, Mailed Sep. 29, 2022, 12 pgs.

Extended European Search Report for European Application No. 20818304.6, Search completed Mar. 23, 2023, Mailed Mar. 31, 2023, 8 pgs.

International Preliminary Report on Patentability for International Application PCT/US2020/043107, Report issued Jan. 25, 2022, Mailed on Feb. 3, 2022, 7 pgs.

International Preliminary Report on Patentability for International Application PCT/US2020/067737, Report issued Jul. 5, 2022, Mailed Jul. 14, 2022, 6 pgs.

International Preliminary Report on Patentability for International Application PCT/US2021/038542, Report issued Dec. 13, 2022, Mailed on Jan. 5, 2023, 8 pgs.

International Preliminary Report on Patentability for International Application PCT/US2021/072548, Report issued May 16, 2023, Mailed on Jun. 1, 2023, 05 pgs.

International Search Report and Written Opinion for International Application No. PCT/US2022/071007, Search completed May 2, 2022, Mailed May 23, 2022, 13 pgs.

Ahmadi et al., "Influence of an Al2O3 surface coating on the response of polymeric waveguide sensors", Optics Exp, Oct. 16, 2017, vol. 25, No. 21, pp. 25102-25112.

D'Alessandro et al., "Electro-optic properties of switchable gratings made of polymer and nematic liquid-crystal slices", Opt. Lett., vol. 29, No. 12, Jun. 15, 2004, pp. 1405-1407.

Gaylord et al., "Thin and thick gratings: terminology clarification", Applied Optics, Oct. 1, 1981 , vol. 20, pp. 3271-3273.

Emoto et al., "Formation of positive and negative anisotropic holographic gratings depending on recording energy in photoreactive liquid crystalline copolymer films", Applied Physics B: Lasers and Optics, vol. 107, No. 3, Mar. 31, 2012, pp. 741-748, XP035071884, ISSN: 1432-0649, doi: 10.1007/S00340-012-4977-X.

Kawatsuki et al., "Surface Relief Formation with Molecular Orientation in Photoreactive Liquid Crystalline Polymer Film", Journal of Photopolymer Science and Technology, vol. 19, No. 2, Aug. 15, 2006, pp. 151-156, XP093064657, ISSN: 0914-9244, doi: 10.2494/photopolymer.19.151.

"Compact linear Fresnel reflector", Wikipedia, Sep. 16, 2019, https://en.wikipedia.org/wiki/Compact_linear_Fresnel_reflector.

Digi Lens: Waveguides, announced unknown, [online], [site visited Nov. 6, 2020]. Available from Internet, <URL: https://www.digilens.com/technology/waveguides/> (Year: 2020).

Extended European Search Report for EP Application No. 13192383.1, dated Apr. 2, 2014, 7 pgs.

Extended European Search Report for European Application No. 13765610.4 dated Feb. 16, 2016, 6 pgs.

Extended European Search Report for European Application No. 15187491.4, search completed Jan. 15, 2016, mailed Jan. 28, 2016, 5 pgs.

Extended European Search Report for European Application No. 18867522.7, Search completed Sep. 15, 2021, Mailed Sep. 24, 2021, 9 pgs.

Extended European Search Report for European Application No. 18898154.2, Search completed Aug. 13, 2021, Mailed Aug. 23, 2021, 7 pgs.

Extended European Search Report for European Application No. 19736108.2, Search completed Sep. 15, 2021, Mailed Sep. 27, 2021, 8 pgs.

Extended European Search Report for European Application No. 20755316.5, Search completed Nov. 17, 2022, Mailed Nov. 25, 2022, 09 pgs.

Extended European Search Report for European Application No. 18727645.6, Search completed Oct. 14, 2020, Mailed Oct. 23, 2020, 13 pgs.

(56) References Cited

OTHER PUBLICATIONS

Extended Search Report for European Application No. 18898841.4, Search completed Mar. 18, 2021, Mailed Mar. 26, 2021, 10 pgs.

International Preliminary Report on Patentability for International Application No. PCT/GB2010/000835, issued Nov. 1, 2011, mailed Nov. 10, 2011, 9 pgs.

International Preliminary Report on Patentability for International Application No. PCT/GB2010/001920, issued Apr. 11, 2012, mailed Apr. 19, 2012, 10 pgs.

International Preliminary Report on Patentability for International Application No. PCT/GB2010/001982, report issued May 1, 2012, mailed May 10, 2012, 7 pgs.

International Preliminary Report on Patentability for International Application No. PCT/GB2013/000273, issued Dec. 23, 2014, mailed Dec. 31, 2014, 8 pgs.

International Preliminary Report on Patentability for International Application No. PCT/GB2015/000203, issued Mar. 21, 2017, mailed Mar. 30, 2017, 8 pgs.

International Preliminary Report on Patentability for International Application No. PCT/GB2016/000005, Report issued Jul. 18, 2017, Mailed Jul. 27, 2017, 7 pgs.

International Preliminary Report on Patentability for International Application No. PCT/GB2016/000036, issued Aug. 29, 2017, mailed Sep. 8, 2017, 8 pgs.

International Preliminary Report on Patentability for International Application No. PCT/GB2016/000051, Report issued Sep. 19, 2017, Mailed Sep. 28, 2017, 7 pgs.

International Preliminary Report on Patentability for International Application No. PCT/GB2016/000065, issued Oct. 3, 2017, mailed Oct. 12, 2017, 8 pgs.

International Preliminary Report on Patentability for International Application No. PCT/IB2008/001909, Report issued Jan. 26, 2010, Mailed Jan. 26, 2010, 5 pgs.

International Preliminary Report on Patentability for International Application No. PCT/US2018/012227, Report issued Jul. 30, 2019, Mailed Aug. 8, 2019, 7 pgs.

International Preliminary Report on Patentability for International Application No. PCT/US2018/037410, Report issued Jul. 14, 2020, Mailed Jul. 23, 2020, 7 pgs.

International Preliminary Report on Patentability for International Application No. PCT/US2018/048636, Report issued Jul. 14, 2020, Mailed Jul. 23, 2020, 9 pgs.

International Preliminary Report on Patentability for International Application No. PCT/US2018/062835, Report issued Jul. 14, 2020, Mailed Jul. 23, 2020, 7 pgs.

International Preliminary Report on Patentability for International Application No. PCT/US2019/012758, Report issued Jul. 14, 2020, Mailed Jul. 23, 2020, 4 pgs.

International Preliminary Report on Patentability for International Application No. PCT/US2019/012759, Report issued Jul. 14, 2020, Mailed Jul. 23, 2020, 6 pgs.

International Preliminary Report on Patentability for International Application PCT /US2018/015553, Report issued Jun. 4, 2019, Mailed Jun. 13, 2019, 6 pgs.

International Preliminary Report on Patentability for International Application PCT/GB2009/051676, issued Jun. 14, 2011, mailed Jun. 23, 2011, 6 pgs.

International Preliminary Report on Patentability for International Application PCT/GB2011/000349, issued Sep. 18, 2012, mailed Sep. 27, 2012, 10 pgs.

International Preliminary Report on Patentability for International Application PCT/GB2012/000331, issued Oct. 8, 2013, mailed Oct. 17, 2013, 8 pgs.

International Preliminary Report on Patentability for International Application PCT/GB2012/000677, issued Feb. 25, 2014, mailed Mar. 6, 2014, 5 pgs.

International Preliminary Report on Patentability for International Application PCT/GB2013/000005, issued Jul. 8, 2014, mailed Jul. 17, 2014, 12 pgs.

International Preliminary Report on Patentability for International Application PCT/GB2013/000210, issued Nov. 11, 2014, Mailed Nov. 20, 2014, 6 pgs.

International Preliminary Report on Patentability for International Application PCT/GB2014/000197, issued Nov. 24, 2015, mailed Dec. 3, 2015, 7 pgs.

International Preliminary Report on Patentability for International Application PCT/GB2014/000295, issued Feb. 2, 2016, mailed Feb. 11, 2016, 4 pgs.

International Preliminary Report on Patentability for International Application PCT/GB2015/000225, issued Feb. 14, 2017, mailed Feb. 23, 2017, 8 pgs.

International Preliminary Report on Patentability for International Application PCT/GB2015/000228, issued Feb. 14, 2017, mailed Feb. 23, 2017, 11 pgs.

International Preliminary Report on Patentability for International Application PCT/GB2015/000274, Issued Mar. 28, 2017, mailed Apr. 6, 2017, 8 pgs.

International Preliminary Report on Patentability for International Application PCT/GB2016/000003, issued Jul. 18, 2017, mailed Jul. 27, 2017, 11 pgs.

International Preliminary Report on Patentability for International Application PCT/GB2016/000014, issued Jul. 25, 2017, mailed Aug. 3, 2017, 7 pgs.

International Preliminary Report on Patentability for International Application PCT/GB2017/000015, Report Completed Aug. 7, 2018, Mailed Aug. 16, 2018, 7 pgs.

International Preliminary Report on Patentability for International Application PCT/GB2017/000040, Report issued Sep. 25, 2018, Mailed Oct. 4, 2018, 7 pgs.

International Preliminary Report on Patentability for International Application PCT/GB2017/000055, issued Oct. 16, 2018, Mailed Oct. 25, 2018, 9 pgs.

International Preliminary Report on Patentability for International Application PCT/US2014/011736, issued Jul. 21, 2015, mailed Jul. 30, 2015, 9 pgs.

International Preliminary Report on Patentability for International Application PCT/US2016/017091, issued Aug. 15, 2017, mailed Aug. 24, 2017, 5 pgs.

International Preliminary Report on Patentability for International Application PCT/US2018/012691, issued Jul. 9, 2019, Mailed Jul. 18, 2019, 10 pgs.

International Preliminary Report on Patentability for International Application PCT/US2018/048960, Report issued on Mar. 3, 2020, Mailed on Mar. 12, 2020, 7 pgs.

International Preliminary Report on Patentability for International Application PCT/US2018/056150, Report Issued on Apr. 21, 2020, Mailed on Apr. 30, 2020, 6 pgs.

International Preliminary Report on Patentability for International Application PCT/US2019/012764, Report issued Jul. 14, 2020, Mailed Jul. 23, 2020, 5 pgs.

International Preliminary Report on Patentability for International Application PCT/US2019/031163, Report issued Nov. 10, 2020, Mailed Nov. 19, 2020, 6 pgs.

International Preliminary Report on Patentability for International Application PCT/US2019/043496 Report issued Jan. 26, 2021, Mailed Feb. 4, 2021, 5 pgs.

International Preliminary Report on Patentability for International Application PCT/US2019/047097 issued Sep. 28, 2021, Mailed on Nov. 4, 2021, 7 pgs.

International Preliminary Report on Patentability for International Application PCT/US2019/064765, Report issued Oct. 19, 2020, Mailed Oct. 28, 2020, 27 pgs.

International Preliminary Report on Patentability for International Application PCT/US2019/065478, Report issued Jun. 8, 2021, mailed on Jun. 24, 2021, 9 pgs.

International Preliminary Report on Patentability for International Application PCT/US2020/018686, Report issued Aug. 10, 2021, Mailed Aug. 26, 2021, 6 pgs.

International Preliminary Report on Patentability for International Application PCT/US2020/019549, Report issued Aug. 10, 2021, Mailed Sep. 2, 2021, 7 pgs.

(56) References Cited

OTHER PUBLICATIONS

International Preliminary Report on Patentability for International Application PCT/US2020/022482, issued Aug. 25, 2021, Mailed Sep. 23, 2021, 7 pgs.
International Preliminary Report on Patentability for International Application PCT/US2020/031363, issued Nov. 2, 2021, Mailed Nov. 18, 2021, 7 pgs.
International Preliminary Report on Patentability for International Application PCT/US2020/036654, Report issued Dec. 7, 2021, Mailed Dec. 16, 2021, 9 pgs.
International Preliminary Report on Patentability for International Application PCT/US2020/044060, Report issued Feb. 1, 2022, Mailed on Feb. 10, 2022, 7 pgs.
International Preliminary Report on Patentability for International Application PCT/US2020/048590, Report issued Mar. 1, 2022, Mailed on Mar. 10, 2022, 12 pgs.
International Preliminary Report on Patentability for PCT Application No. PCT/US2013/038070, dated Oct. 28, 2014, 6 pgs.
International Search Report and Written Opinion for International Application No. PCT/GB2010/000835, completed Oct. 26, 2010, mailed Nov. 8, 2010, 12 pgs.
International Search Report and Written Opinion for International Application No. PCT/GB2010/001920, completed Mar. 29, 2011, mailed Apr. 6, 2011, 15 pgs.
International Search Report and Written Opinion for International Application No. PCT/GB2015/000228, Search completed May 4, 2011, Mailed Jul. 15, 2011, 15 pgs.
International Search Report and Written Opinion for International Application No. PCT/GB2016/000036, completed Jul. 4, 2016, mailed Jul. 13, 2016, 10 pgs.
International Search Report and Written Opinion for International Application No. PCT/GB2016/000065, completed Jul. 14, 2016, mailed Jul. 27, 2016, 10 pgs.
International Search Report and Written Opinion for International Application No. PCT/GB2017/000015, Search completed Apr. 25, 2017, Mailed May 8, 2017, 10 pgs.
International Search Report and Written Opinion for International Application No. PCT/GB2017/000055, Search completed Jul. 19, 2017, Mailed Jul. 26, 2017, 12 pgs.
International Search Report and Written Opinion for International Application No. PCT/IB2008/001909, Search completed Feb. 4, 2009, Mailed Feb. 17, 2009, 6 pgs.
International Search Report and Written Opinion for International Application No. PCT/US2013/038070, completed Aug. 12, 2013, mailed Aug. 14, 2013, 12 pgs.
International Search Report and Written Opinion for International Application No. PCT/US2014/011736, completed Apr. 18, 2014, mailed May 8, 2014, 10 pgs.
International Search Report and Written Opinion for International Application No. PCT/US2018/012227, Search completed Feb. 28, 2018, Mailed Mar. 14, 2018, 8 pgs.
International Search Report and Written Opinion for International Application No. PCT/US2018/012691, completed Mar. 10, 2018, mailed Mar. 28, 2018, 16 pgs.
International Search Report and Written Opinion for International Application No. PCT/US2018/015553, completed Aug. 6, 2018, Mailed Sep. 19, 2018, 12 pgs.
International Search Report and Written Opinion for International Application No. PCT/US2018/037410, Search completed Aug. 16, 2018, Mailed Aug. 30, 2018, 11 pgs.
International Search Report and Written Opinion for International Application No. PCT/US2018/048636, Search completed Nov. 1, 2018, Mailed Nov. 15, 2018, 16 pgs.
International Search Report and Written Opinion for International Application No. PCT/US2018/048960, Search completed Dec. 14, 2018, Mailed Jan. 8, 2019, 14 pgs.
International Search Report and Written Opinion for International Application No. PCT/US2018/056150, Search completed Dec. 4, 2018, Mailed Dec. 26, 2018, 10 pgs.
International Search Report and Written Opinion for International Application No. PCT/US2018/062835, Search completed Jan. 14, 2019, Mailed Jan. 31, 2019, 14 pgs.
International Search Report and Written Opinion for International Application No. PCT/US2019/012758, completed Mar. 12, 2019, mailed Mar. 27, 2019, 9 pgs.
International Search Report and Written Opinion for International Application No. PCT/US2019/012764, completed Mar. 1, 2019, mailed Mar. 18, 2019, 9 pgs.
International Search Report and Written Opinion for International Application No. PCT/US2019/031163, Search completed Jul. 9, 2019, Mailed Jul. 29, 2019, 11 pgs.
International Search Report and Written Opinion for International Application No. PCT/US2019/043496, Search completed Sep. 28, 2019, Mailed Nov. 14, 2019, 12 pgs.
International Search Report and Written Opinion for International Application No. PCT/US2019/064765, Search completed Feb. 3, 2020, Mailed Mar. 18, 2020, 11 pgs.
International Search Report and Written Opinion for International Application No. PCT/US2019/065478, Search completed Jan. 29, 2020, Mailed Feb. 11, 2020, 14 pgs.
International Search Report and Written Opinion for International Application No. PCT/US2020/018686, Search completed Apr. 25, 2020, Mailed May 22, 2020, 11 pgs.
International Search Report and Written Opinion for International Application No. PCT/US2020/019549, Search completed Apr. 14, 2020, Mailed May 22, 2020, 12 pgs.
International Search Report and Written Opinion for International Application No. PCT/US2020/022482, Search completed May 12, 2020, Mailed Jun. 9, 2020, 11 pgs.
International Search Report and Written Opinion for International Application No. PCT/US2020/031363, completed May 28, 2020, Mailed Jun. 10, 2020, 8 pgs.
International Search Report and Written Opinion for International Application No. PCT/US2020/036654, Search completed Aug. 21, 2020, Mailed Sep. 4, 2020, 14 pgs.
International Search Report and Written Opinion for International Application No. PCT/US2020/043107, Search completed Sep. 28, 2020, Mailed Oct. 15, 2020, 12 pgs.
International Search Report and Written Opinion for International Application No. PCT/US2020/044060, Search completed Oct. 9, 2020, Mailed Nov. 9, 2020, 12 pgs.
International Search Report and Written Opinion for International Application No. PCT/US2020/048590, Search completed Dec. 7, 2020, Mailed Jan. 11, 2021, 19 pgs.
International Search Report and Written Opinion for International Application No. PCT/US2020/067737, Search completed Mar. 3, 2021, Mailed Mar. 25, 2021, 12 pgs.
International Search Report and Written Opinion for International Application No. PCT/US2021/038542, search Completed Sep. 21, 2021, Mailed Oct. 20, 2021 16 pgs.
International Search Report and Written Opinion for International Application No. PCT/US2021/072287, Search completed Jan. 10, 2022, Mailed Feb. 17, 2022, 11 pgs.
International Search Report and Written Opinion for International Application No. PCT/US2021/072548, Search completed Jan. 25, 2022, Mailed Feb. 8, 2022, 15 pgs.
International Search Report and Written Opinion for International Application No. PCT/US2022/070095, Search completed Mar. 10, 2022, Mailed Mar. 22, 2022, 13 pgs.
International Search Report and Written Opinion for International Application PCT/GB2009/051676, completed May 10, 2010, mailed May 18, 2010, 7 pgs.
International Search Report and Written Opinion for International Application PCT/GB2016/000181, completed Dec. 21, 2016, mailed Feb. 27, 2017, 21 pgs.
International Search Report and Written Opinion for International Application PCT/US2016/017091, completed by the European Patent Office on Apr. 20, 2016, 7 pgs.
International Search Report and Written Opinion for International Application PCT/US2019/012759, completed Mar. 14, 2019, mailed Apr. 15, 2019, 12 pgs.

(56) References Cited

OTHER PUBLICATIONS

International Search Report and Written Opinion for International Application PCT/US2019/047097, completed Nov. 22, 2015, mailed Dec. 16, 2019, 10 pgs.
International Search Report and Written Opinion for International Application PCT/US2020/016875, Report Completed Apr. 9, 2020, Mailed Apr. 29, 2020, 11 pgs.
International Search Report for International Application PCT/GB2014/000295, completed Nov. 18, 2014, mailed Jan. 5, 2015, 4 pgs.
International Search Report for International Application PCT/GB2017/000040, mailed Jul. 18, 2017, completed Jul. 10, 2017, 3 pgs.
International Search Report for PCT/GB2010/001982, completed by the European Patent Office on Feb. 24, 2011, 4 pgs.
International Search Report for PCT/GB2011/000349, completed by the European Patent Office on Aug. 17, 2011, 4 pgs.
International Search Report for PCT/GB2012/000331, completed by the European Patent Office on Aug. 29, 2012, 4 pgs.
International Search Report for PCT/GB2012/000677, completed by the European Patent Office on Dec. 10, 2012, 4 pgs.
International Search Report for PCT/GB2013/000005, completed by the European Patent Office on Jul. 16, 2013, 3 pgs.
International Search Report for PCT/GB2013/000210, completed by the European Patent Office on Aug. 12, 2013, 3 pgs.
International Search Report for PCT/GB2013/000273, completed by the European Patent Office on Aug. 30, 2013, 4 pgs.
International Search Report for PCT/GB2014/000197, Completed by the European Patent Office on Jul. 31, 2014, 3 pgs.
International Search Report for PCT/GB2015/000203, completed by the European Patent Office on Oct. 9, 2015, 4 pgs.
International Search Report for PCT/GB2015/000225, completed by the European Patent Office on Nov. 10, 2015, mailed Dec. 2, 2016, 5 pgs.
International Search Report for PCT/GB2015/000274, completed by the European Patent Office on Jan. 7, 2016, 4 pgs.
International Search Report for PCT/GB2016/000003, Completed by the European Patent Office May 31, 2016, 6 pgs.
International Search Report for PCT/GB2016/000005, completed by the European Patent Office on May 27, 2016, 4 pgs.
International Search Report for PCT/GB2016/000014, completed by the European Patent Office on Jun. 27, 2016, 4 pgs.
International Search Report for PCT/GB2016/000051, Completed Aug. 11, 2016, 3 pgs.
Supplementary Partial European Search Report for European Application No. 18727645.6, Search completed Jul. 2, 2020, Mailed Jul. 13, 2020, 13 pgs.
Written Opinion for International Application No. PCT/GB2010/001982, search completed Feb. 24, 2011, mailed Mar. 8, 2011, 6 pgs.
Written Opinion for International Application No. PCT/GB2011/000349, completed Aug. 17, 2011, mailed Aug. 25, 2011, 9 pgs.
Written Opinion for International Application No. PCT/GB2012/000331, completed Aug. 29, 2012, mailed Sep. 6, 2012, 7 pgs.
Written Opinion for International Application No. PCT/GB2012/000677, completed Dec. 10, 2012, mailed Dec. 17, 2012, 4 pgs.
Written Opinion for International Application No. PCT/GB2013/000005, search completed Jul. 16, 2013, mailed Jul. 24, 2013, 11 pgs.
Written Opinion for International Application No. PCT/GB2013/000273, completed Aug. 30, 2013, mailed Sep. 9, 2013, 7 pgs.
Written Opinion for International Application No. PCT/GB2014/000197, Search completed Jul. 31, 2014, Mailed Aug. 7, 2014, 6 pgs.
Written Opinion for International Application No. PCT/GB2014/000295, search completed Nov. 18, 2014, mailed Jan. 5, 2015, 3 pgs.
Written Opinion for International Application No. PCT/GB2015/000203, completed Oct. 29, 2015, mailed Nov. 16, 2015, 7 pgs.

Written Opinion for International Application No. PCT/GB2015/000225, search completed Nov. 10, 2015, mailed Feb. 4, 2016, 7 pgs.
Written Opinion for International Application No. PCT/GB2015/000274, search completed Jan. 7, 2016, mailed Jan. 19, 2016, 7 pgs.
Written Opinion for International Application No. PCT/GB2016/000014, search completed Jun. 27, 2016, mailed Jul. 7, 2016, 6 pgs.
Written Opinion for International Application No. PCT/GB2016/000051, Search completed Aug. 11, 2016, Mailed Aug. 22, 2016, 6 pgs.
Written Opinion for International Application No. PCT/GB2017/000040, search completed Jul. 10, 2017, mailed Jul. 18, 2017, 6 pgs.
Written Opinion for International Application PCT/GB2013/000210, completed Aug. 12, 2013, Mailed Aug. 20, 2013, 5 pgs.
Written Opinion for International Application PCT/GB2016/000003, completed May 31, 2016, mailed Aug. 12, 2016, 10 pgs.
Written Opinion for International Application PCT/GB2016/000005, search completed May 27, 2016, mailed Jun. 6, 2016, 6 pgs.
Google search: "digilens waveguide" [site visited Sep. 14, 2020], https://www.google.com/search?q=digilens+waveguide&sxsrf=ALeKk02RFwZAZ0vrlxVH0M_2fiXFkhW1 FA: 1604777621684&source=lnms&tbm=isch&sa=X&ved=2ah U KEwjjyNXAlvHsAh U Rh HI EHTufCvsQ_AUoAnoECBwQBA&biw= 1200&bih= 1777.
Google search: "eyewear display devices" [site visited Sep. 14, 2020], https://www.google.com/search?q=eyewear+display+devices&sxsrf=ALeKk0 1 WWfnOAgsQR_bhydJaYK3e37r J Lg: 1604779001617&source=lnms&tbm=isch&sa=X&ved=2ah U KEwi99txSm_HsAhVaoH I EHawtD8QQ_AUoAnoECC8QBA&biw= 1200&bih= 1777.
Google search: "smart glasses" [site visited Sep. 14, 2020], https://www.google.com/search?q=smart+glasses&sxsrf=ALeKk01 KN 1wj23-NqP-KCnrcsUpCgxyKA: 1604779046920&source=lnms&tbm=isch&sa=X&ved=2ah UKEwipkq Pom_HsAhVKhXI EHQGFBp8Q_AUoBHoECCgQBg&biw= 1200&bih=1777.
"Agilent ADNS-2051 Optical Mouse Sensor: Data Sheet", Agilent Technologies, Jan. 9, 2002, 40 pgs.
"Application Note—MOXTEK ProFlux Polarizer use with LCOS displays", CRL Opto Limited, http://www.crlopto.com, 2003, 6 pgs.
"Application Note AN16: Optical Considerations for Bridgelux LED Arrays", BridgeLux, Jul. 31, 2010, 23 pgs.
"Application Note: Variable Attenuator for Lasers", Technology and Applications Center, Newport Corporation, www.newport.com, 2006, DS-08067, 6 pgs.
"Bae Systems to Unveil Q-Sight Family of Helmet-Mounted Display at AUSA Symposium", Released on Tuesday, Oct. 9, 2007, 1 pg.
"Beam Steering Using Liquid Crystals", Boulder Nonlinear Systems, Inc., info@bnonlinear.com, May 8, 2001, 4 pgs.
"BragGrate—Deflector: Transmitting Volume Bragg Grating for angular selection and magnification", 2015, www.OptiGrate.com.
"Cree XLamp XP-E LEDs", Cree, Inc., Retrieved from www.cree.com/Xlamp, CLD-DS18 Rev 17, 2013, 17 pgs.
"Desmodur N 3900", Bayer MaterialScience AG, Mar. 18, 2013, www.bayercoatings.com, 4 pgs.
"Digilens—Innovative Augmented Reality Display and Sensor Solutions for OEMs", Jun. 6, 2017, 31 pgs.
"Exotic Optical Components", Building Electro-Optical Systems, Making It All Work, Chapter 7, John Wiley & Sons, Inc., pp. 233-261, Dec. 31, 2021.
"FHS Lenses Series", Fraen Corporation, www.fraen.com, Jun. 16, 2003, 10 pgs.
"FLP Lens Series for LUXEONTM Rebel and Rebel ES LEDs", Fraen Corporation, www.fraensrl.com, Aug. 7, 2015, 8 pgs.
"Head-up Displays, See-through display for military aviation", BAE Systems, 2016, 3 pgs.
"Holder for LUXEON Rebel—Part No. 180", Polymer Optics Ltd., 2008, 12 pgs.
"LED 7-Segment Displays", Lumex, uk.digikey.com, 2003, UK031, 36 pgs.
"LED325W UVTOP UV LED with Window", Thorlabs, Specifications and Documentation, 21978-S01 Rev. A, Apr. 8, 2011, 5 pgs.

(56) References Cited

OTHER PUBLICATIONS

"Liquid Crystal Phases", Phases of Liquid Crystals, http://plc.cwru.edu/tutorial/enhanced/files/lc/phase, Retrieved on Sep. 21, 2004, 6 pgs.

"LiteHUD Head-up display", BAE Systems, 2016, 2 pgs.

"LiteHUD Head-up display infographic", BAE Systems, 2017, 2 pgs.

"Luxeon C: Power Light Source", Philips Lumileds, www.philipslumileds.com, 2012, 18 pgs.

"Luxeon Rebel ES: Leading efficacy and light output, maximum design flexibility", LUXEON Rebel ES Datasheet DS61 20130221, www.philipslumileds.com, 2013, 33 pgs.

"Mobile Display Report", Insight Media, LLC, Apr. 2012, vol. 7, No. 4, 72 pgs.

"Molecular Imprints Imprio 55", Engineering at Illinois, Micro + Nanotechnology Lab, Retrieved from https://mntl.illinois.edu/facilities/cleanrooms/equipment/Nano-Imprint.asp, Dec. 28, 2015, 2 pgs.

"Navy awards SGB Labs a contract for HMDs for simulation and training", Press releases, DigiLens, Oct. 2012, pp. 1-2.

"Optical measurements of retinal flow", Industrial Research Limited, Feb. 2012, 18 pgs.

"Osterhout Design Group Develops Next-Generation, Fully-integrated Smart Glasses Using Qualcomm Technologies", ODG, www.osterhoutgroup.com, Sep. 18, 2014, 2 pgs.

"Plastic has replaced glass in photochromic lens", www.plastemart.com, 2003, 1 pg.

"Range Finding Using Pulse Lasers", OSRAM, Opto Semiconductors, Sep. 10, 2004, 7 pgs.

"Response time in Liquid-Crystal Variable Retarders", Meadowlark Optics, Inc., 2005, 4 pgs.

"Secondary Optics Design Considerations for SuperFlux LEDs", Lumileds, application brief AB20-5, Sep. 2002, 23 pgs.

"Solid-State Optical Mouse Sensor with Quadrature Outputs", IC Datasheet, UniqueICs, Jul. 15, 2004, 11 pgs.

"SVGA TransparentVLSITM Microdisplay Evaluation Kit", Radiant Images, Inc., Product Data Sheet, 2003, 3 pgs.

"Technical Data Sheet LPR1", Luminus Devices, Inc., Luminus Projection Chipset, Release 1, Preliminary, Revision B, Sep. 21, 2004, 9 pgs.

"The Next Generation of TV", SID Information Display, Nov./Dec. 2014, vol. 30, No. 6, 56 pgs.

"Thermal Management Considerations for SuperFlux LEDs", Lumileds, application brief AB20-4, Sep. 2002, 14 pgs.

"USAF Awards SBG Labs an SBIR Contract for Wide Field of View HUD", Press Release, SBG Labs DigiLens, Apr. 2014, 2 pgs.

"UVTOP240", Roithner LaserTechnik GmbH, v 2.0, Jun. 24, 2013, 6 pgs.

"UVTOP310", Roithner LaserTechnik GmbH, v 2.0, Jun. 24, 2013, 6 pgs.

"Velodyne's HDL-64E: A High Definition Lidar Sensor for 3-D Applications", High Definition Lidar, white paper, Oct. 2007, 7 pgs.

"VerLASE Gets Patent for Breakthrough Color Conversion Technology That Enables Full Color MicroLED Arrays for Near Eye Displays", Cision PRweb, Apr. 28, 2015, Retrieved from the Internet http://www.prweb.com/releases/2015/04/prweb12681038.htm, 3 pgs.

"X-Cubes—Revisited for LCOS", BASID, RAF Electronics Corp. Rawson Optics, Inc., Oct. 24, 2002, 16 pgs.

Aachen, "Design of plastic optics for LED applications", Optics Colloquium 2009, Mar. 19, 2009, 30 pgs.

Abbate et al., "Characterization of LC-polymer composites for opto-electronic application", Proceedings of OPTOEL'03, Leganes-Madrid, Spain, Jul. 14-16, 2003, 4 pgs.

Al-Kalbani et al., "Ocular Microtremor laser speckle metrology", Proc. of SPIE, 2009, vol. 7176 717606-1, 12 pgs., doi: 10.1117/12.808855.

Almanza-Workman et al., "Planarization coating for polyimide substrates used in roll-to-roll fabrication of active matrix backplanes for flexible displays", HP Laboratories, HPL-2012-23, Feb. 6, 2012, 12 pgs.

Amitai et al., "Visor-display design based on planar holographic optics", Applied Optics, vol. 34, No. 8, Mar. 10, 1995, pp. 1352-1356.

Amundson et al., "Morphology and electro-optic properties of polymer-dispersed liquid-crystal films", Physical Review E, Feb. 1997, vol. 55. No. 2, pp. 1646-1654.

An et al., "Speckle suppression in laser display using several partially coherent beams", Optics Express, Jan. 5, 2009, vol. 17, No. 1, pp. 92-103, first published Dec. 22, 2008.

Apter et al., "Electrooptical Wide-Angle Beam Deflector Based on Fringing- Field-Induced Refractive Inhomogeneity in a Liquid Crystal Layer", 23rd IEEE Convention of Electrical and Electronics Engineers in Israel, Sep. 6-7, 2004, pp. 240-243.

Arnold et al., "52.3: An Improved Polarizing Beamsplitter LCOS Projection Display Based on Wire-Grid Polarizers", Society for Information Display, Jun. 2001, pp. 1282-1285.

Ayras et al., "Exit pupil expander with a large field of view based on diffractive optics", Journal of the Society for Information Display, May 18, 2009, vol. 17, No. 8, pp. 659-664, DOI: 10.1889/JSID17.8.659.

Baets et al., "Resonant-Cavity Light-Emitting Diodes: a review", Proceedings of SPIE, 2003, vol. 4996, pp. 74-86.

Bayer et al., "Introduction to Helmet-Mounted Displays", 2016, pp. 47-108.

Beckel et al., "Electro-optic properties of thiol-ene polymer stabilized ferroelectric liquid crystals", Liquid Crystals, vol. 30, No. 11, Nov. 2003, pp. 1343-1350, DOI: 10.1080/0267829031000160591 0.

Bergkvist, "Biospeckle-based Study of the Line Profile of Light Scattered in Strawberries", Master Thesis, Lund Reports on Atomic Physics, LRAP-220, Lund 1997, pp. 1-62.

Bernards et al., "Nanoscale porosity in polymer films: fabrication and therapeutic applications", Soft Matter, Jan. 1, 2010, vol. 6, No. 8, pp. 1621-1631, doi:10.1039/B922303G.

Bhuvaneshwaran et al., "Spectral response of Bragg gratings in multimode polymer waveguides", Applied Optics, Dec. 1, 2017, vol. 56. No. 34, pp. 9573-9582, doi: 10.1364/AO.56.009573.

Bleha et al., "Binocular Holographic Waveguide Visor Display", SID Symposium Digest of Technical Papers, Holoeye Systems Inc., Jun. 2014, San Diego, CA, 4 pgs.

Bleha et al., "D-ILA Technology for High Resolution Projection Displays", Sep. 10, 2003, Proceedings, vol. 5080, 11 pgs., doi: 10.1117/12.497532.

Bone, "Design Obstacles for LCOS Displays in Projection Applications "Optics architectures for LCOS are still evolving"", Aurora Systems Inc., Bay Area SID Seminar, Mar. 27, 2001, 22 pgs.

Born et al., "Optics of Crystals", Principles of Optics 5th Edition 1975, pp. 705-707.

Bourzac, "Magic Leap Needs to Engineer a Miracle", Intelligent Machines, Jun. 11, 2015, 7 pgs.

Bowen et al., "Optimisation of interdigitated electrodes for piezoelectric actuators and active fibre composites", J Electroceram, Jul. 2006, vol. 16, pp. 263-269, DOI 10.1007/s10832-006-9862-8.

Bowley et al., "Variable-wavelength switchable Bragg gratings formed in polymer-dispersed liquid crystals", Applied Physics Letters, Jul. 2, 2001, vol. 79, No. 1, pp. 9-11, DOI: 10.1063/1.1383566.

Bronnikov et al., "Polymer-Dispersed Liquid Crystals: Progress in Preparation, Investigation and Application", Journal of Macromolecular Science.

Part B, published online Sep. 30, 2013, vol. 52, pp. 1718-1738, DOI: 10.1080/00222348.2013.808926.

Brown, "Waveguide Displays", Rockwell Collins, 2015, 11 pgs.

Bruzzone et al., "Compact, high-brightness LED illumination for projection systems", Journal of the Society for Information Display, vol. 17, No. 12, Dec. 2009, pp. 1043-1049, DOI: 10.1189/JSID17.12.1043.

Buckley, "Colour holographic laser projection technology for heads-up and instrument cluster displays", Conference: Proc. SID Conference 14th Annual Symposium on Vehicle Displays, Jan. 2007, 5 pgs.

(56)                References Cited

OTHER PUBLICATIONS

Buckley, "Pixtronix DMS technology for head-up displays", Pixtronix, Inc., Jan. 2011, 4 pgs.
Buckley et al., "Full colour holographic laser projector HUD", Light Blue Optics Ltd., Aug. 10, 2015, 5 pgs.
Buckley et al., "Rear-view virtual image displays", in Proc. SID Conference 16th Annual Symposium on Vehicle Displays, Jan. 2009, 5 pgs.
Bunning et al., "Effect of gel-point versus conversion on the real-time dynamics of holographic polymer-dispersed liquid crystal (HPDLC) formation", Proceedings of SPIE—vol. 5213, Liquid Crystals VII, Iam-Choon Khoo, Editor, Dec. 2003, pp. 123-129.
Bunning et al., "Electro-optical photonic crystals formed in H-PDLCs by thiol-ene photopolymerization", American Physical Society, Annual APS, Mar. 3-7, 2003, abstract #R1.135.
Bunning et al., "Holographic Polymer-Dispersed Liquid Crystals (H-PDLCs)1", Annual Review of Material Science, 2000, vol. 30, pp. 83-115.
Bunning et al., "Morphology of Anisotropic Polymer Dispersed Liquid Crystals and the Effect of Monomer Functionality", Journal of Polymer Science: Part B: Polymer Physics, Jul. 30, 1997, vol. 35, pp. 2825-2833.
Busbee et al., "SiO2 Nanoparticle Sequestration via Reactive Functionalization in Holographic Polymer-Dispersed Liquid Crystals", Advanced Materials, Sep. 2009, vol. 21, pp. 3659-3662, DOI: 10.1002/adma.200900298.
Butler et al., "Diffractive Properties of Highly Birefringent Volume Gratings: Investigation", Journal of Optical Society of America, Feb. 2002, vol. 19, No. 2, pp. 183-189.
Cai et al., "Recent advances in antireflective surfaces based on nanostructure arrays", Materials Horizons, 2015, vol. 2, pp. 37-53, DOI: 10.1038/c4mh00140k.
Cameron, "Optical Waveguide Technology & Its Application In Head Mounted Displays", Proc. of SPIE, May 22, 2012, vol. 8383, pp. 83830E-1-83830E-11, doi: 10.1117/12.923660.
Cameron, "The Application of Holographic Optical Waveguide Technology to Q-Sight™ Family of Helmet Mounted Displays", Proc. of SPIE, 2009, vol. 7326, 11 pages, doi: 10.1117/12.818581.
Caputo et al., "POLICRYPS Composite Materials: Features and Applications", Advances in Composite Materials—Analysis of Natural and Man-Made Materials, www.intechopen.com, Sep. 2011, pp. 93-118.
Caputo et al., "POLICRYPS Switchable Holographic Grating: A Promising Grating Electro-Optical Pixel for High Resolution Display Application", Journal of Display Technology, Mar. 2006, vol. 2, No. 1, pp. 38-51, DOI: 10.1109/JDT.2005.864156.
Caputo et al., "POLICRYPS: a liquid crystal composed nano/microstructure with a wide range of optical and electro-optical applications", Journal of Optics A: Pure and Applied Optics, Jan. 15, 2009, vol. 11, No. 2, 13 pgs., doi:10.1088/1464-4258/11/2/024017.
Carlo Optics, "Guide to choosing secondary optics", Carclo Optics, Dec. 15, 2014, www.carclo-optics.com, 48 pgs.
Carothers, "Polymers and polyfunctionality", Transactions of the Faraday Society, Jan. 1, 1936, vol. 32, pp. 39-49, doi: 10.1039/TF9363200039.
Chen et al., "Polarization rotators fabricated by thermally-switched liquid crystal alignments based on rubbed poly(N-vinyl carbazole) films", Optics Express, Apr. 11, 2011, vol. 19, No. 8, pp. 7553-7558, first published Apr. 5, 2011.
Cheng et al., "Design of an ultra-thin near-eye display with geometrical waveguide and freeform optics", Optics Express, Aug. 2014, 16 pgs., DOI:10.1364/OE.22.020705.
Chi et al., "Ultralow-refractive-index optical thin films through nanoscale etching of ordered mesoporous silica films", Optic Letters, May 1, 2012, vol. 37, No. 9, pp. 1406-1408, first published Apr. 19, 2012.
Chigrinov et al., "Photo-aligning by azo-dyes: Physics and applications", Liquid Crystals Today, Sep. 6, 2006, http://www.tandfonline.com/action/journalInformation?journalCode=tlcy20, 15 pgs.

Cho et al., "Electro-optic Properties of CO2 Fixed Polymer/Nematic LC Composite Films", Journal of Applied Polymer Science, Nov. 5, 2000, vol. 81, Issue 11, pp. 2744-2753.
Cho et al., "Optimization of Holographic Polymer Dispersed Liquid Crystals for Ternary Monomers", Polymer International, Nov. 1999, vol. 48, pp. 1085-1090.
Colegrove et al., "P-59: Technology of Stacking HPDLC for Higher Reflectance", SID 00 Digest, May 2000, pp. 770-773.
Crawford, "Electrically Switchable Bragg Gratings", Optics & Photonics News, Apr. 2003, pp. 54-59.
Cruz-Arreola et al., "Diffraction of beams by infinite or finite amplitude-phase gratings", Investigacion Revista Mexicana De Fisica, Feb. 2011, vol. 57, No. 1, pp. 6-16.
Dabrowski, "High Birefringence Liquid Crystals", Crystals, Sep. 3, 2013, vol. 3, No. 3, pp. 443-482, doi: 10.3390/cryst3030443.
Dainty, "Some statistical properties of random speckle patterns in coherent and partially coherent illumination", Optica Acta, Mar. 12, 1970, vol. 17, No. 10, pp. 761-772.
Date, "Alignment Control in Holographic Polymer Dispersed Liquid Crystal", Journal of Photopolymer Science and Technology, Nov. 2, 2000, vol. 13, No. 2, pp. 289-294.
Date et al., "52.3: Direct-viewing Display Using Alignment-controlled PDLC and Holographic PDLC", Society for Information Display Digest, May 2000, pp. 1184-1187, DOI: 10.1889/1.1832877.
Date et al., "Full-color reflective display device using holographically fabricated polymer-dispersed liquid crystal (HPDLC)", Journal of the SID, 1999, vol. 7, No. 1, pp. 17-22.
De Bitetto, "White light viewing of surface holograms by simple dispersion compensation", Applied Physics Letters, Dec. 15, 1966, vol. 9, No. 12, pp. 417-418.
De Sarkar et al., "Effect of Monomer Functionality on the Morphology and Performance of the Holographic Transmission Gratings Recorded on Polymer Dispersed Liquid Crystals", Macromolecules, 2003, vol. 36, No. 3, pp. 630-638.
Developer World, "Create customized augmented reality solutions", printed Oct. 19, 2017, LMX-001 holographic waveguide display, Sony Developer World, 3 pgs.
Dhar et al., "Recording media that exhibit high dynamic range for digital holographic data storage", Optics Letters, Apr. 1, 1999, vol. 24, No. 7, pp. 487-489.
Domash et al., "Applications of switchable Polaroid holograms", SPIE Proceedings, vol. 2152, Diffractive and Holographic Optics Technology, Jan. 23-29, 1994, Los Angeles, CA, pp. 127-138, ISBN: 0-8194-1447-6.
Doolittle, "Studies in Newtonian Flow. II. The Dependence of the Viscosity of Liquids on Free-Space", Journal of Applied Physics, 1951, vol. 22, Issue 12, pp. 1471-1475, published online Apr. 29, 2004, https://doi.org/10.1063/1.1699894.
Drake et al., "Waveguide Hologram Fingerprint Entry Device", Optical Engineering, Sep. 1996, vol. 35, No. 9, pp. 2499-2505.
Drevensek-Olenik et al., "In-Plane Switching of Holographic Polymer-Dispersed Liquid Crystal Transmission Gratings", Mol. Cryst. Liq. Cryst., 2008, vol. 495, pp. 177/[529]-185/[537], DOI: 10.1080/15421400802432584.
Drevensek-Olenik et al., "Optical diffraction gratings from polymer-dispersed liquid crystals switched by interdigitated electrodes", Journal of Applied Physics, Dec. 1, 2004, vol. 96, No. 11, pp. 6207-6212, DOI: 10.1063/1.1807027.
Ducharme, "Microlens diffusers for efficient laser speckle generation", Optics Express, Oct. 29, 2007, vol. 15, No. 22, pp. 14573-14579.
Duong et al., "Centrifugal Deposition of Iron Oxide Magnetic Nanorods for Hyperthermia Application", Journal of Thermal Engineering, Yildiz Technical University Press, Istanbul, Turkey, Apr. 2015, vol. 1, No. 2, pp. 99-103.
Escuti et al., "Holographic photonic crystals", Society of Photo-Optical Instrumentation Engineers, Sep. 2004, vol. 43, No. 9, pp. 1973-1987, DOI: 10.1117/1.1773773.
Fattal et al., "A multi directional backlight for a wide-angle glasses-free three-dimensional display", Nature, Mar. 21, 2012, vol. 495, pp. 348-351.

(56)　　　　　References Cited

OTHER PUBLICATIONS

Flory, "Molecular size distribution in three-dimensional polymers. I. Gelation", J. Am. Chem. Soc., Nov. 1941, vol. 63, pp. 3083-3090.

Fontecchio et al., "Spatially Pixelated Reflective Arrays from Holographic Polymer Dispersed Liquid Crystals", SID 00 Digest, May 2000, pp. 774-776.

Forman et al., "Materials development for PhotoINhibited Super-Resolution (PINSR) lithography", Proc. of SPIE, 2012, vol. 8249, pp. 824904-1-824904-9, doi: 10.1117/12.908512.

Forman et al., "Radical diffusion limits to photoinhibited super-resolution lithography", Phys. Chem. Chem. Phys., May 31, 2013, vol. 15, pp. 14862-14867, DOI: 10.1039/c3cp51512.

Friedrich-Schiller, "Spatial Noise and Speckle", Version 1.12.2011, Dec. 2011, Abbe School of Photonics, Jena, Germany, 27 pgs.

Fries et al., "Real-time beam shaping without additional optical elements", Light Science & Applications, Jun. 20, 2018, vol. 7, No. 18, doi: 10.1038/s41377-018-0014-0.

Fuh et al., "Thermally and Electrically Switchable Gratings Based Upon the Polymer-Balls Type Polymer-Dispersed Liquid Crystal Films", Appl. Phys. Vol. 41, No. 22, Aug. 1, 2002, pp. 4585-4589.

Fujii et al., "Nanoparticle-polymer-composite volume gratings incorporating chain-transfer agents for holography and slow-neutron optics", Optics Letters, Apr. 25, 2014, vol. 39, Issue 12, 5 pgs.

Funayama et al., "Proposal of a new type thin film light-waveguide display device using", The International Conference on Electrical Engineering, 2008, No. P-044, 5 pgs.

Gabor, "Laser Speckle and its Elimination", BM Research and Development, Eliminating Speckle Noise, Sep. 1970, vol. 14, No. 5, pp. 509-514.

Gardiner et al., "Bistable liquid-crystals reduce power consumption for high-efficiency smart glazing", SPIE, 2009, 10.1117/2.1200904. 1596, 2 pgs.

Gerritsen et al., "Application of Kogelnik's two-wave theory to deep, slanted, highly efficient, relief transmission gratings", Applied Optics, Mar. 1, 1991, vol. 30; No. 7, pp. 807-814.

Giancola, "Holographic Diffuser, Makes Light Work of Screen Tests", Photonics Spectra, 1996, vol. 30, No. 8, pp. 121-122.

Golub et al., "Bragg properties of efficient surface relief gratings in the resonance domain", Optics Communications, Feb. 24, 2004, vol. 235, pp. 261-267, doi: 10.1016/j.optcom.2004.02.069.

Goodman, "Introduction to Fourier Optics", Second Edition, Jan. 1996, 457 pgs.

Goodman, "Some fundamental properties of speckle", J. Opt. Soc. Am., Nov. 1976, vol. 66, No. 11, pp. 1145-1150.

Goodman, "Statistical Properties of Laser Speckle Patterns", Applied Physics, 1975, vol. 9, Chapter 2, Laser Speckle and Related Phenomena, pp. 9-75.

Goodman et al., "Speckle Reduction by a Moving Diffuser in Laser Projection Displays", The Optical Society of America, 2000, 15 pgs.

Guldin et al., "Self-Cleaning Antireflective Optical Coatings", Nano Letters, Oct. 14, 2013, vol. 13, pp. 5329-5335.

Guo et al., "Analysis of the effects of viscosity, volume and temperature in photopolymer material for holographic applications", Proc. SPIE, May 2013, vol. 8776, pp. 87760J-1-87760-J15, DOI:10.1117/12.2018330.

Guo et al., "Review Article: A Review of the Optimisation of Photopolymer Materials for Holographic Data Storage", Physics Research International, vol. 2012, Article ID 803439, Academic Editor: Sergi Gallego, 16 pages, http://dx.doi.org/10.1155/2012/803439, May 4, 2012.

Han et al., "Study of Holographic Waveguide Display System", Advanced Photonics for Communications, 2014, 4 pgs.

Harbers et al., "I-15.3: LED Backlighting for LCD-HDTV", Journal of the Society for Information Display, 2002, vol. 10, No. 4, pp. 347-350.

Harbers et al., "Performance of High Power LED Illuminators in Color Sequential Projection Displays", Lumileds Lighting, 2007, 4 pgs.

Harbers et al., "Performance of High Power LED Illuminators in Color Sequential Projection Displays", Lumileds, Aug. 7, 2001, 11 pgs.

Harbers et al., "Performance of High-Power LED illuminators in Projection Displays", Proc. Int. Disp. Workshops, Japan. vol. 10, 2003, pp. 1585-1588.

Harding et al., "Reactive Liquid Crystal Materials for Optically Anisotropic Patterned Retarders", Merck, licrivue, 2008, ME-GR-RH-08-010, 20 pgs.

Harding et al., "Reactive Liquid Crystal Materials for Optically Anisotropic Patterned Retarders", SPIE Lithography Asia—Taiwan, 2008, Proceedings vol. 7140, Lithography Asia 2008; 71402J, doi: 10.1117/12.805378.

Hariharan, "Optical Holography: Principles, techniques and applications", Cambridge University Press, 1996, pp. 231-233.

Harris, "Photonic Devices", EE 216 Principals and Models of Semiconductor Devices, Autumn 2002, 20 pgs.

Harrold et al., "3D Display Systems Hardware Research at Sharp Laboratories of Europe: an update", Sharp Laboratories of Europe, Ltd., received May 21, 1999, 7 pgs.

Harthong et al., "Speckle phase averaging in high-resolution color holography", J. Opt. Soc. Am. A, vol. 14, No. 2, Feb. 1997, pp. 405-409.

Hasan et al., "Tunable-focus lens for adaptive eyeglasses", Optics Express, Jan. 23, 2017, vol. 25, No. 2, 1221, 13 pgs.

Hasman et al., "Diffractive Optics: Design, Realization, and Applications", Fiber and Integrated Optics, vol. 16, 1997, pp. 1-25.

Hata et al., "Holographic nanoparticle-polymer composites based on step- growth thiol-ene photopolymerization", Optical Materials Express, vol. 1, No. 2, Jun. 1, 2011, pp. 207-222.

He et al., "Dynamics of peristrophic multiplexing in holographic polymer-dispersed liquid crystal", Liquid Crystals, Mar. 26, 2014, vol. 41, No. 5, pp. 673-684.

He et al., "Holographic 3D display based on polymer-dispersed liquid-crystal thin films", Proceedings of China Display/Asia Display 2011, pp. 158-160.

He et al., "Properties of Volume Holograms Recording in Photopolymer Films with Various Pulse Exposures Repetition Frequencies", Proceedings of SPIE vol. 5636, Bellingham, WA, 2005, pp. 842-848, doi: 10.1117/12.580978.

He et al., "Transmission Holographic Gratings Using Siloxane Containing Liquid Crystalline Compounds, Importance of Chemical Structure of Polymer Matrix Components", Polymer Journal, Jun. 9, 2006, vol. 38, No. 7, pp. 678-685.

Herman et al., "Production and Uses of Diffractionless Beams", J. Opt. Soc. Am. A., Jun. 1991, vol. 8, No. 6, pp. 932-942.

Hisano, "Alignment layer-free molecular ordering induced by masked photopolymerization with nonpolarized light", Appl. Phys. Express 9, Jun. 6, 2016, pp. 072601-1-072601-4.

Hoepfner et al., "LED Front Projection Goes Mainstream", Luminus Devices, Inc., Projection Summit, 2008, 18 pgs.

Holmes et al., "Controlling the Anisotropy of Holographic Polymer-Dispersed Liquid-Crystal Gratings", Physical Review E, Jun. 11, 2002, vol. 65, pp. 066603-1-066603-4.

Hoyle et al., "Advances in the Polymerization of Thiol-Ene Formulations", Heraeus Noblelight Fusion UV Inc., 2003 Conference, 6 pgs.

Hua, "Sunglass-like displays become a reality with free-form optical technology", Illumination & Displays 3D Visualization and Imaging Systems Laboratory (3DVIS) College of Optical Sciences University of Arizona Tucson, AZ. 2014, 3 pgs.

Huang et al., "Diffraction properties of substrate guided-wave holograms", Optical Engineering, Oct. 1995, vol. 34, No. 10, pp. 2891-2899.

Huang et al., "Theory and characteristics of holographic polymer dispersed liquid crystal transmission grating with scaffolding morphology", Applied Optics, Jun. 20, 2012, vol. 51, No. 18, pp. 4013-4020.

Iannacchione et al., "Deuterium NMR and morphology study of copolymer-dispersed liquid-crystal Bragg gratings", Europhysics Letters, 1996, vol. 36, No. 6, pp. 425-430.

Irie, "Photochromic diarylethenes for photonic devices", Pure and Applied Chemistry, 1996, pp. 1367-1371, vol. 68, No. 7, IUPAC.

(56) References Cited

OTHER PUBLICATIONS

Jang et al., "Low Driving Voltage Holographic Polymer Dispersed Liquid Crystals with Chemically Incorporated Graphene Oxide", Journal of Materials Chemistry, 2011, vol. 21, pp. 19226-19232, doi. 10.1039/1jm13827h.

Jeng et al., "Aligning liquid crystal molecules", SPIE, 2012, 10.1117/2.1201203.004148, 2 pgs.

Jeong et al., "Memory Effect of Polymer Dispersed Liquid Crystal by Hybridization with Nanoclay", express Polymer Letters, vol. 4, No. 1, 2010, pp. 39-46, DOI: 10.3144/expresspolymlett.2010.7.

Jo et al., "Control of Liquid Crystal Pretilt Angle using Polymerization of Reactive Mesogen", IMID 2009 Digest, P1-25, 2009, pp. 604-606.

Juhl, "Interference Lithography for Optical Devices and Coatings", Dissertation, University of Illinois at Urbana-Champaign, 2010.

Juhl et al., "Holographically Directed Assembly of Polymer Nanocomposites", ACS Nano, Oct. 7, 2010, vol. 4, No. 10, pp. 5953-5961.

Jurbergs et al., "New recording materials for the holographic industry", Proc. of SPIE, 2009 vol. 7233, pp. 72330K-1-72330L-10, doi: 10.1117/12.809579.

Kahn et al., "Private Line Report on Large Area Display", Kahn International, Jan. 7, 2003, vol. 8, No. 10, 9 pgs.

Kakiuchida et al., "Multiple Bragg Diffractions with Different Wavelengths and Polarizations Composed of Liquid Crystal/Polymer Periodic Phases", ACS Omega, Sep. 22, 2017, pp. 6081-6090, doi: 10.1021/acsomega.7b01149.

Karasawa et al., "Effects of Material Systems on the Polarization Behavior of Holographic Polymer Dispersed Liquid Crystal Gratings", Japanese Journal of Applied Physics, Oct. 1997, vol. 36, No. 10, pp. 6388-6392.

Karp et al., "Planar micro-optic solar concentration using multiple imaging lenses into a common slab waveguide", Proc. of SPIE vol. 7407, 2009 SPIE, pp. 74070D-1-74070D-11, CCC code: 0277-786X/09, doi: 10.1117/12.826531.

Karp et al., "Planar micro-optic solar concentrator", Optics Express, Jan. 18, 2010, vol. 18, No. 2, pp. 1122-1133.

Kato et al., "Alignment-Controlled Holographic Polymer Dispersed Liquid Crystal (HPDLC) for Reflective Display Devices", SPIE, 1998, vol. 3297, pp. 52-57.

Kessler, "Optics of Near to Eye Displays (NEDs)", Oasis 2013, Tel Aviv, Feb. 19, 2013, 37 pgs.

Keuper et al., "26.1: RGB LED Illuminator for Pocket-Sized Projectors", SID 04 Digest, 2004, ISSN/0004-0966X/04/3502, pp. 943-945.

Keuper et al., "P-126: Ultra-Compact LED based Image Projector for Portable Applications", SID 03 Digest, 2003, ISSN/0003-0966X/03/3401-0713, pp. 713-715.

Kim et al., "Effect of Polymer Structure on the Morphology and Electro optic Properties of UV Curable PNLCs", Polymer, Feb. 2000, vol. 41, pp. 1325-1335.

Kim et al., "Enhancement of electro-optical properties in holographic polymer-dispersed liquid crystal films by incorporation of multiwalled carbon nanotubes into a polyurethane acrylate matrix", Polym. Int., Jun. 16, 2010, vol. 59, pp. 1289-1295.

Kim et al., "Fabrication of Reflective Holographic PDLC for Blue", Molecular Crystals and Liquid Crystals Science, 2001, vol. 368, pp. 3845-3853.

Kim et al., "Optimization of Holographic PDLC for Green", Mol. Cryst. Liq. Cryst., vol. 368, 2001, pp. 3855-3864.

Klein, "Optical Efficiency for Different Liquid Crystal Colour Displays", Digital Media Department, HPL-2000-83, Jun. 29, 2000, 18 pgs.

Kogelnik, "Coupled Wave Theory for Thick Hologram Gratings", The Bell System Technical Journal, vol. 48, No. 9, Nov. 1969, pp. 2909-2945.

Konuray et al., "State of the Art in Dual-Curing Acrylate Systems", Polymers, Feb. 12, 2018, vol. 10, No. 178, 24 pgs, doi: 10.3390/polym10020178.

Kotakonda et al., "Electro-optical Switching of the Holographic Polymer-dispersed Liquid Crystal Diffraction Gratings", Journal of Optics A: Pure and Applied Optics, Jan. 1, 2009, vol. 11, No. 2, 11 pgs.

Kress et al., "Diffractive and Holographic Optics as Optical Combiners in Head Mounted Displays", UbiComp '13, Sep. 9-12, 2013, Session: Wearable Systems for Industrial Augmented Reality Applications, pp. 1479-1482.

Kwon et al., "Polymer waveguide notch filter using two stacked thermooptic long-period gratings", IEEE Photonics Technology Letters, Apr. 4, 2005, vol. 17, Issue 4, pp. 792-794, DOI: 10.1109/LPT.2005.844008.

Lauret et al., "Solving the Optics Equation for Effective LED Applications", Gaggione North America, LLFY System Design Workshop 2010, Oct. 28, 2010, 26 pgs.

Lee, "Patents Shows Widespread Augmented Reality Innovation", PatentVue, May 26, 2015, 5 pgs.

Levin et al., "A Closed Form Solution To Natural Image Matting", Illumination & Displays 3D Visualization and Imaging Systems Laboratory (3DVIS) College of Optical Sciences University of Arizona Tucson, 2014, 8 pgs.

Levola, "Diffractive optics for virtual reality displays", Journal of the SID, 2006, 14/5, pp. 467-475.

Levola et al., "Near-to-eye display with diffractive exit pupil expander having chevron design", Journal of the SID, 2008, 16/8, pp. 857-862.

Levola et al., "Replicated slanted gratings with a high refractive index material for in and outcoupling of light", Optics Express, vol. 15, Issue 5, 2007, pp. 2067-2074.

Li et al., "A low cost, label-free biosensor based on a novel double-sided grating waveguide coupler with sub-surface cavities", Sensors and Actuators B.

Chemical, Jan. 2015, vol. 206, pp. 371-380, https://doi.org/10.1016/j.snb.2014.09.065.

Li et al., "Design and Optimization of Tapered Light Pipes", Proceedings vol. 5529, Nonimaging Optics and Efficient Illumination Systems, Sep. 29, 2004, doi: 10.1117/12.559844, 10 pgs.

Li et al., "Dual Paraboloid Reflector and Polarization Recycling Systems for Projection Display", Proceedings vol. 5002, Projection Displays IX, Mar. 28, 2003, doi: 10.1117/12.479585, 12 pgs.

Li et al., "Light Pipe Based Optical Train and its Applications", Proceedings vol. 5524, Novel Optical Systems Design and Optimization VII, Oct. 24, 2004, doi: 10.1117/12.559833, 10 pgs.

Li et al., "Novel Projection Engine with Dual Paraboloid Reflector and Polarization Recovery Systems", Wavien Inc., SPIE EI 5289-38, Jan. 21, 2004, 49 pgs.

Li et al., "Polymer crystallization/melting induced thermal switching in a series of holographically patterned Bragg reflectors", Soft Matter, Jul. 11, 2005, vol. 1, pp. 238-242.

Lin et al., "Ionic Liquids in Photopolymerizable Holographic Materials", in book: Holograms—Recording Materials and Applications, Nov. 9, 2011, 21 pgs.

Liu et al., "Effect of Surfactant on the Electro-Optical Properties of Holographic Polymer Dispersed Liquid Crystal Bragg Gratings", Optical Materials, 2005, vol. 27, pp. 1451-1455, available online Dec. 25, 2004, doi: 10.1016/j.optmat.2004.10.010.

Liu et al., "Holographic Polymer Dispersed Liquid Crystals Materials, Formation and Applications", Advances in OptoElectronics, Nov. 30, 2008, vol. 2008, Article ID 684349, 52 pgs.

Liu et al., "Realization and Optimization of Holographic Waveguide Display System", Acta Optica Sinica, vol. 37, Issue 5, Issuing date—May 10, 2017, pp. 310-317.

Lorek, "Experts Say Mass Adoption of augmented and Virtual Reality is Many Years Away", Siliconhills, Sep. 9, 2017, 4 pgs.

Lougnot et al., "Polymers for holographic recording: VI. Some basic ideas for modelling the kinetics of the recording process", Pure and Applied Optics: Journal of the European Optical Society Part A, 1997, vol. 6, No. 2, pp. 225-245, https://doi.org/10.1088/0963-9659/6/2/007.

Lowenthal et al., "Speckle Removal by a Slowly Moving Diffuser Associated with a Motionless Diffuser", Journal of the Optical Society of America, Jul. 1971, vol. 61, No. 7, pp. 847-851.

(56)         References Cited

OTHER PUBLICATIONS

Lu et al., "Polarization switch using thick holographic polymer-dispersed liquid crystal grating", Journal of Applied Physics, vol. 95, No. 3, Feb. 1, 2004, pp. 810-815.

Lu et al., "The Mechanism of electric-field-induced segregation of additives in a liquid-crystal host", Phys Rev E Stat Nonlin Soft Matter Phys., Nov. 27, 2012, 14 pgs.

Ma et al., "Holographic Reversed-Mode Polymer-Stabilized Liquid Crystal Grating", Chinese Phys. Lett., 2005, vol. 22, No. 1, pp. 103-106.

Mach et al., "Switchable Bragg diffraction from liquid crystal in colloid-templated structures", Europhysics Letters, Jun. 1, 2002, vol. 58, No. 5, pp. 679-685.

Magarinos et al., "Wide Angle Color Holographic infinity optics display", Air Force Systems Command, Brooks Air Force Base, Texas, AFHRL-TR-80-53, Mar. 1981, 100 pgs.

Marino et al., "Dynamical Behaviour of Policryps Gratings", Electronic-Liquid Crystal Communications, Feb. 5, 2004, 10 pgs.

Massenot et al., "Multiplexed holographic transmission gratings recorded in holographic polymer-dispersed liquid crystals: static and dynamic studies", Applied Optics, 2005, vol. 44, Issue 25, pp. 5273-5280.

Matay et al., "Planarization of Microelectronic Structures by Using Polyimides", Journal of Electrical Engineering, 2002, vol. 53, No. 3-4, pp. 86-90.

Mathews, "The LED FAQ Pages", Jan. 31, 2002, 23 pgs.

Matic, "Blazed phase liquid crystal beam steering", Proc. of the SPIE, 1994, vol. 2120, pp. 194-205.

Matsushima et al., "Thiol-Isocyanate-Acrylate Ternary Networks by Selective Thiol-Click Chemistry", Journal of Polymer Science: Part A: Polymer Chemistry, Apr. 16, 2010, vol. 48, 3255-3264, doi: 10.1002/pola.24102.

Mcleod, "Axicons and Their Uses", Journal of the Optical Society of America, Feb. 1960, vol. 50, No. 2, pp. 166-169.

Mcmanamon et al., "A Review of Phased Array Steering for Narrow-Band Electrooptical Systems", Proceedings of the IEEE, Jun. 2009, vol. 97, No. 6, pp. 1078-1096.

Mcmanamon et al., "Optical Phased Array Technology", Proceedings of the IEEE, Feb. 1996, vol. 84, Issue 2, pp. 268-298.

Miller, "Coupled Wave Theory and Waveguide Applications", The Bell System Technical Journal, Short Hills, NJ, Feb. 2, 1954, 166 pgs.

Missinne et al., "Flexible thin polymer waveguide Bragg grating sensor foils for strain sensing", Proc. SPIE, 10101, Organic Photonic Materials and Devices, Feb. 16, 2017, https://doi.org/10.1117/12.2250823.

Moffitt, "Head-Mounted Display Image Configurations", retrieved from the internet on Dec. 19, 2014, dated May 2008, 25 pgs.

Moharam et al., "Diffraction characteristics of photoresist surface-relief gratings", Applied Optics, Sep. 15, 1984, vol. 23, pp. 3214-3220.

Mulik, "Adhesion Enhancement of Polymeric Films on Glass Surfaces by a Silane Derivative of Azobisisobutyronitrile (AIBN).", Polymer Preprints, American Chemical Society (ACS), Jan. 2008, 3 pgs.

Nair et al., "Enhanced Two-Stage Reactive Polymer Network Forming Systems", Polymer (Guildf). May 25, 2012, vol. 53, No. 12, pp. 2429-2434, doi: 10.1016/j.polymer.2012.04.007.

Nair et al., "Two-Stage Reactive Polymer Network Forming Systems", Advanced Functional Materials, 2012, pp. 1-9, DOI: 10.1002/adfm.201102742.

Naqvi et al., "Concentration-dependent toxicity of iron oxide nanoparticles mediated by increased oxidative stress", International Journal of Nanomedicine, Dovepress, Nov. 13, 2010, vol. 5, pp. 983-989.

Natarajan et al., "Electro Optical Switching Characteristics of vol. Holograms in Polymer Dispersed Liquid Crystals", Journal of Nonlinear Optical Physics and Materials, 1997, vol. 5, No. 1, pp. 666-668.

Natarajan et al., "Electro-Optical Switching Characteristics of Volume Holograms in Polymer Dispersed Liquid Crystals", Journal of Nonlinear Optical Physics and Materials, Jan. 1996, vol. 5, No. 1, pp. 89-98.

Natarajan et al., "Holographic polymer dispersed liquid crystal reflection gratings formed by visible light initiated thiol-ene photopolymerization", Polymer, vol. 47, May 8, 2006, pp. 4411-4420.

Naydenova et al., "Low-scattering Volume Holographic Material", DIT PhD Project, http://www.dit.ie/ieo/, Oct. 2017, 2 pgs.

Neipp et al., "Non-local polymerization driven diffusion based model: general dependence of the polymerization rate to the exposure intensity", Optics Express, Aug. 11, 2003, vol. 11, No. 16, pp. 1876-1886.

Nielsen et al., "Grating Couplers for Fiber-to-Fiber Characterizations of Stand-Alone Dielectric Loaded Surface Plasmon Waveguide Components", Journal of Lightwave Technology, Oct. 1, 2012, vol. 30, No. 19, pp. 3118-3125, DOI: 10.1109/JLT.2012.2212418.

Nishikawa et al., "Mechanically and Light Induced Anchoring of Liquid Crystal on Polyimide Film", Mol. Cryst. Liq. Cryst., Aug. 1999, vol. 329, 8 pgs.

Nishikawa et al., "Mechanism of Unidirectional Liquid-Crystal Alignment on Polyimides with Linearly Polarized Ultraviolet Light Exposure", Applied Physics Letters, May 11, 1998, vol. 72, No. 19, 4 pgs.

Nordin et al., "Diffraction Properties of Stratified Volume Holographic Optical Elements", Journal of the Optical Society of America A. Dec. 1992, vol. 9, No. 12, pp. 2206-2217.

Ogiwara et al., "Temperature Dependence of Anisotropic Diffraction in Holographic Polymer-Dispersed Liquid Crystal Memory", Applied Optics, Sep. 10, 2013, vol. 52, No. 26, pp. 6529-6536.

Ogiwara et al., "Thermo-Driven Light Controller by Using Thermal Modulation of Diffraction Wavelength in Holographic Polymer Dispersed Liquid Crystal Grating", Proc. SPIE, Feb. 19, 2014, 9004, Article 90040Q, 8 pgs., doi: 10.1117/12.2039104.

Oh et al., "Achromatic Diffraction from Polarization Gratings with High Efficiency", Optic Letters, vol. 33, No. 20, Oct. 15, 2008, pp. 2287-2289.

Olson et al., "Templating Nanoporous Polymers with Ordered Block Copolymers", Chemistry of Materials, Web publication Nov. 27, 2007, vol. 20, pp. 869-890.

Ondax, Inc., "Volume Holographic Gratings (VHG)", 2005, 7 pgs.

Orcutt, "Coming Soon: Smart Glasses That Look Like Regular Spectacles", Intelligent Machines, Jan. 9, 2014, 4 pgs.

Osredkar, "A study of the limits of spin-on-glass planarization process", Informacije MIDEM, 2001, vol. 31, 2, ISSN0352-9045, pp. 102-105.

Osredkar et al., "Planarization methods in IC fabrication technologies", Informacije MIDEM, 2002, vol. 32, 3, ISSN0352-9045, 5 pgs.

Ou et al., "A Simple LCOS Optical System (Late News)", Industrial Technology Research Institute/OES Lab. Q100/Q200, SID 2002, Boston, USA, 2 pgs.

Paolini et al., "High-Power LED Illuminators in Projection Displays", Lumileds, Aug. 7, 2001, 19 pgs.

Park et al., "Aligned Single-Wall Carbon Nanotube Polymer Composites Using an Electric Field", Journal of Polymer Science: Part B: Polymer Physics, Mar. 24, 2006, DOI 10.1002/polb.20823, pp. 1751-1762.

Park et al., "Fabrication of Reflective Holographic Gratings with Polyurethane Acrylates (PUA)", Current Applied Physics, Jun. 2002, vol. 2, pp. 249-252.

Peng et al., "Facile Image Patterning via Sequential Thiol-Michael/Thiol-Yne Click Reactions", Chemistry of Materials, Nov. 20, 2014, vol. 26, pp. 6819-6826, doi: 10.1021/cm5034436.

Peng et al., "High Performance Graded Rainbow Holograms via Two-Stage Sequential Orthogonal Thiol-Click Chemistry", Macromolecules, Mar. 28, 2014, vol. 47, pp. 2306-2315, doi: 10.1021/ma500167x.

(56)           References Cited

OTHER PUBLICATIONS

Peng et al., "Low Voltage Driven and Highly Diffractive Holographic Polymer Dispersed Liquid Crystals with Spherical Morphology", RSC Advances, 2017, vol. 7, pp. 51847-51857, doi: 10.1039/c7ra08949.

Pierantoni et al., "Efficient modeling of 3-D photonic crystals for integrated optical devices", IEEE Photonics Technology Letters, Feb. 2006, vol. 18, No. 2, pp. 319-321, DOI: 10.1109/LPT.2005.861991.

Plawsky et al., "Engineered nanoporous and nanostructured films", Materials Today, Jun. 2009, vol. 12, No. 6, pp. 36-45.

Pogue et al., "Electrically Switchable Bragg Gratings from Liquid Crystal/Polymer Composites", Applied Spectroscopy, 2000, vol. 54, Issue 1, pp. 12A-28A.

Popovich et al., U.S. Appl. No. 10/555,661, filed Nov. 4, 2005.

Potenza, "These smart glasses automatically focus on what you're looking at", The Verge, Voc Media, Inc., Jan. 29, 2017, https://www.theverge.com/2017/1/29/14403924/smart-glasses-automatic-focus-presbyopia-ces-2017, 6 pgs.

Presnyakov et al., "Electrically tunable polymer stabilized liquid-crystal lens", Journal of Applied Physics, Apr. 29, 2005, vol. 97, pp. 103101-1-103101-6.

Prokop et al., "Air-Suspended SU-8 Polymer Waveguide Grating Couplers", Journal of Lightwave Technology, Sep. 1, 2016, vol. 34, No. 17, pp. 3966-3971, DOI: 10.1109/JLT.2016.2593025.

Qi et al., "P-111: Reflective Display Based on Total Internal Reflection and Grating-Grating Coupling", Society for Information Display Digest, May 2003, pp. 648-651, DOI: 10.1889/1.1832359.

Ramón, "Formation of 3D micro- and nanostructures using liquid crystals as a template", Technische Universiteit Eindhoven, Apr. 17, 2008, Thesis, 117 pgs., DOI:http://dx.doi.org/10.6100/IR634422.

Ramsey, "Holographic Patterning of Polymer Dispersed Liquid Crystal Materials for Diffractive Optical Elements", Thesis, The University of Texas at Arlington, Dec. 2006, 166 pgs.

Ramsey et al., "Holographically recorded reverse-mode transmission gratings in polymer-dispersed liquid crystal cells", Applied Physics B: Laser and Optics, Sep. 10, 2008, vol. 93, Nos. 2-3, pp. 481-489.

Reid, "Thin film silica nanocomposites for anti-reflection coatings", Oxford Advance Surfaces, www.oxfordsurfaces.com, Oct. 18, 2012, 23 pgs.

Riechert, "Speckle Reduction in Projection Systems", Dissertation, University Karlsruhe, 2009, 178 pgs.

Rossi et al., "Diffractive Optical Elements for Passive Infrared Detectors", Submitted to OSA Topical Meeting "Diffractive Optics and Micro-Optics", Quebec, Jun. 18-22, 2000, 3 pgs.

Roussel et al., "Photopolymerization Kinetics and Phase Behavior of Acrylate Based Polymers Dispersed Liquid Crystals", Liquid Crystals, 1998, vol. 24, Issue 4, pp. 555-561.

Sabel et al., "Simultaneous formation of holographic surface relief gratings and volume phase gratings in photosensitive polymer", Materials Research Letters, May 30, 2019, vol. 7, No. 10, pp. 405-411, doi: 10.1080/21663831.2019.1621956.

Sagan et al., "Electrically Switchable Bragg Grating Technology for Projection Displays", Proc. SPIE. vol. 4294, Jan. 24, 2001, pp. 75-83.

Sakhno et al., "Deep surface relief grating in azobenzene-containing materials using a low-intensity 532 nm laser", Optical Materials: X, Jan. 23, 2019, 100006, pp. 3-7, doi: 10.1016/j.omx.2019.100006.

Saleh et al., "Fourier Optics: 4.1 Propagation of light in free space, 4.2 Optical Fourier Transform, 4.3 Diffraction of Light, 4.4 Image Formation, 4.5 Holography", Fundamentals of Photonics 1991, Chapter 4, pp. 108-143.

Saraswat, "Deposition & Planarization", EE 311 Notes, Aug. 29, 2017, 28 pgs.

Schreiber et al., "Laser display with single-mirror MEMS scanner", Journal of the SID 17/7, 2009, pp. 591-595.

Seiberle et al., "Photo-aligned anisotropic optical thin films", Journal of the SID 12/1, 2004, 6 pgs.

Serebriakov et al., "Correction of the phase retardation caused by intrinsic birefringence in deep UV lithography", Proc. of SPIE, May 21, 2010, vol. 5754, pp. 1780-1791.

Shechter et al., "Compact beam expander with linear gratings", Applied Optics, vol. 41, No. 7, Mar. 1, 2002, pp. 1236-1240.

Shi et al., "Design considerations for high efficiency liquid crystal decentered microlens arrays for steering light", Applied Optics, vol. 49, No. 3, Jan. 20, 2010, pp. 409-421.

Shriyan et al., "Analysis of effects of oxidized multiwalled carbon nanotubes on electro-optic polymer/liquid crystal thin film gratings", Optics Express, Nov. 12, 2010, vol. 18, No. 24, pp. 24842-24852.

Simonite, "How Magic Leap's Augmented Reality Works", Intelligent Machines, Oct. 23, 2014, 7 pgs.

Smith et al., "RM-PLUS—Overview", Licrivue, Nov. 5, 2013, 16 pgs.

Sony Global, "Sony Releases the Transparent Lens Eyewear 'SmartEyeglass Developer Edition'", printed Oct. 19, 2017, Sony Global—News Releases, 5 pgs.

Steranka et al., "High-Power LEDs—Technology Status and Market Applications", Lumileds, Jul. 2002, 23 pgs.

Stumpe et al., "Active and Passive LC Based Polarization Elements", Mol. Cryst. Liq. Cryst., 2014, vol. 594: pp. 140-149.

Stumpe et al., "New type of polymer-LC electrically switchable diffractive devices—POLIPHEM", May 19, 2015, p. 97.

Subbarayappa et al., "Bistable Nematic Liquid Crystal Device", Jul. 30, 2009, 14 pgs.

Sun et al., "Effects of multiwalled carbon nanotube on holographic polymer dispersed liquid crystal", Polymers Advanced Technologies, Feb. 19, 2010, DOI: 10.1002/pat.1708, 8 pgs.

Sun et al., "Low-birefringence lens design for polarization sensitive optical systems", Proceedings of SPIE, 2006, vol. 6289, pp. 6289DH-1-6289DH-10, doi: 10.1117/12.679416.

Sun et al., "Transflective Multiplexing of Holographic Polymer Dispersed Liquid Crystal Using Si Additives", eXPRESS Polymer Letters, 2011, vol. 5, No. 1, pp. 73-81.

Sutherland et al., "Bragg Gratings in an Acrylate Polymer Consisting of Periodic Polymer-Dispersed Liquid-Crystal Planes", Chem. Mater., 1993, vol. 5, pp. 1533-1538.

Sutherland et al., "Electrically switchable vol. gratings in polymer-dispersed liquid crystals", Applied Physics Letters, Feb. 28, 1994, vol. 64, No. 9, pp. 1074-1076.

Sutherland et al., "Enhancing the electro-optical properties of liquid crystal nanodroplets for switchable Bragg gratings", Proc. of SPIE, 2008, vol. 7050, pp. 705003-1-705003-9, doi: 10.1117/12.792629.

Sutherland et al., "Liquid crystal bragg gratings: dynamic optical elements for spatial light modulators", Hardened Materials Branch, Hardened Materials Branch, AFRL-ML-WP-TP-2007-514, Jan. 2007, Wright-Patterson Air Force Base, OH, 18 pgs.

Sutherland et al., "Phenomenological model of anisotropic volume hologram formation in liquid-crystal-photopolymer mixtures", Journal of Applied Physics, Jun. 30, 2004, vol. 96, No. 2, pp. 951-965, https://doi.org/10.1063/1.1762713.

Sutherland et al., "The physics of photopolymer liquid crystal composite holographic gratings", presented at SPIE: Diffractive and Holographic Optics Technology San Jose, CA, 1996, SPIE, vol. 2689, pp. 158-169.

Sweatt, "Achromatic triplet using holographic optical elements", Applied Optics, May 1977, vol. 16, No. 5, pp. 1390-1391.

Tahata et al., "Effects of Polymer Matrix on Electro-Optic Properties of Liquid Crystal Mixed With Polymer", Proc SPIE, Mar. 11, 1996, vol. 2651, pp. 101-106, doi: 10.1117/12.235342.

Talukdar, "Technology Forecast: Augmented reality", Changing the economics of Smartglasses, Issue 2, 2016, 5 pgs.

Tao et al., "TiO2 nanocomposites with high refractive index and transparency", J. Mater. Chem., Oct. 4, 2011, vol. 21, pp. 18623-18629.

Titus et al., "Efficient, Accurate Liquid Crystal Digital Light Deflector", Proc. SPIE 3633, Diffractive and Holographic Technologies, Systems, and Spatial Light Modulators VI, 1 Jun. 1, 1999, doi: 10.1117/12.349334, 10 pgs.

Tiziani, "Physical Properties of Speckles", Speckle Metrology, Chapter 2, Academic Press, Inc., 1978, pp. 5-9.

(56)                    References Cited

OTHER PUBLICATIONS

Tominaga et al., "Fabrication of holographic polymer dispersed liquid crystals doped with gold nanoparticles", 2010 Japanese Liquid Crystal Society Annual Meeting, 2 pgs.

Tomita, "Holographic assembly of nanoparticles in photopolymers for photonic applications", The International Society for Optical Engineering, SPIE Newsroom, 2006, 3 pgs., doi: 10.1117/2.1200612. 0475.

Tondiglia et al., "Holographic Formation of Electro-Optical Polymer-Liquid Crystal Photonic Crystals", Advanced Materials, 2002, Published Online Nov. 8, 2001, vol. 14, No. 3, pp. 187-191.

Trisnadi, "Hadamard Speckle Contrast Reduction", Optics Letters, Jan. 1, 2004, vol. 29, No. 1, pp. 11-13.

Trisnadi, "Speckle contrast reduction in laser projection displays", Proc. SPIE 4657, 2002, 7 pgs.

Tzeng et al., "Axially symmetric polarization converters based on photo-aligned liquid crystal films", Optics Express, Mar. 17, 2008, vol. 16, No. 6, pp. 3768-3775.

Upatnieks et al., "Color Holograms for white light reconstruction", Applied Physics Letters, Jun. 1, 1996, vol. 8, No. 11, pp. 286-287.

Urey, "Diffractive exit pupil expander for display applications", Applied Optics, Nov. 10, 2001, vol. 40, Issue 32, pp. 5840-5851.

Ushenko, "The Vector Structure of Laser Biospeckle Fields and Polarization Diagnostics of Collagen Skin Structures", Laser Physics, 2000, vol. 10, No. 5, pp. 1143-1149.

Valoriani, "Mixed Reality: Dalle demo a un prodotto", Disruptive Technologies Conference, Sep. 23, 2016, 67 pgs.

Van Gerwen et al., "Nanoscaled interdigitated electrode arrays for biochemical sensors", Sensors and Actuators, Mar. 3, 1998, vol. B 49, pp. 73-80.

Vecchi, "Studi Esr Di Sistemi Complessi Basati Su Cristalli Liquidi", Thesis, University of Bologna, Department of Physical and Inorganic Chemistry, 2004-2006, 110 pgs.

Veltri et al., "Model for the photoinduced formation of diffraction gratings in liquid-crystalline composite materials", Applied Physics Letters, May 3, 2004, vol. 84, No. 18, pp. 3492-3494.

Vita, "Switchable Bragg Gratings", Thesis, Universita degli Studi di Napoli Federico II, Nov. 2005, 103 pgs.

Vuzix, "M3000 Smart Glasses, Advanced Waveguide Optics", brochure, Jan. 1, 2017, 2 pgs.

Waldern et al., "Waveguide Optics for All Day Wearable Displays", Jun. 20, 2017, 35 pgs.

Wang et al., "Liquid-crystal blazed-grating beam deflector", Applied Optics, Dec. 10, 2000, vol. 39, No. 35, pp. 6545-6555.

Wang et al., "Optical Design of Waveguide Holographic Binocular Display for Machine Vision", Applied Mechanics and Materials, Sep. 27, 2013, vols. 427-429, pp. 763-769.

Wang et al., "Speckle reduction in laser projection systems by diffractive optical elements", Applied Optics, Apr. 1, 1998, vol. 37, No. 10, pp. 1770-1775.

Weber et al., "Giant Birefringent Optics in Multilayer Polymer Mirrors", Science, Mar. 31, 2000, vol. 287, pp. 2451-2456.

Webster, "Webster's Third New International Dictionary 433", (1986), 3 pages.

Wei An, "Industrial Applications of Speckle Techniques", Doctoral Thesis, Royal Institute of Technology, Department of Production Engineering, Chair of Industrial Metrology & Optics, Stockholm, Sweden 2002, 76 pgs.

Welde et al., "Investigation of methods for speckle contrast reduction", Master of Science in Electronics, Jul. 2010, Norwegian University of Science and Technology, Department of Electronics and Telecommunications, 127 pgs.

White, "Influence of thiol-ene polymer evolution on the formation and performance of holographic polymer dispersed liquid crystals", The 232nd ACS National Meeting, San Francisco, CA, Sep. 10-14, 2006, 1 pg.

Wicht et al., "Nanoporous Films with Low Refractive Index for Large-Surface Broad-Band Anti-Reflection Coatings", Macromol. Mater. Eng., 2010, 295, DOI: 10.1002/mame.201000045, 9 pgs.

Wilderbeek et al., "Photoinitiated Bulk Polymerization of Liquid Crystalline Thiolene Monomers", Macromolecules, 2002, vol. 35, pp. 8962-8969.

Wilderbeek et al., "Photo-Initiated Polymerization of Liquid Crystalline Thiol-Ene Monomers in Isotropic and Anisotropic Solvents", J. Phys. Chem. B, 2002, vol. 106, No. 50, pp. 12874-12883.

Wisely, "Head up and head mounted display performance improvements through advanced techniques in the manipulation of light", Proc. of SPIE, vol. 7327, 2009, 10 pgs.

Wofford et al., "Liquid crystal bragg gratings: dynamic optical elements for spatial light modulators", Hardened Materials Branch, Survivability and Sensor Materials Division, AFRL-ML-WP-TP-2007-551, Air Force Research Laboratory, Jan. 2007, Wright-Patterson Air Force Base, OH, 17 pgs.

Yang et al., "Robust and Accurate Surface Measurement Using Structured Light", IEEE, Apr. 30, 2008, vol. 57, Issue 6, pp. 1275-1280, DOI:10.1109/TIM.2007.915103.

Yaqoob et al., "High-speed two-dimensional laser scanner based on Bragg grating stored in photothermorefractive glass", Applied Optics, Sep. 10, 2003, vol. 42, No. 26, pp. 5251-5262.

Yaroshchuk et al., "Stabilization of liquid crystal photoaligning layers by reactive mesogens", Applied Physics Letters, Jul. 14, 2009, vol. 95, pp. 021902-1-021902-3.

Ye, "Three-dimensional Gradient Index Optics Fabricated in Diffusive Photopolymers", Thesis, Department of Electrical, Computer and Energy Engineering, University of Colorado, 2012, 224 pgs.

Yemtsova et al., "Determination of liquid crystal orientation in holographic polymer dispersed liquid crystals by linear and non-linear optics", Journal of Applied Physics, Oct. 13, 2008, vol. 104, pp. 073115-1-073115-4.

Yeralan et al., "Switchable Bragg grating devices for telecommunications applications", Opt. Eng., Aug. 2012, vol. 41, No. 8, pp. 1774-1779.

Yokomori, "Dielectric surface-relief gratings with high diffraction efficiency", Applied Optics, Jul. 15, 1984, vol. 23; No. 14, pp. 2303-2310.

Yoshida et al., "Nanoparticle-Dispersed Liquid Crystals Fabricated by Sputter Doping", Adv. Mater., 2010, vol. 22, pp. 622-626.

Youcef et al., "Phase Behavior Of Poly(N-Butyl Acrylate) And Poly(2-Ethylhexyl Acrylate) in Nematic Liquid Crystal E7", Macromol. Symp. 2011, vol. 303, pp. 10-16, doi: 10.1002/masy.201150502.

Zeller et al., "Laminated Air Structured and Fluid Infiltrated Polymer Waveguides", in IEEE Photonics Technology Letters, Nov. 2, 2011, vol. 23, Issue: 21, pp. 1564-1566, first published Aug. 12, 2011, DOI: 10.1109/LPT.2011.2164396.

Zhang et al., "Dynamic Holographic Gratings Recorded by Photopolymerization of Liquid Crystalline Monomers", J. Am. Chem. Soc., 1994, vol. 116, pp. 7055-7063.

Zhang et al., "Switchable Liquid Crystalline Photopolymer Media for Holography", J. Am. Chem. Soc., 1992, vol. 114, pp. 1506-1507.

Zhao et al., "Designing Nanostructures by Glancing Angle Deposition", Proc. of SPIE, Oct. 27, 2003, vol. 5219, pp. 59-73.

Zhao et al., "Diffusion Model of Hologram Formation in Dry Photopolymer Materials", Journal of Modern Optics, 1994. vol. 41, No. 10, pp. 1929-1939, https://doi.org/10.1080/09500349414551831.

Zhao et al., "Extension of a diffusion model for holographic photopolymers", Journal of Modern Optics, 1995, vol. 42, No. 12, pp. 2571-2573, https://doi.org/10.1080/713824349.

Zheng et al., "Holographic Polymer-Dispersed Liquid Crystal Grating with Low Scattering Losses", Liquid Crystals, Mar. 2012, vol. 39, Issue 3, pp. 387-391,http://dx.doi.org/10.1080/02678292.2012. 656716.

Ziębacz, "Dynamics of nano and micro objects in complex liquids", Ph.D. dissertation, Institute of Physical Chemistry of the Polish Academy of Sciences, Warsaw 2011, 133 pgs.

Zou et al., "Functionalized nano interdigitated electrodes arrays on polymer with integrated microfluidics for direct bio-affinity sensing using impedimetric measurement", Sensors and Actuators A, Jan. 16, 2007, vol. 136, pp. 518-526, doi: 10.1016/j.sna.2006.12.006.

Zyga, "Liquid crystals controlled by magnetic fields may lead to new optical applications", Nanotechnology, Nanophysics, Retrieved

(56)     References Cited

OTHER PUBLICATIONS from http://phys.org/news/2014-07-liquid-crystals-magnetic-fields-
optical.html, Jul. 9, 2014, 3 pgs.

* cited by examiner 15B  16B  17B  18A  15C  16C  17C  18C 17C  16C  15B  18A  18C  16C  17B  15C 304A  304B  304C  304

304D  304E

304F

305

305A

305B

305C

305D

305E

305F

305G

305H

305I

305J 306A  306

306B  306C 307A  307B  307

307C

307D

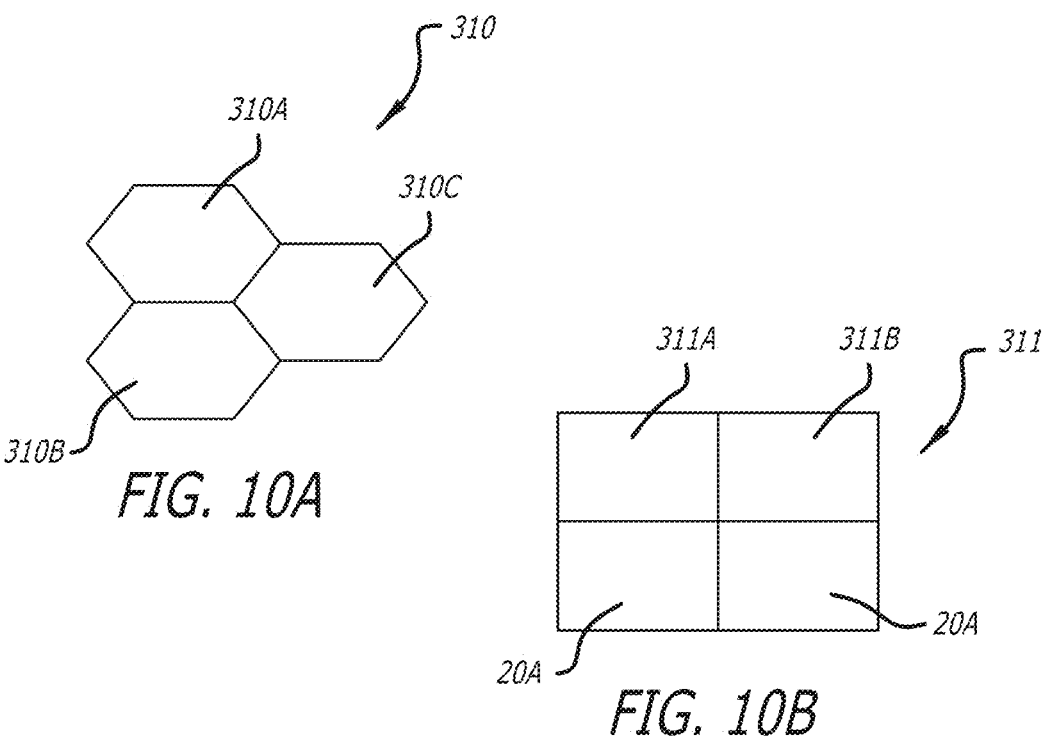
*310*
*310A*
*310C*
*310B*
*FIG. 10A*
*311A*        *311B*        *311*
*20A*        *20A*
*FIG. 10B*
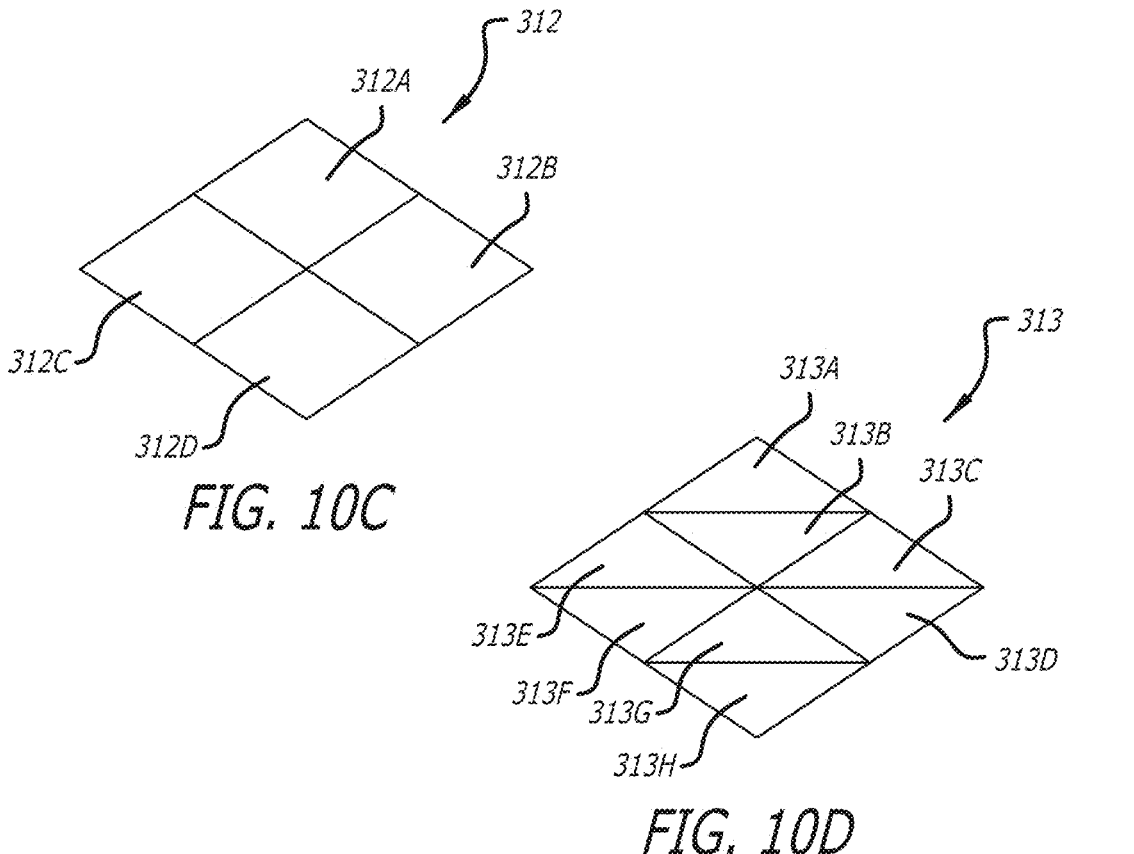
*312*
*312A*
*312B*
*312C*
*312D*
*FIG. 10C*
*313*
*313A*
*313B*
*313C*
*313E*        *313D*
*313F*        *313G*
*313H*
*FIG. 10D*

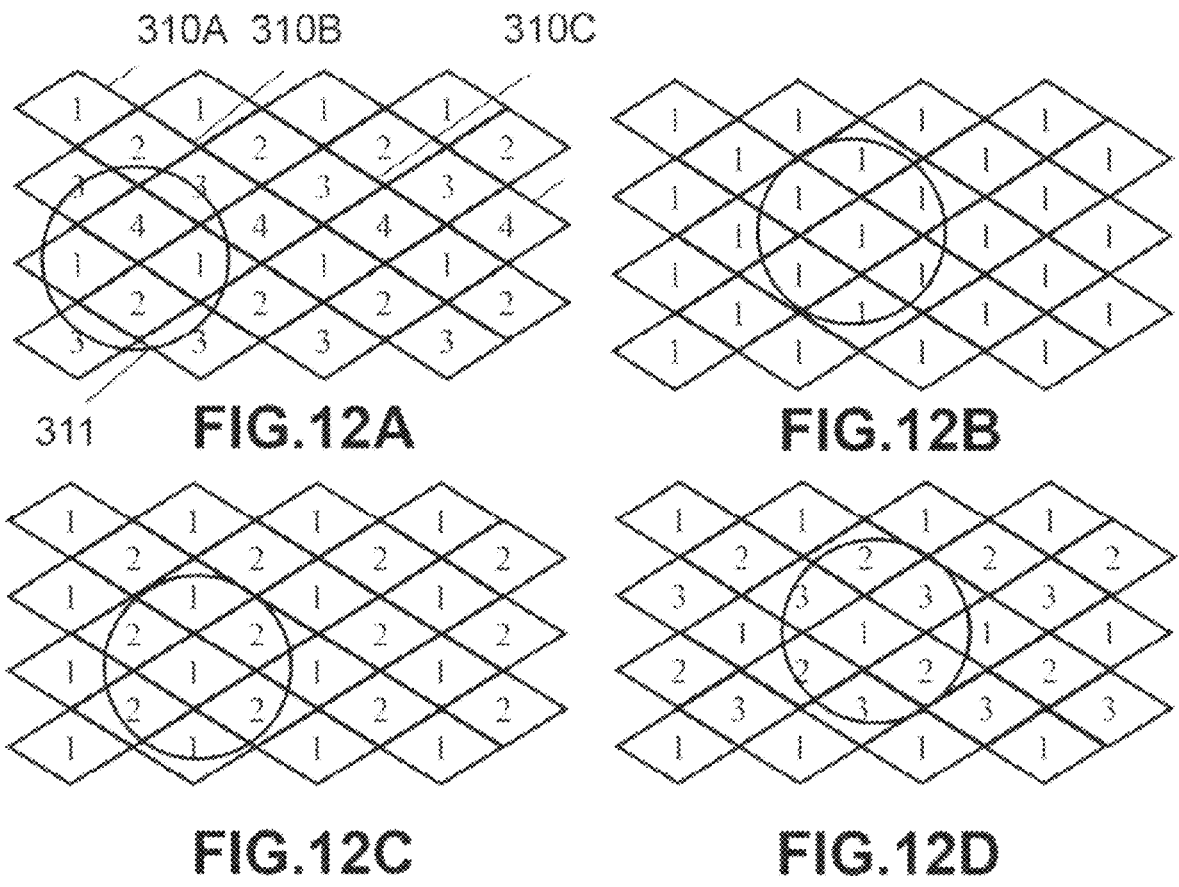
FIG.12A          FIG.12B
FIG.12C          FIG.12D
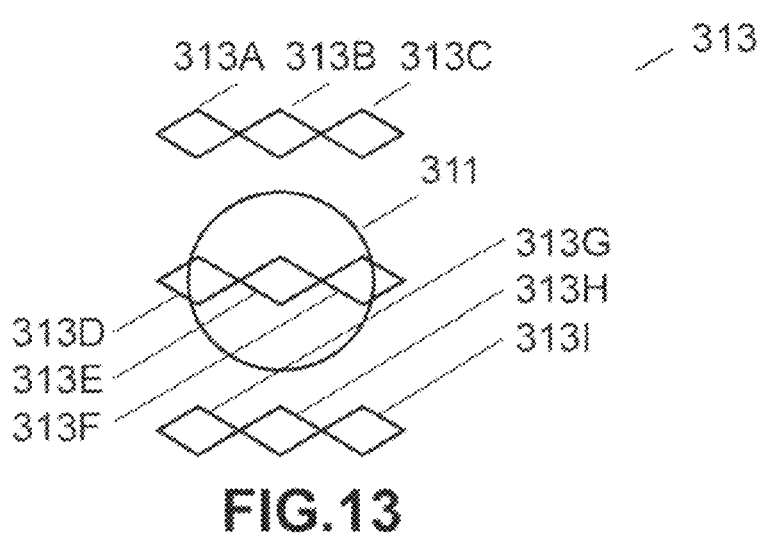
FIG.13

315A  315B  315C  315D  315E

315

| 1 | 2 | 3 | 4 | 5 | 1 | 2 |
|---|---|---|---|---|---|---|
| 4 | 5 | 1 | 2 | 3 | 4 | 5 |
| 2 | 3 | 4 | 5 | 1 | 2 | 3 |
| 5 | 1 | 2 | 3 | 4 | 5 | 1 |

321A    322A    323A     324

323B    322B    321B

325

| (UP,1) | (UP,2) | (UP,3) | (UP,4) |
|--------|--------|--------|--------|
| (MID,1) | (MID,2) | (MID,3) | (MID,4) |
| (DWN,1) | (DWN,2) | (DWN,3) | (DWN,4) |

326A 326B

326

327A 327B

326

327

401

402

403

404

407

408

409

410　　411

394 395 77B

76B

391

77

76A 393 77A 392

76B 395

394 77

393

392 76A

78

76B 79    396

77

76A

Spatial Distribution of μT

Case A: Top hat function for this field angle, 50% aperture fill.

Case B: Tiles have different weighting. Aperture therefore not a top hat function.

μTs don't need to be square or in order shown.
Also will have 2D distribution.
Structured and random arrangements considered in the following.

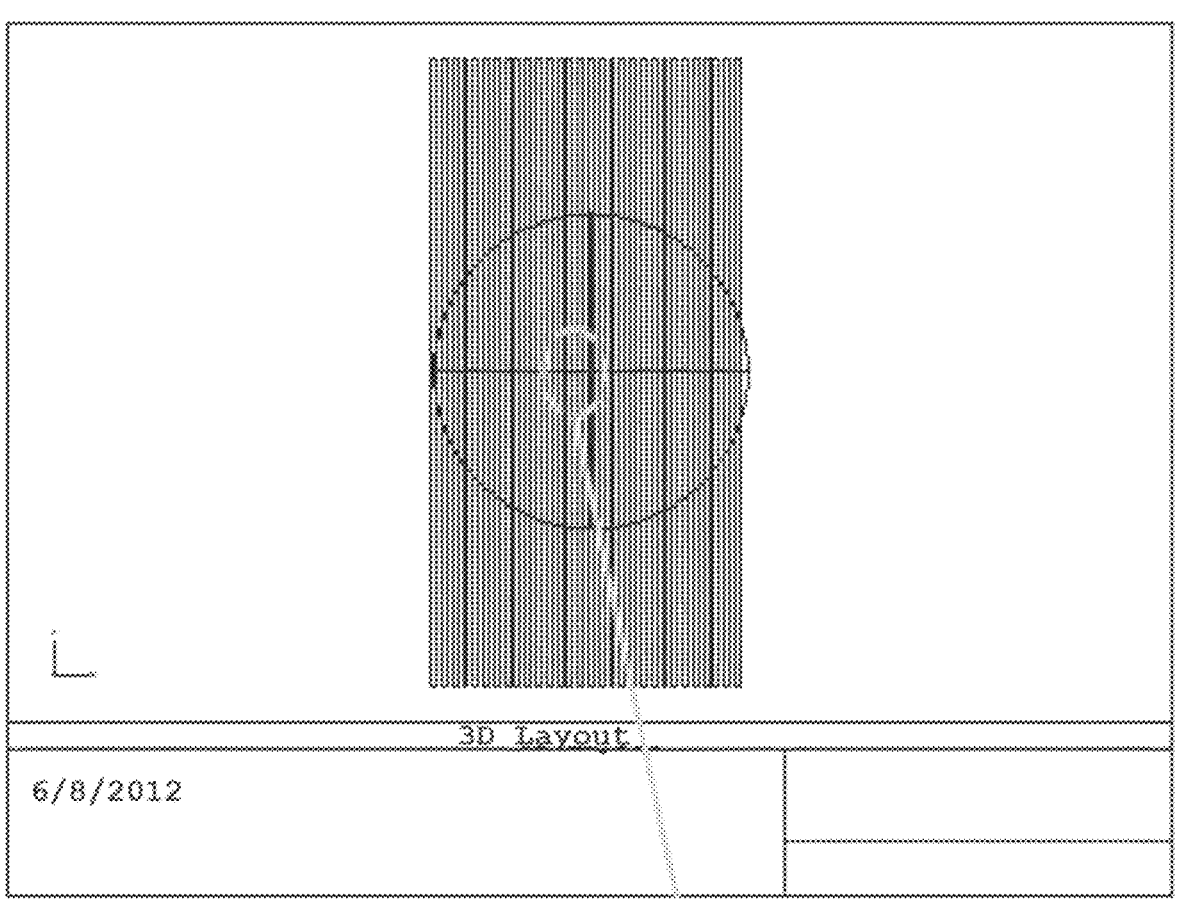
3D Layout
6/8/2012
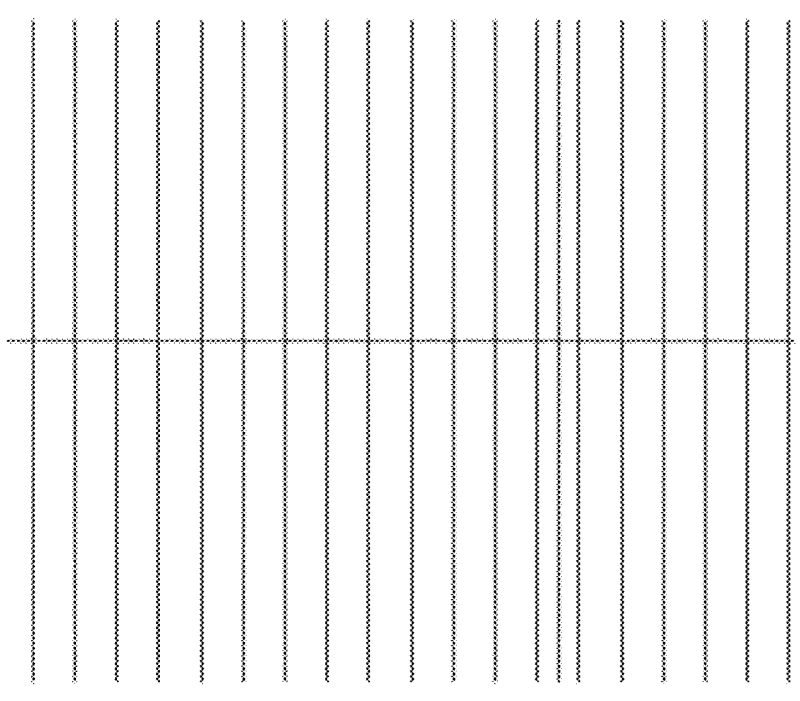
FIG. 43B

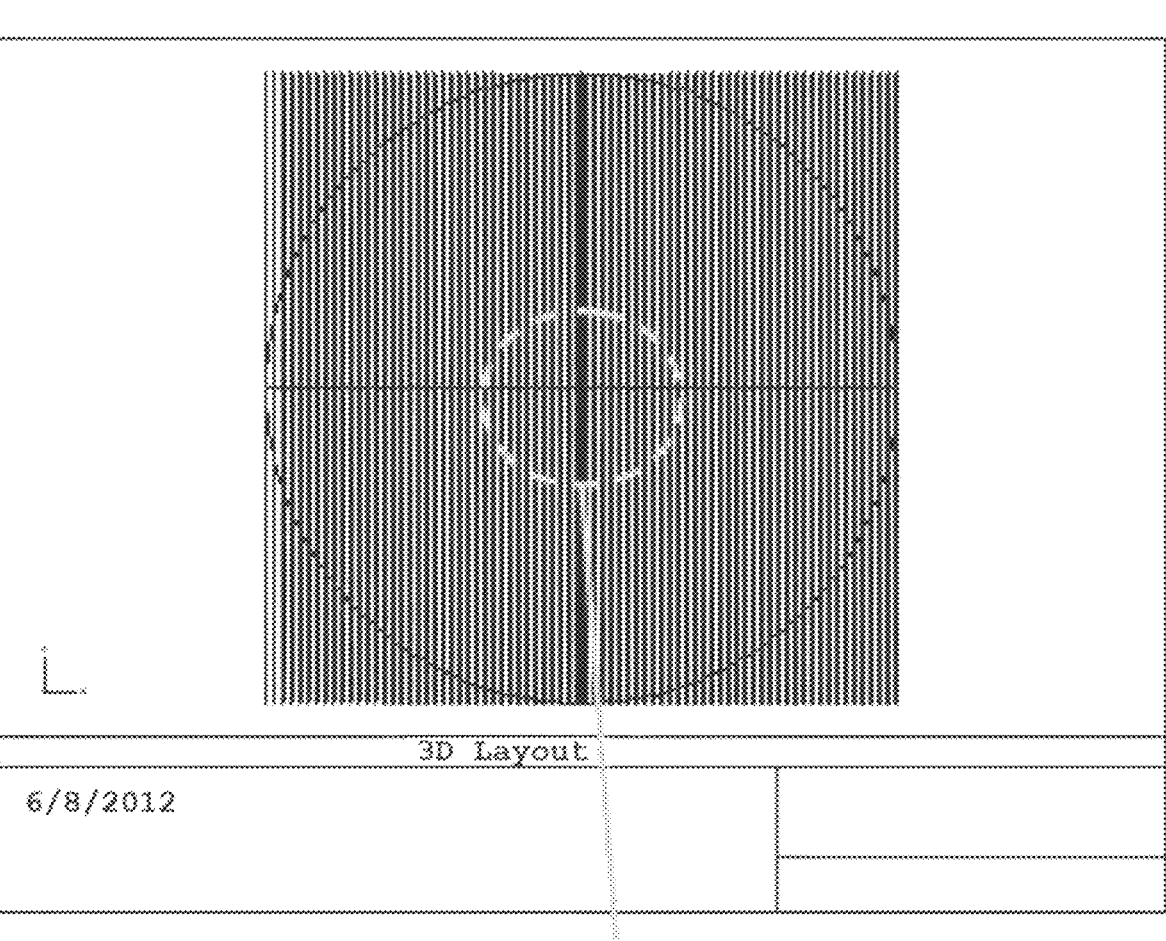
3D Layout
6/8/2012
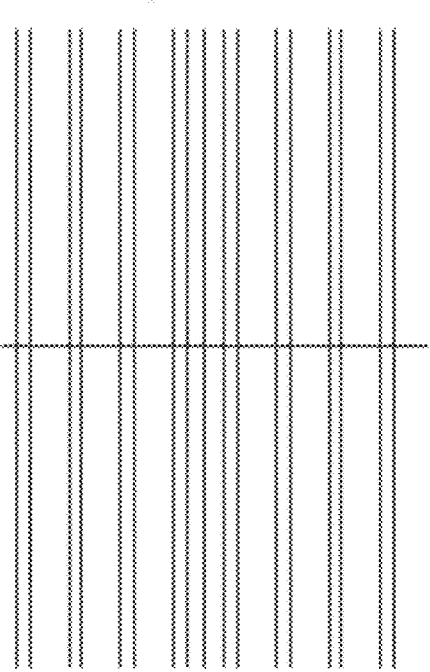
FIG. 44B

Scale: 3.2000 Millimeters

Aperture Diameter: 3.0000

% rays through = 74.74%

Footprint Diagram

6/11/2012
Surface 4:
Ray X Min = -1.5000    Ray X Max = 1.4925
Ray Y Min = -1.4925    Ray Y Max = 1.5000
Max Radius= 1.5000     Wavelength= 0.5320

Tessellation Aperture Model uTessellations.zmx
Configuration 2 of 4

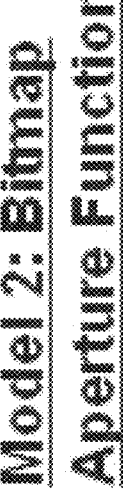
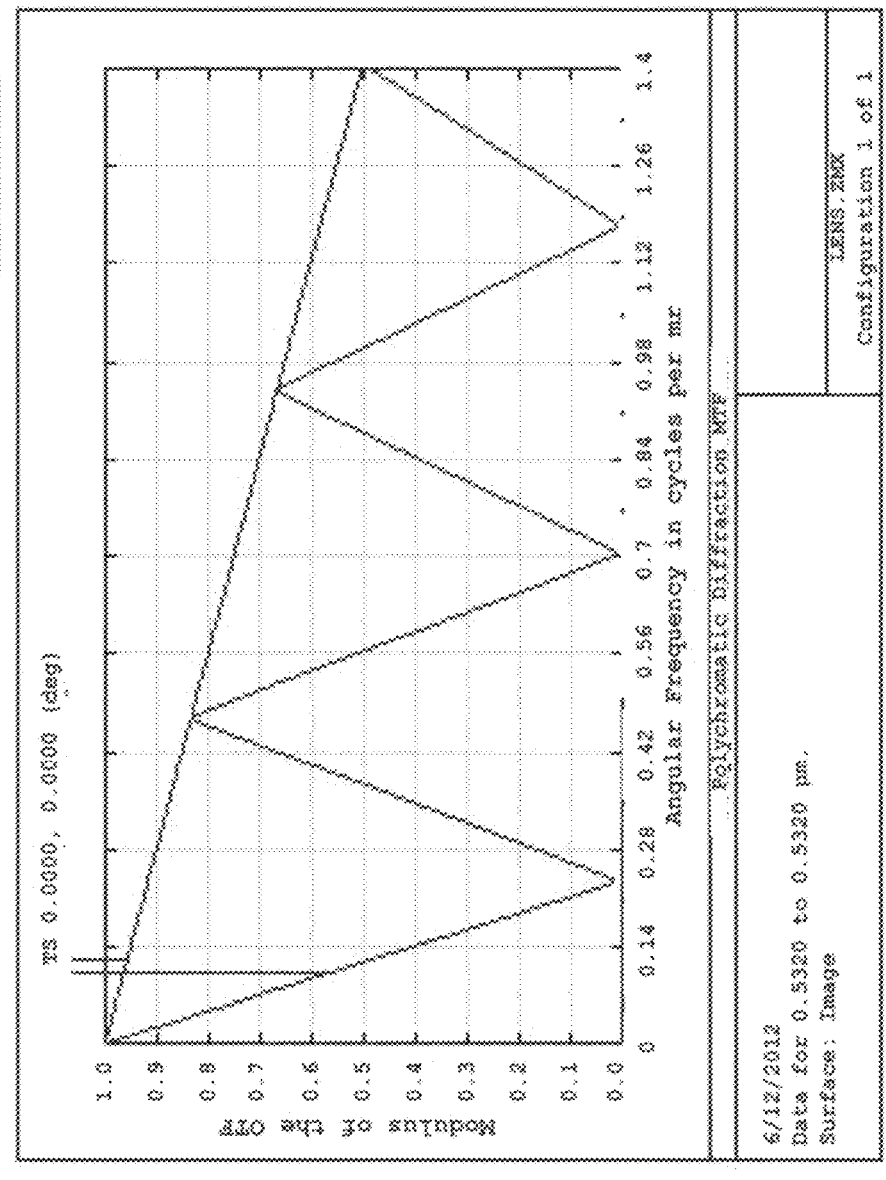
FIG. 58B

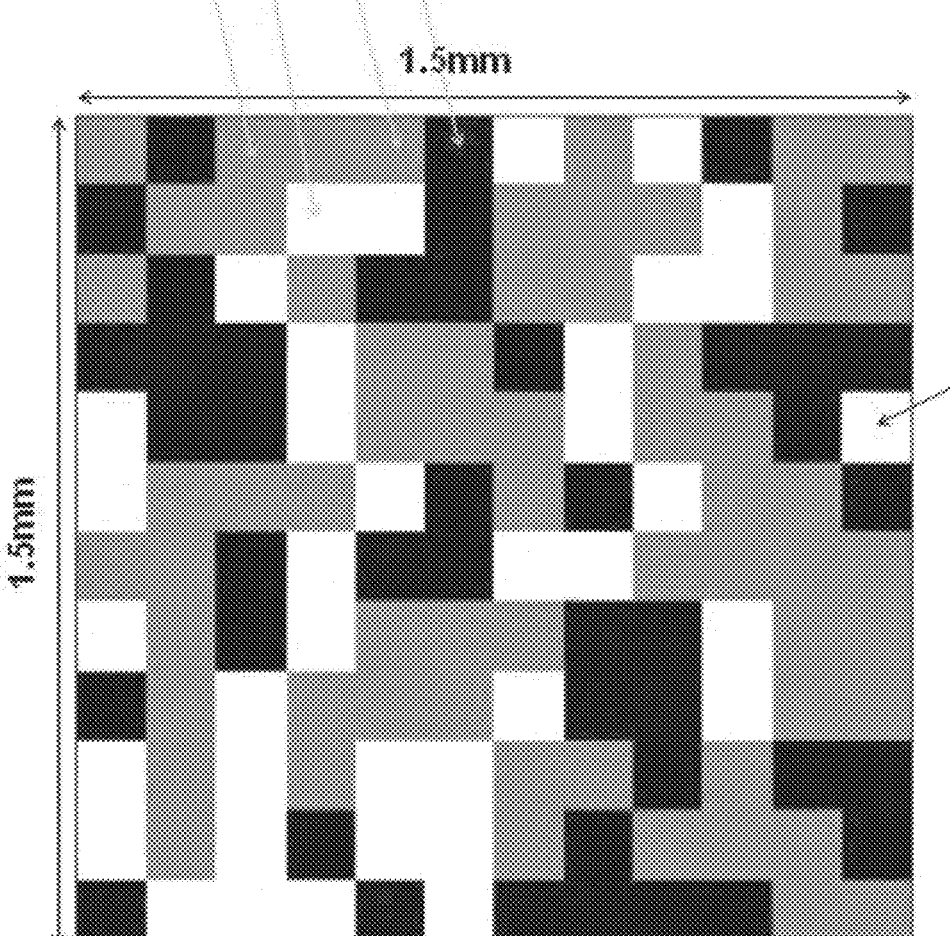
◆ 4 tile types are represented here.
◆ Transmission values of each are:
  ◆ 1: 50%
  ◆ 2: 100%
  ◆ 3: 50%
  ◆ 4: 0%
◆ μT Apertures are 125um squares.
◆ The grid is 12x12 pixels, so the tessellation aperture is 1.5mm x 1.5mm square.
1.5mm
1.5mm
125um x 125um square micro-tessellations
FIG. 61

Case 1: 1mm Tessellations, Fill Per Overlaid Reference Designs  Strictly Confidential Represents 6 layer, 12 tile, monochrome reference design Single tile: 50% Aperture Fill
calculated using 17mm eye relief.

3mm eye pupil
6 layer monochrome reference
design.
1mm tessellations
Offset reference design.

Unit cell is 2x3.
Overlay is as shown to generate
tiled overlay pattern.

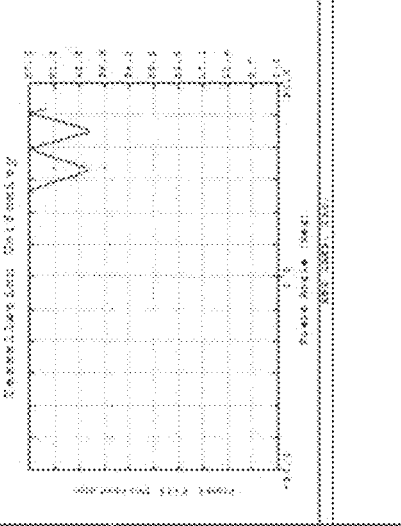

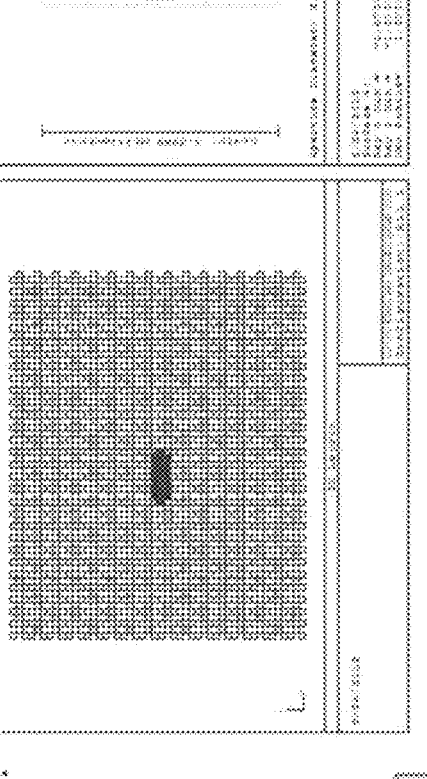

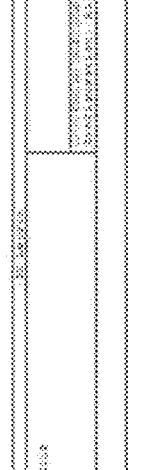

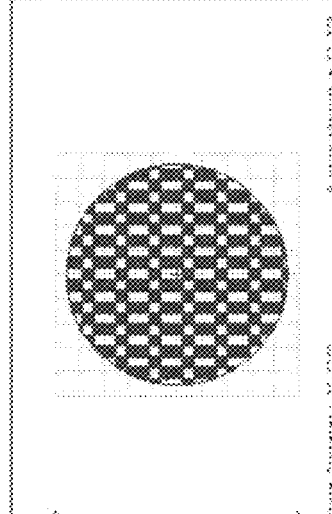

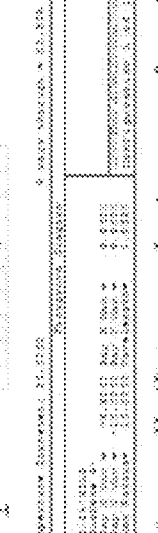

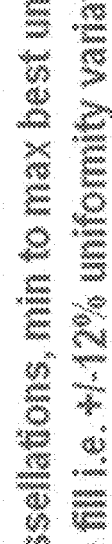

◆ With 1mm tessellations, min to max best uniformity is +/-12% with
  50% aperture fill i.e. +/-12% uniformity variation = 24% p-p.  (2)

SBGLabs

FIG. 63

Strictly Confidential
Case 1b : repeated on axis
3mm eye pupil @ 30mm eye relief.
Eye relief impacts the spatial frequency of the variation.
Larger eye relief causes higher spatial frequency ripple.
Uniformity magnitude is unaffected.
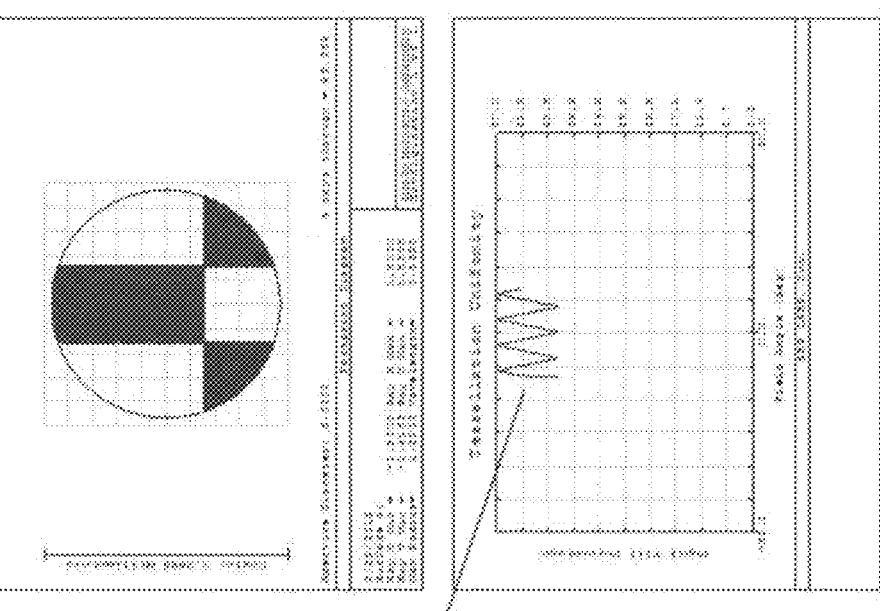
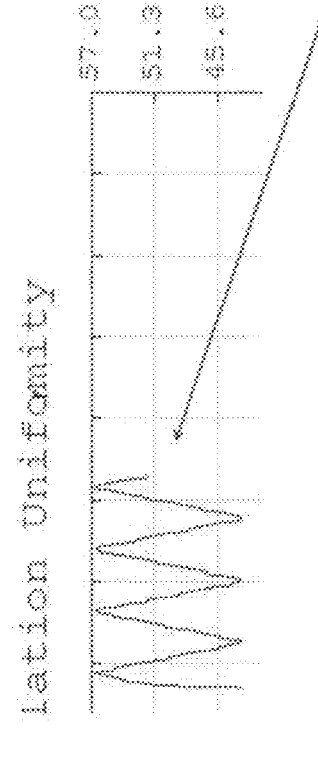
lation Uniformity
◆ Max Ripple : 56.6% pupil fill
◆ Min Ripple : 43.4% pupil fill
◆ Uniformity : +/-13.2%, 26.4% p-p
FIG. 64

Strictly Confidential
Case 2: 1mm Tessellations : Fill Optimized
Single tile : 50% Aperture fill     Represents 6 layer, 12 tile monochrome reference design with grating positions reoptimized
3mm eye pupil
6 layer monochrome reference design.
1mm tessellations
Tessellations are spatially uniform.
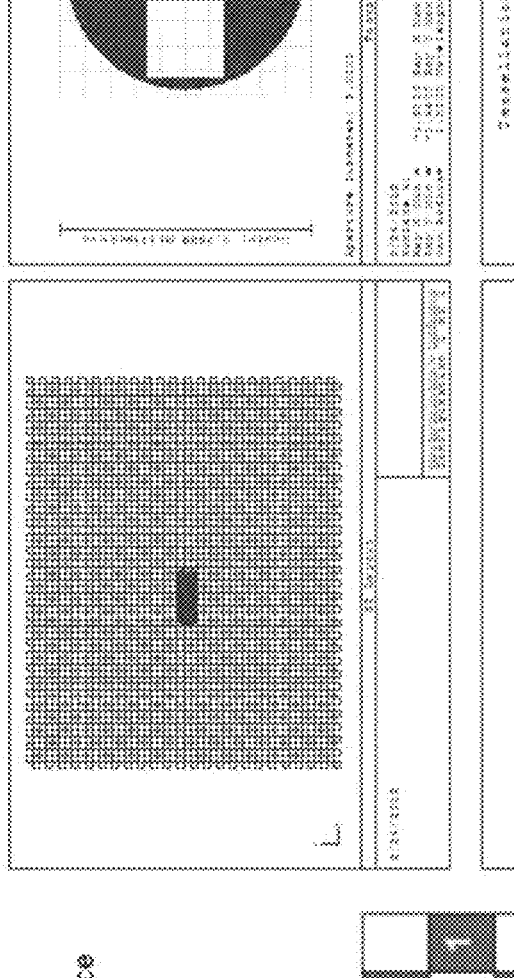
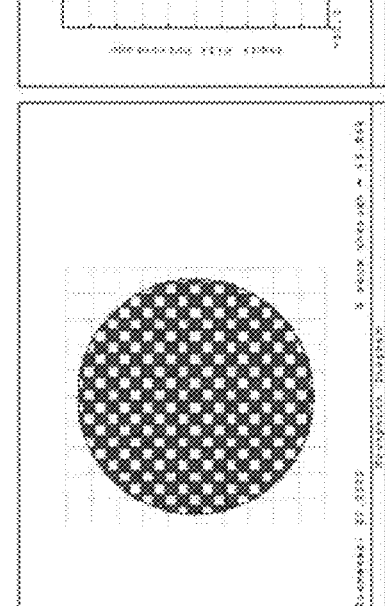
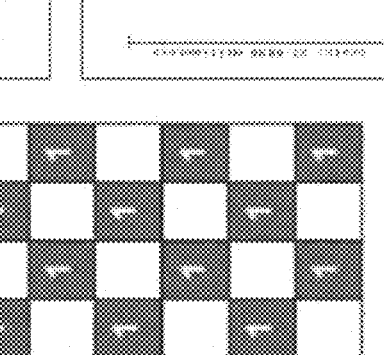
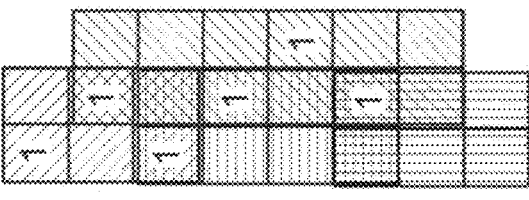
FIG. 65

Case 2: Consideration of Max & Min Situations

Min: 45.1%

Max: 54.9%

◆ With 1mm tessellations, min to max best uniformity is +/-5% with 50% aperture fill i.e. +/-10% uniformity variation, 20%p-p Case 3: 0.5mm Tessellations with 50% Aperture Fill, Off Axis Strictly Confidential Represents 8 layer, 12 tile, monochrome reference design but with 0.5mm tessellations Single tile: 50% Aperture Fill
3mm eye pupil Uniformity

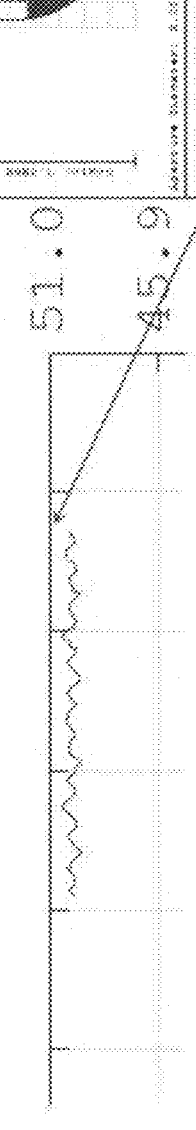
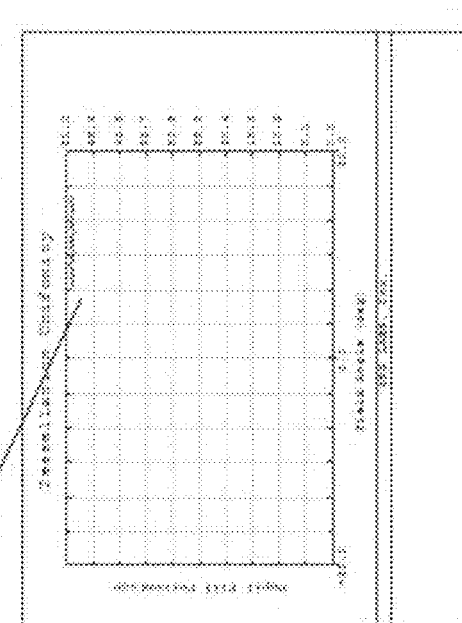

◆ This simulates 50% aperture fill with 0.5mm wide tessellations.

◆ Ripple calculated : Max=50.4, Min=49.6. Ripple magnitude is about +/-0.8% (1.6% P-P).

◆ The field range measured was ~11deg to 24deg.

◆ Ripple frequency is ~1cycle for 1.25deg.

FIG. 67

Case 3b: 0.5mm Tessellations with 50% Aperture Fill, On Axis

Strictly Confidential

Represents 8 layer, 12 tile, monochrome reference design but with 0.5mm tessellations Single tile: 50% Aperture Fill
3mm eye pupil

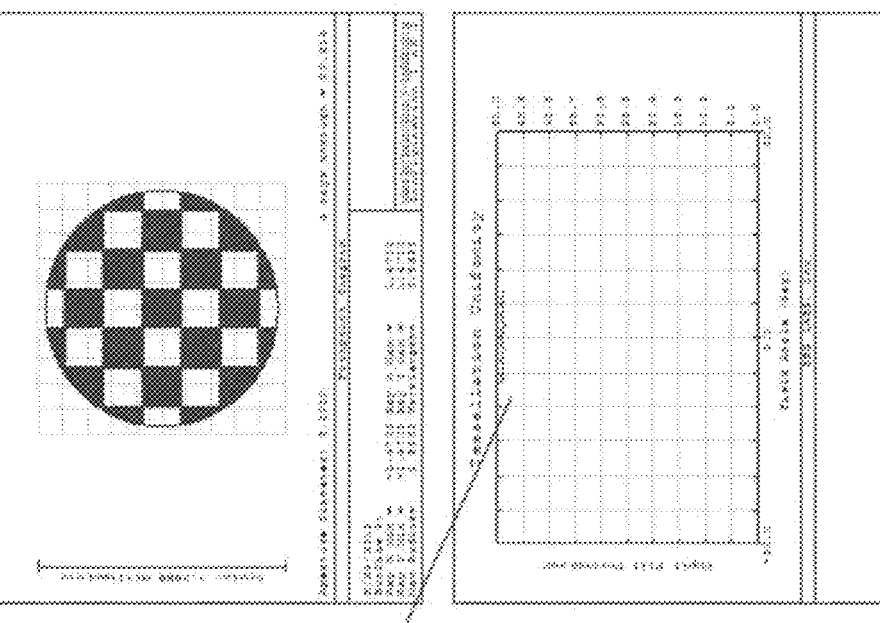

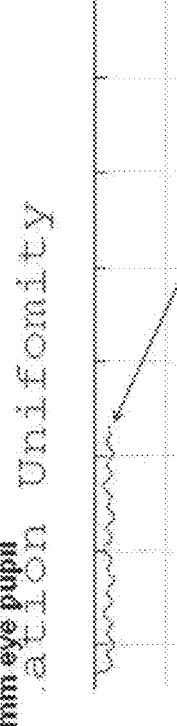

◆ This simulates 50% aperture fill with 0.5mm wide tessellations

◆ Ripple calculated : Max=50.9, Min=49.6. Ripple magnitude is about +/-1.5% (3% P-P).

◆ The field range measured was ~+/-6.5deg. Off axis, tessellations are foreshortened, and so uniformity improves.

◆ Ripple frequency is ~1cycle for 1.25deg.

FIG. 68

4mm eye pupil, 0.5mm tessellations, 50% aperture fill

Strictly Confidential

Tessellation Uniformity 52.0

48.0

◆ Max: 51.97%
◆ Min: 48.03%
◆ Ripple: +/-2% = 4% p-p

3mm Eye Pupil, 33% aperture fill [3 layers, 9 tile types]
Represents 3 layer, 9 tile, monochrome reference design but with 0.5mm tessellations
Single tile: 33% Aperture fill
3mm eye pupil
Cartesian grid distribution
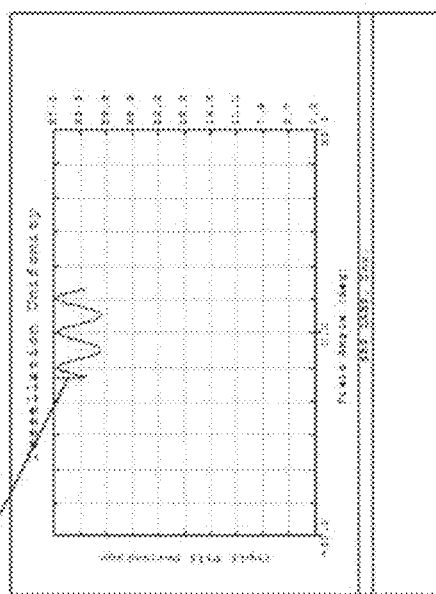
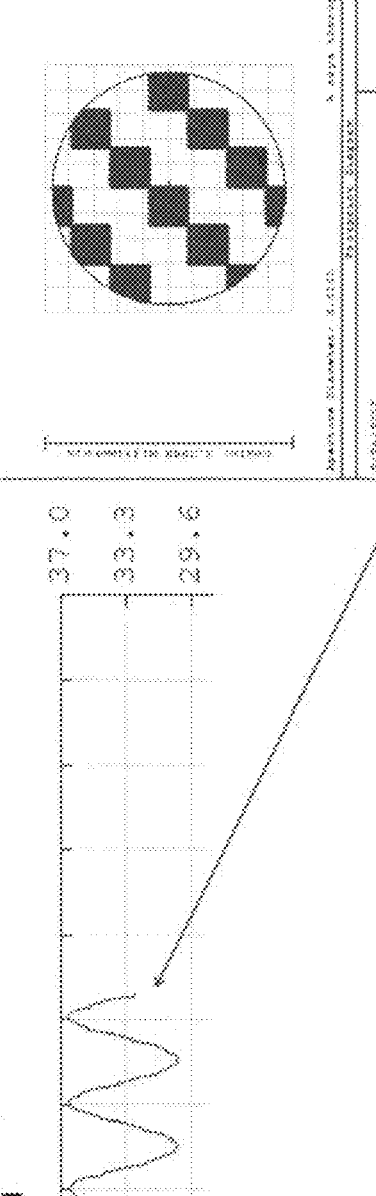
37.0
33.8
29.6
◆ Ripple calculated : Max=36.9, Min=30.4. Ripple magnitude is ~6.5%/33%=+/-9.75%=19.5% P-P.
◆ Ripple frequency is ~1cycle for 5deg.
FIG. 70

ReRun : 4mm Eye Pupil, 33% aperture fill [3 layers, 9 tile types]    Strictly Confidential
Requires pattern to have 1x3 unit cell, with even columns offset by 0.5pixel.
Grid distribution using even column half pixel offsets for more even distribution
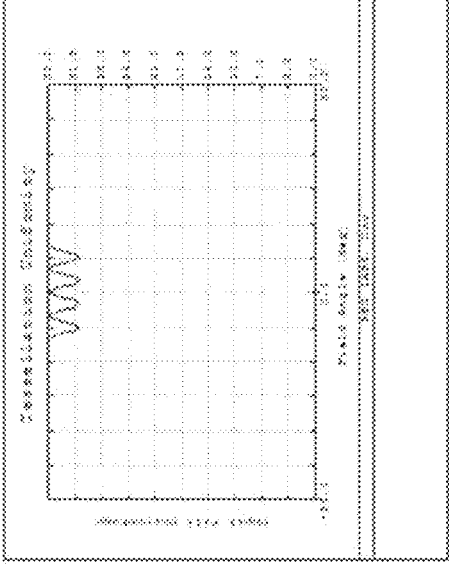
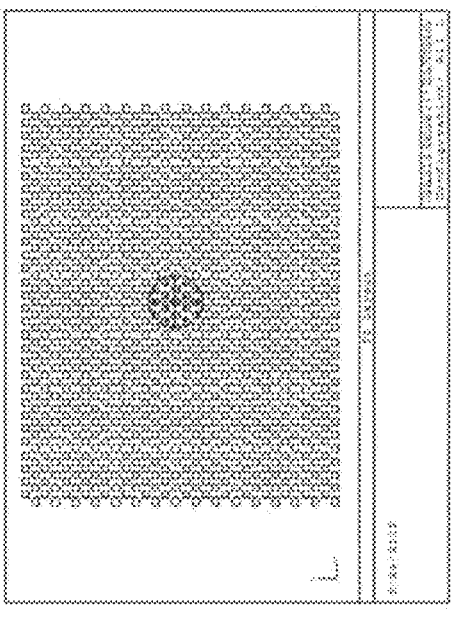
◆ Ripple Max: 35.0%
◆ Ripple Min: 31.0%
◆ Uniformity: 4.0%/33.3%=+/-6%=12%
FIG. 74

4mm Eye Pupil, 33% aperture fill [3 layers, 9 tile types]
Strictly Confidential
Requires pattern to have 1x3 unit cell, with even columns offset by 0.5pixel.
Eye pupil offset by half tessellation pixel in y.
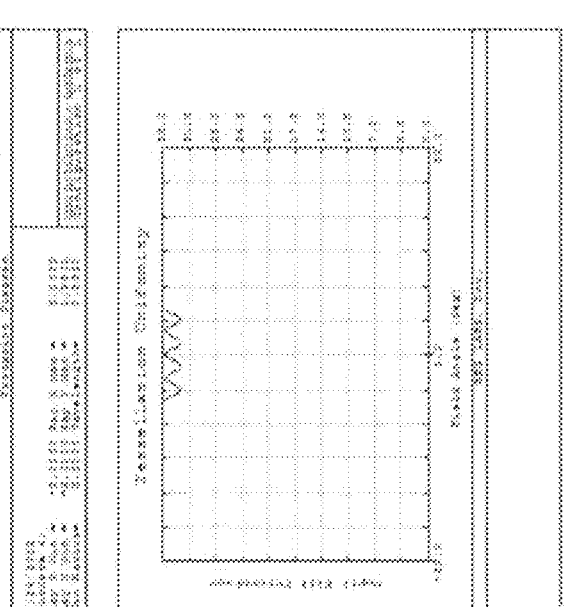
Grid distribution using even column half pixel offsets for more even distribution
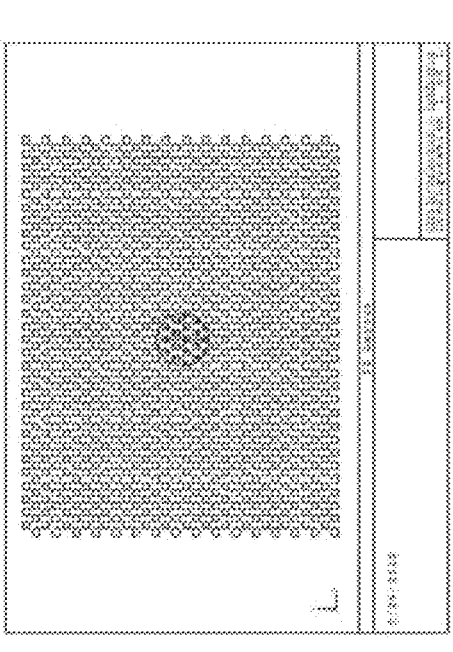
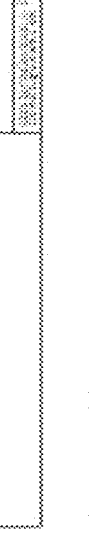
◆ Ripple Max: 34.6%
◆ Ripple Min: 32.7%
◆ Uniformity: 1.9%/33.3%=+/-2.85%=5.7%
FIG. 75

HOLOGRAPHIC WIDE ANGLE DISPLAY

CROSS-REFERENCE TO RELATED APPLICATIONS

This application is a continuation of U.S. patent application Ser. No. 17/808,206, filed Jun. 22, 2022, which is a continuation of U.S. patent application Ser. No. 16/849,043, filed Apr. 15, 2020, which is a continuation of U.S. patent application Ser. No. 15/048,954, now U.S. Pat. No. 10,690, 915, filed Feb. 19, 2016, which is a continuation of U.S. patent application Ser. No. 13/869,866, now U.S. Pat. No. 9,341,846, filed Apr. 24, 2013, which claims the benefit of and priority to U.S. Application No. 61/687,436, filed Apr. 25, 2012, and 61/689,907, filed Jun. 15, 2012, each of which is hereby incorporated by reference herein in their entirety.

BACKGROUND

There is a need for a compact see through data display capable of displaying image content ranging from symbols and alphanumeric arrays to high-resolution pixelated images. The display should be highly transparent and the displayed image content should be clearly visible when superimposed over a bright background scene. The display should provide full color with an enhanced color gamut for optimal data visibility and impact. A desirable feature is that the display should be as easy to wear, natural and non-distracting as possible with a form factor similar to that of ski goggles or, more desirably, sunglasses. The eye relief and pupil should be big enough to avoid image loss during head movement even for demanding military and sports activities. The image generator should be compact, solid state and have low power consumption.

The above goals are not achieved by current technology. Current wearable displays only manage to deliver see through, adequate pupils, eye relief and field of view and high brightness simultaneously at the expense of cumbersome form factors. In many cases weight is distributed in undesirable place for a wearable display in front of the eye. One common approach to providing see through relies on reflective or diffractive visors illuminated off axis. Microdisplays, which provide high-resolution image generators in tiny flat panels, often do not necessarily help with miniaturizing wearable displays because a general need for very high magnifications inevitably results in large diameter optics. Several ultra low form factor designs offering spectacle-like form factors are currently available but usually demand aggressive trade-offs against field of view (FOV), eye relief and exit pupil.

A long-term goal for research and development in HMDs is to create near-to-eye, color HMDs featuring:

a) high resolution digital imagery exceeding the angular resolution of standard NVGs over the entire field of view and focused at infinity;

b) a 80°×40° monocular field-of-view (FOV) HMD, or a 120°×40° binocular FOV HMD with 40° stereoscopic overlap at the center of the FOV;

c) a high see-through (≥90%) display with an unobstructed panoramic view of the outside world, a generous eye box, and adequate eye relief; and d) a light-weight, low-profile design that integrates well with both step-in visors and standard sand, wind and dust goggles.

Although the imagery will be displayed over a certain field of view, the panoramic see-through capability may be much greater than this and generally better than the host visor or goggles. This is an improvement over existing NVGs, where the surrounding environment is occluded outside the 40° field of view.

One desirable head-worn display is one that: (1) preserves situational awareness by offering a panoramic see-through with high transparency; and (2) provides high-resolution, wide-field-of-view imagery. Such a system should also be unobtrusive; that is, compact, light-weight, and comfortable, where comfort comes from having a generous exit pupil and eye motion box/exit pupil (>15 mm), adequate eye relief (≥25 mm), ergonomic center of mass, focus at infinity, and compatibility with protective head gear. Current and future conventional refractive optics cannot satisfy this suite of requirements. Other important discriminators include: full color capability, field of view, pixel resolution, see-through, luminance, dynamic grayscale and low power consumption. Even after years of highly competitive development, HWDs based on refractive optics exhibit limited field of view and are not compact, light-weight, or comfortable.

Head-mounted displays based on waveguide technology substrate guided displays have demonstrated the capability of meeting many of these basic requirements. Of particular relevance is a patent (U.S. Pat. No. 5,856,842) awarded to Kaiser Optical Systems Inc. (KOSI), a Rockwell Collins subsidiary, in 1999, which teaches how light can be coupled into a waveguide by employing a diffractive element at the input and coupled out of the same waveguide by employing a second diffractive element at the output. According to U.S. Pat. No. 5,856,842, the light incident on the waveguide needs to be collimated in order to maintain its image content as it propagates along the waveguide. That is, the light should be collimated before it enters the waveguide. This can be accomplished by many suitable techniques. With this design approach, light leaving the waveguide may be naturally collimated, which is the condition needed to make the imagery appear focused at infinity. Light propagates along a waveguide only over a limited range of internal angles. Light propagating parallel to the surface will (by definition) travel along the waveguide without bouncing. Light not propagating parallel to the surface will travel along the waveguide bouncing back and forth between the surfaces, provided the angle of incidence with respect to the surface normal is greater than some critical angle. For BK-7 glass, this critical angle is ~42°. This can be lowered slightly by using a reflective coating (but this may diminish the see through performance of the substrate) or by using a higher-index material. Regardless, the range of internal angles over which light will propagate along the waveguide does not vary significantly. Thus, for glass, the maximum range of internal angles is ≤50°. This translates into a range of angles exiting the waveguide (i.e.; angles in air) of <40°; generally less, when other design factors are taken into account.

To date, SGO technology has not gained wide-spread acceptance. This may be due to the fact that waveguide optics can be used to expand the exit pupil but they cannot be used to expand the field of view or improve the digital resolution. That is, the underlying physics, which constraints the range of internal angles that can undergo total internal reflection (TIR) within the waveguide, may limit the achievable field of view with waveguide optics to at most 40° and the achievable digital resolution to that of the associated image.

BRIEF SUMMARY OF INVENTION

In view of the foregoing, the Inventors have recognized and appreciated the advantages of a display and more particularly to a transparent display that combines Substrate Guided Optics (SGO) and Switchable Bragg Gratings (SBGs).

Accordingly, provided in one aspect of some embodiments is an apparatus for displaying an image, comprising: an input image node configured to provide at least a first and a second image modulated lights; and a holographic waveguide device configured to propagate the at least one of the first and second image modulated lights in at least a first direction. The holographic waveguide device may comprise: at least a first and second interspersed multiplicities of grating elements disposed in at least one layer, the first and second grating elements having respectively a first and a second prescriptions. The first and second image modulated lights may be modulated respectively with first field of view (FOV) and second FOV image information. The first multiplicity of grating elements may be configured to deflect the first image modulated light out of the at least one layer into a first multiplicity of output rays forming a first FOV tile, and the second multiplicity of grating elements may be configured to deflect the second image modulated light out of the layer into a second multiplicity of output rays forming a second FOV tile.

Provided in another aspect of some embodiments is a method of displaying an image, the method comprising: (i) providing an apparatus comprising: an input image node and a holographic waveguide device comprising (M×N) interspersed multiplicities of grating elements, where M, N are integers; (ii) generating image modulated light (I,J) input image node corresponding to field of view (FOV) tile (I,J), for integers $1 \leq I \leq N$ and $1 \leq J \leq M$; (iii) switching grating elements of prescription matching FOV tile (I,J) to their diffracting states; (iv) illuminating grating elements of prescription matching FOV tile (I,J) with image modulated light (I,J); and (v) diffracting the image modulated light I, J into FOV tile I, J.

A more complete understanding of the invention can be obtained by considering the following detailed description in conjunction with the accompanying drawings, wherein like index numerals indicate like parts. For purposes of clarity, details relating to technical material that is known in the technical fields related to the invention have not been described in detail.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 10A is a tessellation pattern comprising hexagons of horizontally biased aspect ratio in one embodiment.

FIG. 10B is a tessellation pattern comprising rectangles of horizontally biased aspect ratio in one embodiment.

FIG. 10C is a tessellation pattern comprising diamond shaped elements of horizontally biased aspect ratio in one embodiment.

FIG. 10D is a tessellation pattern comprising triangles of horizontally biased aspect ratio in one embodiment.

FIG. 12A shows an example of a tessellation pattern comprising four different grating element types with an eye pupil overlaid in one embodiment.

FIG. 12B shows an example of a tessellation pattern comprising one grating element types with an eye pupil overlaid in one embodiment.

FIG. 12C shows an example of a tessellation pattern comprising two different grating element types with an eye pupil overlaid in one embodiment.

FIG. 12D shows an example of a tessellation pattern comprising three different grating element types with an eye pupil overlaid in one embodiment.

FIG. 13 shows an example of a tessellation pattern for one particular grating element type with an eye pupil overlaid in one embodiment.

FIG. 28B shows a ray trace of the embodiment of FIG. 28A in one embodiment.

FIG. 43B is a schematic illustration showing the effect of 50% aperture fill produced by the micro tessellation pattern of FIG. 43A in one embodiment.

FIG. 44B is a schematic illustration showing the effect of 25% aperture fill produced by the micro tessellation pattern of FIG. 43A in one embodiment.

FIG. 58B is a chart showing the MTF of a Bitmap Aperture Function in one embodiment.

FIG. 61 is a Bitmap Aperture Function in one embodiment.

FIG. 63 is a first illumination uniformity analysis of a first implementation tessellation pattern in one embodiment.

FIG. 64 is a second illumination uniformity analysis of a first implementation tessellation pattern in one embodiment.

FIG. 65 is a third illumination uniformity analysis of a first implementation tessellation pattern in one embodiment.

FIG. 67 is a fifth illumination uniformity analysis of a first implementation tessellation pattern in one embodiment.

FIG. 68 is a sixth illumination uniformity analysis of a first implementation tessellation pattern in one embodiment.

FIG. 70 is an eighth illumination uniformity analysis of a first implementation tessellation pattern in one embodiment.

FIG. 74 is a twelfth illumination uniformity analysis of a first implementation tessellation pattern in one embodiment.

FIG. 75 is a thirteenth illumination uniformity analysis of a first implementation tessellation pattern in one embodiment in one embodiment.

DETAILED DESCRIPTION

Figure 1:
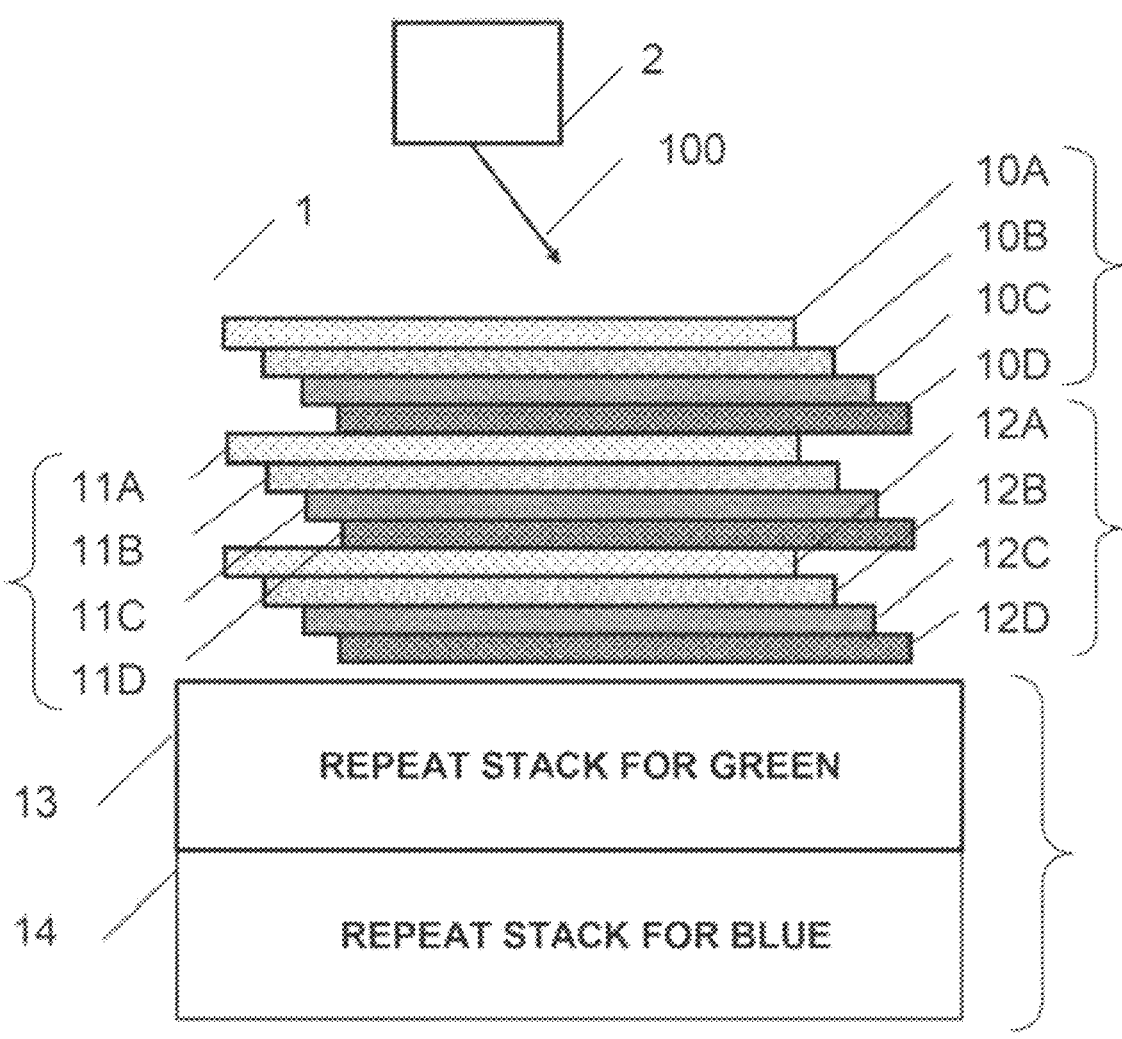
FIG. 1 is a schematic illustration of a color waveguide display architecture using stacked gratings where each grating prescription corresponds to waveguide light being diffracted into a unique field of view tile.

Following below are more detailed descriptions of various concepts related to, and embodiments of, an inventive display. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Various Embodiments

Provided in one embodiment is an apparatus for displaying an image, comprising: an input image node configured to provide at least a first and a second image modulated lights; and a holographic waveguide device configured to propagate the at least one of the first and second image modulated lights in at least a first direction. The holographic waveguide device may comprise: at least a first and second interspersed multiplicities of grating elements disposed in at least one layer, the first and second grating elements having respectively a first and a second prescriptions. The first and second image modulated lights may be modulated respectively with first field of view (FOV) and second FOV image information. The first multiplicity of grating elements may be configured to deflect the first image modulated light out of the at least one layer into a first multiplicity of output rays forming a first FOV tile, and the second multiplicity of grating elements may be configured to deflect the second image modulated light out of the layer into a second multiplicity of output rays forming a second FOV tile.

Provided in another embodiment is an apparatus for displaying an image, comprising: an input image node configured to provide at least a first and a second image modulated lights; and a holographic waveguide device configured to propagate the at least one of the first and second image modulated lights in at least a first direction. The holographic waveguide device may comprise: at least a first and second interspersed multiplicities of grating elements disposed in at least one layer, the first and second grating elements having respectively a first and a second prescriptions. The first and second image modulated lights may be modulated respectively with first field of view (FOV) and second FOV image information. The first multiplicity of grating elements may be configured to deflect the first image modulated light out of the at least one layer into a first multiplicity of output rays forming a first FOV tile, and the second multiplicity of grating elements may be configured to deflect the second image modulated light out of the layer into a second multiplicity of output rays forming a second FOV tile. The first and second multiplicities of the grating elements may comprise an SBG in a passive mode or a switching mode.

Provided in another embodiment is an apparatus for displaying an image, comprising: an input image node configured to provide at least a first and a second image modulated lights; a beam expander; and a holographic waveguide device configured to propagate the at least one of the first and second image modulated lights in at least a first direction. The holographic waveguide device may comprise: at least a first and second interspersed multiplicities of grating elements disposed in at least one layer, the first and second grating elements having respectively a first and a second prescriptions. The first and second image modulated lights may be modulated respectively with first field of view (FOV) and second FOV image information. The first multiplicity of grating elements may be configured to deflect the first image modulated light out of the at least one layer into a first multiplicity of output rays forming a first FOV tile, and the second multiplicity of grating elements may be configured to deflect the second image modulated light out of the layer into a second multiplicity of output rays forming a second FOV tile.

Provided in another embodiment is an apparatus for displaying an image, comprising: an input image node configured to provide at least a first and a second image modulated lights; and a holographic waveguide device configured to propagate the at least one of the first and second image modulated lights in at least a first direction. The holographic waveguide device may comprise: at least a first and second interspersed multiplicities of grating elements disposed in at least one layer, the first and second grating elements having respectively a first and a second prescriptions. The first and second image modulated lights may be modulated respectively with first field of view (FOV) and second FOV image information. The first multiplicity of grating elements may be configured to deflect the first image modulated light out of the at least one layer into a first multiplicity of output rays forming a first FOV tile, and the second multiplicity of grating elements may be configured to deflect the second image modulated light out of the layer into a second multiplicity of output rays forming a second FOV tile. At least one of the first and second multiplicities of the grating elements may be tessellated in a predetermined pattern.

In one embodiment, at least one of the first and second multiplicities of the grating elements comprise an SBG that is in a switching mode or in a passive mode.

In one embodiment, at least one of the first and second multiplicities of the grating elements are electrically switchable.

In one embodiment, at least one of the first and second multiplicities of the grating elements have a non-diffracting state and a diffracting state having a diffraction efficiency lying between a predetermined minimum level and a maximum level.

In one embodiment, all elements in the first or second multiplicities of grating elements are configured to be switched.

In one embodiment, at least one of the first and second multiplicities of the grating elements have a diffracting state, and when in the diffracting state. The first grating elements are configured to deflect the first image modulated light out of the at least one layer into the first multiplicity of output rays forming a first FOV tile. The second grating elements are configured to deflect the second image modulated light out of the layer into the second multiplicity of output rays forming a second FOV tile.

In one embodiment, the at least one layer is sandwiched between transparent substrates to which patterned electrodes are applied.

In one embodiment, the at least one layer is sandwiched between transparent substrates to which patterned electrodes are applied, and at least one of the patterned electrodes comprises a first multiplicity of electrode elements overlapping the first multiplicity of the first grating elements and a second multiplicity of electrode elements overlapping the second multiplicity of the second grating elements.

In one embodiment, at least one of the first and second multiplicities of the grating elements have a diffraction efficiency that is spatially dependent.

In one embodiment, at least one of the first and second multiplicities of the grating elements have a diffraction efficiency that increases with distance along a length of the waveguide.

In one embodiment, within the at least one layer the grating elements have integer N1 different prescription interspersed in a first band, abutted to the left and right, in sequence, by bands containing elements of integer N2 different prescriptions where N1>N2, N3 different prescriptions where N2>N3, and integer N4 different prescriptions where N3>N4. In one embodiment, at least one of the first and second multiplicities of grating elements have 12 different prescriptions interspersed in a first band, abutted to the left and right, in sequence, by bands containing elements of 9 different prescriptions, 6 different prescriptions, and 1 prescription.

In one embodiment, each the FOV tile is configured to provide an image at infinity.

In one embodiment, each the FOV tile is configured to provide an image at a far point of the human eye.

In one embodiment, the holographic waveguide device comprises at least one of beam splitter lamina, a quarter wave plate, and a grating device for polarization recovery.

In one embodiment, the image modulated light from at least one grating element of a given prescription is present within an exit pupil region bounded by the instantaneous aperture of the human eye pupil. In one embodiment, the image modulate light from at least three grating elements of a given prescription is present.

In one embodiment, the FOV tiles abut in FOV space to form a rectangular FOV.

In one embodiment, the FOV tiles abut in FOV space to provide a continuous field of view.

In one embodiment, at least two the FOV tiles overlap.

In one embodiment, the FOV tiles abut to provide a FOV of approximately 40 degrees horizontally by 30 degrees vertically.

In one embodiment, the FOV tiles abut to provide a FOV of approximately 60 degrees horizontally by 30 degrees vertically.

In one embodiment, wherein the FOV tiles abut to provide a FOV of approximately 80 degrees horizontally by 80 degrees vertically.

In one embodiment, the input image node further comprises a despeckler.

In one embodiment, at least one of the first and second multiplicities of the grating elements are recorded in HPDLC.

In one embodiment, at least one of the first and second multiplicities of the grating elements are reverse mode SBGs.

In one embodiment, the holographic waveguide device is curved.

In one embodiment, at least one of the first and second multiplicities of grating elements have varying thickness.

In one embodiment, the holographic waveguide device comprises faceted sections abutting edge to edge.

In one embodiment, the holographic waveguide device comprises faceted sections abutting edge to edge and embedded in a plastic continuously curved volume.

In one embodiment, the holographic waveguide device comprises plastic.

In one embodiment, the holographic waveguide device is configured to provide exit pupil expansion in the first direction, and the beam expander is configured to provide exit pupil expansion in a second direction.

In one embodiment, the holographic waveguide device is configured to provide exit pupil expansion in the first direction, and the beam expander is configured to provide exit pupil expansion in a second direction that is orthogonal to the first direction.

In one embodiment, the beam expander further comprises: an input port for image modulated light from the input image node; an output port; and at least one waveguide layer configured to propagate light in a second direction. The at least one waveguide layer may comprise at least one grating lamina configured to extract the modulated light from a substrate along the second direction into the first direction through the output port.

In one embodiment, the beam expander further comprises at least one waveguide layer that comprises at least two grating lamina disposed adjacently.

In one embodiment, the beam expander further comprises at least one waveguide layer that comprises at least two overlapping grating lamina.

In one embodiment, the beam expander incorporates at least one of a beam splitter lamina, a quarter wave plate, and a grating device for polarization recovery.

In one embodiment, the first and second image modulated lights are presented sequentially.

In one embodiment, at least one of the first and second modulated image lights undergoes total internal reflection (TIR) within the waveguide device.

In one embodiment, the input image node comprises at least one of a microdisplay, a light source configured to illuminate the microdisplay, a processor for writing image data to the microdisplay, and a collimation lens, a relay lens, a beam splitter, and a magnification lens.

In one embodiment, the first and second multiplicities of the grating elements are tessellated in a predetermined pattern.

In one embodiment, the predetermined pattern is at least one of a periodic pattern, a non-periodic pattern, a self-similar pattern, a non-self-similar tiling pattern, and randomly distributed pattern. In one embodiment, a non-periodic pattern may be a Penrose tiling pattern. In another embodiment, a self-similar pattern may be a Penrose tiling pattern.

In one embodiment, all elements in the first or second multiplicities of grating elements are configured to be switched into a diffracting state simultaneously.

In one embodiment, at least one of the first and second multiplicities of the grating elements have at least one axis of symmetry.

In one embodiment, at least one of the first and second multiplicities of the grating elements have a shape that comprises at least one of a square, triangle and diamond.

In one embodiment, elements of the first multiplicity of grating elements have a first geometry and elements of the second multiplicity of grating elements have a second geometry.

In one embodiment, at least one of the first and second grating elements have at least two different geometries.

In one embodiment, all grating elements in the at least one the layer are optimized for one wavelength.

In one embodiment, at least one of the first and second grating elements in the at least one layer are optimised for at least two wavelengths.

In one embodiment, at least one of the first and second grating elements have multiplexed prescriptions optimized for at least two different wavelengths.

In one embodiment, at least one of the first and second grating elements have multiplexed prescriptions optimized for at least two different diffraction efficiency angular bandwidths.

In one embodiment, at least one of the first and second image modulated lights is collimated.

In one embodiment, at least one of the first and second image modulated lights is polarized.

In one embodiment, the apparatus may further comprise an illumination source comprising a laser providing light of at least one wavelength.

In one embodiment, the holographic waveguide device is configured to provide a transparent display.

Provided in some embodiments are devices comprising the apparatus as described herein. The device may be a part of a reflective display. The device may be a part of a stereoscopic display in which the first and second image modulated light provides left and right eye perspective views. The device may be a part of a real image forming display. The device may be a part of at least one of HMD, HUD, and HDD. The device may be a part of a contact lens.

In one embodiment, the input image node comprises at least one of a microdisplay, a light source configured to illuminate the microdisplay, a processor for writing image data to the microdisplay, and a collimation lens, a relay lens, a beam splitter and a magnification lens.

Provided in another embodiment is a method of displaying an image, the method comprising: (i) providing an apparatus comprising: an input image node and a holographic waveguide device comprising (M×N) interspersed multiplicities of grating elements, where M, N are integers; (ii) generating image modulated light (I,J) input image node corresponding to field of view (FOV) tile (I,J), for integers $1 \leq I \leq N$ and $1 \leq J \leq M$; (iii) switching grating elements of prescription matching FOV tile (I,J) to their diffracting states; (iv) illuminating grating elements of prescription matching FOV tile (I,J) with image modulated light (I,J); and (v) diffracting the image modulated light I, J into FOV tile I, J.

In one embodiment, the method may further comprise repeating (ii)-(v) until achieving full FOV tiled.

In one embodiment, the method may further comprise sampling the input image into a plurality of angular intervals, each of the plurality of angular intervals having an effective exit pupil that is a fraction of the size of the full pupil.

In one embodiment, the method may further comprise improving the displaying of the image by modifying at least one of the following of the at least one grating lamina of at least one of the first and second optical substrates: grating thickness, refractive index modulation, k-vector, surface grating period, and hologram-substrate index difference.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

At least some embodiments provided herein overcome the challenges of tiling large FOVs using a multiplicity of different grating prescriptions in a waveguide HMD of the type disclosed in U.S. Pat. No. 8,233,204. In one embodiment, grating angular bandwidth constraints could limit the size of FOV tiles to around 10°×10° leading to unmanageably large grating stacks as the number of vertical and horizontal FOV tiles increased. Attempting full color would increase the number of layers by a factor of 3.

One important feature of the embodiments described herein is that instead of stacking gratings of different prescriptions, they are chopped up into small elements which are then interspersed into tessellation patterns in one or more overlapping layers.

One embodiment of a tessellated display may comprise an Input Image Node (IIN); a first beam expander waveguide (usually vertical); and a second beam expander waveguide (usually horizontal) which also serves as an eyepiece. In one embodiment, the eyepiece combines the tessellation and beam expansion functions. Each waveguide may contain input and output Bragg gratings. Each of the waveguides may comprise more than one grating layer. In color embodiments, a separate monochromatic waveguide may be used for each primary color. Another option for providing color is to record multiplexed gratings, in which holograms with different color prescriptions are superimposed, into a waveguide. Multiplexing may also be used to combine gratings of different angular bandwidth.

Many different tessellation schemes are possible including periodic (i.e., invariant under lateral displacement), non-periodic, self similar and random schemes. The patterns may be designed to provide more detail in near the centre FOV. Embodiments provided herein encompass passive or switchable tessellation solutions and include hybrid solutions that combine passive and switchable elements.

In one embodiment, rays diffracted from each tessellation element form a footprint in the exit pupil. Typically, there must be at least two such footprints within an instantaneous eye pupil area. The precise number will depend on factors such as tessellation size and shape. In one embodiment, tessellation may present significant design and fabrication challenges. The tiny (few millimetre) grating elements result in resolution loss and illumination ripple, both of which have proved difficult to correct. The holographic recording and electrode patterning of tessellated holographic arrays may be difficult with current processes. These challenges may be overcome by using the passive grating elements. In one embodiment, bandwidth may be increased in the tangential plane by making gratings thinner, while broad bandwidth in the orthogonal, sagittal, plane may be achieved. Tessellation may offer a route to larger FOVs if the above design and fabrications problems can be solved. A FOV of 80°×80° in color is a reasonable goal.

One embodiment uses separate vertical and horizontal beam expansion waveguides to provide an enlarged exit pupil (or eye box). In one embodiment, collimated image light from the IIN is fed into the first beam expansion waveguide with a FOV defined by the microdisplay and collimating optics. One embodiment allows the input or "coupling" optics to be configured in many different ways ranging from classical optical lens-mirror designs to more compact designs based entirely on diffractive (holographic) optics. One embodiment may be implemented using all-passive gratings (although the use of switchable gratings is preferred for large FOVs). Conventional passive gratings would not work. One benefit of using passive SBGs is that the refractive index modulation of the grating can be tuned from very low to very high values with a correspondingly broad range of diffraction efficiencies. The high index modulation of SBGs results from the alternating bands of polymer-rich and LC-rich regions that form the Bragg fringes. Alternatively, active gratings may also be used, wherein the active gratings may be tuned from very low to very high values with a correspondingly broad range of diffraction efficiencies.

The vertical and horizontal beam expanders may be based on lossy waveguides; that is, ones designed to extract light out of the waveguide uniformly along its length. As demonstrated in U.S. application Ser. No. 13/844,456, filed Mar. 15, 2013, this may be achieved by varying the thickness (and modulation) across the grating. In one embodiment, in its simplest case this entails creating a wedged grating (by inclining the cell walls) such that the hologram thickness increases in the direction of propagation. Generally, the grating thickness may vary from 1.0-1.2 microns up to 2.8-3.0 microns, the lower thickness producing the lowest efficiency (and largest angular bandwidth). Some embodiments may allow more sophisticated control of extraction by varying the thickness in orthogonal directions, using two wedge angles, or in a more general fashion by applying curvature to one or both faces of the grating.

In one embodiment, beam expansion gratings are very thin (well below 3 microns), which results in very broad diffraction efficiency angular bandwidth which, in turn. By optimising thickness and refractive index modulation it is possible to meet all of the desired grating characteristics needed in the display—e.g., very high efficiency for coupling into gratings and large dynamic range for the efficient, uniform extraction needed for beam expansion.

Image sampling can be used to enhance image transfer efficiency and form factor. Coupling wide FOV image light into a waveguide would normally result in some loss of image angular content owing to the limited range of angles that can be efficiently propagated down a waveguide. Some of this light may couple out of the waveguide. At least some embodiments described herein may overcome this challenge by sampling the input image into multiple angular intervals, each of which has an effective exit pupil that is a fraction of the size of the full pupil, the thickness of the waveguide being reduced correspondingly.

One feature of the embodiments provided herein is the possibility of combining fixed frequency surface gratings at the input and output of each waveguide with rolled k-vectors. The surface grating may be intersection of the Bragg fringes with the substrate edge and accounts (approximately) for the basic ray optics of the waveguide. The k-vector is the direction normal to the Bragg grating and accounts for the diffraction efficiency vs. angle characteristics of the grating. By varying the k-vector direction along the waveguide propagation direction (k-vector rolling), it is possible to, firstly, provide efficient coupling of image light into the waveguide and, secondly, ensure that once coupled-in, all of the desired angular content is transmitted down the waveguide with high efficiency. The k-vector rolling would desirably be augmented by grating thickness control as discussed above.

In general the propagation of angular content down the waveguides can be optimized by fine tuning of one or more of the following: grating thickness; refractive index modulation; k-vector rolling; surface grating period; and the hologram-substrate index difference. The tessellation pattern may include infrared sensitive elements for implementing a waveguide eye tracker.

SBG Device

One way to create a much larger field of view is to parse it into a set of smaller fields of view (each compatible with the optical limitations of the waveguide) and to (time) sequentially display them rapidly enough that the eye perceives them as a unified wide-angle display. One way to do this is by using holographic elements that can be sequentially switched on and off very rapidly. One desirable solution to providing such switchable holographic elements is a device knows as a Switchable Bragg Grating (SBG).

The optical design benefits of diffractive optical elements (DOEs) include unique and efficient form factors and the ability to encode complex optical functions such as optical power and diffusion into thin layers. Bragg gratings (also commonly termed volume phase gratings or holograms), which offer high diffraction efficiencies, have been widely used in devices such as Head Up Displays. An important class of Bragg grating devices is known as a Switchable Bragg Grating (SBG). SBG is a diffractive device formed by recording a volume phase grating, or hologram, in a polymer dispersed liquid crystal (PDLC) mixture. Typically, SBG devices are fabricated by first placing a thin film of a mixture of photopolymerizable monomers and liquid crystal material between parallel glass plates or substrates. One or both glass substrates support electrodes, including for example transparent indium tin oxide films, for applying an electric field across the PDLC layer. A volume phase grating is then recorded by illuminating the liquid material with two mutually coherent laser beams, which interfere to form the desired grating structure. During the recording process, the monomers polymerize and the HPDLC mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting volume phase grating can exhibit very high diffraction efficiency, which may be controlled by the magnitude of the electric field applied across the PDLC layer. When an electric field is applied to the hologram via transparent electrodes, the natural orientation of the LC droplets is changed causing the refractive index modulation of the fringes to reduce and the hologram diffraction efficiency to drop to very low levels. Note that the diffraction efficiency of the device can be adjusted, by, for example, the applied voltage over a continuous range from near 100% efficiency with no voltage applied to essentially zero efficiency with a sufficiently high voltage applied.

SBGs may be used to provide transmission or reflection gratings for free space applications. SBGs may be implemented as waveguide devices in which the HPDLC forms either the waveguide core or an evanescently coupled layer in proximity to the waveguide. In one particular configuration to be referred to here as Substrate Guided Optics (SGO) the parallel glass plates used to form the HPDLC cell provide a total internal reflection (TIR) light guiding structure. Light is "coupled" out of the SBG when the switchable grating diffracts the light at an angle beyond the TIR condition. SGOs are currently of interest in a range of display and sensor applications. Although much of the earlier work on HPDLC has been directed at reflection holograms transmission devices are proving to be much more versatile as optical system building blocks.

The HPDLC used in SBGs may comprise liquid crystal (LC), monomers, photoinitiator dyes, and coinitiators. The mixture may include a surfactant. The patent and scientific literature contains many examples of material systems and processes that may be used to fabricate SBGs. Two fundamental patents are: U.S. Pat. No. 5,942,157 by Sutherland, and U.S. Pat. No. 5,751,452 by Tanaka et al. both filings describe monomer and liquid crystal material combinations suitable for fabricating SBG devices.

One of the known attributes of transmission SBGs is that the LC molecules tend to align normal to the grating fringe planes. The effect of the LC molecule alignment is that transmission SBGs efficiently diffract P polarized light (i.e., light with the polarization vector in the plane of incidence) but have nearly zero diffraction efficiency for S polarized light (i.e., light with the polarization vector normal to the plane of incidence. A glass light guide in air will propagate light by total internal reflection if the internal incidence angle is greater than about 42 degrees. Thus, typically the embodiments using transmission SBGs described herein will use SBGs design to diffract input P-polarized light entering the waveguide into TIR angles of about 42 to about 70 degrees, or diffract TIR light at said angles into output light paths.

Normally SBGs diffract when no voltage is applied and are switching into their optically passive state when a voltage is application other times. However SBGs can be designed to operate in reverse mode such that they diffract when a voltage is applied and remain optically passive at all other times. Methods for fabricating reverse mode SBGs may be any suitable methods, such as for example those disclosed in PCT/GB2012/000680 by Popovich et al. The same reference also discloses how SBGs may be fabricated using flexible plastic substrates to provide the benefits of improved ruggedness, reduce weight and safety in near eye applications.

The invention will now be further described by way of example only with reference to the accompanying drawings. It will be apparent to those skilled in the art that the present invention may be practiced with some or all of the present invention as disclosed in the following description. For the purposes of explaining the invention well-known features of optical technology known to those skilled in the art of optical design and visual displays have been omitted or simplified in order not to obscure the basic principles of the invention. Unless otherwise stated the term "on-axis" in relation to a ray or a beam direction refers to propagation parallel to an axis normal to the surfaces of the optical components described in relation to the invention. In the following description the terms light, ray, beam and direction may be used interchangeably and in association with each other to indicate the direction of propagation of light energy along rectilinear trajectories. Parts of the following description will be presented using terminology commonly employed by those skilled in the art of optical design. It should also be noted that in the following description repeated usage of the phrase "in one embodiment" does not necessarily refer to the same embodiment.

One important feature of the embodiments provided herein is the realization that one way to create a much larger field of view is to parse it into a set of smaller fields of view (each compatible with the optical limitations of the waveguide) and to (time) sequentially display them so fast that the eye perceives them as a unified image.

One way to do this is with holographic elements that can be sequentially switched on and off very rapidly. U.S. Provisional Patent Application No. 61/687,436, filed 25 Apr. 2012, shows that multiple SBGs can be stacked together in the same waveguide and activated in rapid succession to time-sequentially tile a high-resolution, ultra-wide-field of view. Moreover, each subfield of view has the full digital resolution of the associated imager, allowing the formation of images that approach or even exceed the visual acuity limit of the human eye.

While the tiling disclosed in this earlier filing overcomes the twin deficiencies of standard guided-wave architectures (i.e., limited field of view and limited pixel resolution), it has limitations when it is necessary to tile vertically and horizontally over large fields of view. For monochrome displays with modest FOV and expansion in only one direction, tiling can be accomplished by simply stacking the grating planes. However, when the field of view is expanded in both directions and color is added, the number of layers needed with this approach quickly becomes impractical. For example, consider FIG. 1 which shows is a schematic illustration of a beam defection system for providing a display. The display is based on the principle of using a stack 1 of electrically switchable gratings SBGs to deflect input light 100 from an image generator 2 into FOV regions or tiles. In one embodiment, each SBG is essentially a planar grating beam deflector that deflects incident TIR light into output light forming a unique FOV tile. The SBG elements 10A-10D provide a first row of four FOV tiles, elements 11A-11D provide a second row of four FOV tiles, and elements 12A-12D provide a third row of four FOV tiles, Advantageously, the image light is collimated and may be delivered to the SBG stack by, for example, a light guide or Substrate Guided Optics. The substrates used to containing the SBGs may provide the light-guiding substrate. FIG. 2 shows how a horizontal field of view can be generated using 4 SBGs 10A-10D configured in four separate layers. One input SBG is to provide for directing input image light from the image generator into a TIR path. The input image generator may comprise a laser module, microdisplay and optics for collimation and beam expansion. The output SBGs may be staggered horizontally to provide image continuity in FOV space. FIG. 2 shows the limiting rays in one plane for the SBG group 3 corresponding to one row of FOV tiles 10A-10D. The limiting rays 101A-101D and the maximum angular extent θ1 relative to the normal 102, 103 the display are shown. The rays define the exit pupil 104.

In one embodiment, each subfield of view is limited by the diffraction efficiency and angular bandwidth of the SBG. SBG grating devices may have angular bandwidths in air of approximately ±5° (subject to material properties, index modulation beam geometry and thickness). In one embodiment, larger angles can be achieved in practice by using thinner SBGs. In one embodiment the SBG may have a thickness less than or equal to about 4 µm—e.g., less than or equal to about 3.5 µm, 3 µm, 2.5 µm, 2 µm, 1.5 µm, 1 µm, 0.5 µm or smaller. The increased bandwidth resulting from thinner SBGs may result in lower peak diffraction efficient. In one embodiment, it may be desired to increase the refractive indeed modulation.

In one embodiment, the top SBG 10A provides a field of view of −20° to −10°; the next SBG 10B provides the field of view −10° to 0°; the next SBG 10C provides the field of view 0° to 10°; the and the lower SBG 10D provides the field of view 10° to 20°; one provides the right 20°. Each output put FOV provides a FOV tile of horizontal extent 10 degrees and a vertical extent set by the input collimation optics and the waveguide limitations typically 10 degrees. When the SBG elements are rapidly displayed in sequence (SBGs have a switching speed of as little as, for example, 35 microseconds), the eye integrates the separate optical outputs, and a 40° horizontal field of view by 10 degree vertical field of view is perceived. Each time a new output SBG is activated the input image generator generally indicated by 2 is update with a new digital image. In one embodiment, the input image generator provides an image of approximately 1000 pixels horizontal by 800 pixels vertical resolution. Hence the complete perceived image has a resolution of 4000×800 pixels. The tiles may abut in FOV space through the exit pupil defined by the overlapping light rays from the SBG layers. A HMD based on the above principles is disclosed in a PCT Application No.: PCT/GB2010/000835 with International Filing Date: 26 Apr. 2010 by the present inventors entitled COMPACT HOLOGRAPHIC EDGE ILLUMINATED EYEGLASS DISPLAY (and also referenced by the Applicant's docket number SBG073PCT) which is incorporated by reference herein in its entirety.

Figure 2:
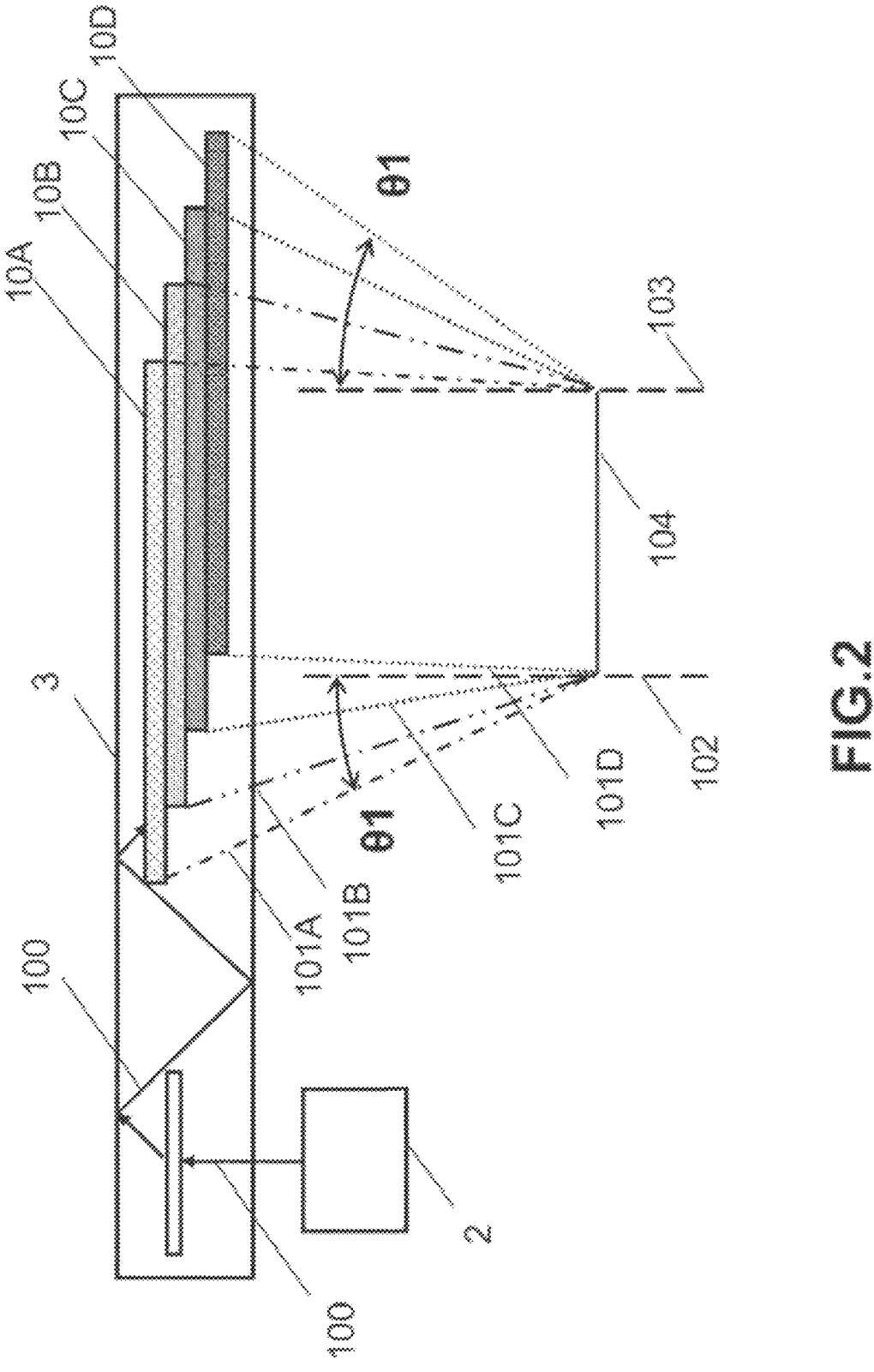
FIG. 2 is a schematic cross section view of a waveguide display in one embodiment using stacked gratings indicating the FOV provided by each grating.

The stacking approach shown in FIG. 1 may be suitable for relatively modest FOV. In one embodiment, horizontal field of view of around 60 degrees by 10 degree vertical is feasible. As the field of view increases, the number of SBG layers needed becomes impractical: six layers is the current practical limit before the performance of the display is compromised by scatter, absorption, and other optical losses. If additional layers for blue and green are added as schematically indicated by 13, 14, the number of tiles would be increased by ×3.

One method to avoid using separate RGB SBGs is to use multiplexed SBGs, in which the illumination is provided from opposite ends of the lightguide as R and B/G illumination, compromising the color gamut somewhat. However, multiplexed gratings raise issues of fabrication complexity and cross talk.

One benefit of the embodiments described herein is minimizing the need for very large numbers of SBG layers. One embodiment provides compressing the stack by interlacing the SBGs, as shown in FIG. 3, as opposed to simply stacking the gratings, as illustrated in FIGS. 1-2. Referring to the simple stacking scheme discussed above (inset), it can be seen that the optical process which would ordinarily need a stack of four holographic planes to produce one color channel can be accomplished with a single layer of interleaved gratings. Note that in FIGS. 1-3, the shading patterns of the holograms is merely for the purposes of distinguish the four different types and does not represent the geometry of the gratings.

Figure 3A:
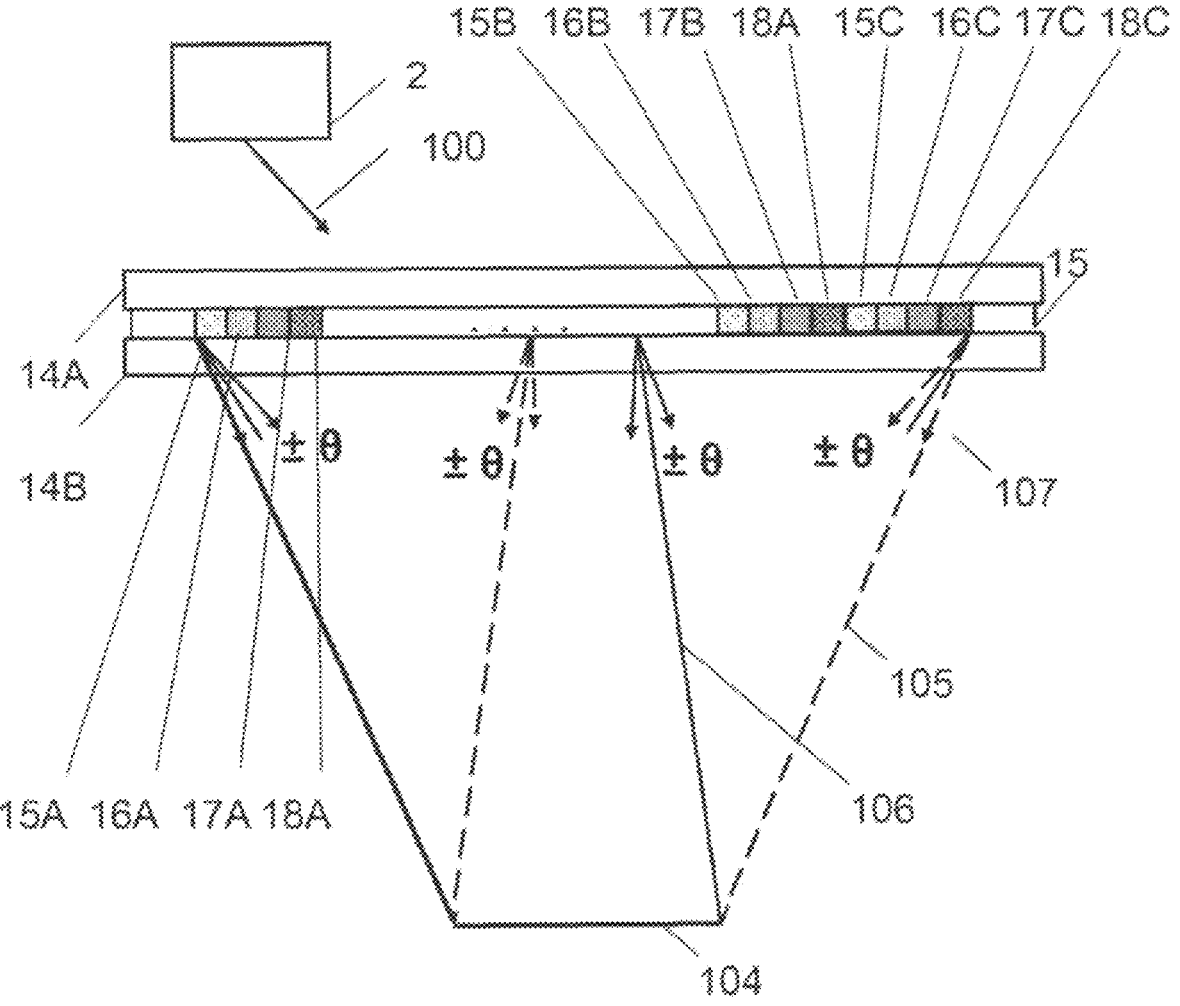
FIG. 3A is a schematic cross section view of a tessellated waveguide display in one embodiment showing a detail of the tessellation pattern.

Turning first to the schematic side elevation view of FIG. 3A, there is provided an apparatus for displaying an image comprising a multiplicity of groups of selectively switchable beam deflecting elements. In a preferred embodiment, the beam deflectors are SBGs having a first diffracting state and a second diffracting state. The first diffracting state may exhibit high diffraction efficiency and the second diffraction state may exhibit low diffraction efficiency.

In one embodiment, the SBGs may operate in reverse mode such that they diffract when a voltage is applied and remain optically passive at all other times. The SBGs may be implemented as continuous SBG lamina separated by thin (as thin as 100 microns) substrate layers. In one embodiment, the substrate may comprise plastic. In one embodiment the substrate may comprise plastic substrates with transmissive conductive coatings (instead of ITO).

For simplicity four groups of SBG elements indicated by the numerals 15-18 are illustrated, each group comprising four elements labelled by the characters A-D. The repetition of the pattern of SBG elements is indicated by the dotted line. The number of groups of beam deflecting elements or the number of elements per group is not limited. The elements are forming in a thin HPDLC grating lamina 15 sandwiched by the transparent substrates 14A, 14B. Transparent electrodes are applied to opposing faces of the substrates with at least one of the electrodes being patterned to overlap the SBG elements.

Figure 3B:
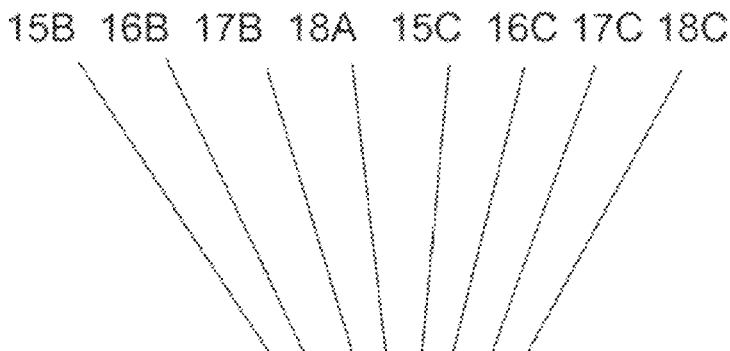
FIG. 3B is a schematic cross section view of a tessellated waveguide display in one embodiment showing a detail of the tessellation pattern in which the grating elements are uniformly interspersed.
Figure 3C:
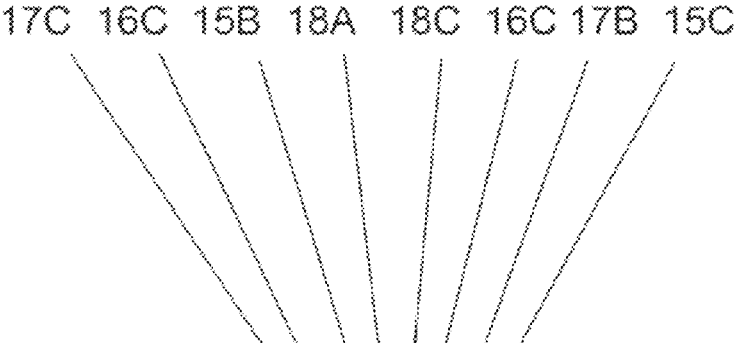
FIG. 3C is a schematic cross section view of a tessellated waveguide display in one embodiment showing a detail of the tessellation pattern in which the grating elements are randomly interspersed.
Figure 4:
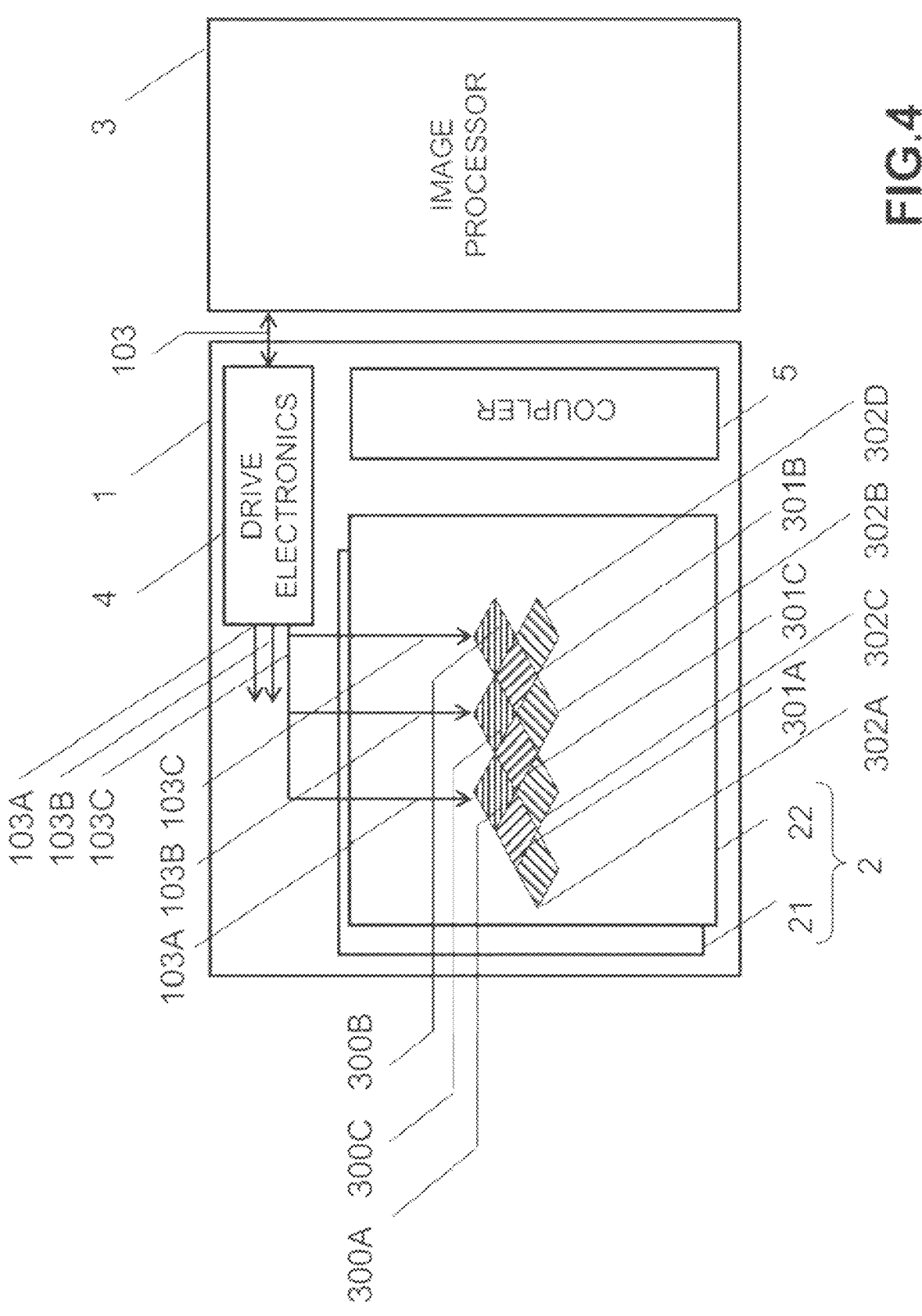
FIG. 4 is a schematic front elevation view of the function elements of a tessellated waveguide display in one embodiment.

An input image generator, which will be described in more detail later, provides collimated image light generally indicated by 100. Each group of beam deflecting elements diffracts image light into a multiplicity of rays providing a set of FOV tiles. Elements corresponding to a given tile will have a unique grating prescription. The rays may define an exit pupil according to geometrical optical principles. The limiting rays from the group 15 and 18 in the projection of the drawing are indicated by 107, 108. Each element has a diffraction efficiency angular bandwidth ±θ. Comparing FIG. 3 with FIG. 2, it should be apparent that the embodiment of FIG. 3 is equivalent to interspersing the SBG layers shown in FIG. 2 within a single SBG lamina. In one embodiment, the first multiplicity of beam deflecting elements and the second multiplicity of beam deflecting elements are uniformly interspersed a shown in FIG. 3B. In one embodiment, the first multiplicity of beam deflecting elements and the second of multiplicity beam deflecting elements are randomly interspersed as shown in FIG. 3C.

FIG. 3 shows the principles of an HMD. A display based on the above principles may comprise two sub systems: a color waveguide (which herein also refers to a DigiLens) and a device configured to inject an input image into the color waveguide (also referred herein to an Image Injection Node).

Figure 5:
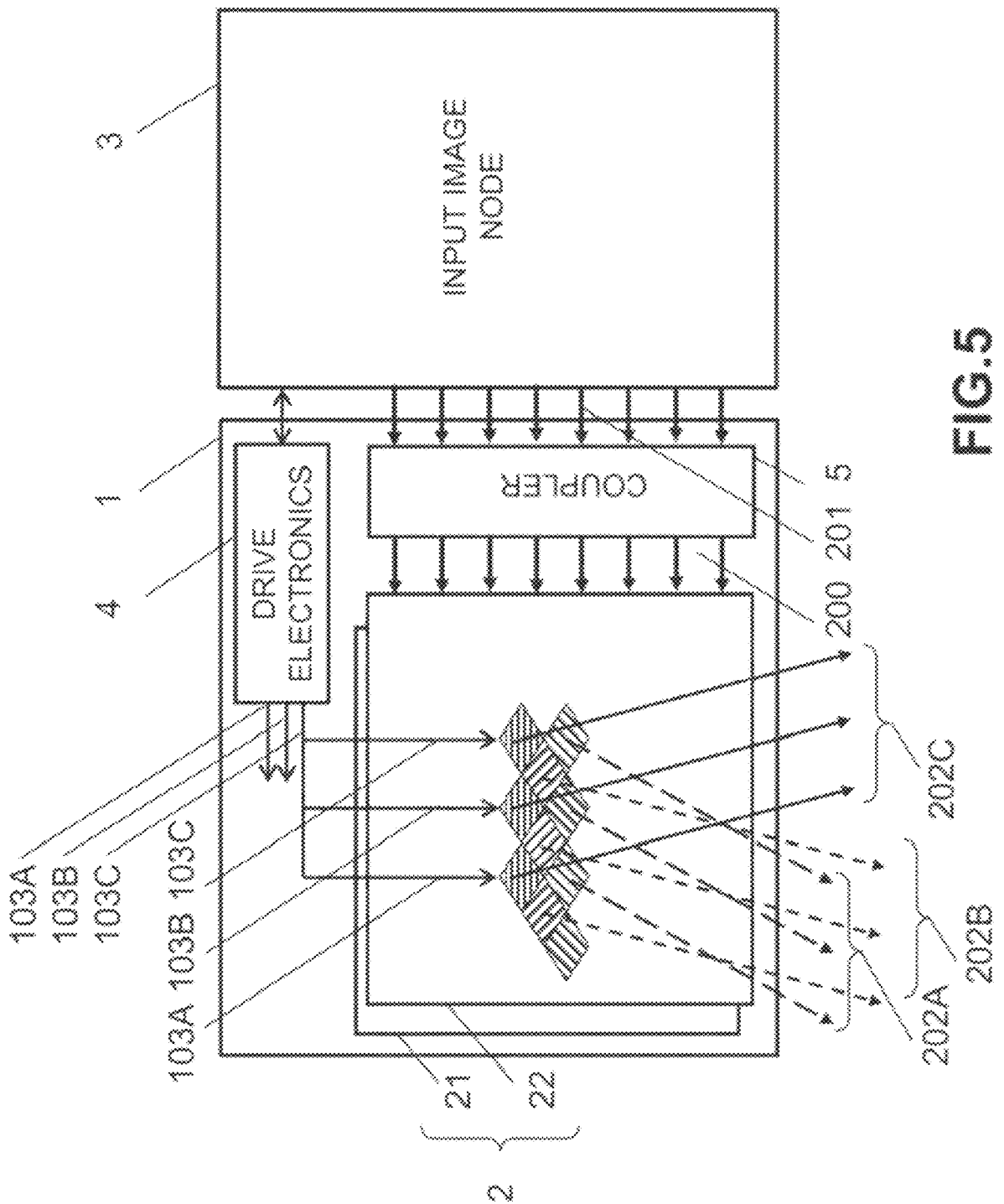
FIG. 5 is a schematic front elevation view of a tessellated waveguide display in one operational state in one embodiment.

The basic principles of the display in one embodiment are illustrated in more detail using the front elevation views of FIGS. 4-7. In a color display, the DigiLens comprises a stack of three separate RGB waveguides each providing a red, green or blue color imaging channel. In one embodiment, each waveguide is further divided into two holographic layers (to be referred to as a doublet). In one embodiment, the description will assume double layers unless stated otherwise. Hence in FIG. 4 the DigiLens 2 comprises the doublet further comprising layers 21, 22. The apparatus further comprises the IIN 3, DigiLens drive electronics 4, and a coupler for admitting light from the IIN into the DigiLens. The IIN and the DigiLens drive electronics are connected by the communication link 103. Each SBG layer contains arrays of SBGs comprising sets of sub arrays, where the members of any given sub array have one of a predefined set of optical prescriptions, each prescription corresponding to a unique FOV tile. The number of SBG prescriptions equals the number of FOV tiles. In some embodiments, a prescription defines the Bragg grating geometry needed to deflect incident TIR input light from the IIN into output light that defines a FOV tile. For simplicity three sub arrays of SBG elements indicated by the numerals 200-202 are illustrated. Three elements of each sub array are illustrated labelled by the characters A-C. The drive electronics provides voltage outputs 103A-103C. The connections 104A-104C to the SBG elements 300A-300C is shown. The distribution of the array elements depends on the FOV tile with, for example, FOV tiles near the central region of the FOV needing that the corresponding SBG elements are distributed near the center of the DigiLens. The spatial configuration of the array elements will be discussed in more detail later. FIG. 5 shows input collimated image light 200 from the IIN being coupled into the DigiLens to provide the collimated image light 201 at the input to the waveguide 2. Typical collimated output beams from the waveguide for the SBG sub arrays 200-202 are generally indicated by 202A-202C.

In one embodiment, the SBGs operate in reverse mode such that they diffract when a voltage is applied and remain optically passive at all other times.

The SBGs may be implemented as continuous SBG lamina separated by thin substrate layers (as thin as 100 microns) as shown. This is a planar monolithic design harnessing the full assets of narrow band laser illumination with monolithic holographic optics. The motivation for configuring the SBGs as monochromatic layers is to enable the use of holographic optics and SBG beam splitter to provide a flat, solid state, precision-aligned display, minimizing the need for bulky refractive optics. In one embodiment, the resolution of the display is only limited by that of the microdisplay. The design is scalable to a larger FOV by interlacing more tiles in each layer and/or adding new layers. Likewise the pupil, eye-relief and FOV aspect ratio can be tailored to suit the application.

Figure 6:
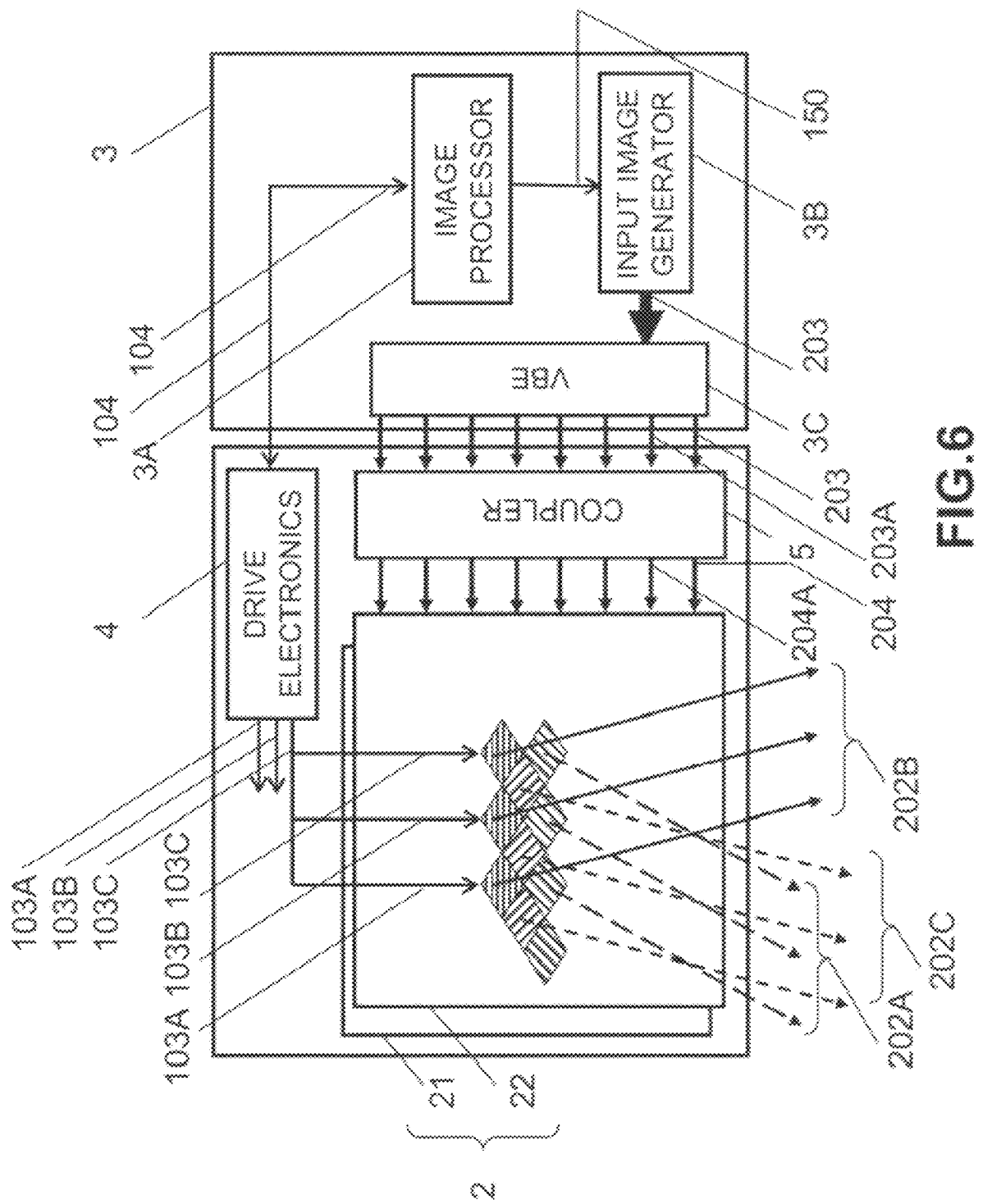
FIG. 6 is a schematic front elevation view of a tessellated waveguide display showing details of the Input Image Node in one embodiment.
Figure 7:
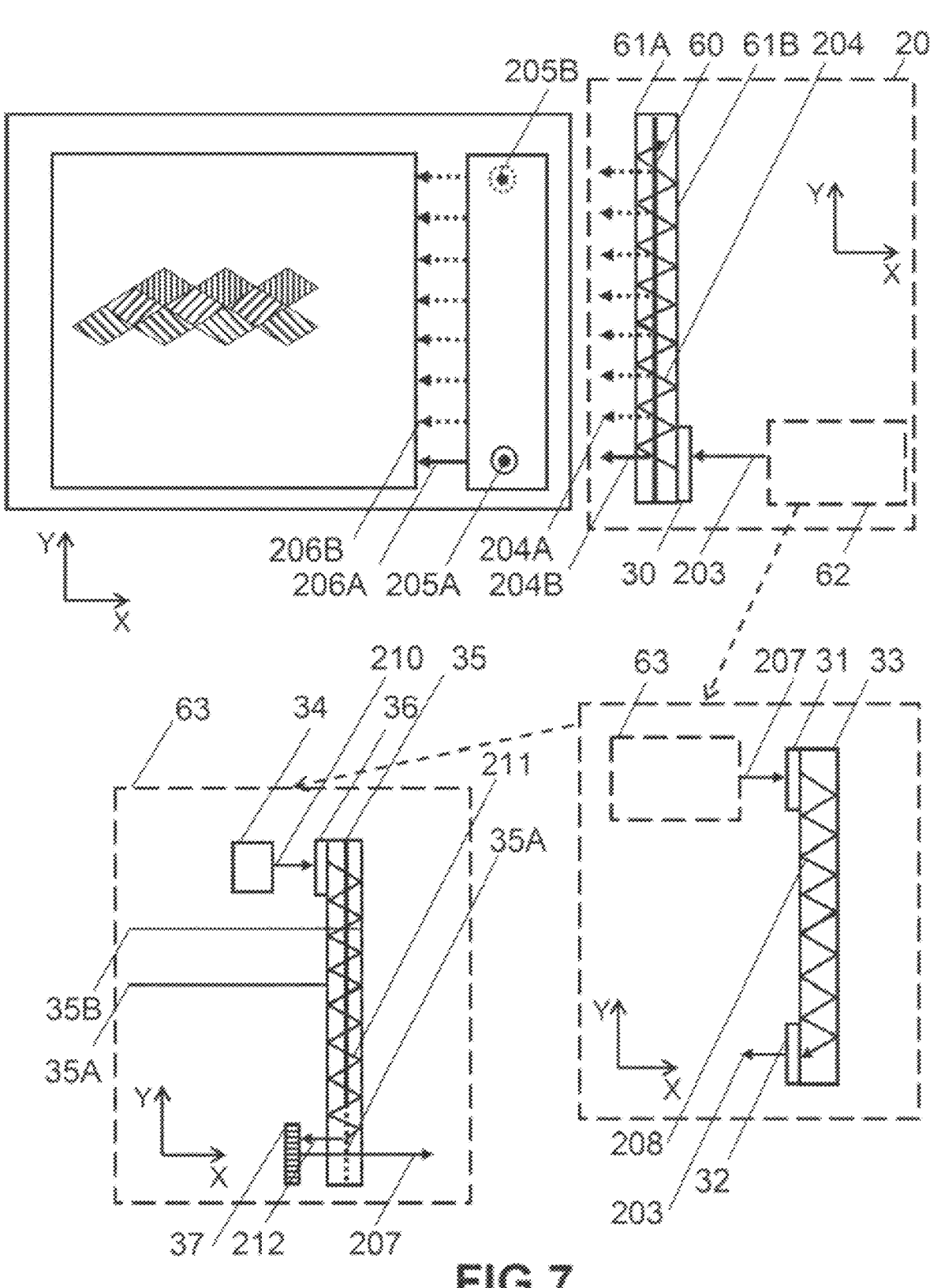
FIG. 7 illustrates the operation of the Input Image Node in one embodiment.

FIG. 6 shows the IIN in more detail in one embodiment. The role of IIN is to form a digital image, collimate it, and inject it into the DigiLens. Two separate optical subsystems may be employed: one to illuminate the microdisplay and one to collimate the image. The IIN may comprise an image processor 3A, input image generator 3B, and a vertical beam expander (VBE) 3C. The image processor provides image data to the input image generator via the communication link 150. The image processor also controls the switching of the SBG elements in the DigiLens by means of an electronic link to the DigiLens drive electronics. The input image generator, which will be discussed in more detail in the following description, may comprise a laser module and microdisplay. Collimated image light 203 from the input generator is coupled into the beam expander 3C, which is itself optically connected to the coupler 5. FIG. 7 illustrates the operation of the IIN in further detail concentrating on the input image generator and the VBE and referring to the XYZ orthogonal coordinate axes provided in the drawings. The front elevation view corresponds to the YX plane, and the Y axes refer to the vertical direction as perceived by the viewer of the display.

The VBE comprises a SBG 60 sandwiched by substrates 61A, 61B. Image light from the image generator undergoes TIR, as indicated by 204 within the waveguide formed by the substrates. The VBE is designed to be lossy. In other words, the diffraction efficiency of the grating is low at the end nearest the image generator and highest at the furthest extremity. One effect is that it couples light, such as 204A, 204B, out towards the couple 5 along its entire length providing a vertical beam expansion (in the Y direction) to match the height of the DigiLens waveguide. Image light may be coupled into the VBE by a grating coupler 31A. Referring to the drawing inset 62, there is further holographic objective 31 and a holographic field lens 32 both optically connected to light guiding device 33. Image light from the microdisplay 207 is admitted to the light bide via the holographic objective and follows the TIR path 208 until it is directed out of the light guide into the VBE by the holographic objective 32 as output light 203. In one embodiment, the light guide 33 includes inclined surfaces at each end. The drawing inset 63 shows the configuration of the laser module and microdisplay. The illumination of the microdisplay 37 may be performed using a diode laser 34, a waveguide, and a SBG beam splitter. The SBG beam splitter may be formed as lamina 36 sandwiched between transparent substrates 35A, 35B forming the waveguide. A slanted SBG grating is recorded in the portion of the lamina 35A overlapping the microdisplay. Collimated P-polarised light 210 from the laser module is admitted into the waveguide by a coupler 36. The coupler may be a prism. In some embodiments, the coupler may be a grating device. The coupled light follows the TIR path 211 up the SBG beam splitter, where according to the properties of SBGs the P-polarised light is diffracted towards the microdisplay. On reflection the light becomes S-polarized and passes through the SBG beam splitter without substantial loss or deviation to emerge from the waveguide as the collimated image light 207.

It should be apparent to those skilled in the art of optical design that many alternative optical configurations and components may be used to provide an IIN according to the principles described herein.

For example, the reflective microdisplay could be replaced by a transmissive device. Alternatively, an emissive display may be used. It should also be apparent that components such as anamorphic lenses and light shaping diffusing elements may be used in certain applications to control image aspect ration and illumination uniformity. The apparatus may further include a despeckler. The IIN may comprise, or be, a diffractive optical device. The processes carried out by the IIN, as employed in pre-existing techniques, may use several refractive lenses, a polarizing beam splitter cube, and a precision housing for aligning and assembling the various components. Not only are the piece parts expensive, but the touch labor is excessive. In addition, the whole assembly is difficult to ruggedize and, in the end, heavy and bulky. Miniaturized components can reduce size and weight, but they also sharply increase component costs and assembly time.

It should further be apparent that the description of the IIN has referred to just one monochromatic microdisplay. In a color display the IIN optical components would need to be replicated for each color. Since the optical design uses substrate guided optics and diffractive optical elements, the combination of the red green and blue channels in one embodiment can be accomplished within a very compact form factor that is only limited by the size of the microdisplay and laser module and the overall system design needs.

The interlacing of the SBG elements in the DigiLens may be carried out in many different ways. For example, the interlaced gratings in the embodiment of FIG. 1 may be configured in the fashion of a Venetian blind (as disclosed in Provisional Patent Application No. 61/627,202 by the present inventors). However, the MTF associated with such geometry has notches in it at spatial frequencies traceable to the periodic nature of the interleaving. In one embodiment, introducing a complex tessellation of gratings, this deficiency can be rectified. "Tessellation" in at least some embodiments herein is defined as the process of creating a two-dimensional surface pattern using the repetition of a geometric shape with no overlaps and no gaps. However, it should be noted that the tessellation pattern is not limited to diamond shaped tessellation patterns of the type illustrated in FIG. 4-7. It will be appreciated that patterns based on squares, rectangles, triangles may be used. While a regular patterning is implied in the drawings, it may be advantageous in certain cases to have a randomly distributed pattern.

Figures 8A, 8B, 8C, 8D:
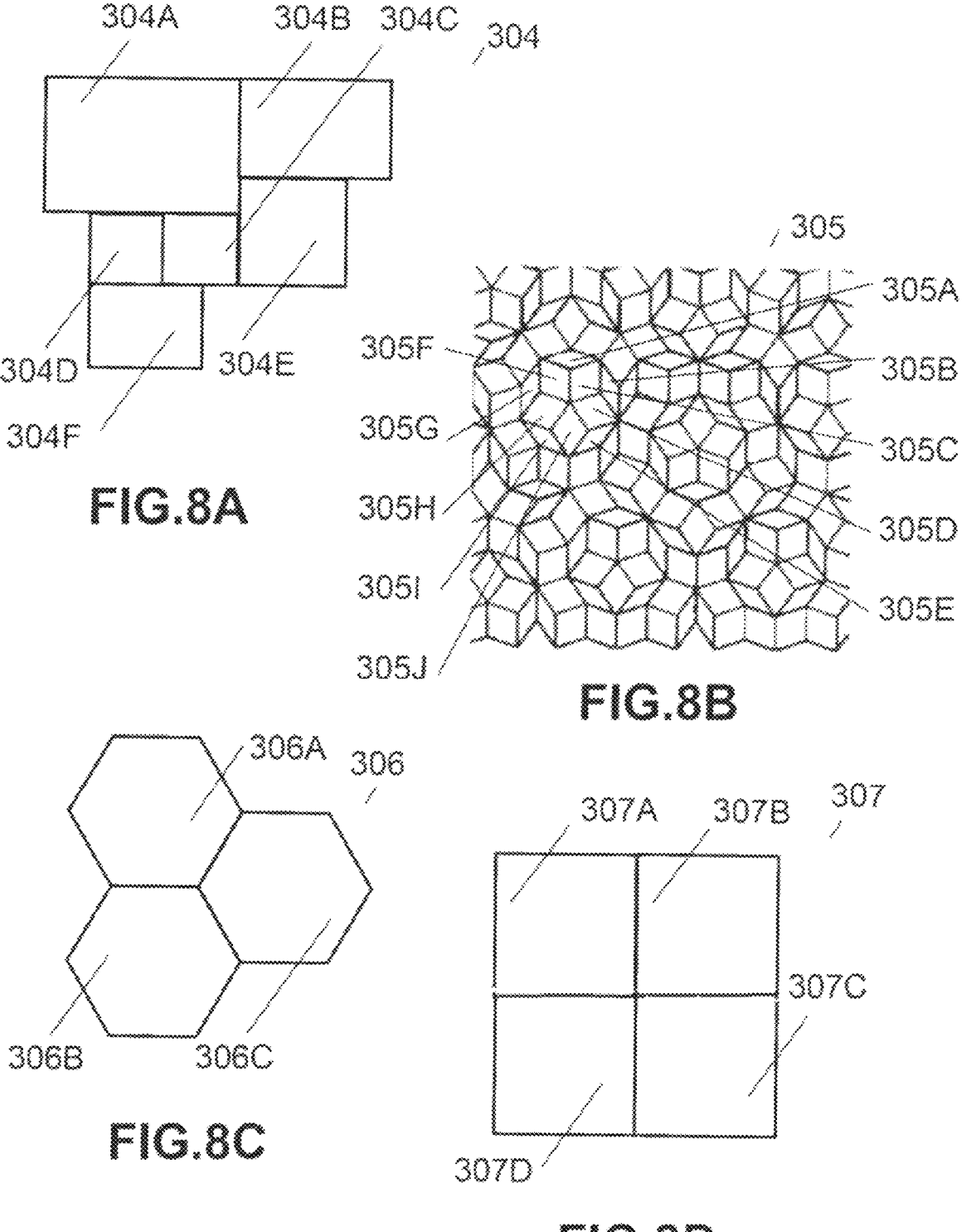
FIG. 8A is a tessellation pattern comprising rectangular elements of differing size and aspect ratio in one embodiment.
FIG. 8B is a tessellation pattern comprising Penrose tiles in one embodiment.
FIG. 8C is a tessellation pattern comprising hexagons in one embodiment.
FIG. 8D is a tessellation pattern comprising squares in one embodiment.
Figure 9A:
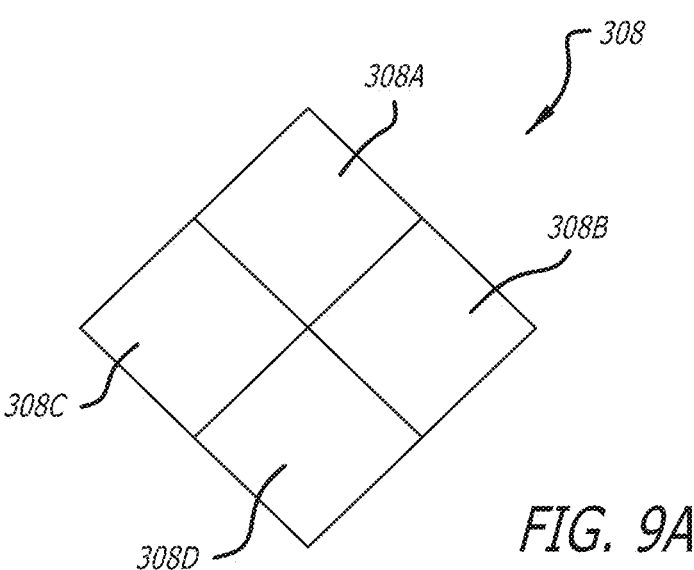
FIG. 9A is a tessellation pattern comprising diamond-shaped elements in one embodiment.
Figure 9B:
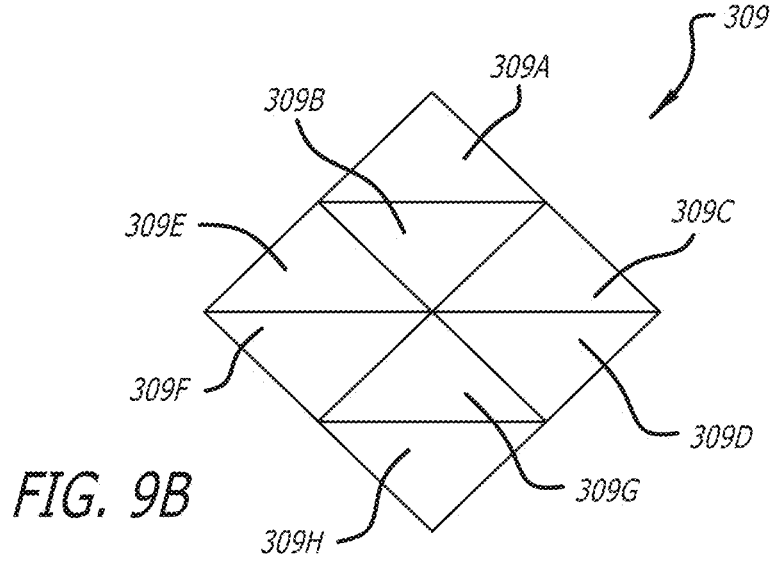
FIG. 9B is a tessellation pattern comprising isosceles triangles in one embodiment.

In one embodiment, it may also be possible to use elements of different sizes and geometries in a given pattern. Many possible schemes exist. The elements may have vertically or horizontally biased aspect ratios. In one embodiment, a broader horizontal aspect ratio results in a better horizontal resolution. As will be shown below 1.38 mm.×0.8 mm, diamonds give acceptable resolution. Since there is not expected to be any benefit in having better horizontal resolution than vertical, it may even be adequate to use 1 mm squares (side on), rather than diamonds. For the purposes of mere illustration, the description refers to tessellated tiling based on diamond shaped or square-shaped elements. In one embodiment of tessellated patterns, there will be a small gap to allow for electrode addressing circuitry, as will be discussed later. Examples of SBG element patterning are illustrated in FIGS. 8-10. FIG. 8A shows a tiling pattern 304 comprising rectangular shapes 304A-304F having a multiplicity of vertical and horizontal dimensions. FIG. 8B shows a tiling pattern 305 known as Penrose tiling comprising elements 305A-305J. FIG. 8C shows a tiling pattern 306 based on regular hexagons comprising elements 306A-306C. FIG. 8D shows a tiling pattern 306 based on squares comprising elements 307A-306D. FIG. 9A shows a tiling pattern 308 based on diamond shapes comprising elements 308A-308D. FIG. 9B shows a tiling pattern 309 based on isosceles triangle shapes comprising elements 309A-309D. FIG. 10A shows a tiling pattern 310 based on horizontally elongated hexagons comprising elements 310A-310C. FIG. 10B shows a tiling pattern 311 based on rectangles with horizontally biased aspect ratios comprising elements 311A-311D. FIG. 10C shows a tiling pattern 312 based on rectangles horizontally elongated diamond elements 312A-312D.

In one embodiment, the technology used for fabricating SBG arrays regularly produces features as small as 50 microns (500 dpi), so that interlacing features in the manner described above is not an issue. One important condition is that the distance between gratings of like prescription should be small compared to the size of the eye pupil under bright conditions (assumed to be 3 mm in bright sunlight). In one embodiment, when this condition is met, banding is not observable. Importantly, in one embodiment as the eye moves around in the eye box, light lost from a band moving beyond the pupil of the eye is offset by light gained from another band moving into the pupil. The luminosity variation anticipated from this effect, assuming uniform illumination across the waveguide, is approximately ±1% of the average brightness level. The concept of banding may be most readily understood in embodiments where the SBG elements comprise columns. However, the basic principle may apply to any type of patterning that may be used with any embodiments described herein.

In some embodiments, image light is admitted into one end of the DigiLens only. Each waveguide in the DigiLens may generally comprise two SBG layers. It should be apparent from consideration of the drawings and description that in such embodiments the layers may comprise SBG arrays of identical prescription with one reversed and the image injection node being configured in two symmetrical portions to provide separate image light in opposing paths to the two holographic layers. Such embodiments may need duplication of components and are therefore likely more expensive to implement.

In some embodiments, each DigiLens doublet waveguide is 2.8 mm thick. The SBG layers may in theory be separated by low index substrates or air gaps. In one embodiment, in many practical applications that need TIR beam geometry cannot be supported without an air interface. Note also the thickness of the holograms has been exaggerated. In one embodiment, the gratings may be 3 microns in thickness sandwiched by substrates of thickness 100-200 microns. The thicknesses of the transparent electrodes applied to opposing faces of the substrates are measured in nanometers.

Figure 11:
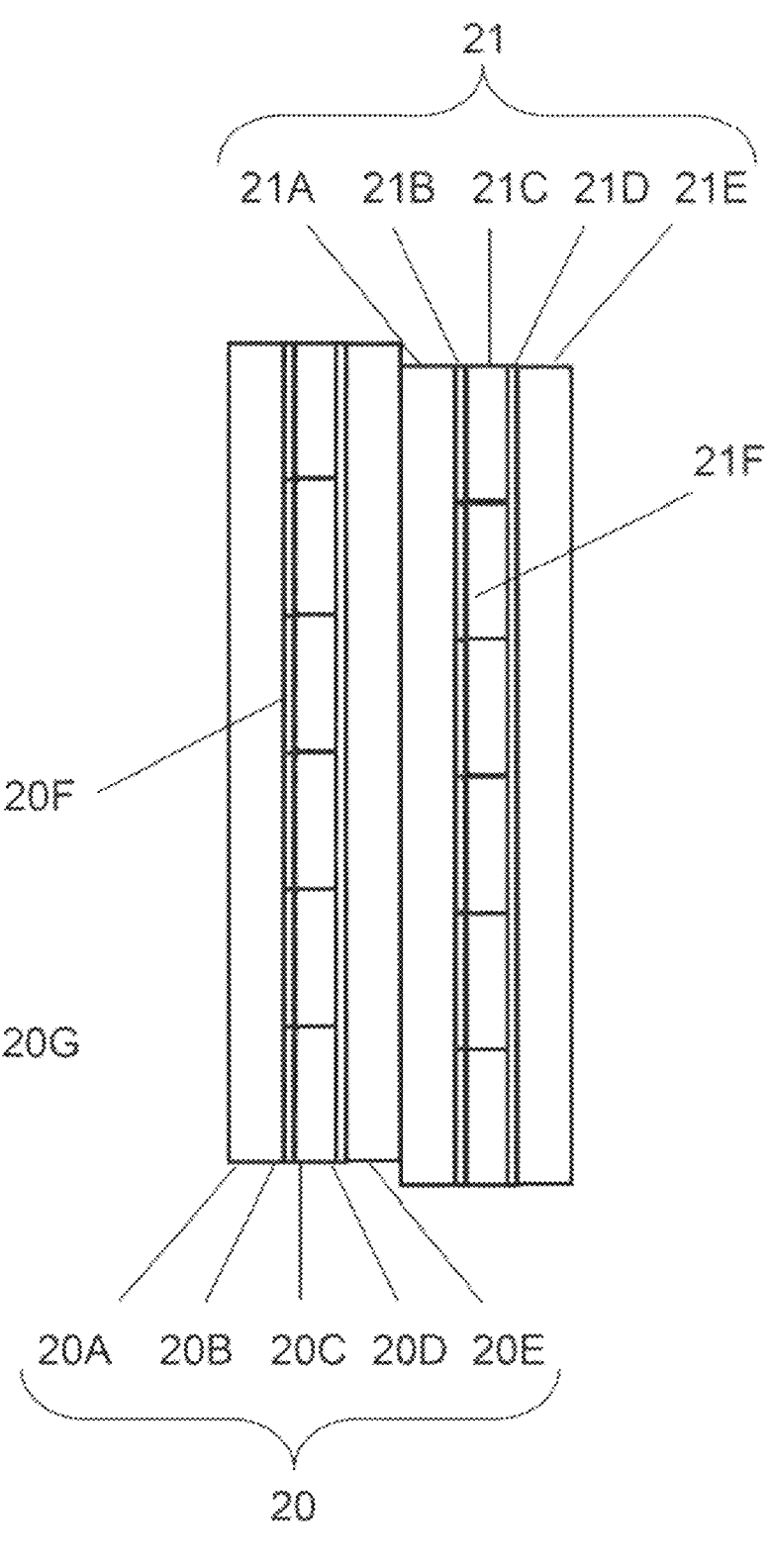
FIG. 11 is a schematic cross sectional view of a tessellated waveguide containing two grating layers in one embodiment.

FIG. 11 is a schematic cross-sectional view of a DigiLens waveguide comprising two layers 20, 21 in one embodiment. Layer 20 comprises transparent substrate 20A, transparent patterned electrode layer 20B, SBG array 20C containing elements such as 20F, a transparent electrode layer 20D, and a second substrate 20E. Layer 21 comprises transparent substrate 21A, transparent patterned electrode layer 21B, SBG array 21C containing elements such as 21F, a transparent electrode layer 21D, and a second substrate 21E. In one embodiment, the substrates 20E and 21A may be combined into a single layer.

Figures 14, 15:
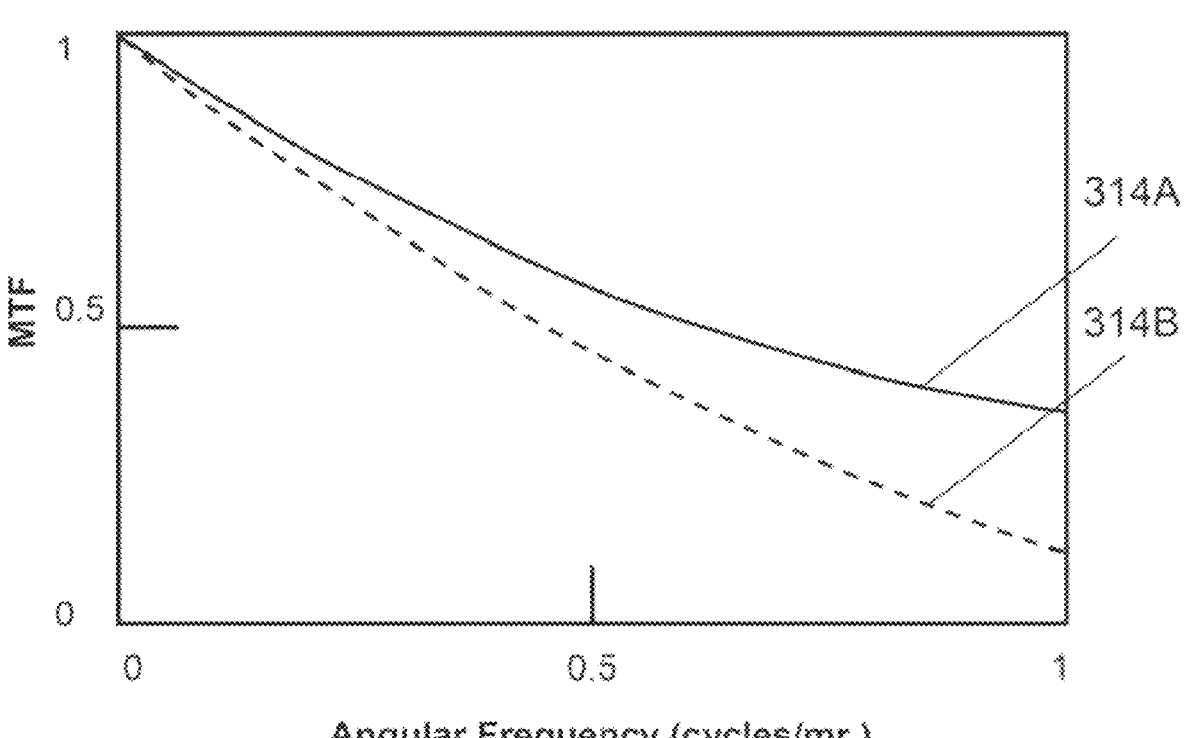
FIG. 14 is a chart showing the MTF versus angular frequency for the tessellation pattern of FIG. 13 in one embodiment.
FIG. 15 shows an example of a tessellation pattern using rectangular elements of horizontally biased aspect ratio and comprising elements of five different types in one embodiment.

FIGS. 12A-12D shows examples of tessellation patterns in the regions containing SBG elements of types labelled 1-4. The eye pupil 311 is overlaid. FIGS. 13-14 shows MTF data for one particular SBG element type configured as shown in FIG. 13 at one eye pupil location in the display exit pupil. The SBG elements are labelled by 313A-3131. FIG. 14 shows the MTF curves. In this embodiment, the upper curve 314A is the diffraction limited MTF, and the lower curve is the estimated SBG array MTF allowing for aberrations. The diamond shapes are based on triangles of triangles of side=0.8 mm, and therefore, length=1.38 mm. This architecture is applicable to a 2 layer (1 doublet) monochrome design, or a single color layer in the R, G, B color design. Three stacked doublet layers give the composite performance. The exit pupil 311 is 3 mm in diameter in this embodiment.

Figures 17, 18:
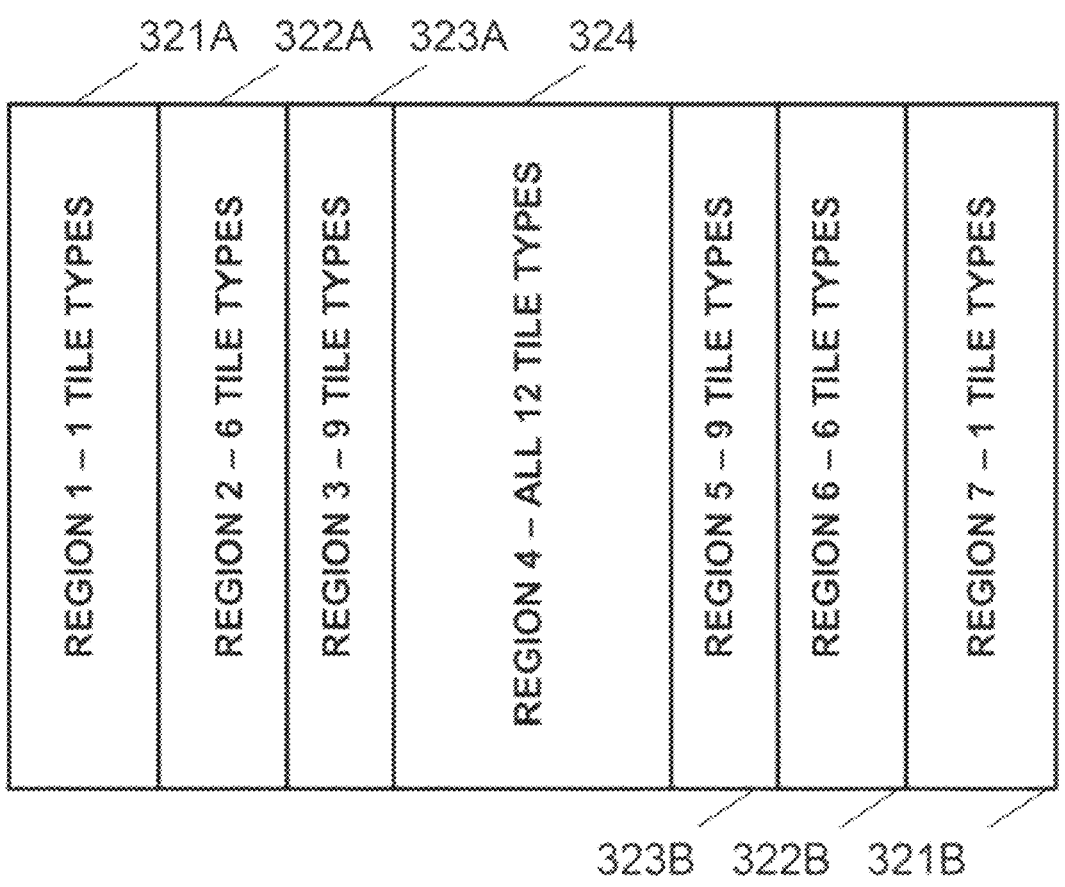
FIG. 17 shows the distribution of tessellation element types within regions labelled by numerals 1-7 used to provide a field of view tiling pattern illustrated in FIG. 18 in one embodiment.
FIG. 18 shows a field of view tiling pattern comprising four horizontal tiles and three vertical tiles.

The DigiLens architecture corresponding to FIGS. 13-14 tiles 12 SGB elements on 2 monochromatic SBG layers. Referring to FIG. 18, the first layer, which is illustrated in FIG. 13, tiles all of the horizontal (lower) tiles: L1-4 and the horizontal (middle) tiles (MID,1), (MID,2). The second layer tiles the horizontal (middle) tiles: (MID,3), (MID,4), and all of the horizontal (upper) tiles: U1-4.

FIG. 15 shows an example of tiling using rectangular SBGs with horizontally biased aspect ratios. The tiling pattern 315 comprises element types 1-5 also labelled by the numerals 315A-315E.

Figures 16A, 16B, 16C, 16D, 16E, 16F:
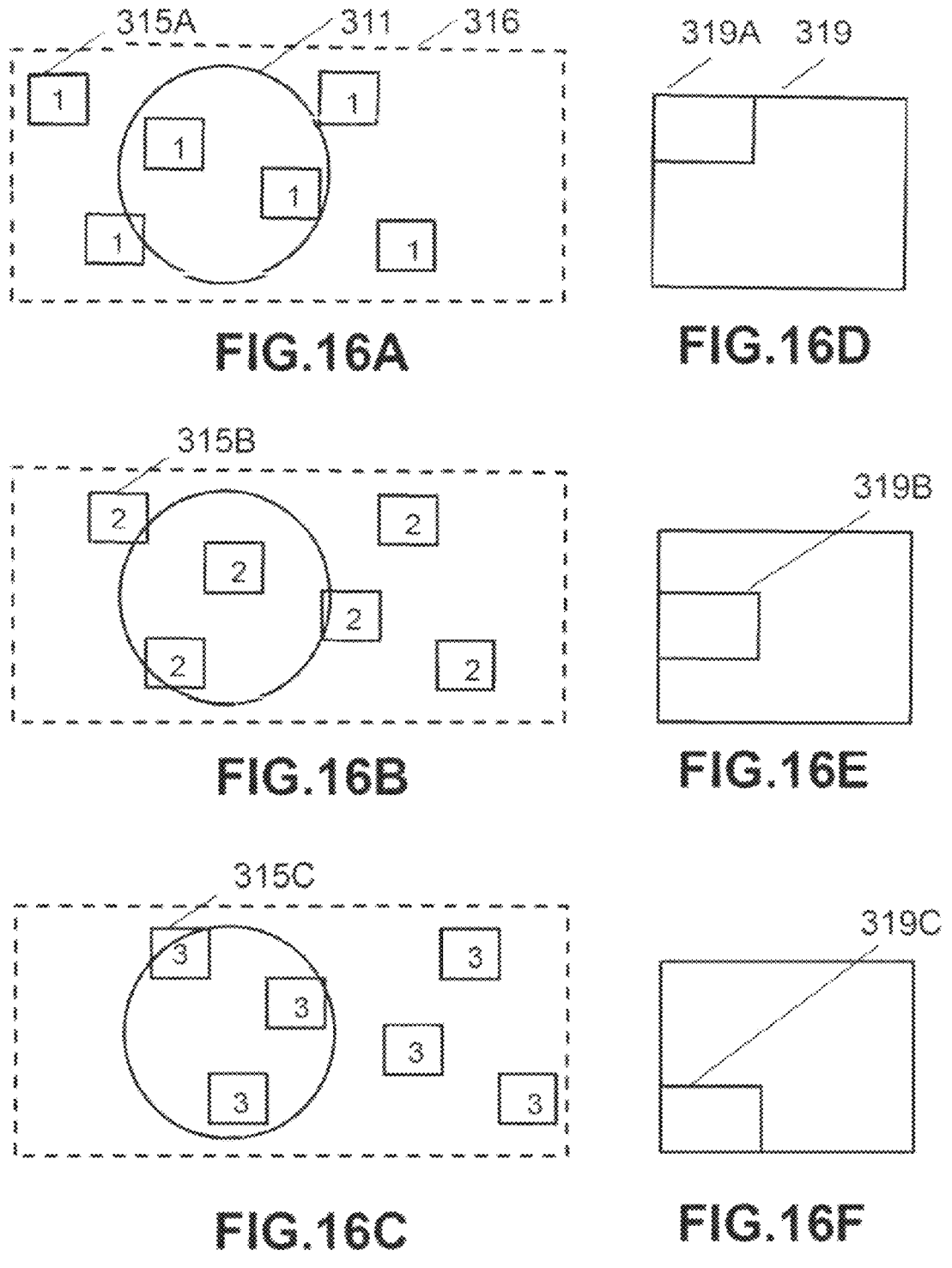
FIG. 16A illustrates the projection into the exit pupil of tessellation elements of a first type corresponding to a first field of view with an eye pupil overlaid in one embodiment.
FIG. 16B illustrates the projection into the exit pupil of tessellation elements of a second type corresponding to a second field of view with an eye pupil overlaid in one embodiment.
FIG. 16C illustrates the projection into the exit pupil of tessellation elements of a third type corresponding to a third field of view with an eye pupil overlaid in one embodiment.
FIG. 16D shows the field of view tile corresponding to the tessellation elements of FIG. 16A in one embodiment.
FIG. 16E shows the field of view tile corresponding to the tessellation elements of FIG. 16B.
FIG. 16F shows the field of view tile corresponding to the tessellation elements of FIG. 16C in one embodiment.

FIG. 16 illustrates in one embodiment how the DigiLens tiles the FOV in the exit pupil in three consecutive stages of the formation of a monochromatic image. The writing of images of each primary color will follow a similar process. FIGS. 16A-16C show three types of SBG 1-3 also indicated by the labels 315A-315C being activated. The eye pupil 311 and the exit pupil 316 are overlaid in each case. The corresponding FOV tiles 319A-319C in FOV space indicated by the rectangle 319 are shown in FIGS. 16D-16F. Only a small number of SBG elements are illustrated to simplify the understanding of the switching process. Note that all SBG elements of a given type can all couple light out simultaneously owing to the "lossy" coupling between the beam and grating. In other words, the diffraction efficiency of individual elements is modulated to extract a fraction of light the light available from the guided beam. In one embodiment, the first elements the guide beam interacts with have the weakest coupling efficiency, while the elements at the other extremity of the beam path have the strongest.

The area of the pupil filled by light from SBGs of a given type is roughly fixed. As the eye moves from left to right, light is lost from the leftmost SBG elements, but is gained on the right hand edge. The luminosity variation arising from this effect, assuming uniform illumination across all elements, is approximately 2% (+/−1% of the average brightness level).

In some embodiments, the periodicity of the SBG elements could yield unwanted artifacts resulting from diffraction by the element apertures or even interference effects. The latter is believed to be unlikely because light propagating in the planar waveguide structure will not necessarily be in phase with light from the next aperture because of the unequal optical path lengths inherent in planar waveguide structures. Light exiting each periodic aperture is therefore expected to combine incoherently (even if the coherence length of the laser is reasonably long with respect to the planar waveguide structure) when considered across all SBG elements. In the event that an unwanted artifact does arise from the SBG element, periodicity on the proposed strategy would involve randomizing the elements.

Points across the DigiLens aperture contribute angular information to the 10 mm eye box progressively differently because of the 25 mm eye relief. Points towards the left of the display do not contribute angular content from the right of the FOV, and vice versa. To maximize optical efficiency, the DigiLens in one embodiment may be optimized to fill the desired eyebox at the prescribed eye relief. FIGS. 10A-10D indicate the portions of the SBG aperture that contribute to the eyebox in one embodiment.

Not all positions across the surface of the DigiLens contribute pupil filling content at the eyebox. To fill the 10 mm pupil at 25 mm (eye relief), the minimum size of the outcoupling SBG is just less than 30 mm wide. However, only a very small region in the center of the DigiLens provides content at all field angles, e.g.: −15°±5°, 5°±5°, +15°±5°. These angular bands correspond to outcoupling SBG columns 1, 2, 3, and 4 (found for each of Upper)(+10°), Mid (+0°) and Down (−10°) fields.

FIG. 17 shows the distribution of SBG tile types for the 3 vertical×4 horizontal FOV tiling pattern of FIG. 18. As shown in the drawing in this case all 12 SBG prescriptions are needed in the centre of the FOV, while the number needed falls to just one at the horizontal limits of the FOV FIG. 18 shows an exemplary FOV tiling pattern that may be used to tile a 52°×30° FOV (assuming each SBG prescription provides 13°×10°). A total of 12 different types of SBG prescriptions need to be provided comprising "UP", "MIDDLE" and "DOWN" elements for vertical tiling and four horizontal tiling prescriptions for each of the vertical tiling SBGs tiles (labeled 1-4). Each type of SBG will be represented by more than one SBG element. Hence to view the FOV tile at [UP,1], it is needed to sequentially activate each element "1" in each column group "UP" in this embodiment.

Figure 19A:
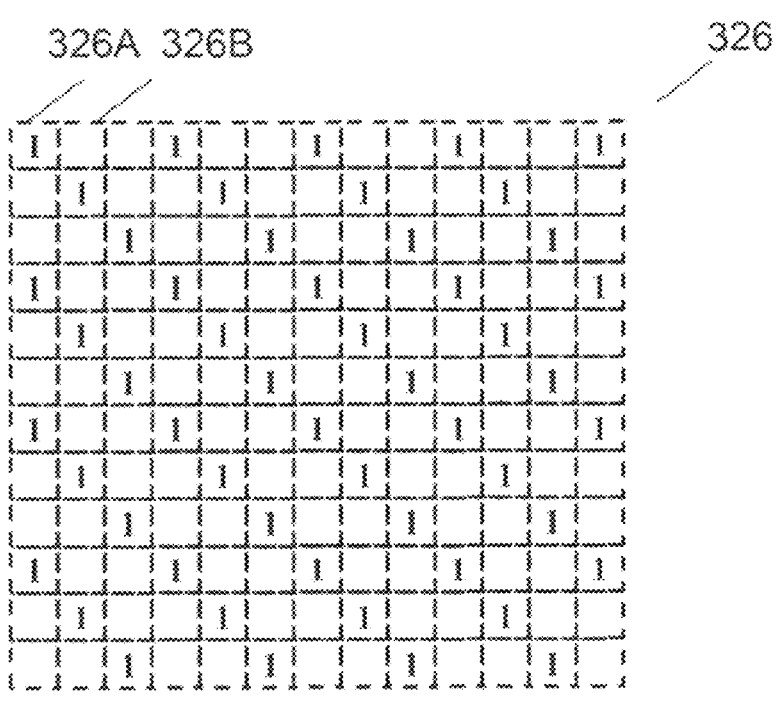
FIG. 19A shows a tessellation pattern comprising elements of one type from regions 1 and 7 in one layer of a two layer waveguide in the embodiment illustrated in FIGS. 17-18 in one embodiment.
Figure 19B:
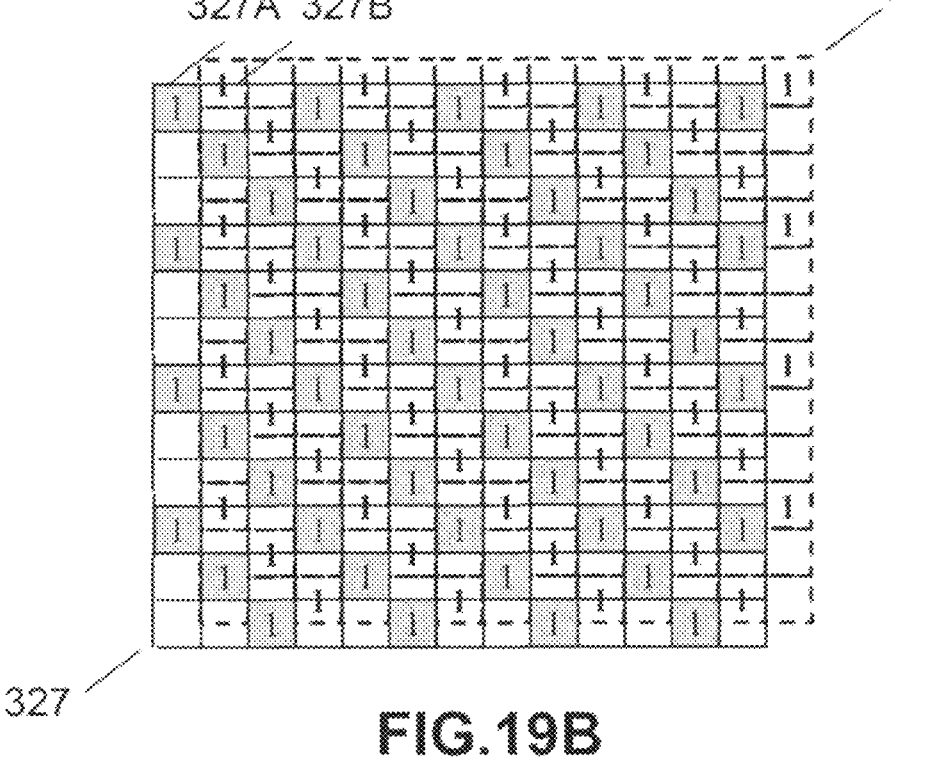
FIG. 19B shows overlaid tessellation patterns from both layers of the waveguide of FIG. 19A in one embodiment.
Figure 20A:
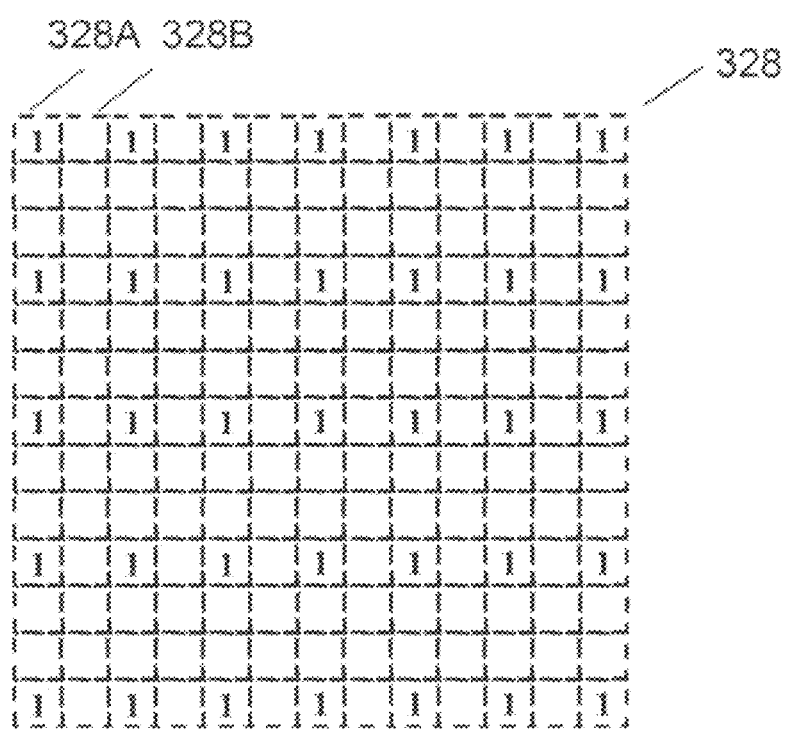
FIG. 20A shows a tessellation pattern comprising elements of one type from regions 2 and 6 in one layer of a two layer waveguide in the embodiment illustrated in FIGS. 17-18 in one embodiment.
Figure 20B:
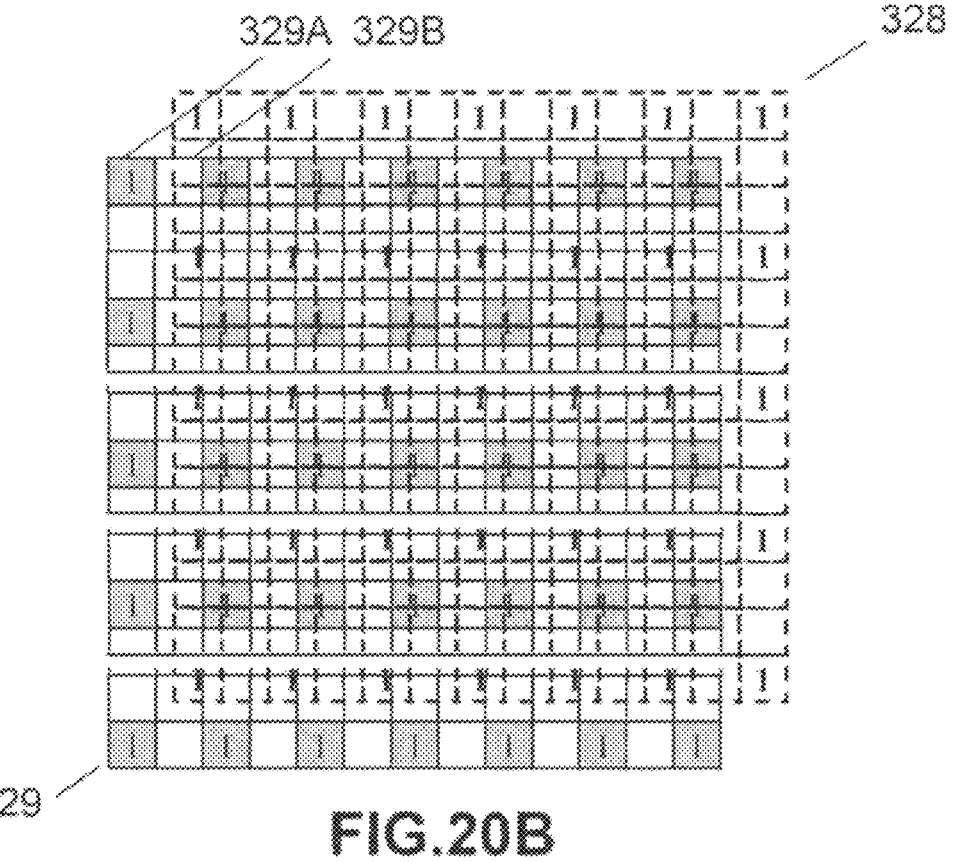
FIG. 20B shows overlaid tessellation patterns from both layers of the waveguide of FIG. 20A in one embodiment.
Figure 21A:
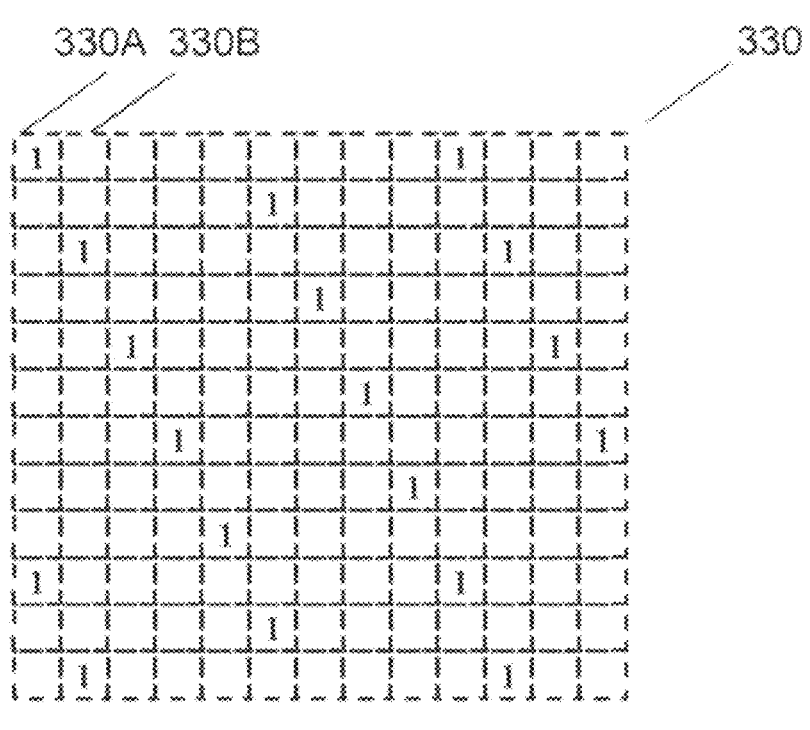
FIG. 21A shows a tessellation pattern comprising elements of one type from regions 3 and 5 in one layer of a two layer waveguide in the embodiment of the invention illustrated in FIGS. 17-18 in one embodiment.
Figure 21B:
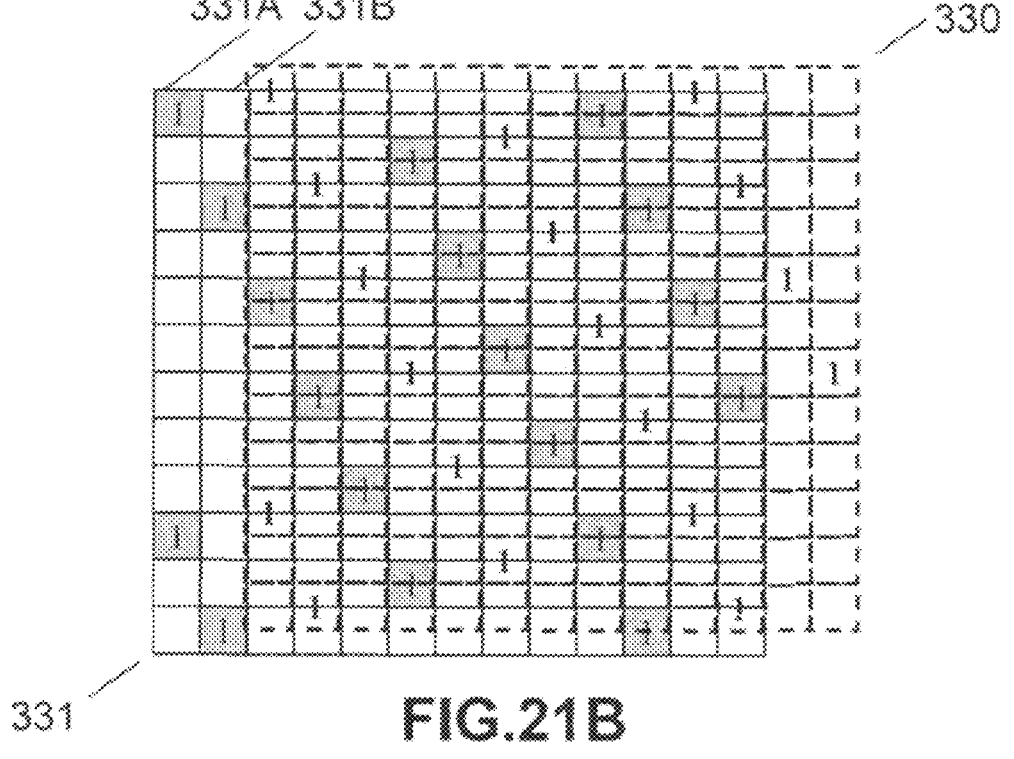
FIG. 21B shows overlaid tessellation patterns from both layers of the waveguide of FIG. 21A in one embodiment.
Figure 22A:
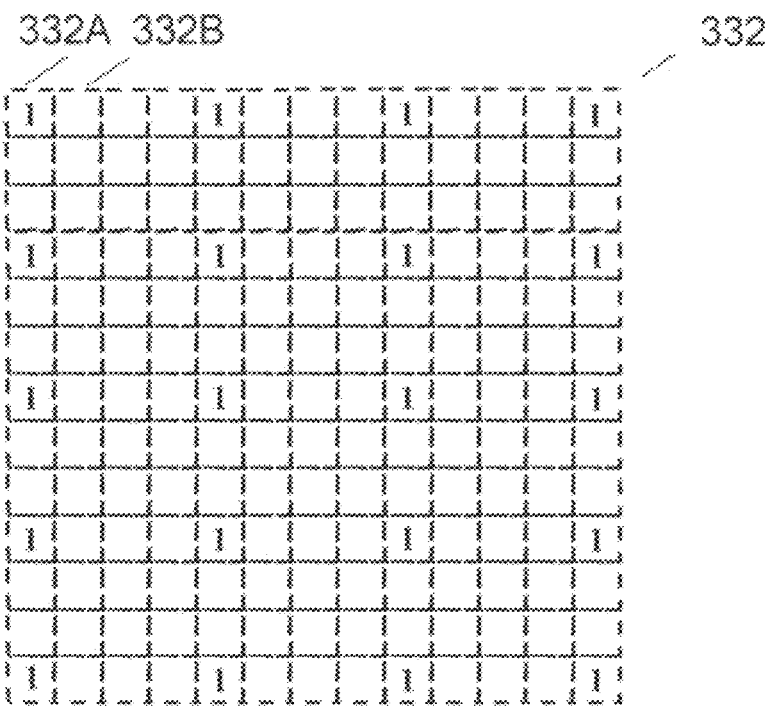
FIG. 22A shows a tessellation pattern comprising elements of one type from region 4 in one layer of a two layer waveguide in the embodiment of the invention illustrated in FIGS. 17-18.
Figure 22B:
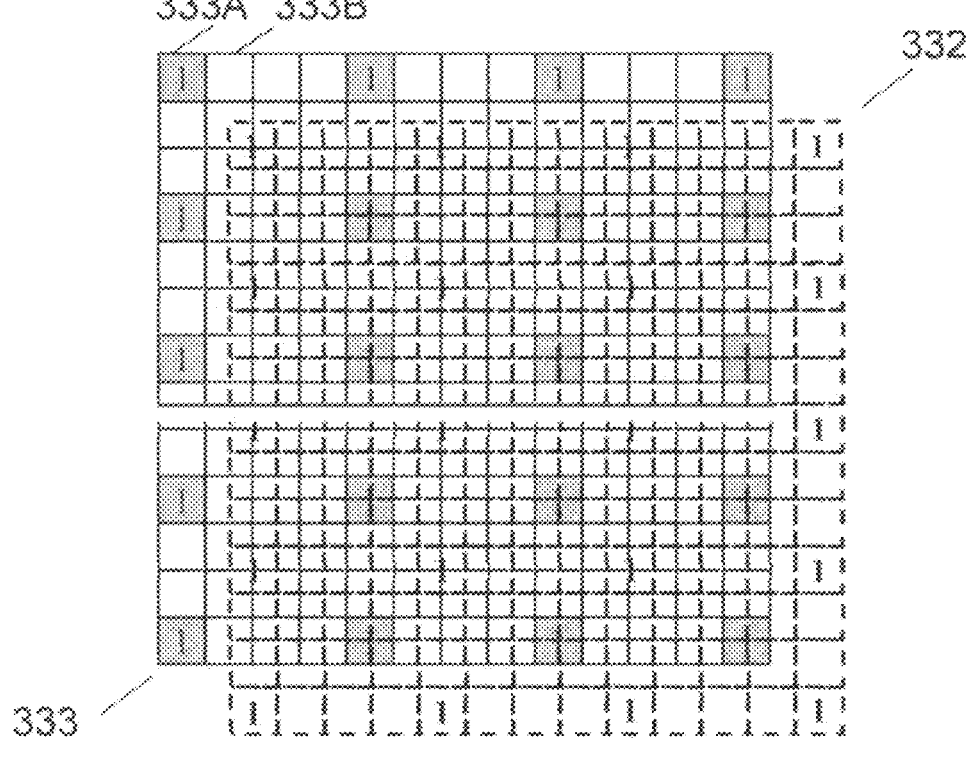
FIG. 22B shows overlaid tessellation patterns from both layers of the waveguide of FIG. 22A in one embodiment.

FIGS. 19-23 illustrate SBG patterns, which correspond to each of the tiling regions defined in FIGS. 17-18. In each case, the single layer pattern and two overlaid patterns for on SBG type are illustrated. Square elements have been assumed in this embodiment. FIG. 19 shows patterns corresponding to regions 1 and 7 (3 tile types). The two layers are indicated by 326, 327, each layer comprising type 1 elements 326A, 327A and spaces 326B, 327B (to be occupied by elements of other types). In this case, one layer achieves 33% aperture fill and one doublet achieves 66% aperture fill. FIG. 20 shows patterns corresponding to regions 2 and 6 (6 tile types). The two layers are indicated by 328, 329, each layer comprising type 1 elements 328A, 329A and spaces 328B, 329B. In this case, one layer achieves 16.7% aperture fill and one doublet achieves 33% aperture fill. FIG. 21 shows patterns corresponding to regions 3 and 5 (9 tile types). The two layers are indicated by 330, 331, each layer comprising type 1 elements 330A, 331A and spaces 330B, 331B. In this case, one layer achieves 11.1% aperture fill and one doublet achieves 22.2% aperture fill. Finally, FIG. 22 shows patterns corresponding to region 4 (12 tile types). The two layers are indicated by 332, 333, each layer comprising type 1 elements 332A, 333A and spaces 332B, 333B. In this case, one layer achieves 8.33% aperture fill and one doublet achieves 16.7% aperture fill.

Figures 23, 24:
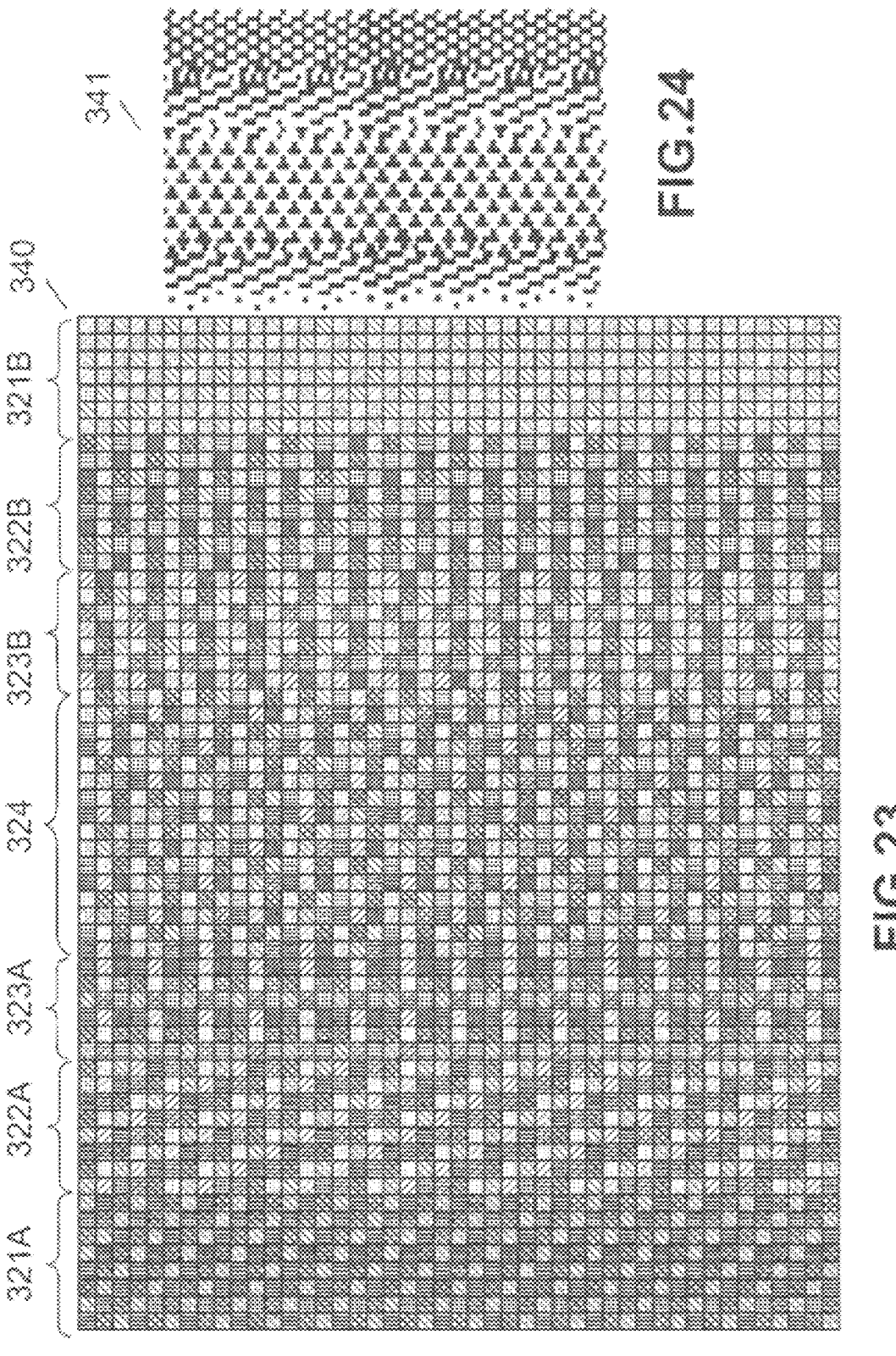
FIG. 23 illustrates the composite tessellation pattern resulting from the superposition of the tiling patterns of FIGS. 19A-22B in one embodiment.
FIG. 24 shows an example of a tessellation pattern in a two layer waveguide for grating elements of one type only in one embodiment.

The resulting composite pattern 340 is shown FIG. 23. An example of the coverage of a single SBG type in a three layer waveguide 341 is shown in FIG. 24.

Figure 25:
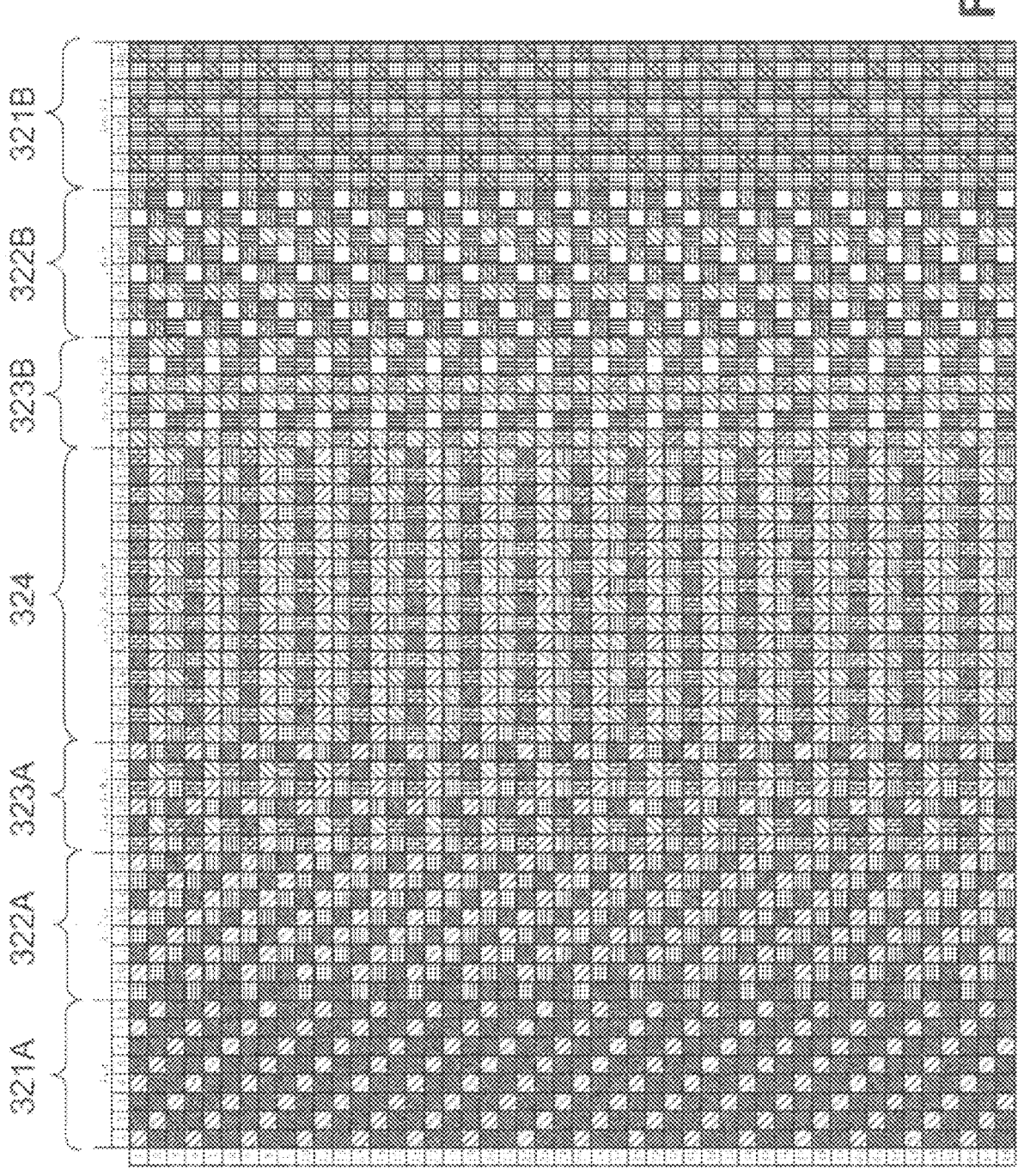
FIG. 25 shows the composite tessellation pattern in a first layer of a two layer waveguide in one embodiment.
Figure 26:
FIG. 26 shows the composite tessellation pattern in a second layer of a two layer waveguide in one embodiment.

FIGS. 25-26 show SBG patterns for each layer of a two layer waveguide in one embodiment.

A typical estimate of the human visual acuity limit is about 1 arc minutes/line pair=60 cyc/deg; this is a generally accepted performance limit and equates to 3.4 cyc/mr. This can be achieved with 20/20 vision under bright conditions where the eye pupil is constricted to 3 mm diameter. The eye is photoreceptor limited. Cone spacing at the fovea can be as small as 2.5 equivalent to 60 cyc/deg. At larger pupil apertures, the eye's performance degrades significantly due to aberration in the eye. At about 3 mm, the eye's performance is close to diffraction limited. It is noted that diffraction limit cut off at 532 nm for an f/5.6 eye (3 mm pupil with f=17 mm) is about 320 lp/m, which is significantly higher than the retina limit. The eye is therefore photoreceptor density limited in this embodiment. In considering this, it is realized that if the eye's pupil, or the display limiting the eye's pupil, is greater than 0.75 mm (equates to 1.4 cyc/mr cut off), then the blur spot size at the retina will not be affected. This establishes a minimum aperture requirement for the display. A 12 μm pitch LCoS microdisplay with 4H×3V tiles, where each tile has 640H×480V pixels may yield 2560H×1440V pixels over 52degH×30degV. The display projection magnification from the microdisplay to the retina is approximately 2. Hence the angular size of the microdisplay pixels at the eye is 6.0 μm giving a display 83 cyc/mm Nyquist frequency at the retina (1.4 cyc/mr). Image sharpness may be assessed to be sharp when contrast is maximized (and is high) at the half Nyquist limit (i.e., about 40 cyc/mm in the following plots showing image quality at the retina).

The concern that the periodic structure of the Color Waveguide SBG Layers will act as a diffraction grating has been addressed. Many of the potential sources diffractive artifacts in the Color Waveguide, such as higher order diffraction, zero orders beams in the waveguide, and the apertures of the SBG elements, may be minimized (or even eliminated) on closer inspection SBGs are Volume Bragg gratings, and in one embodiment may not support higher orders as would be found with blazed or thin grating. The absence of higher orders may minimize (or even eliminate) ghost images. In one embodiment, within the waveguide light which continues to be wave guided (in the lossy waveguide) will not 'see' the output apertures of the tiles. Build-up of diffraction orders within the waveguiding beam will therefore not occur. Light output from different SBG element apertures will not be in phase (apart from perhaps in a unique case). The optical path will change as a function of field angle. It is therefore reasonable to expect the outputs from the apertures to be out of phase, and therefore to combine incoherently. Diffractive artifacts are therefore not anticipated.

Earlier concerns about the periodic structure were based on 50 um column widths. The new SBG feature sizes are now in the range 800 um to 1380 um. Diffraction angles predicted by the grating equation are significantly smaller. For example, for 50 um features with a 52° input angle, the diffraction angle would be 1 degree (equivalent to 74 pixels). For 1000 um features at 52° input angle, the diffraction angle reduces to 0.05° (3.7 pixels). In the very worst case, in this embodiment, if a diffractive ghost appears under conditions of say, a very bright object against a dark background, it will appear like near object lens flare, and not as a double image well separated from the original.

Although a despeckler may be incorporated into the IIN to overcome laser speckle, there is a reasonably high expectation that the design is inherently despeckled. Phase diversity should exist across the output SBG apertures. Polarization diversity will further assist with the despeckling, and hence minimize the effects of any diffractive artifacts from the structure. As a further safeguard, noting that it is not essential to have straight edges on the SBG apertures, the edges will be patterned to randomize any artifacts.

Several factors may influence design layout. It may be needed to take into account tessellation limitations to maximize pupil fill. Importantly, it may be needed to have 3, 6, 9, and 12 tile each pattern on 2 layers of a single doublet, and create a maximized pupil fill condition for any position in the display exit pupil for a 3 mm diameter projected eye pupil. The offsets between the SBG patterns in the two layers need not have a non-integer offset to tessellation pattern design in x or y. In one embodiment, an x offset will in effect cause a half pixel on one side or another of a region, and would then need ITO addressing for half of a pixel in that area alone. In one embodiment, it is better to avoid this to retain a uniform addressing pitch. In one embodiment, an offset in y of the pattern would similarly need half pixel vertical addressing. Similarly, it would be desirable to avoid this. It is acceptable to have a half pixel offset in y to maximize coverage, but then all patterns need to have half pixel offset in same direction. In one embodiment, all 12 tile types are employed on each doublet. However, the maximum tile type fill is obtained for 9 tiles types on two layers. We also have cases where 6 tile types and 3 tile types need to be configured, for example, on two layers. Consider, for example, a region where three horizontal tile types to fill eye pupil for a single vertical tile band in one embodiment. Note that other layers of doublets address the other two vertical tile bands. Layers 1 and 2 both contain the same tiles, but in an offset arrangement to achieve the desired pupil filling. A single tile has dimensions: $(H,V)=(0.8*sqrt(3), 0.8)=(1.386, 0.8)$. The offset on a single layer of 1 tile type is given by: $(dx,dy)=(0,3V)$. The offset of layer 1 with respect to layer 2 is given by: $(dx,dy)=(0.5H, 1.5V)=(0.693, 0.4)$. In the analysis that follows, 1 mm×1 mm squares have been used to simplify the optical modeling; however, the principles are identical no matter the shape. However, it should be noted that certain shapes will pack preferentially.

Figure 27A:
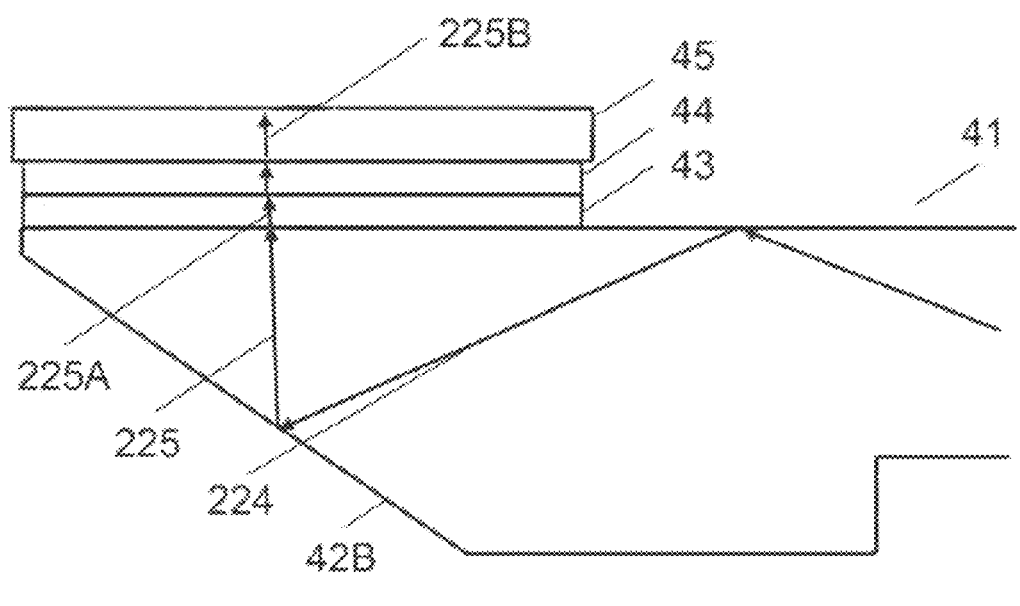
FIG. 27A is a schematic cross section view showing the image output portion of an Input Image Node in one embodiment.
Figure 27B:
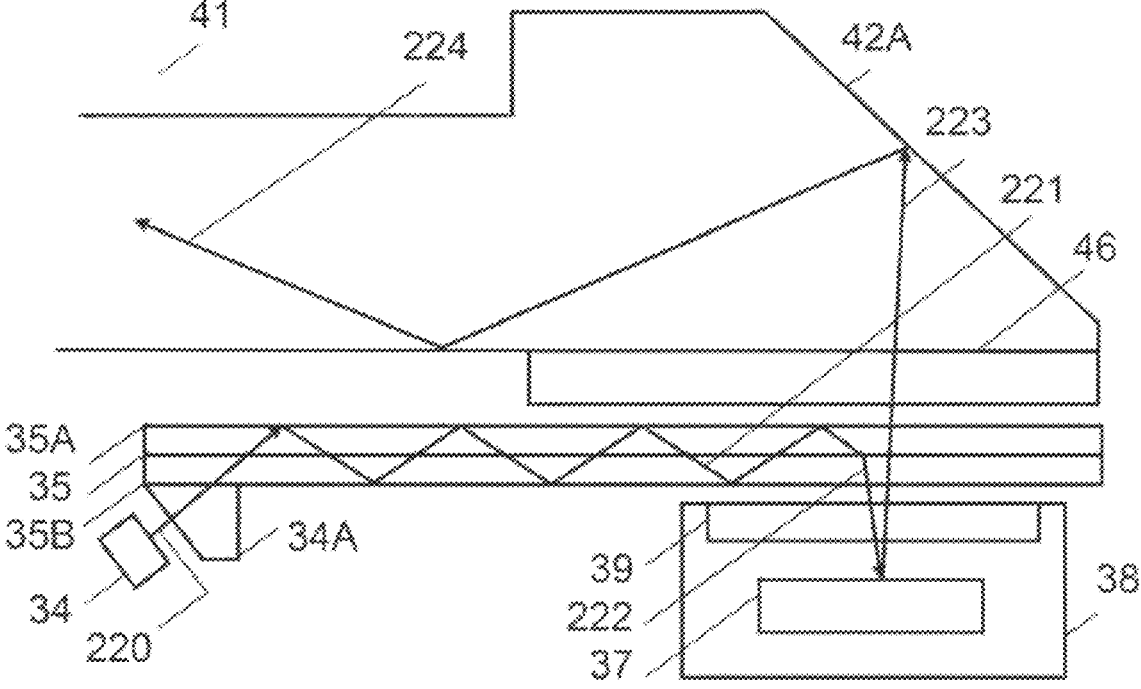
FIG. 27B is a schematic cross section view showing the image input portion of an Input Image Node in one embodiment.
Figure 28A:
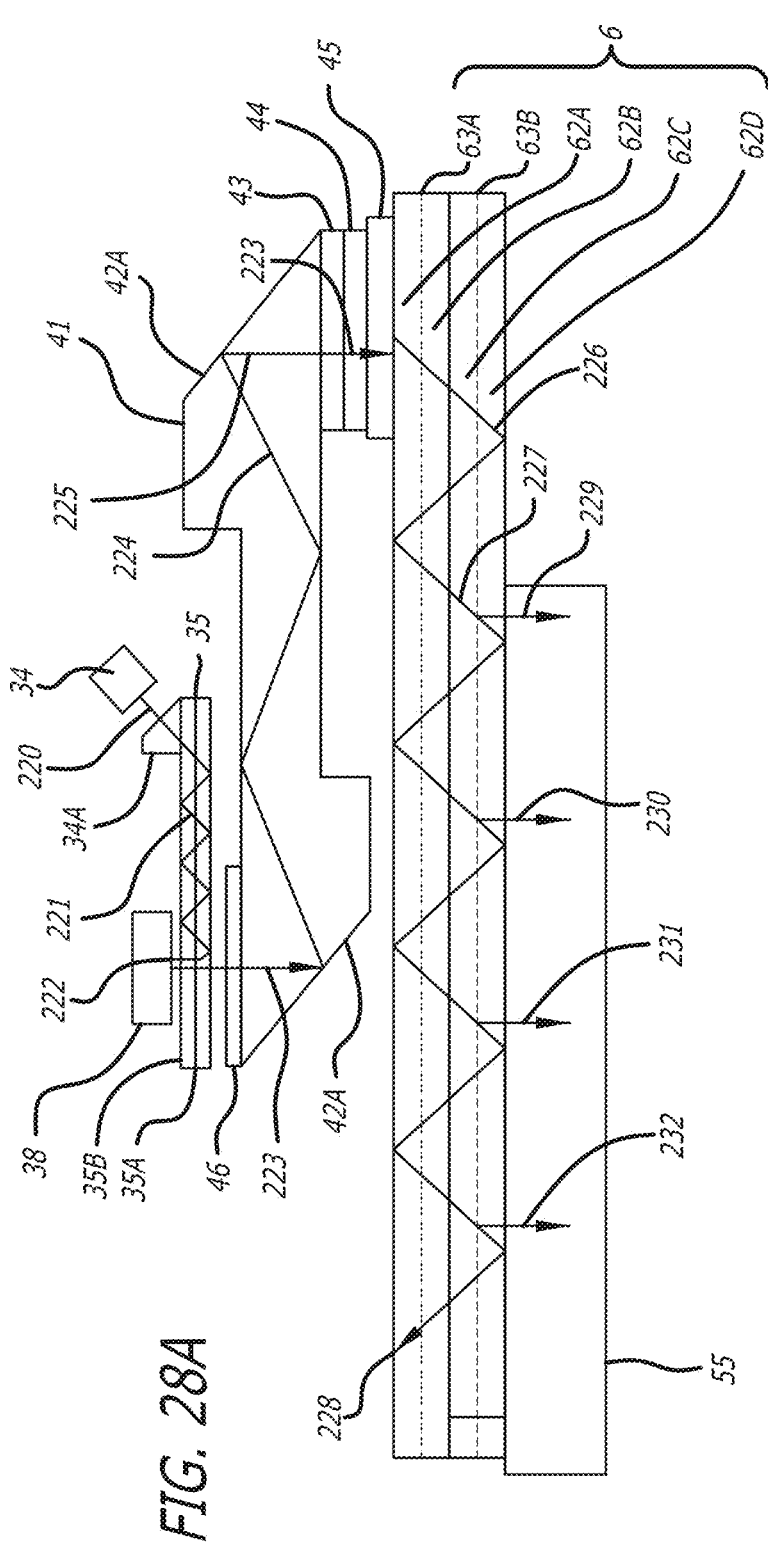
FIG. 28A is a cross section view showing the Input Image Node and its coupling to the DigiLens waveguide via the Vertical Beam Expander in one embodiment.
Figure 29:
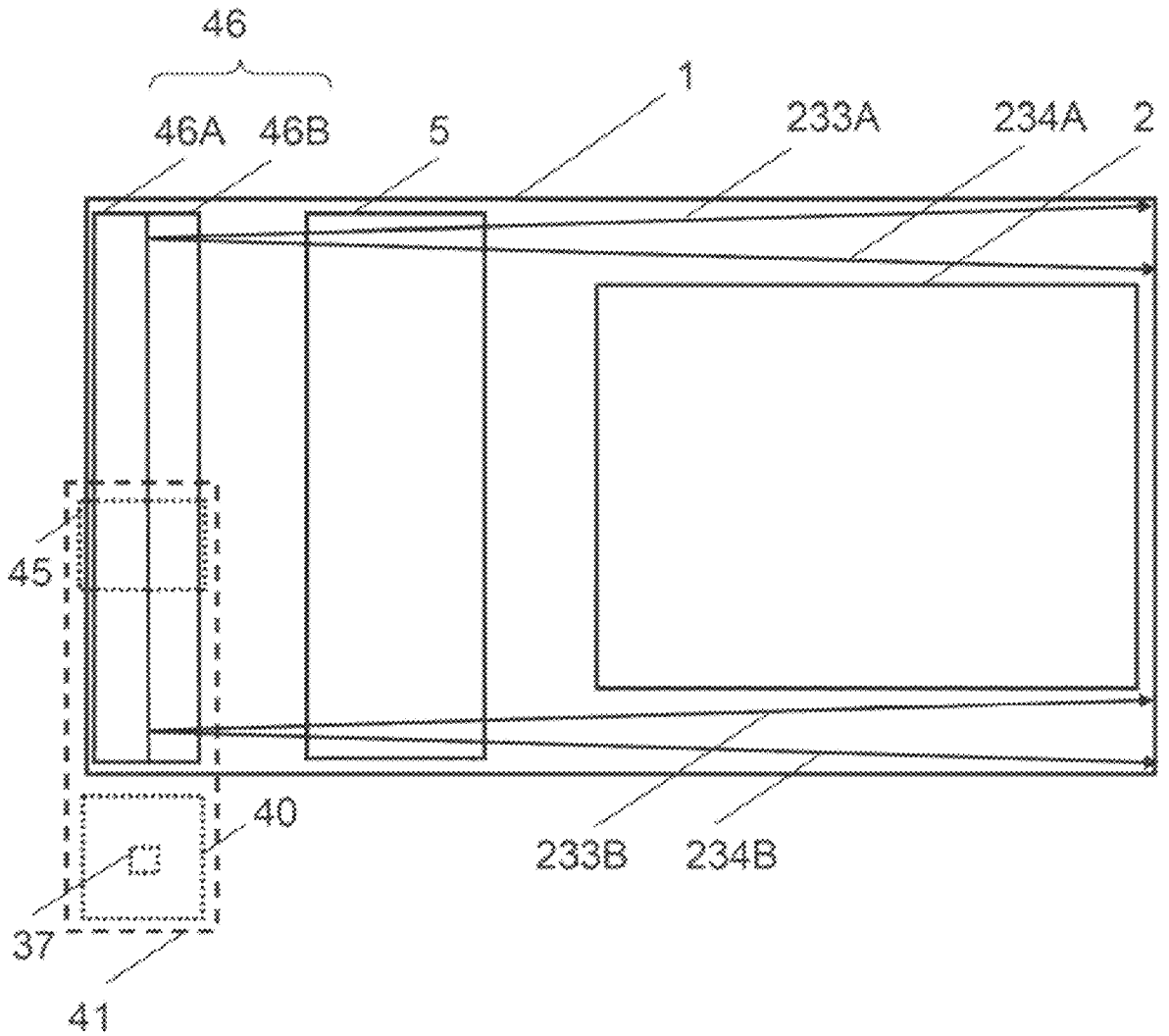
FIG. 29 is a plan view of the DigiLens waveguide and the Vertical Beam Expander in one embodiment.

FIGS. 27-29 illustrate some embodiments of the IIN comprising a input image generator comprising the diode laser module 34, coupling prism 34A, SBG beam splitter layer 35 sandwiched between substrates 35A, 35B, microdisplay module 38, light guide 41 contain include surfaces 42A, 42B, input coupling, holographic objective, spacer half wave plate, holographic field lens.

Advantageously, in one embodiment the IIN provides a telecentric (slightly projected) pupil to allow better coma control and better packaging with the pupil vertical beam expander.

FIG. 28A is a cross sectional view illustrating the coupling from the Input Image Node to the DigiLens via the VBE in one embodiment. FIG. 28B shows a detailed ray trace of the embodiment of FIG. 28A. The VBE may comprise, or is, a lossy grating extracting light from the beam over a distance corresponding to the height of the DigiLens. At the objective input, the light is well ordered in that light across the pupil is arranged in tight field bundles. At the far end of the VBE, the different numbers of bundles of light with different field angles may cause the bundles to be more distributed. At the objective end, the pink ray with the highest waveguide angle may be furthest from the rest of the VBE waveguide. The steepest ray in waveguide starts furthest to the left. This may help keep the passive input coupler (and VBE thickness) down. At the far end (fully to the left) coupling out of the VBE into the waveguide is hampered by the loss of order, as found at the input. To prevent a doubling in the thickness of the waveguide, a 50/50 active coupler is used in one embodiment at the VBE to DigiLens coupling stage.

FIG. 29 is a plan view of the DigiLens and the VBE showing how the latter is split into two switchable elements. This reduces the waveguide thickness. Each DigiLens doublet waveguide is 2.8 mm thick. Without the switch, the thickness doubles such that the total waveguide thickness increases from around 10 mm, to about 18 mm. FIG. 10 shows rays traced from the VBE to the DigiLens.

Several embodiments provided herein may have to be well suited for substrate guided optics. First, component costs may be reduced. The optical complexity is contained in the various holographic optical elements. Once the non-recurring engineering (NRE) associated with creating a set of masters is complete, the replication costs are relatively insignificant, as compared to the recurring material costs associated with discrete refractive components. Second, assembly time may be reduced. Not only is part count reduced, but the assembly process is also much faster. The planar structures can be cost-effectively laminated together with very high optical precision using alignment fiducials. The touch labor is greatly reduced, as compared to that of building a piece-part assembly to exacting standards. Third, the optical precision is greater. One of the biggest challenges in designing a new optical design is controlling the roll-up of tolerances on the piece parts, the mechanical housings, and the assembly procedure. With holographic optical elements (HOEs), "gold standards" can be assembled by senior engineers and this level of quality captured in the HOE masters during the NRE phase. Beside the fact that optical alignment of the HOEs can be accomplished with great precision, the individual HOEs are more tolerant of variations in alignment. Thus, the overall yield of high quality devices is much higher. Lastly, size and weight are greatly reduced by this monolithic design, as is the ruggedness of the entire subsystem.

One important performance parameter is the see-through transmission of the display. The variables that have an impact on transmission are the ITO coating (0.995), the AR coatings (0.99), and the absorption of the substrates and holographic layers. There will also be Fresnel losses at the interfaces between the waveguides and the low-index bonding layers. In one embodiment, the desired transmission for the color display is >70%, with an objective of >90%. Assuming three waveguides per display and two substrates per waveguide, the calculated transmission is 93%, meeting the stipulated objective. In one embodiment, the design described herein may use 100-micron glass substrates. With three waveguides and three substrates per waveguide (note: two holographic layers may need three substrates), the total thickness of the display of the color display may be still less than 1 mm. The thicknesses of the holographic layers (including the coatings) are negligible; each contributes only 4-5 microns to the overall thickness. Since weight is always an issue, this may be an important feature of the embodiments described herein. In one embodiment where the substrate comprises plastic, the weight may be further reduced.

In one embodiment, the SBGs operate in reverse mode such that they diffract when a voltage is applied and remain optically passive at all other times. The SBGs may be implemented as continuous SBG lamina separated by thin (as thin as 100 micron) substrate layers as shown. Ultimately the design goal is to use plastic substrates with transmissive conductive coatings (to replace ITO). Plastic SBG technology suitable for the present application is being developed in a parallel SBIR project. In this embodiment, this is a planar monolithic design harnessing the full assets of narrow band laser illumination with monolithic holographic optics Configuring the SBGs as monochromatic layers may enable the use of holographic optics and SBG beam splitter technology to provide a flat solid state precision aligned display totally eliminating the need for bulky refractive optics. The resolution of the display is only limited by that of the LCoS panels.

The design is scalable to a larger FOV by interlacing more tiles in each layer and/or adding new layers. Similarly, the pupil, eye-relief, and FOV aspect ratio can be tailored to suit the application. The design can be scaled down to a smaller FOV.

Figures 30A, 30B, 31:
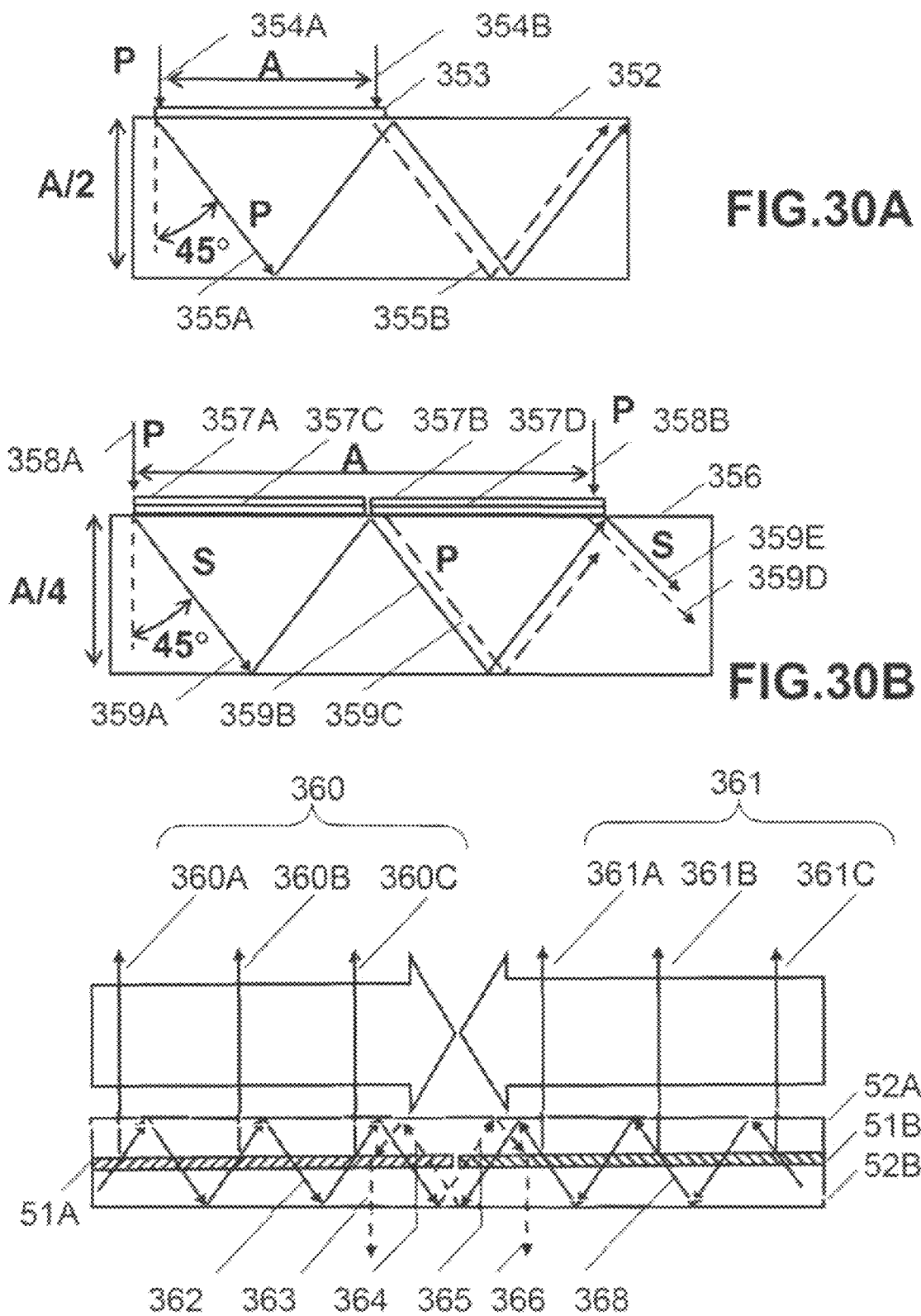
FIG. 30A shows a waveguide 252 with input rays directed into the TIR paths by a coupling grating in one embodiment.
FIG. 30B shows a waveguide in one embodiment having input coupling optics comprising the first and second gratings disposed adjacent each other, the half wave film sandwiched by the waveguide and the first grating; and a polarizing beam splitter (PBS) film sandwiched by the waveguide and the second.
FIG. 31 is a schematic cross section of a portion of a waveguide used in the invention in which light is extracted from the waveguide in opposing directions in one embodiment.

FIGS. 30A-30B illustrate a scheme for polarization recycling for use with at least some embodiments described herein. This may be relevant in the event that polarization is not maintained with an SBG outcoupling waveguide, either by virtue of the properties of the SBG material (current or one developed in future), or where a polarization rotation component is deliberately introduced in the waveguide. Specifically, a thinner DigiLens waveguide can be used if linearly polarized light is input into the DigiLens waveguide (i.e., light coupled from VBE into the waveguide), and light is converted to a mixture of S and P polarized light. This may allow up to a factor of two times reduction thinness of the waveguide. FIG. 30A shows a waveguide 252 with input rays 354A, 354B directed into the TIR paths labelled by 355A, 355B by a coupling grating 353. The light may be of any polarization. However, for a SBG input grating P-polarization may be desirable in one embodiment. The coupling grating aperture is A. For only explanation purpose, the TIR angle has been chosen to be 45° so that the thickness of the waveguide required for the limiting input ray to just skirt the edge of the coupling grating after the first TIR bounce is A/2.

Referring to FIG. 30B, the waveguide 356 has input coupling optics comprising the first and second gratings 357A, 357B disposed adjacent each other, the half wave film 357C sandwiched by the waveguide and the first grating; and a polarizing beam splitter (PBS) film 357D sandwiched by the waveguide and the second. The PBS is design to transmit P-polarized light and reflect S-polarized light. Again the TIR angle is chosen to be 45° only for illustration purpose. Input P-polarized collimated light 358A, 358B is coupled in to the waveguide via the first grating and half wave film (HWF) to provide S-polarized light 359A, and via the second grating and PBS to provide P-polarized light 359C, 359D. Comparing the embodiments of FIG. 30A and FIG. 30B, it should be apparent that in the second the input coupling aperture can be the equal to the length of two TIR bounces owing to the polarization recovery by the HWF and PBS. In the embodiment of FIG. 30A. the input couplet cannot be longer than one TIR bounce because grating reciprocity would result in the light being diffracted downwards out of the waveguide. One benefit of the embodiment of FIG. 30B is that the waveguide thickness can be reduced by 50%; that is, for a coupler length equal to A the waveguide thickness (for 45° TIR) is A/4. At this in some embodiments, S and P lights in the waveguide are not separated. Typically, the input light will be divergent resulting in the S and P light quickly becoming spatially mixed. However, if the waveguide rotates the polarization, because more P is out coupled, there will be more conversion of S to P than P to S, thus yielding a net gain. The polarization rotation may arise from the reflective characteristics of the waveguide walls and from the birefringence of the holographic material where SBGs are used. In one embodiment, polarization rotation is provided by applying a quarter wave film (QWF) to the lower face of the waveguide. HWFs and QWFs may be about 0.125 mm thick. A typical adhesive layer may be about 75 microns. Hence in some embodiments, the polarization control films do not contribute significantly to the overall waveguide thickness. In certain cases the films can be can be immersed in an adhesive layer used for lamination.

FIG. 31 illustrates a counter-propagation waveguide for use in some embodiments. The waveguide comprises adjacent grating laminas 51A, 51B of identical but opposing prescriptions sandwiched by substrates 52A, 52B. Wave guided light 362 propagating from left to right interacts with the grating 51A to provide continuously extracted light 360A-360C to provide the expanded output beam 360. Wave guided light 368 propagating from right to left interacts with the grating 51B to provide continuously extracted light 361A-361C to provide the expanded output beam 361. Note that a small amount of light that is not extracted from each of the left/right propagation directions will interact with an opposing grating and get diffracted out of the grating in the opposite direction to that of the expanded beams 360,361, as indicated by the rays 363-366.

Figure 32:
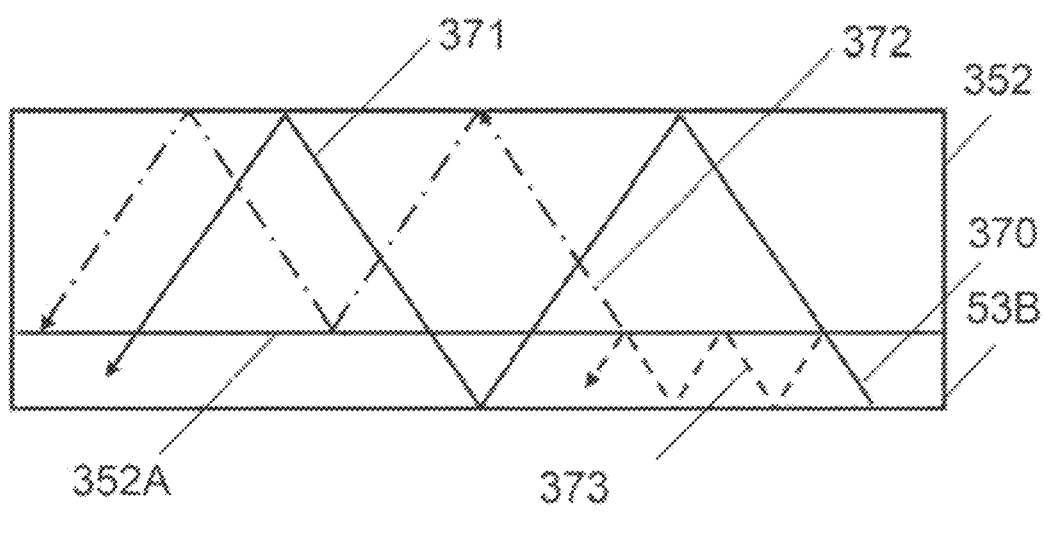
FIG. 32 is a schematic cross section of a portion of a waveguide used in the invention incorporating a beam splitter layer for improving illumination uniformity in one embodiment.

FIG. 32 illustrates the use of a beam splitter in a waveguide in one embodiment to achieve uniformity. This principle may be applied both expansion axes. As a further refinement, a beam splitter offset may be employed in waveguide (i.e., not in middle of waveguiding surfaces, but offset from waveguide midpoint to maximize uniformity following multiple bounce interactions). A yet further refinement is to use different reflectivities in beam splitter to optimize and tailor beam mixing. Not to be bound by any particular theory, but by varying the reflectivity % of the beam splitter to something other than 50/50, or by varying the transmission/reflection split along a B/S length, the pupil fill can be homogenized and optimized. For example, in FIG. 32 the waveguide 353 contains a beam splitter layer 352. In some embodiments, the beam splitter may be provided using a thin film coating. A TIR ray such as 370 may then undergo beam splitting, which results in waveguiding occurring between the upper and lower walls of the waveguide; between the upper wall of the waveguide and the beam splitter, and between the beam splitter and the lower wall of the waveguide as indicated by rays 371-373.

The IIN stop is formed by controlling the profile of the input illumination. In at least some embodiments there is no hard physical stop in the projection optics. The benefits of projected stop include decreased waveguide thickness. The stop is projected midway up the VBE to minimize aperture diameter within the VBE, and hence minimizing the aperture width of the VBE to DigiLens waveguide coupler (e.g., reducing the width of the $1^{st}$ axis expander) limits the thickness of the $2^{nd}$ axis expansion optic.

FIGS. 33-36 show details of an ITO in some embodiments addressing architecture for use in a DigiLens.

Figure 33:
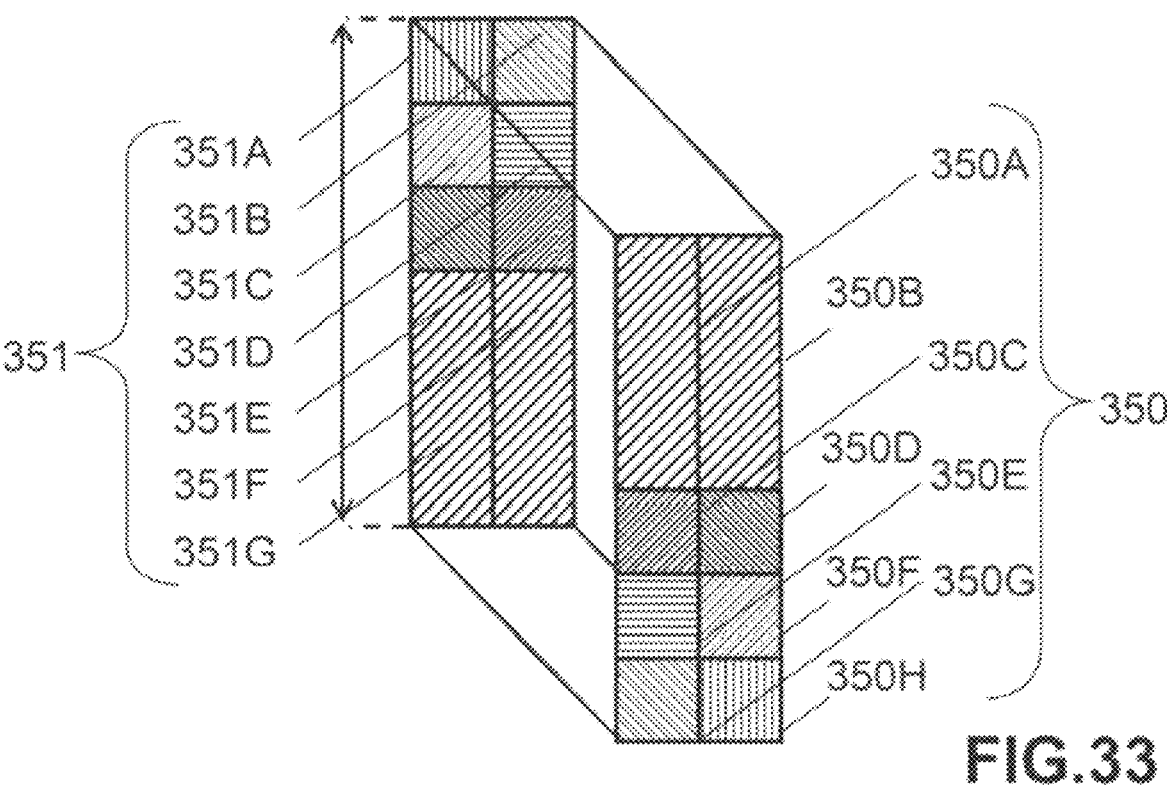
FIG. 33 illustrates a method of reducing the number of wiring tracks in an electrode layer using dual sided addressing in one embodiment.

FIG. 33 shows a method of reducing the number of tracks in a given ITO layer, which method uses dual sided addressing of ITO, and super pixel addressing to reduce the number of tracks by approximately one third. The pixels are provide in a first group 350 comprising: elements of dimension 3 units×1 unit such as the ones labelled by 350A, 350B; and elements of dimension 1 unit×1 unit, such as the ones labelled 350C-350H, and a second overlapping inverted group 351 of identical pixel geometry as indicated by 351A-351G.

Figure 34:
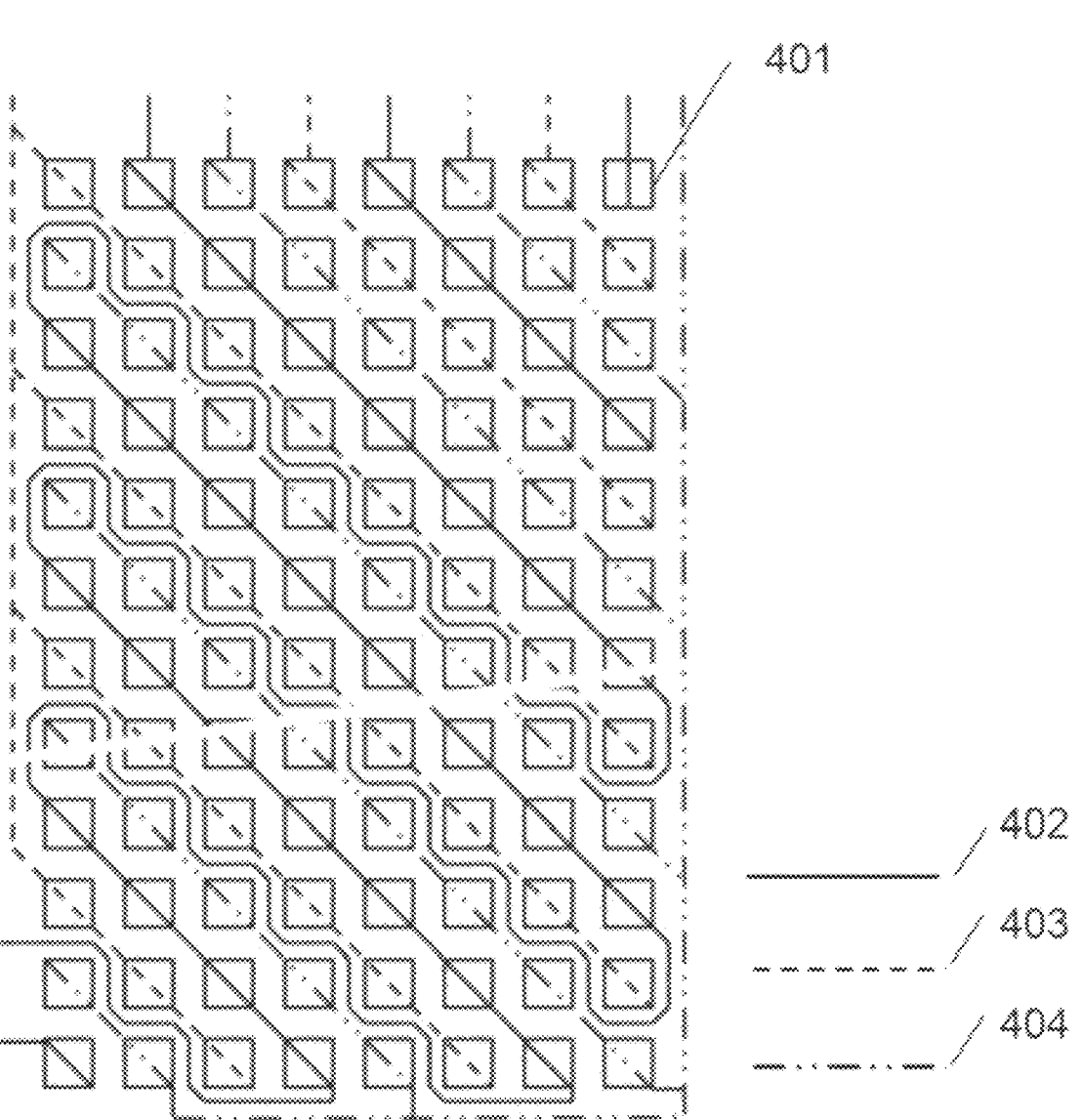
FIG. 34 illustrates one scheme for interleaving electrode wiring tracks in a tessellated waveguide in one embodiment.
Figure 35:
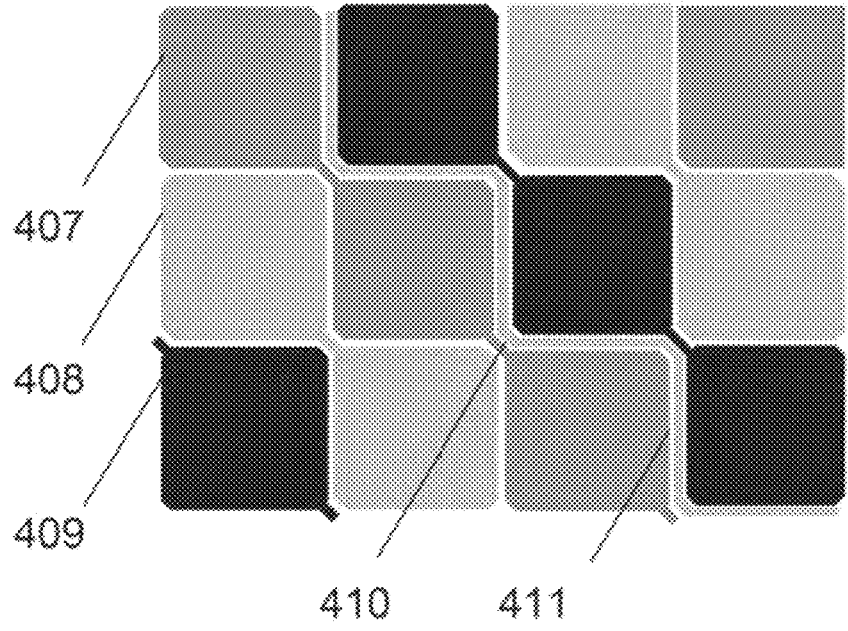
FIG. 35 illustrates another scheme for interleaving electrode wiring tracks in a tessellated waveguide in one embodiment.
Figure 36:
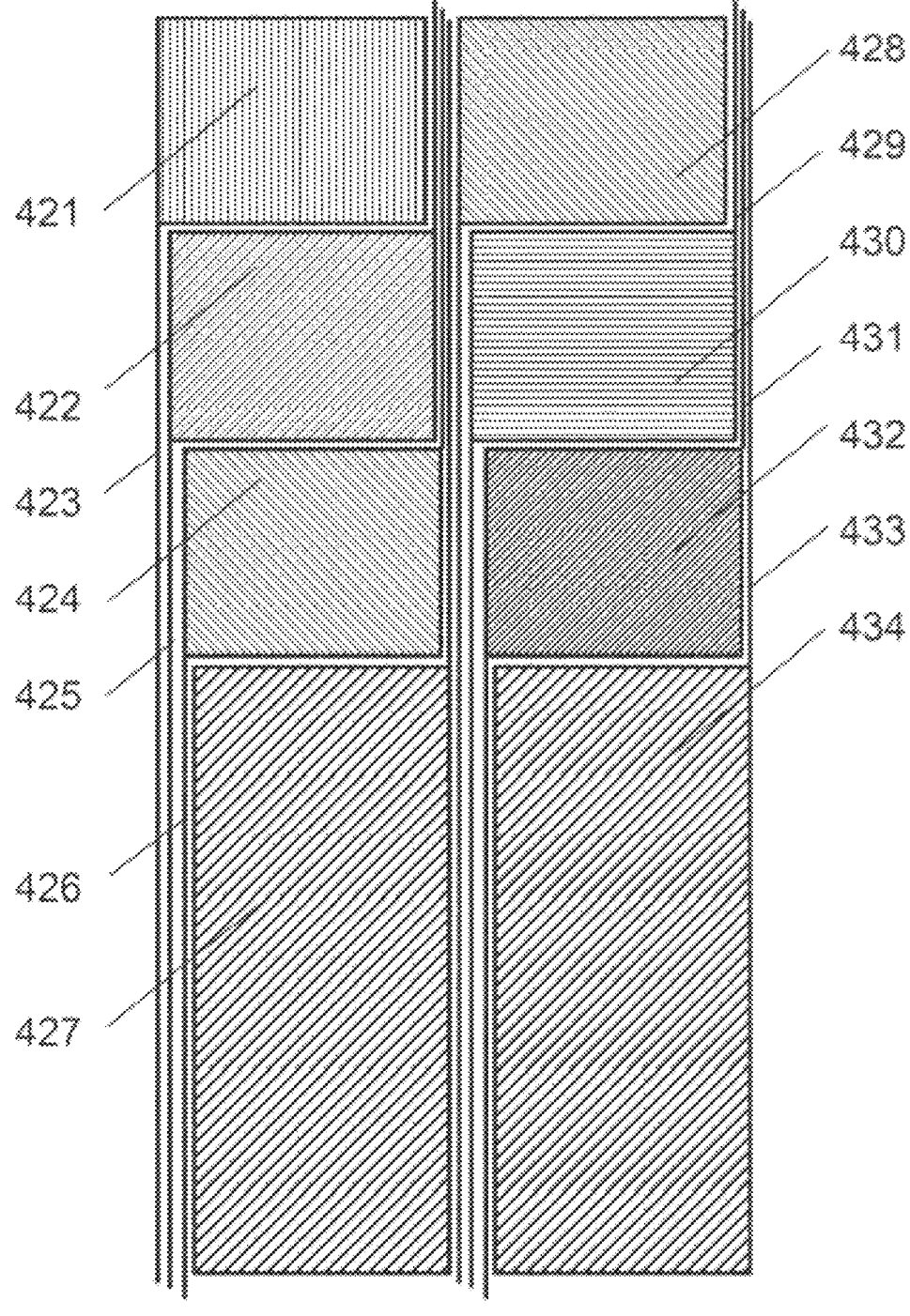
FIG. 36 illustrates a further scheme for interleaving electrode wiring tracks in a tessellated waveguide in one embodiment.

FIGS. 34-36 show how interleaving of electrode wiring tracks may be used to permit a 2D electrode structure to address (switch) multiple different tessellation types. FIG. 34 shows a wiring scheme used in embodiment, in which electrode elements such as 401 are connected by tracks 402-404. FIG. 35 shows a wiring scheme in another embodiment with electrodes 407-409 and track portions 410,411 indicated. FIG. 36 shows the electrodes and tracks of the embodiment of FIG. 33 in more details with the elements and tracks indicated by the numerals 421-434.

The electrode architecture may benefit in terms of reduction of part complexity from using identical pattern technique, and flip symmetry to create full addressing network. This is not needed to make design work, but may limit number of parts that need to be designed and handled.

In one embodiment, a graduated reflection profile underneath SBG layer is used to control (or assist) with grating DE variation along length (normally achieved in SBG grating using index modulation). This may be useful in cases such as the VBE where low percentage of light is out coupled in the first bounce, but high percentage is coupled out at the other end of the expander.

In one embodiment, 1D expansion engines are used to double input power and/or minimize 1D aperture width.

Figure 37A:
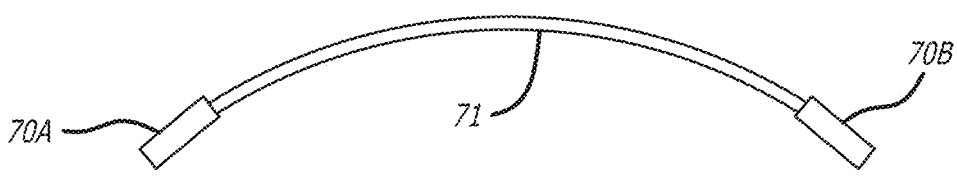
FIG. 37A shows a schematic plan view of a curved visor implementation of the invention in one embodiment.
Figure 37B:
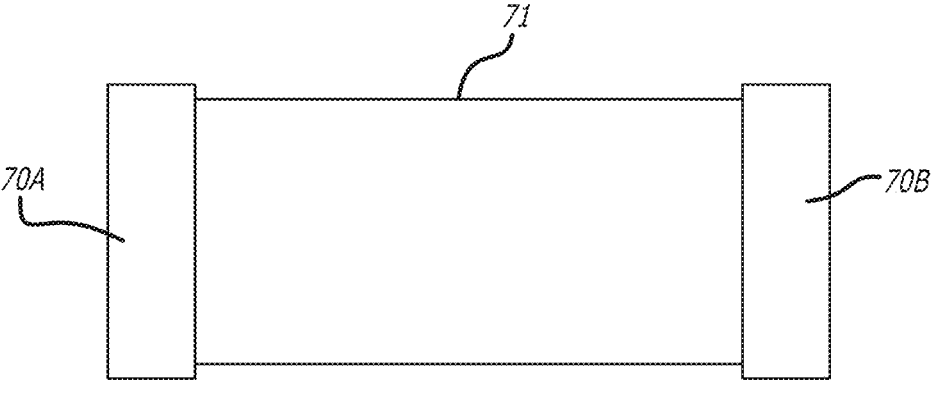
FIG. 37B shows a schematic side elevation view of a curved visor implementation of the invention in one embodiment.

In one embodiment, the display is configured as a "visor". The color waveguide is curved in at least one plane. In general, such an embodiment may have a large (30 mm) eye relief and a large exit pupil. The large exit pupil may reduce (or even eliminate) the need for IPD adjustment. FIG. 37A-37B are schematic plan and side elevation views of a curved visor comprising a DigiLens 71 and optical-electronic modules 70A, 70B to either sides. One module will comprise the IIN. The second module may contain auxiliary optics and electronics.

Figure 38:
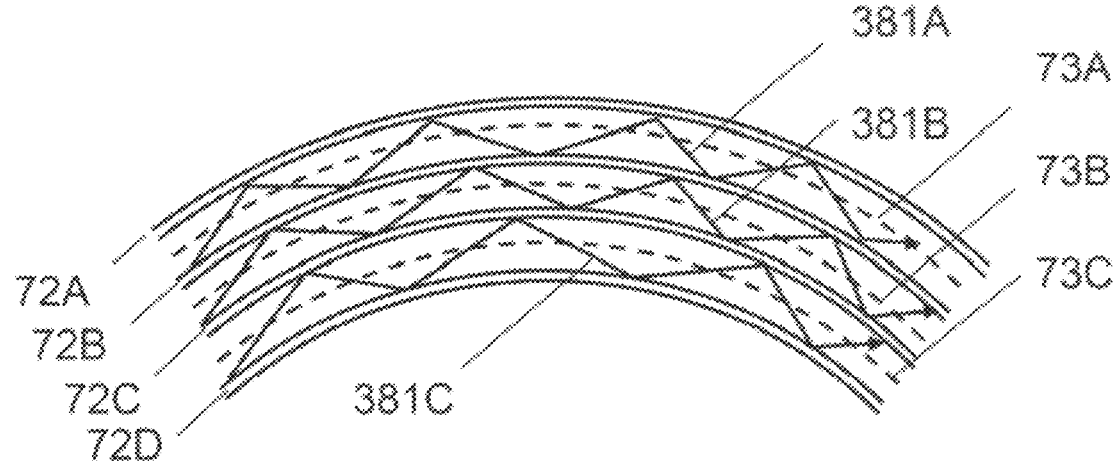
FIG. 38 show a cross section of a curved visor implementation of the invention in which the DigiLens comprises laminated optically isolated waveguides in one embodiment.
Figure 39:
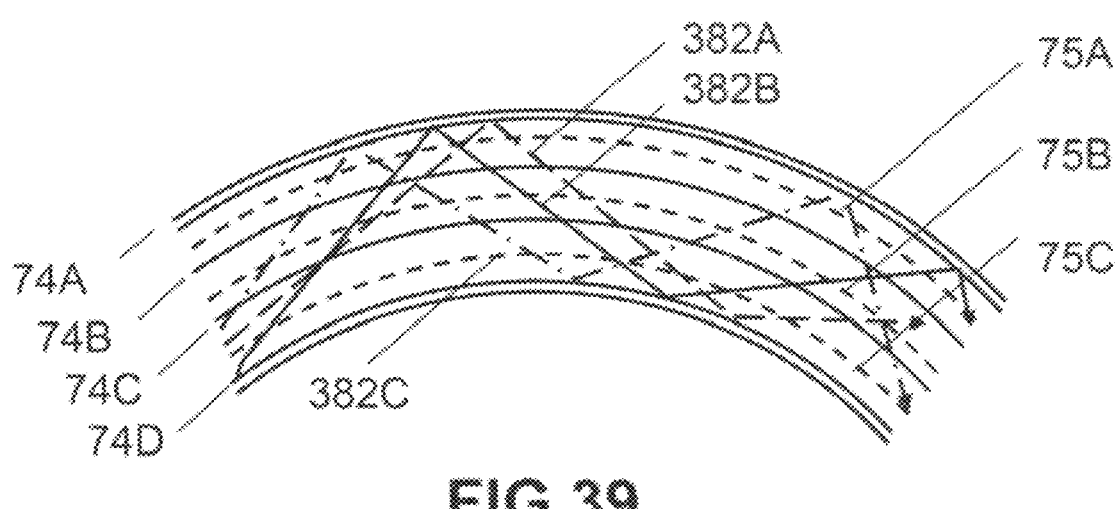
FIG. 39 show a cross section of a curved visor implementation of the invention in which the DigiLens comprises laminated grating layers that form a single waveguiding structure in one embodiment.

FIG. 38 shows the DigiLens of a curved visor in one embodiment in more detail. The DigiLens may comprise laminated waveguides, each containing SBG arrays 73A-73C. In this case the three SBG layers are isolated from each other by the cladding layers 72A-72D. The ray paths are indicated by 381A-381C. In the embodiment of FIG. 39, the SBG layers are stacked without cladding layers to form a single waveguiding structure. The ray paths are indicated by 382A-382C.

Figures 40A, 40B, 40C:
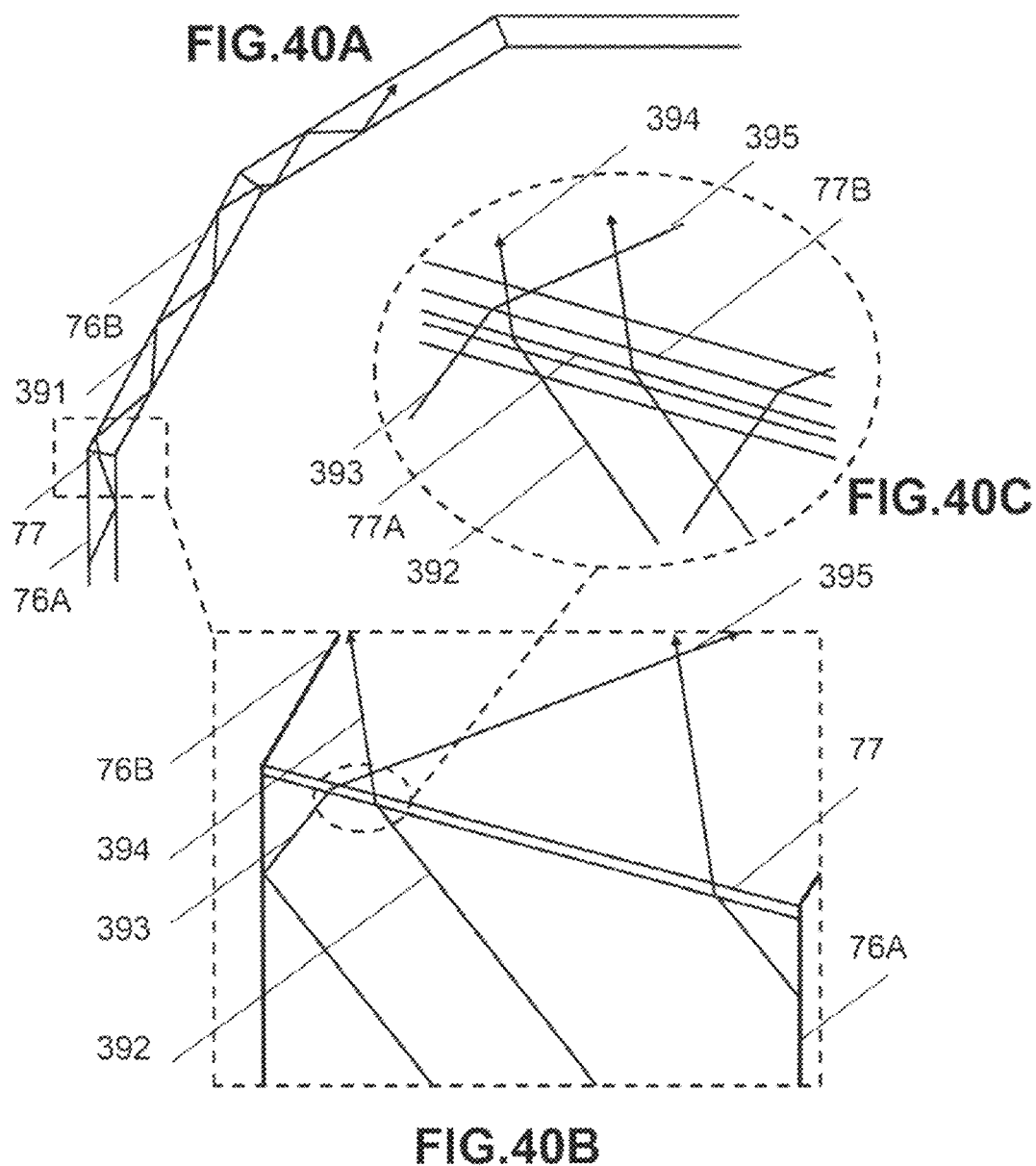
FIG. 40A shows a cross section of a curved visor implementation of the invention in which the DigiLens comprises facetted elements in one embodiment.
FIG. 40B shows the optical interface between two of the facetted elements of FIG. 40A in one embodiment.
FIG. 40C illustrates the optical interface between two of the facetted elements of FIG. 40A in more detail in one embodiment.
Figure 41:
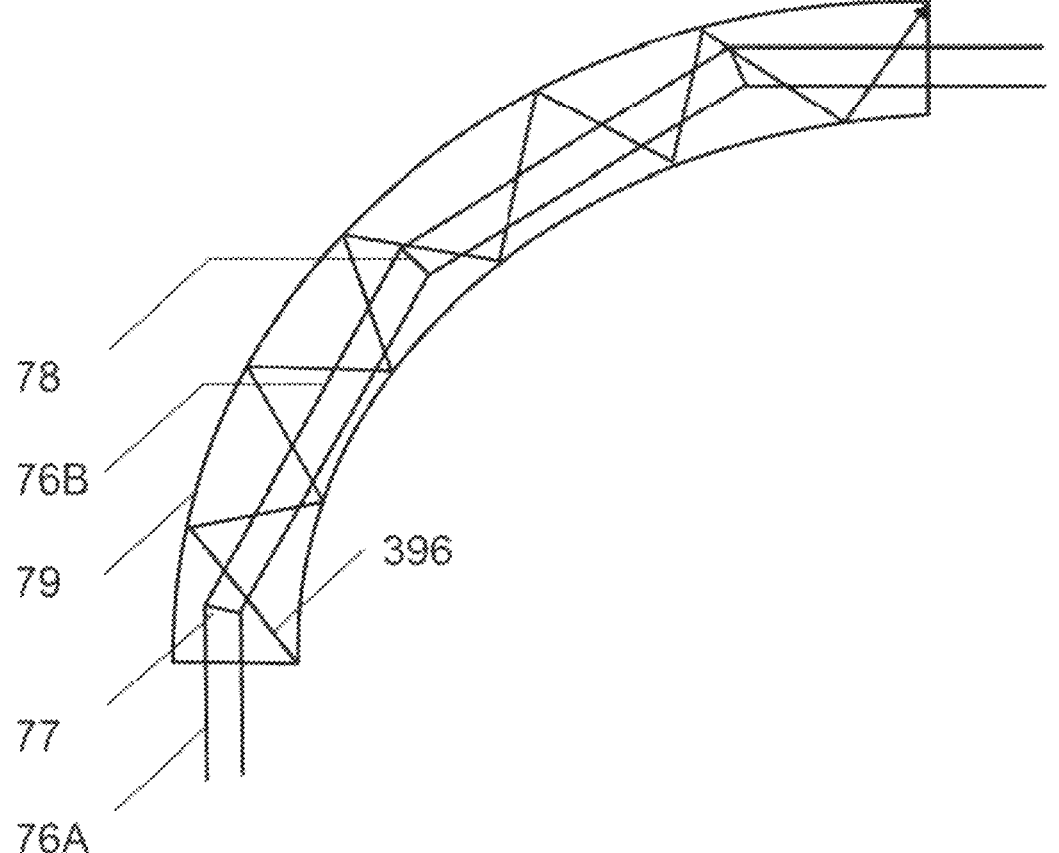
FIG. 41 show a cross section of a curved visor implementation of the invention in which the DigiLens comprises facetted elements embedded in a curved lightguide in one embodiment.

In one embodiment as shown in FIG. 40, a visor DigiLens is shaped facetted planar elements 76A, 76B allowing the waveguides to be planar. As shown in the insets B and C, gratings 77A, 77B are provided at the optical interfaces 77 between the facets to control the beam angles to ensure efficient coupling of guided image light to the SBG array elements. The gratings 77A, 77B may be Bragg gratings. In one embodiment as shown in FIG. 41, a facetted DigiLens comprising planar facets, such as 76A, 76B, is embedded with a curved lightguide 79.

The embodiments may rely on monochromatic waveguides. However it should be apparent from consideration of the description that in alternative embodiments the waveguides could operate on more than color. Such embodiments may involve a more complicated IIN design.

In at least some embodiments the multilayer architectures described herein may not be used with conventional holograms, because they would interfere with each other. Thus, SBG, which can be switched clear to allow time-domain integration of the field of view, may be employed to overcome this challenge.

One embodiment described herein is related to a HMD, such as one with the following specification:

a) 180° see-through visibility;

b) full color;

c) 52°×30° FOV;

d) 30 mm×30 mm eye box;

e) 2560×1440 resolution;

f) Snellen 20/20 acuity;

g) 30 mm eye relief;

h) universal IPD;

i) binocular; and j) polycarbonate optics.

One important feature of at least some of the embodiments described herein is that they provide the benefit of see-through. The latter is of great importance in Head Up Displays for automobile, aviation and other transport applications; private see-through displays such for security sensitive applications; architectural interior signage and many other applications. With the addition of a holographic brightness enhancing film, or other narrow band reflector affixed to one side of the display, the purpose of which is to reflect the display illumination wavelength light only, the see-through display can be made invisible (and hence secure) in the opposite direction of view. The reflected display illumination may be effectively mirrored and therefore blocked in one direction, making it desirable for transparent desktop display applications in customer or personal interview settings common in bank or financial services settings.

Although some of the embodiments above describe wearable displays, it will be clear that in any of the above embodiments the eye lens and retina may be replaced by any type of imaging lens and a screen. Any of the above described embodiments may be used in either directly viewed or virtual image displays. Possible applications range from miniature displays, such as those used in viewfinders, to large area public information displays. The above described embodiments may be used in applications where a transparent display is desired. For example, some embodiments may be employed in applications where the displayed imagery is superimposed on a background scene such as heads up displays and teleprompters. Some embodiments may be used to provide a display device that is located at or near to an internal image plane of an optical system. For example, any of the above described embodiments may be used to provide a symbolic data display for a camera viewfinder in which symbol data is projected at an intermediate image plane and then magnified by a viewfinder eyepiece. One embodiment may be applied in biocular or monocular displays. Another embodiment may also be used in a stereoscopic wearable display. Some embodiments may be used in a rear projection television. One embodiment may be applied in avionic, industrial and medical displays. There are applications in entertainment, simulation, virtual reality, training systems and sport.

Any of the above-described embodiments using laser illumination may incorporate a despeckler device for eliminating laser speckle disposed at any point in the illumination path from the laser path to the eyeglass. Advantageously, the despeckler is an electro-optic device. Desirable the despeckler is based on a HPDLC device.

REFERENCES

The following patent applications are incorporated by reference herein in their entireties:

U.S. Provisional Patent Application No. 61/627,202 with filing date 7 Oct. 2011 by the present inventors entitled WIDE ANGLE COLOR HEAD MOUNTED DISPLAY which is also referenced by the Applicant's docket number SBG106;

PCT Application No. US2008/001909, with International Filing Date: 22 Jul. 2008, entitled LASER ILLUMINATION DEVICE; PCT Application No. US2006/043938, entitled METHOD AND APPARATUS FOR PROVIDING A TRANSPARENT DISPLAY;

PCT Application No. PCT/GB2010/001982 entitled COMPACT EDGE ILLUMINATED EYEGLASS DISPLAY; PCT Application No. PCT/GB2010/000835 with International Filing Date: 26 Apr. 2010 entitled Compact holographic edge illuminated eyeglass display;

PCT Application No. PCT/GB2010/002023 filed on 2 Nov. 2010 entitled APPARATUS FOR REDUCING LASER SPECKLE; U.S. patent application: Ser. No. 10/555,661 filed 4 Nov. 2005 entitled SWITCHABLE VIEWFINDER DISPLAY;

U.S. Provisional Patent Application No. 61/344,748 with filing date 28 Sep. 2010 entitled Eye Tracked Holographic Edge Illuminated Eyeglass Display;

U.S. Provisional Patent Application 61/573,066 with filing date 24 Aug. 2011 by the present inventors entitled HOLOGRAPHIC POLYMER DISPERSED LIQUID CRYSTAL MATERIALS AND DEVICES;

U.S. Provisional Patent Application No. 61/457,835 with filing date 16 Jun. 2011 entitled HOLOGRAPHIC BEAM STEERING DEVICE FOR AUTOSTEREOSCOPIC DISPLAYS; PCT Application No. US2008/001909, with International Filing Date: 22 Jul. 2008, entitled LASER ILLUMINATION DEVICE;

PCT Application No. PCT/GB2010/002023 filed on 2 Nov. 2010 by the present inventors entitled APPARATUS FOR REDUCING LASER SPECKLE;

U.S. Provisional Patent Application No. 61/573,121 with filing date 7 Sep. 2011 by the present inventors entitled METHOD AND APPARATUS FOR SWITCHING HPDLC ARRAY DEVICES which is also referenced by the Applicant's docket number SBG105B;

PCT Application No. PCT/GB2010/000835 with International Filing Date: 26 Apr. 2010 entitled COMPACT HOLOGRAPHIC EDGE ILLUMINATED EYEGLASS DISPLAY (and also referenced by the Applicant's docket number SBG073PCT); and U.S. Provisional Patent Application 61/573,082 with filing date 29 Aug. 2011 by the present inventors entitled CONTACT IMAGE SENSORS.

Micro-Tessellations

One set of embodiments uses Micro Tessellations. The performance of microtessellations gratings in the context of a Switchable Bragg Grating DigiLens™ waveguide device will now be explored. Tessellation is a pattern of repeating shapes that fit together without gaps. Use of the term 'tessellation' may refer to a single element of a tessellation pattern. In the practical application of tessellations pertaining to DigiLens™ devices tessellation also means the creation of patterns without substantial gaps between tessellation elements—i.e., where there is high overall aperture fill factor.

A tessellation element is a region (aperture) of diffraction grating or diffraction gratings, which may be a switchable diffraction grating (SBG). The tessellation will diffract light over all regions of the tessellation at the same time. The diffraction grating may be switchable or non-switchable.

Micro-Tessellation: this is a small tessellation that exists within a larger primary tessellation element. The microtessellations within a primary tessellation may have different grating prescriptions. Micro-tessellation elements that exist within a primary tessellation element all diffract at the same time. The performance of tessellations and their impact on MTF has been described in earlier documents, wherein a single grating was written into the tessellation.

Microtessellations within a Primary Tessellation Structure

Performance considerations of interest are: MTF (resolution) and uniformity of field angles.

In a tiled substrate guided (SGO), a single field of view will exist in the waveguide. At any given moment in time, this will carry field of view information for a portion of the overall field of view. In the case of an eye display, this is a portion of the projected field that is out coupled from the SGO. The out-coupling gratings need to out-couple this field of view content such that the eye can see this field of view information across the eye box, desirably with the same flux entering the eye for each field angle and for all field angles at any position of the eye pupil within the eyebox. From earlier work it is recognized that larger tessellations yield superior MTF (resolution) performance, and field of view irradiance on the eye's pupil is more uniform with smaller tessellations. Outcoupling gratings angular bandwidth leads to a fall off in the output light with field angle. A minimum tessellation size to yield sufficient resolution is dependent on the system resolution sought. However, a minimum tessellation aperture size of 0.5 mm to 1 mm width (or diameter) will approximately be needed to support 0.7 to 1.4 lp/mr resolutions, with larger apertures being preferred in one embodiment. This particularly affects high spatial frequency performance.

A tessellation is a region of the out-coupling grating that, when in a diffracting state, will diffractively out-couple the light at all points in that tessellation aperture region at the same time. The regions within a tessellation may contain with one grating prescription or a plurality of grating prescriptions. This plurality of grating prescriptions may be achieved either by multiplexing the gratings (grating prescriptions share the same area of the tessellation), or by having spatially discrete regions of the tessellation into which is written a single grating only. A microtessellation is small tessellation that is switched at the same time as other small tessellation areas. The case of spatially discrete microtessellations (J) is examined following.

$\mu T$ gratings may be designed to have angular bandwidth overlap with the neighboring $\mu Ts$ (in angular field). Modeling micro-tessellations for a given field angle in one embodiment is described below. One case to consider is FoV overlap of micro-tessellations causing different field angles to be output at different points. Another case to consider is equal irradiance of eye pupil from multiple micro-tessellations for a given field angle. Some field angles would output light equally from multiple micro-tessellations, thereby providing the same irradiance of the eye pupil. It is assumed that some micro-tessellations would then provide less, or no, irradiance of the eye pupil. A top hat model would be appropriate to model this case.

Unequal irradiance of eye pupil from multiple micro-tessellations for a given field angle is investigated. To model this case, an unequal aperture weighting needs to be modeled. For any given single field angle, the output from micro-tessellations to micro-tessellations may not be a smooth function, but rather a step function, as shown in the spatial distribution plots below.

Non-Limiting Working Examples

The modeling that follows firstly evaluated the equal irradiance case for 25%, 50% and 75% aperture fill. Most field angle cases will not be top hat, and must be evaluated with a representative field angle weighting function for different micro-tessellations.

Figure 42A:
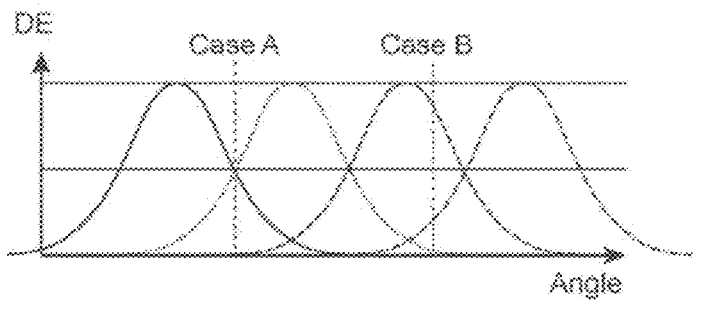
FIG. 42A is a chart showing the variation of diffraction efficiency with angle for a micro tessellated pattern in one embodiment of the invention in one embodiment.
Figure 42B:
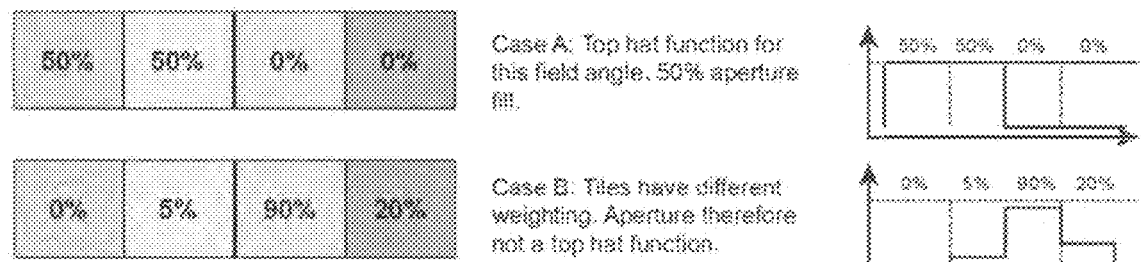
FIG. 42B shows the micro-tessellation distribution corresponding to the chart of FIG. 42A in one embodiment.

A typical angular distribution is shown in FIG. 42A. The corresponding spatial distribution is shown in FIG. 42B. In Case A, a top hat function for this field angle gives 50% aperture fill. In Case B, the tiles have different weighting. Aperture therefore is not a top hat function. Note that micro tessellations do not need to be square or in the order as shown and may have any shape or order, such as a 2D distribution.

Structured and random arrangements were investigated. The following Figures show Non-Random, Regular Repeating Micro-Tessellation Patterns.

Figure 43A:
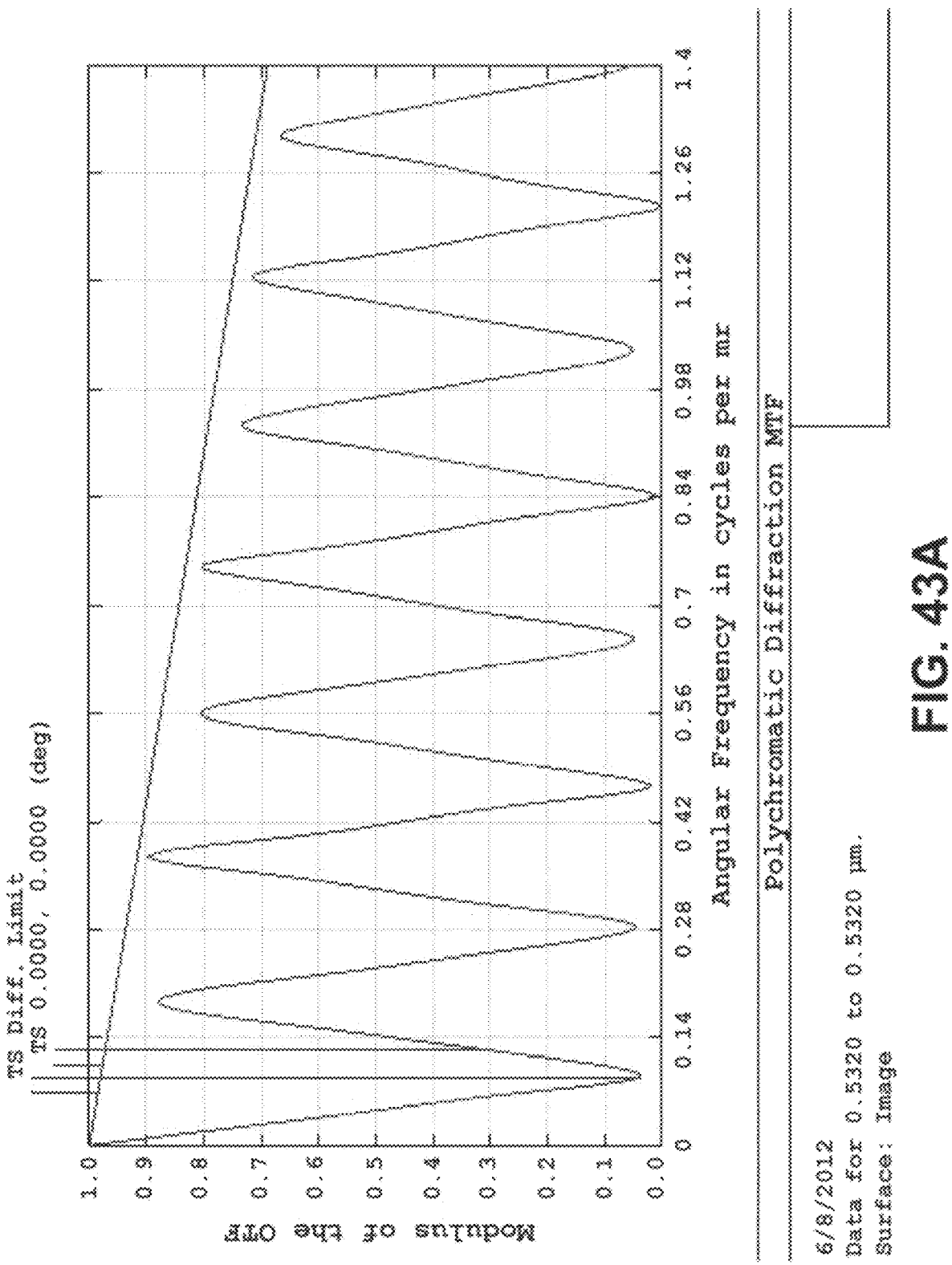
FIG. 43A is a chart showing a MTF plot for a regular micro tessellation pattern with 50% aperture fill in one embodiment.
Figure 44A:
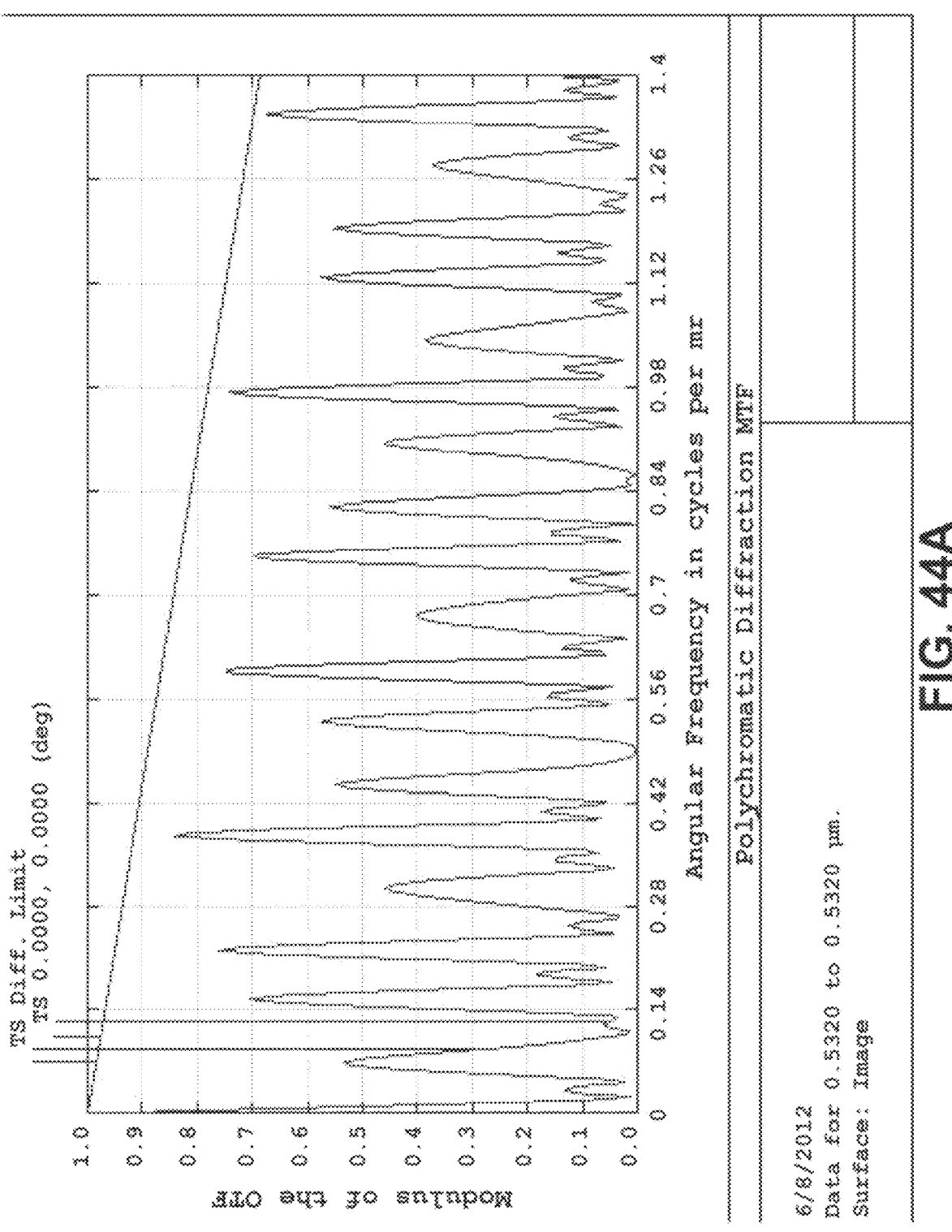
FIG. 44A is a chart showing a MTF plot for a regular micro tessellation pattern with 25% aperture fill in one embodiment.
Figure 45A:
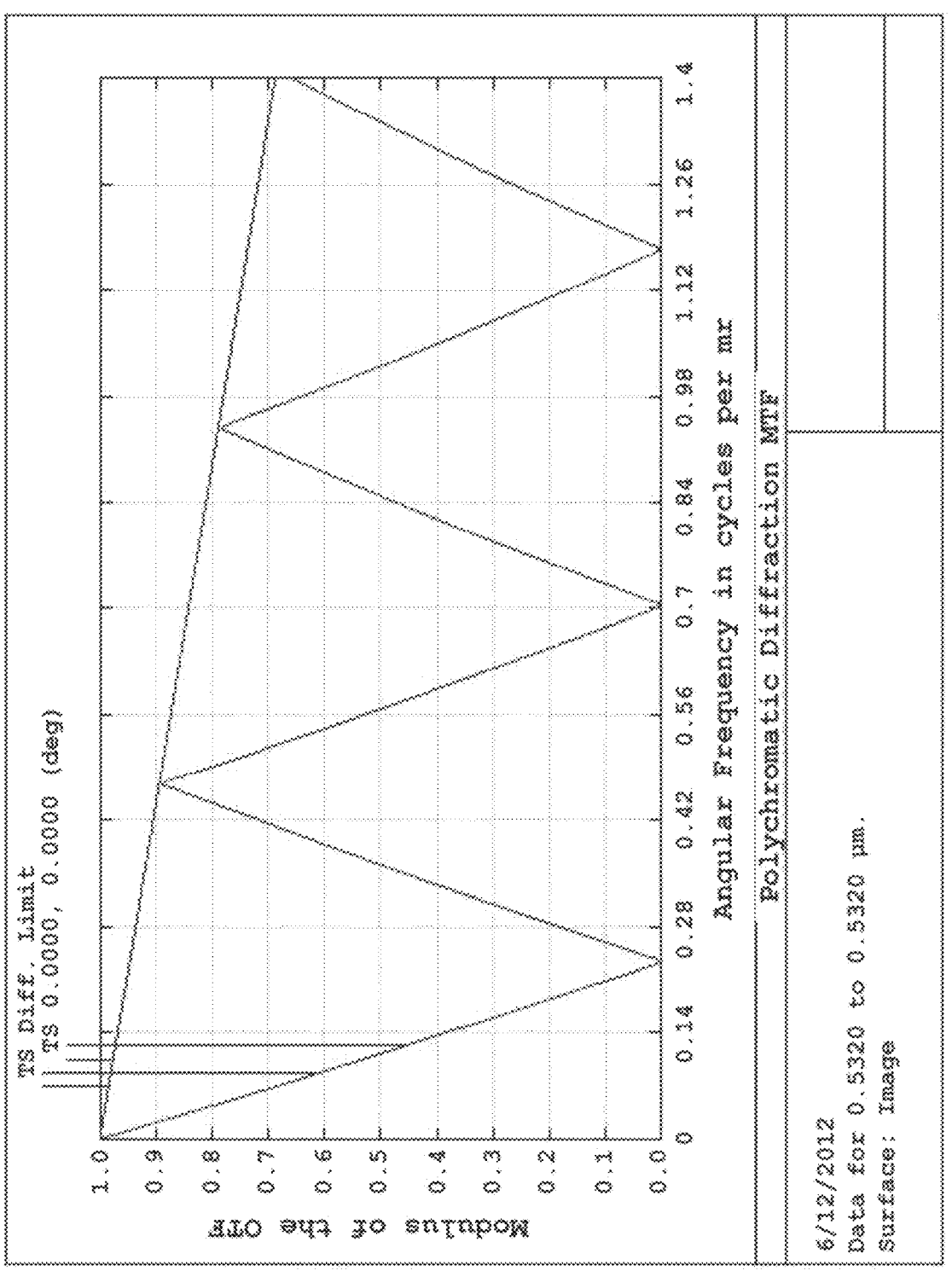
FIG. 45A is a chart showing a MTF plot for a regular micro tessellation pattern with 50% aperture fill in one embodiment.
Figure 45B:
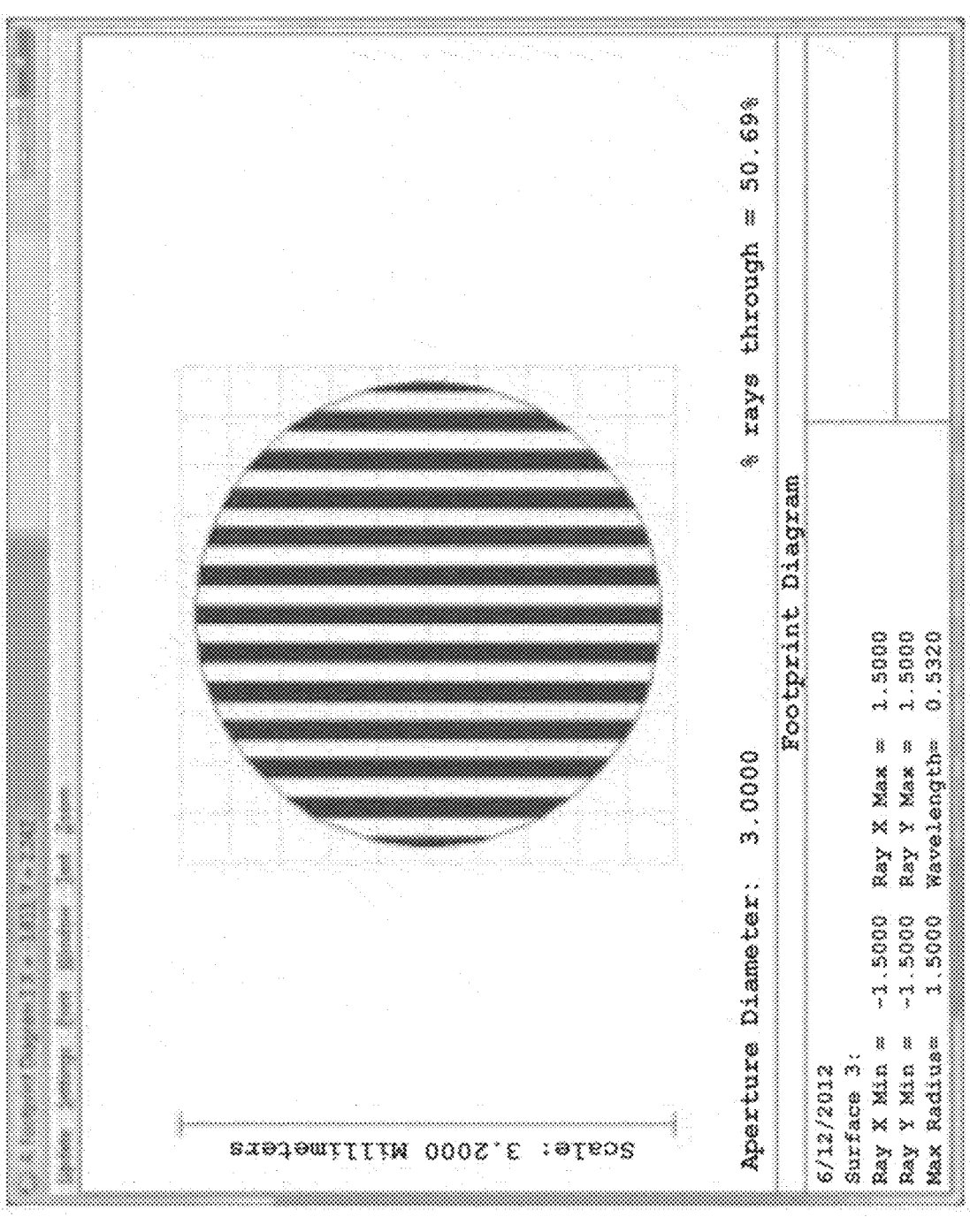
FIG. 45B is a footprint diagram for the case of FIG. 45A in one embodiment.

FIG. 43 illustrates MTF curves (FIG. 43A) and a 3D layout drawing FIG. 43B showing the effects of 50% aperture fill: 50 um apertures on a 100 um pitch, 3 mm eye pupil. It was assumed 10 um apertures on 40 um pitch (25% fill factor) and green light (532 nm) only. Note the high modulation in the resulting frequency space. FIG. 44 shows the effects of 25% aperture fill: 10 um apertures on 40 um pitch, 3 mm eye pupil. MTF and 3D layout plots are provided. 10 um apertures on 40 um pitch (25% fill factor). Green (532 nm) are assumed. FIG. 45 shows the effects 50% aperture fill: 125 um apertures on 250 um pitch, 3 mm eye pupil using a MTF plot (FIG. 45A) and a footprint diagram (FIG. 45B). 125 um stripe apertures on 250 um pitch (50% fill factor) and Green (532 nm) are assumed. The non-randomized, regular periodic structures exhibit dips in the MTF through out the angular frequency range of interest, typically: 1.4 cyc/mr.

Random Micro-Tessellation Patterns were considered next. Results from periodic aperture functions show 'holes' in the MTF. The following investigates randomization of the eye pupil fill using micro tessellations. Tessellation % fill of 25%, 50% and 75% are considered. For this initial analysis, the tessellation was considered to be 100% of the eye pupil. Later cases consider a 1 mm square tessellation that contains micro tessellations with a 3 mm eye pupil.

Figure 46A:
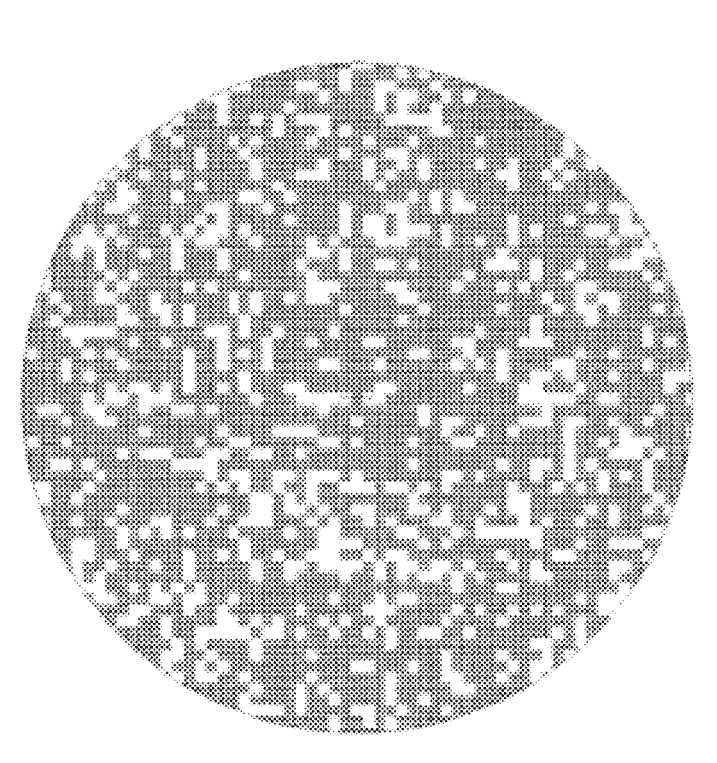
FIG. 46A is a footprint diagram showing the effect of 75% aperture fill for 50 micron micro tessellations in one embodiment.
Figure 46B:
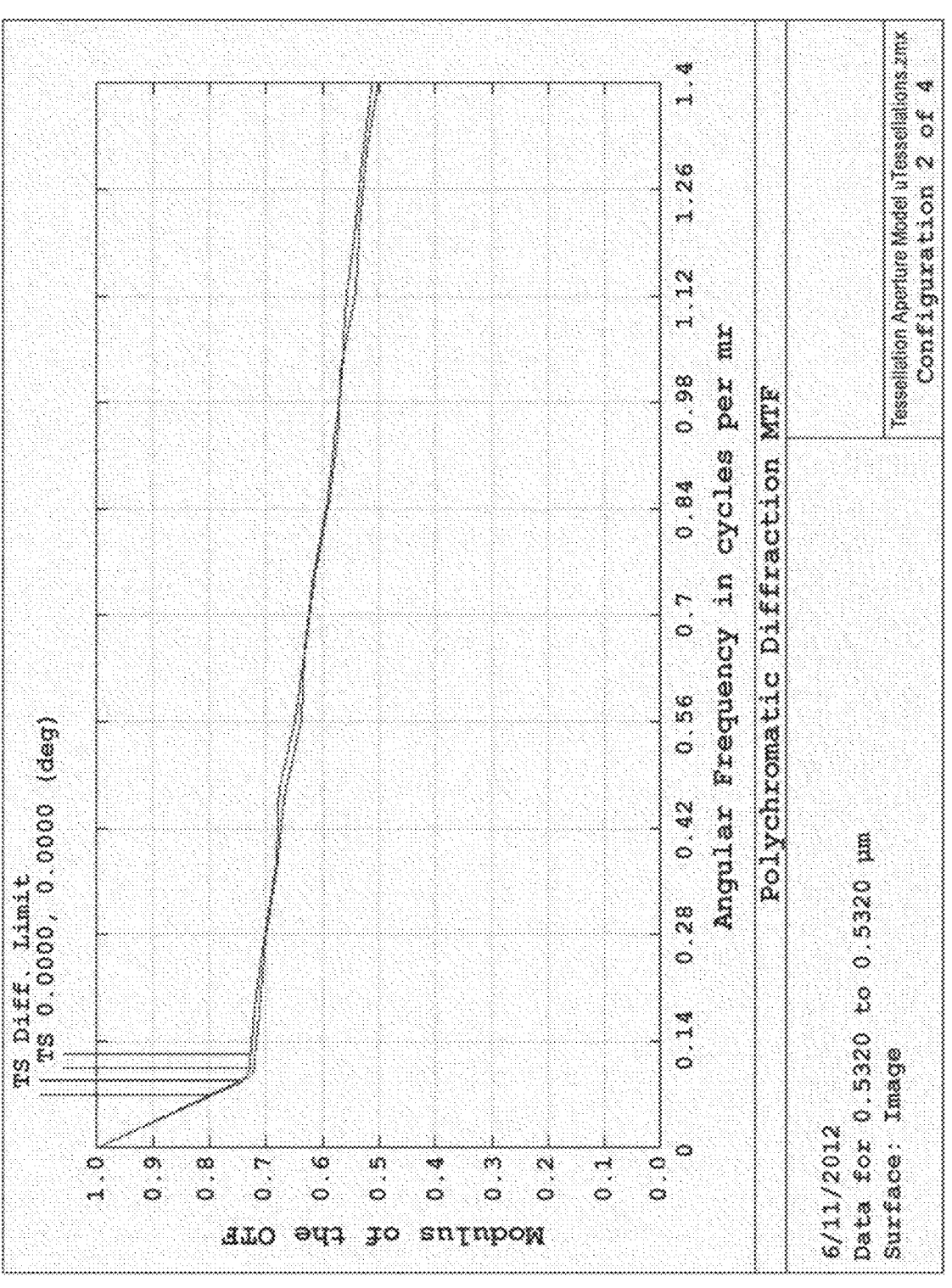
FIG. 46B is a chart showing a MTF plot illustrating the effect of 75% aperture fill for 50 micron micro tessellations in one embodiment.
Figure 47A:
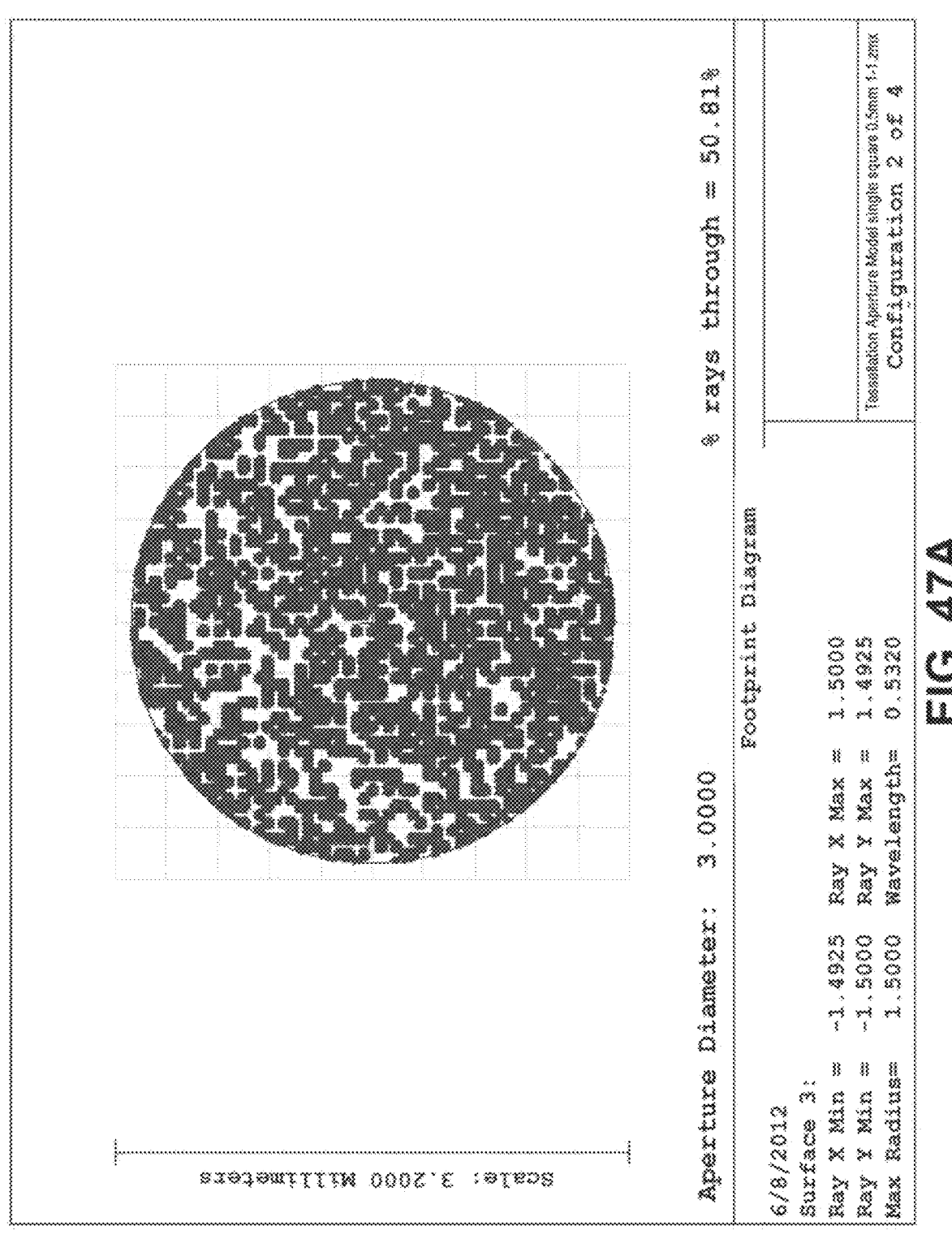
FIG. 47A is a footprint diagram showing the effect of 50% aperture fill for 50 micron micro tessellations in one embodiment.
Figure 47B:
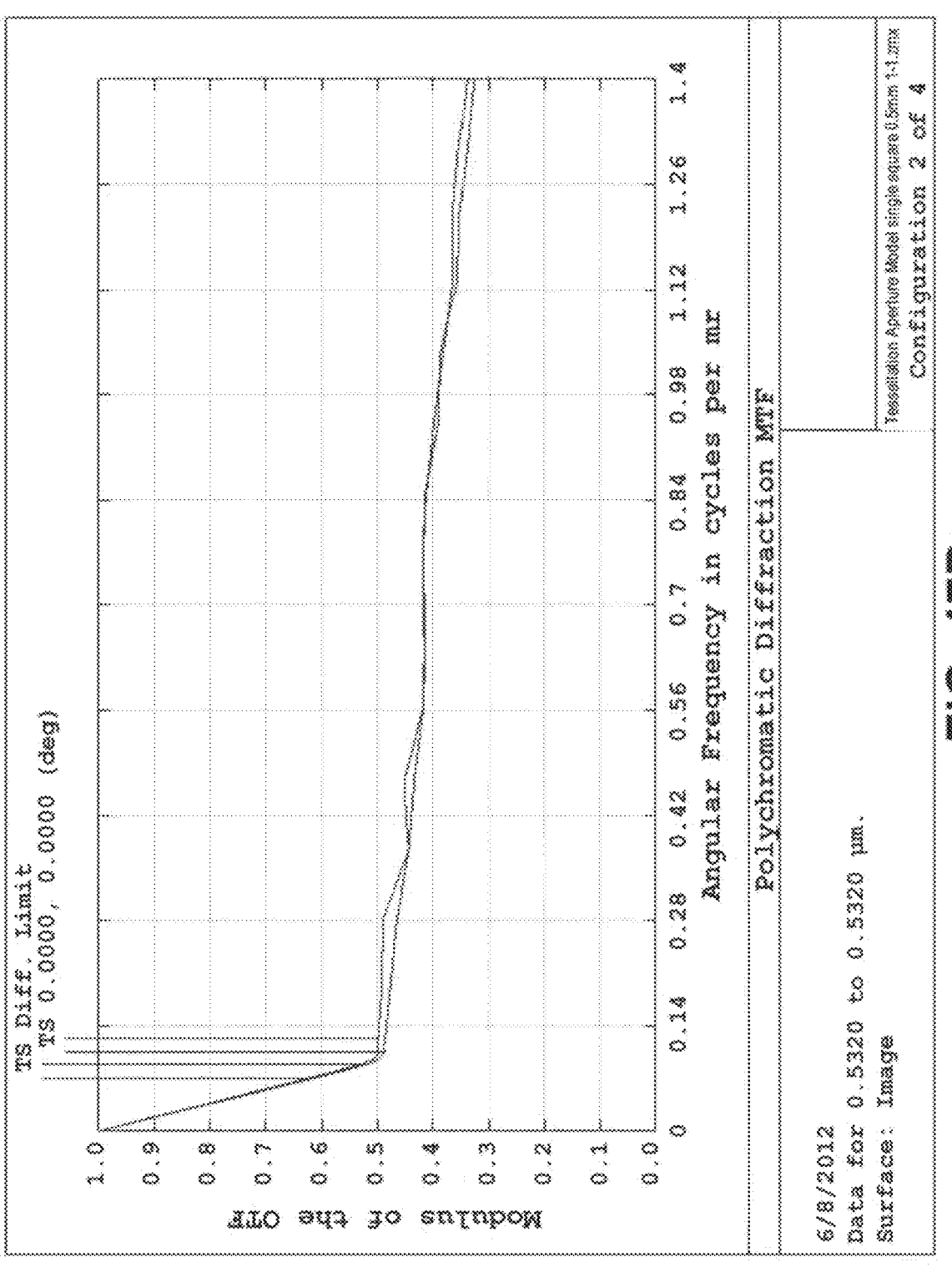
FIG. 47B is a chart showing a MTF plot illustrating the effect of 50% aperture fill for 50 micron micro tessellations in one embodiment.
Figure 48A:
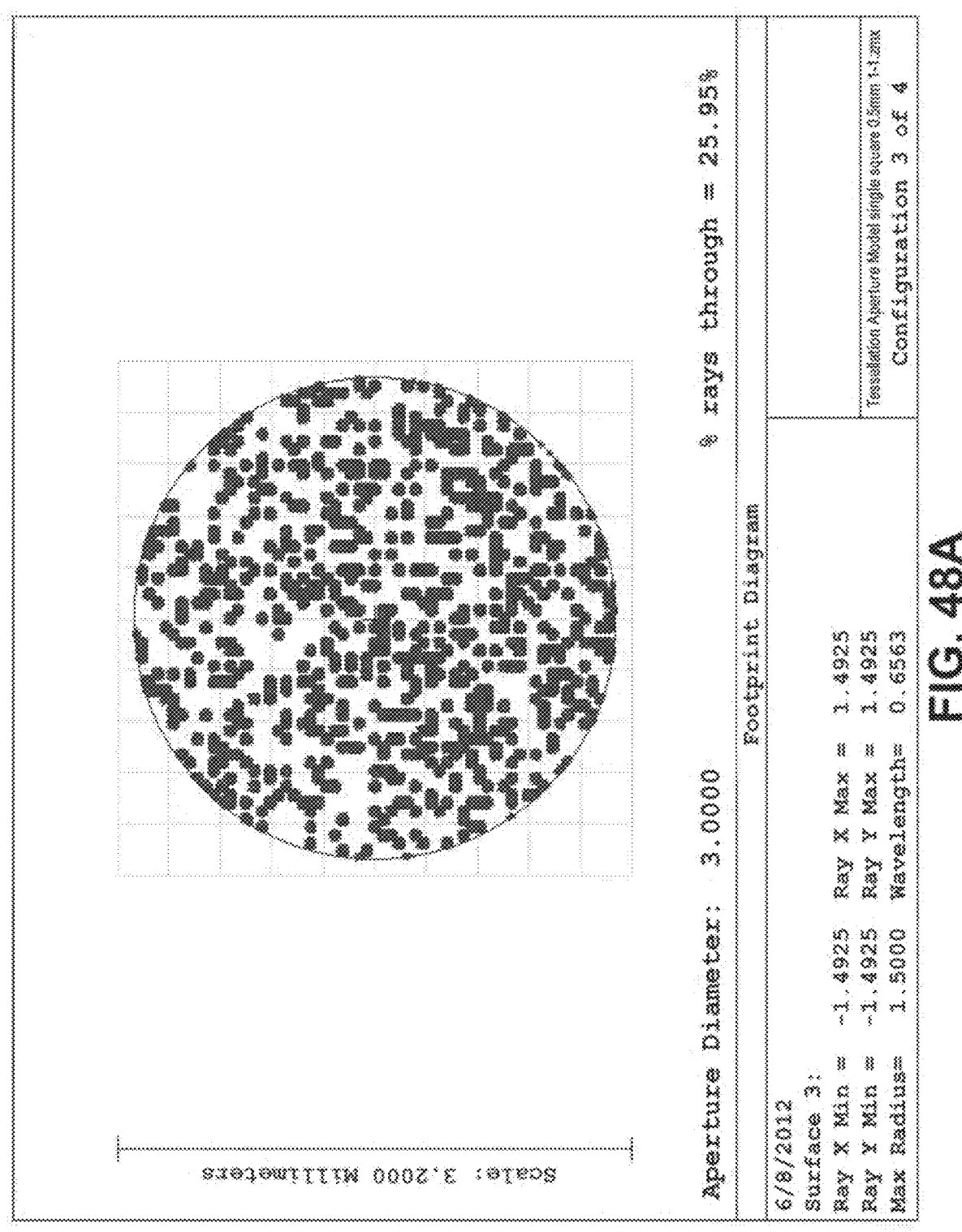
FIG. 48A is a footprint diagram showing the effect of 25% aperture fill for 50 micron micro tessellations in one embodiment.
Figure 48B:
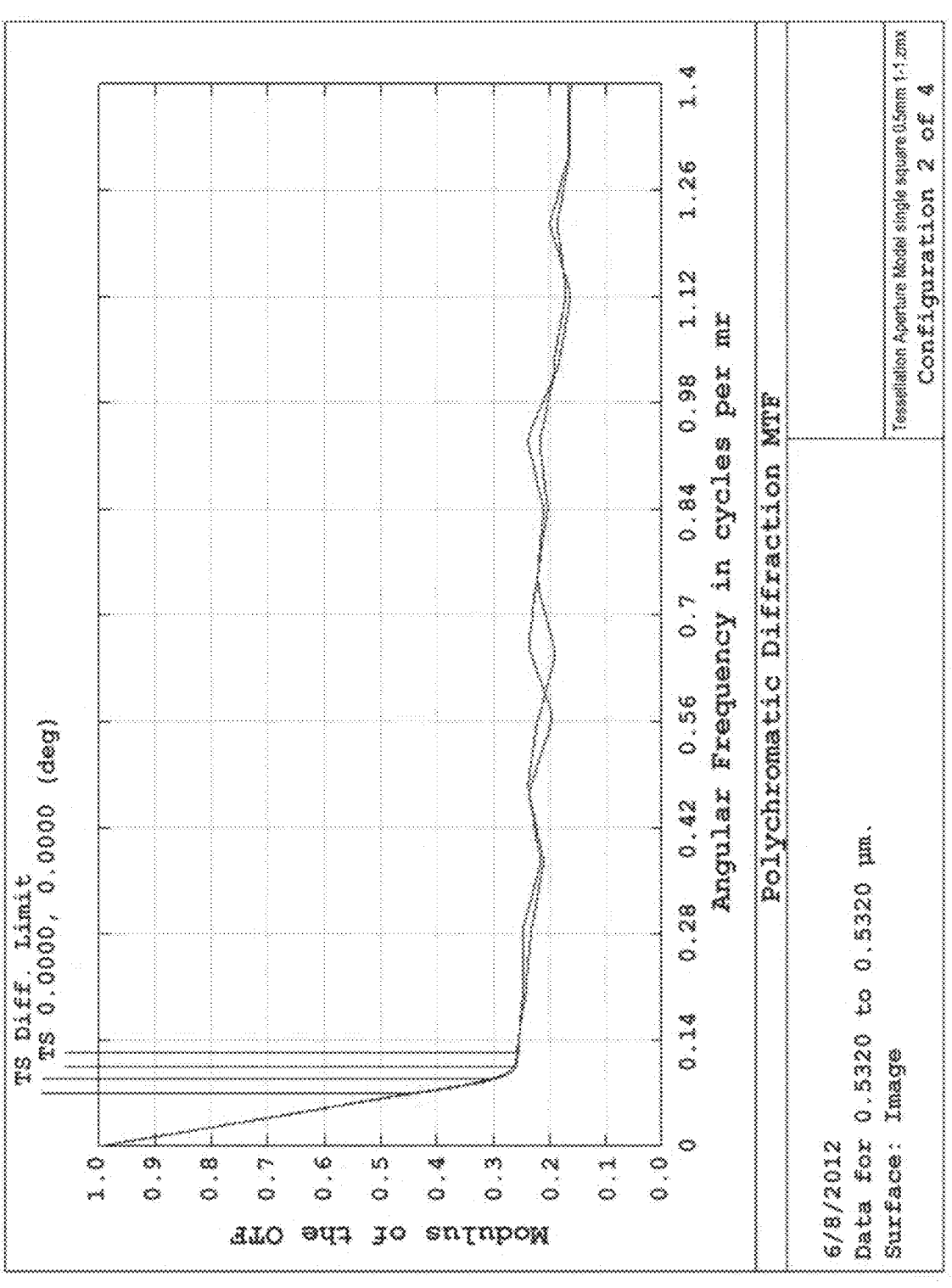
FIG. 48B is a chart showing a MTF plot illustrating the effect of 25% aperture fill for 50 micron micro tessellations in one embodiment.

The following illustrations illustrate the characteristics of 50 micron micro-tessellations. FIG. 46A is a footprint diagram showing the effect of 75% aperture fill of 50 um micro tessellations in 3 mm eye pupil. FIG. 46B is a MTF plot showing the effect of 75% aperture fill of 50 um micro tessellations in 3 mm eye pupil FIG. 47A is a footprint diagram showing the effect of 50% aperture fill of 50 um micro tessellations in 3 mm eye pupil FIG. 47B is a MTF plot showing the effect of 50% aperture fill of 50 um micro tessellations in 3 mm eye pupil FIG. 48A is a footprint diagram showing the effect of 25% aperture fill of 50 um micro tessellations in 3 mm eye pupil FIG. 48B is a MTF plot showing the effect of 25% aperture fill of 50 um micro tessellations in 3 mm eye pupil.

Figure 49A:
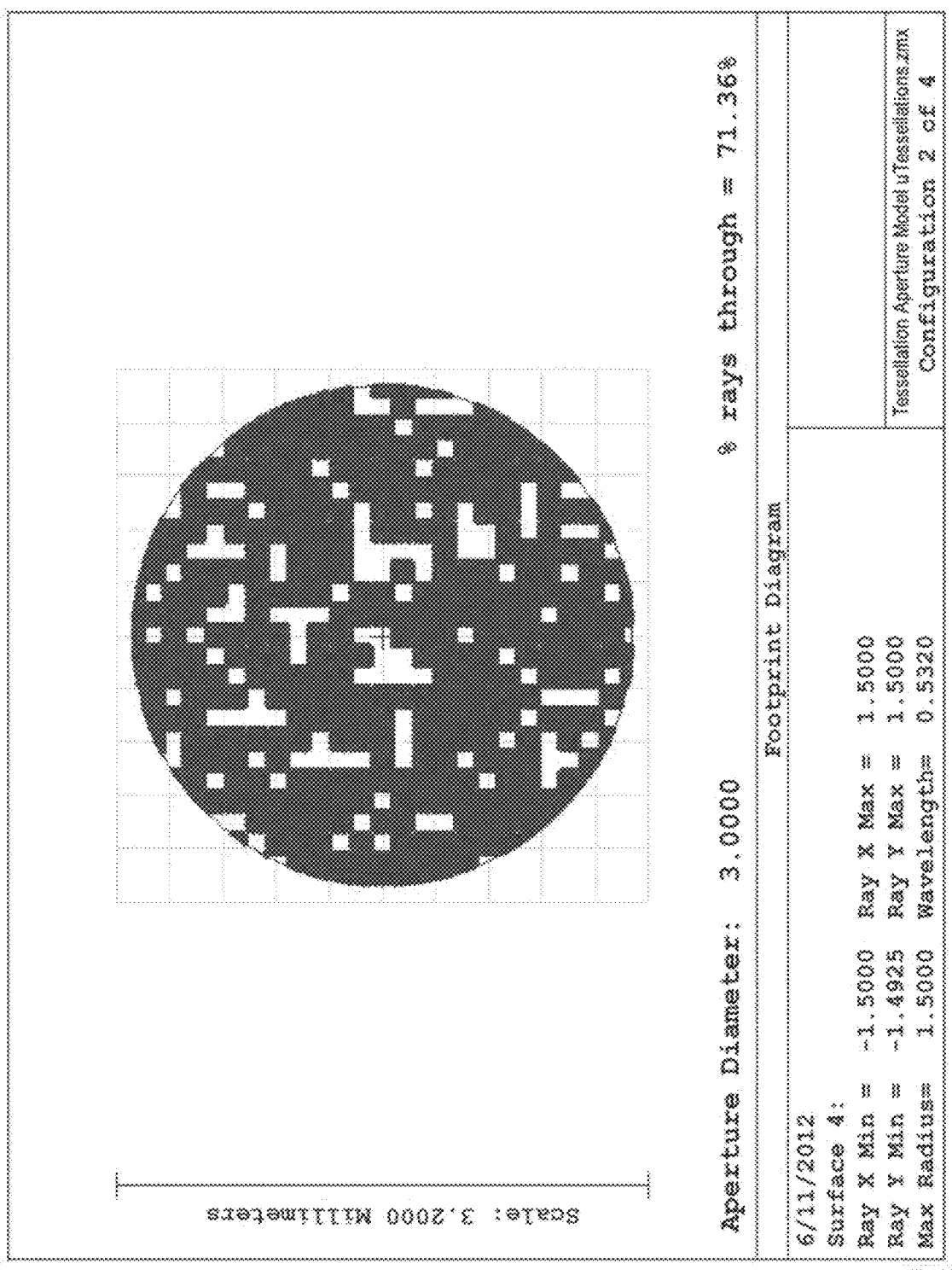
FIG. 49A is a footprint diagram showing the effect of 75% aperture fill for 125 micron micro tessellations in one embodiment.
Figure 49B:
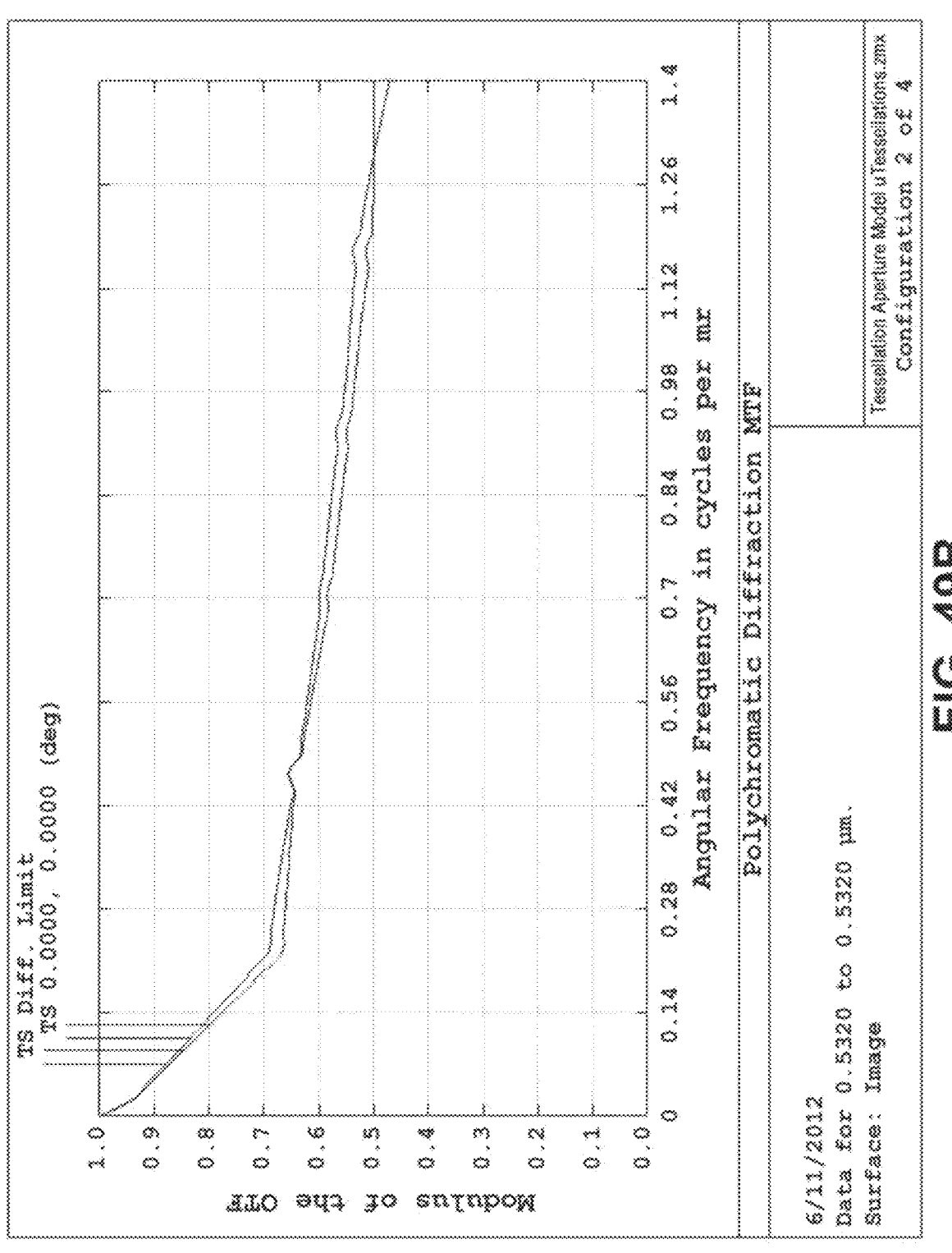
FIG. 49B is a chart showing a MTF plot illustrating the effect of 75% aperture fill for 125 micron micro tessellations in one embodiment.
Figure 50A:
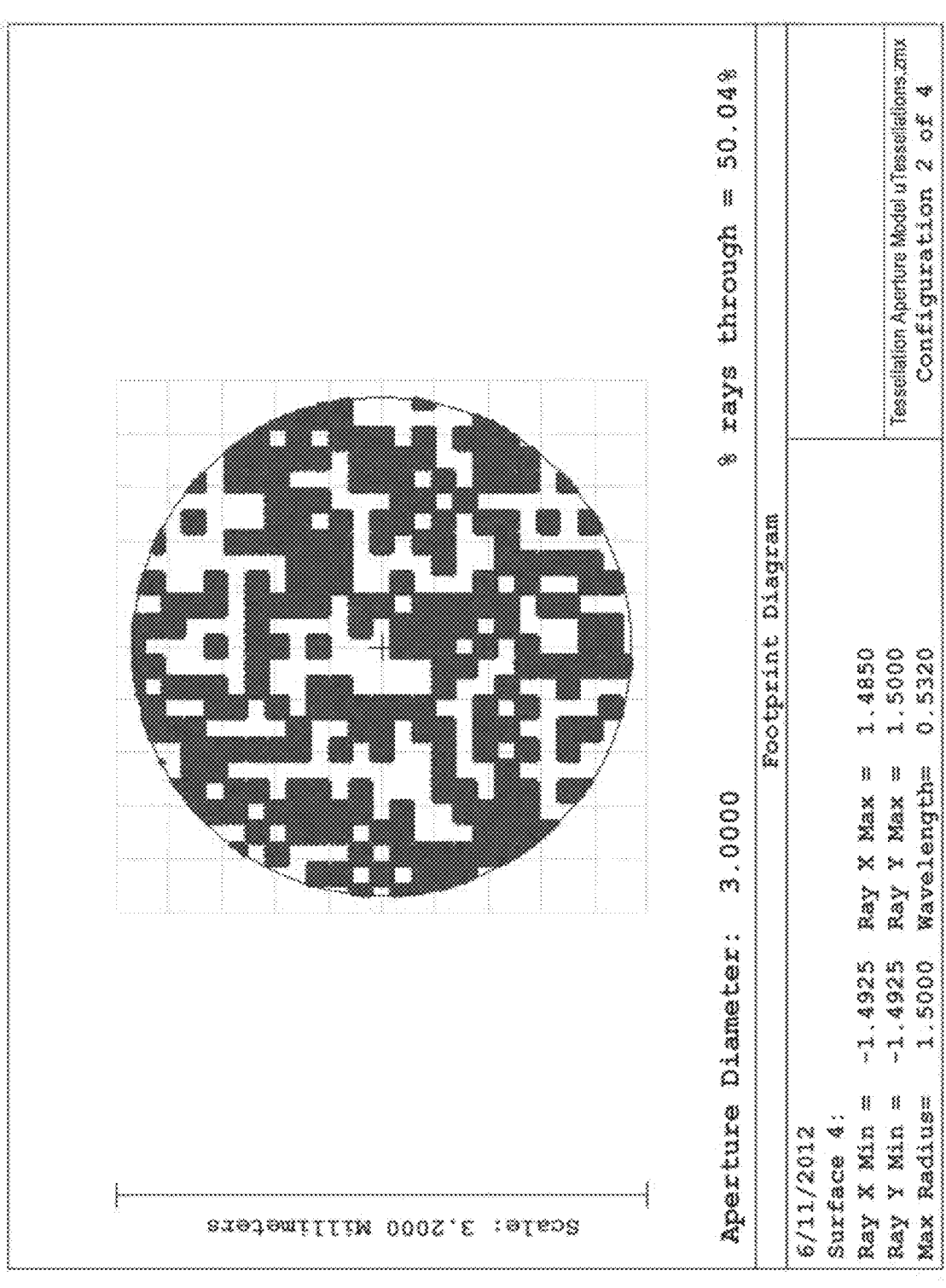
FIG. 50A is a footprint diagram showing the effect of 50% aperture fill for 125 micron micro tessellations in one embodiment.
Figure 50B:
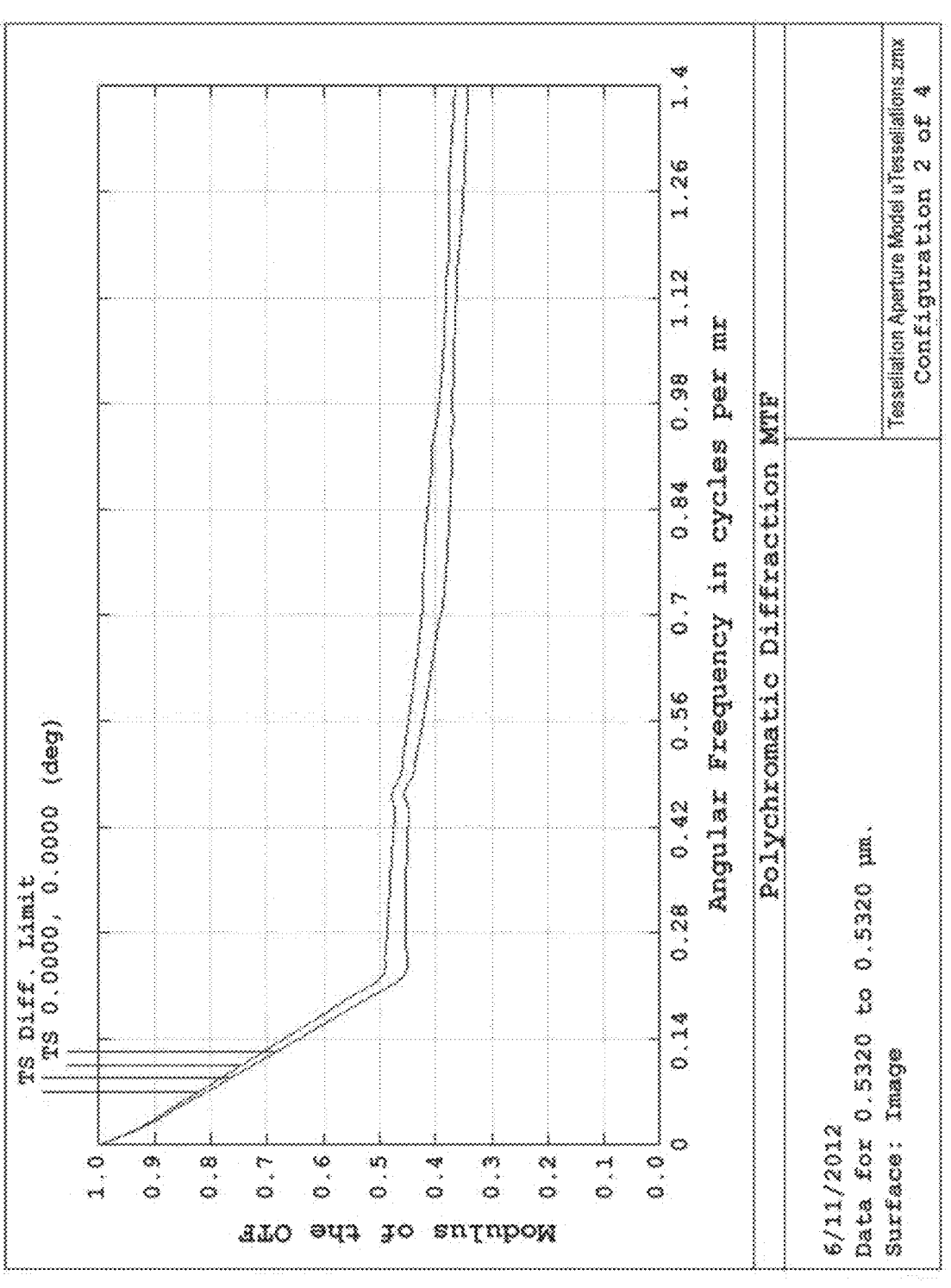
FIG. 50B is a chart showing a MTF plot illustrating the effect of 50% aperture fill for 125 micron micro tessellations in one embodiment.
Figure 51A:
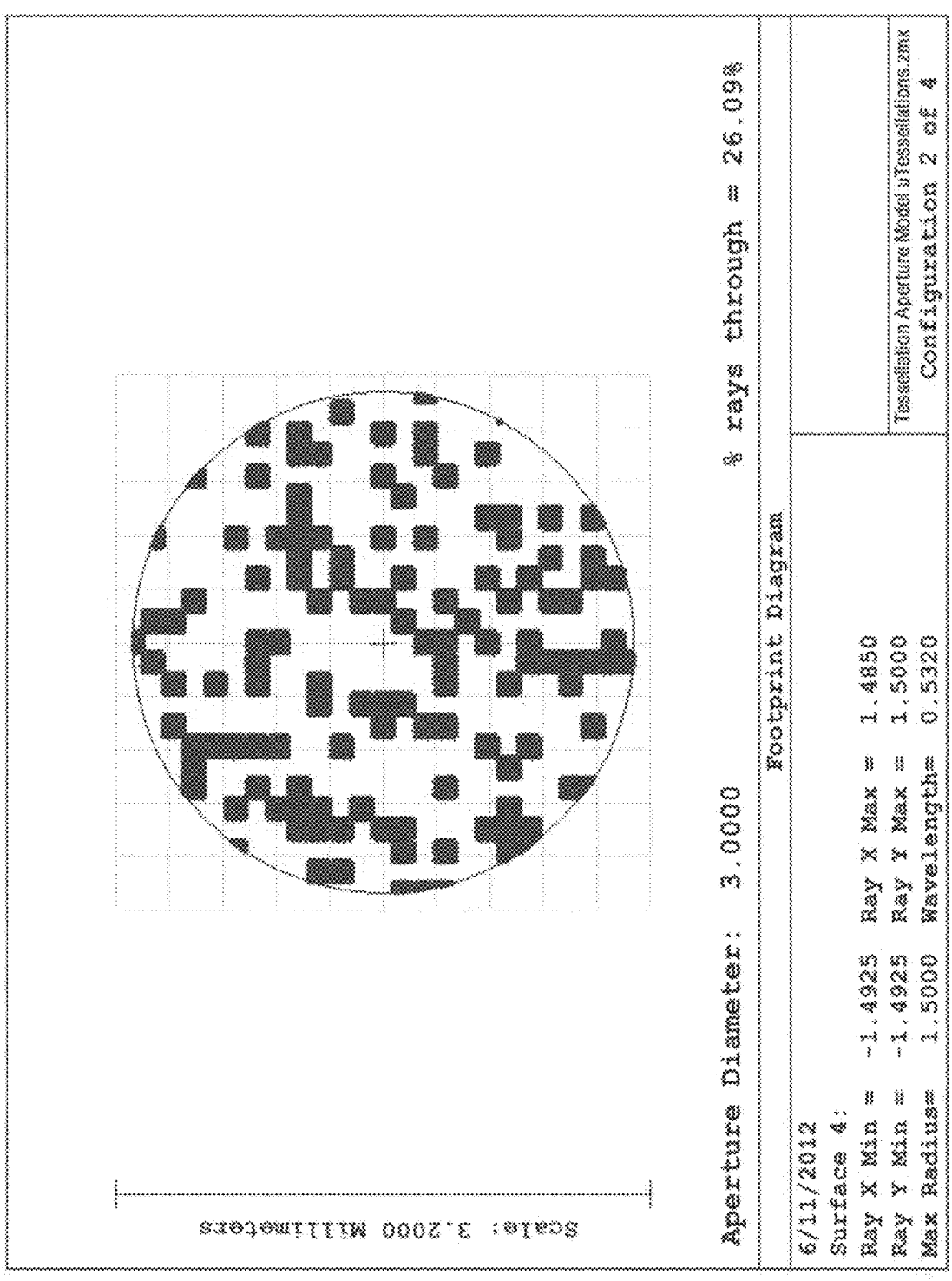
FIG. 51A is a footprint diagram showing the effect of 25% aperture fill for 125 micron micro tessellations in one embodiment.
Figure 51B:
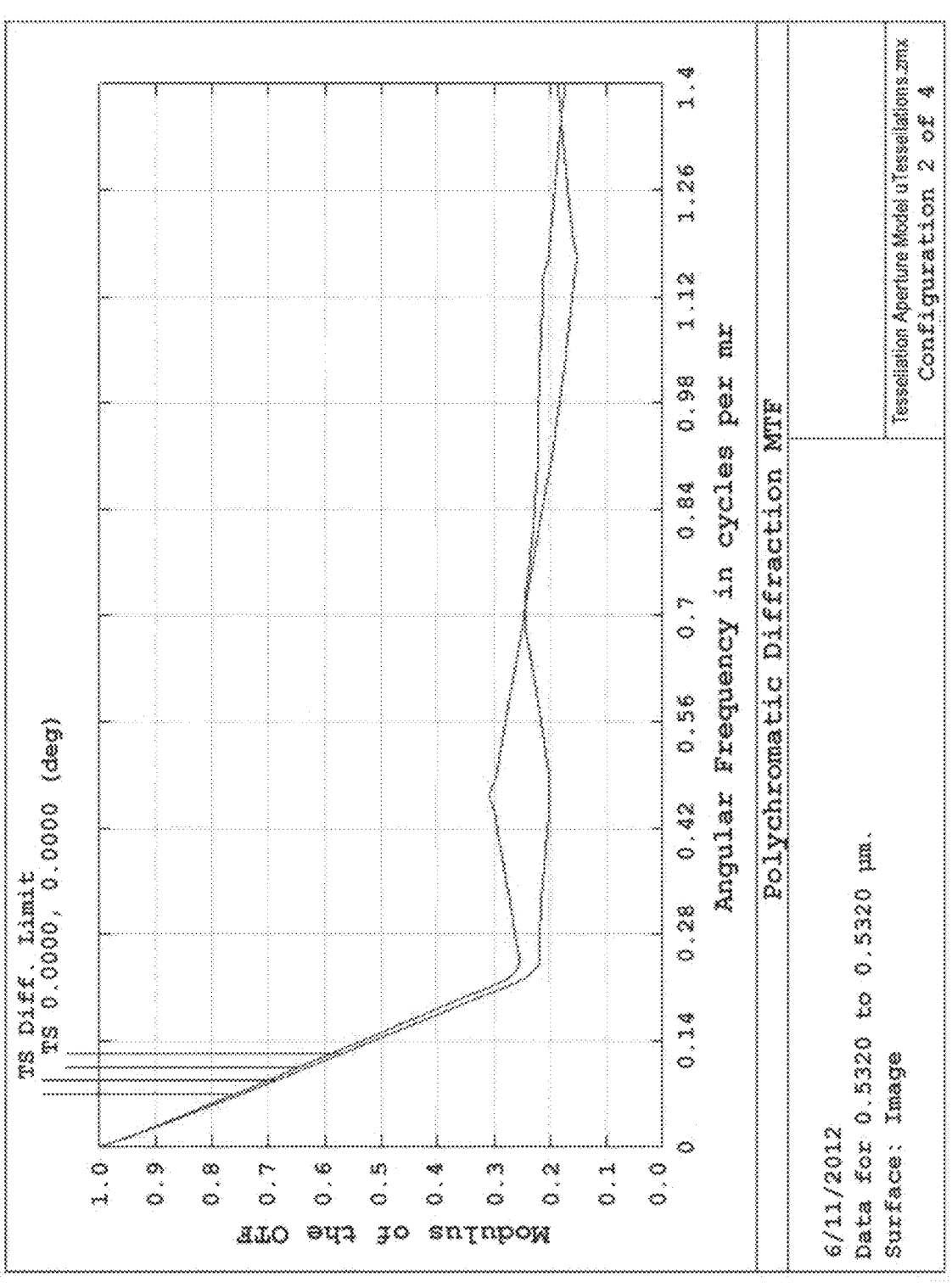
FIG. 51B is a chart showing a MTF plot illustrating the effect of 25% aperture fill for 125 micron micro tessellations in one embodiment.

125 micron micro-tessellation was investigated next. FIG. 49A is a footprint diagram showing the effect of 75% Aperture Fill of 125 um micro tessellations 3 mm Eye Pupil. FIG. 49B is a footprint diagram showing the effect of 75% Aperture Fill of 125 um micro tessellations 3 mm Eye Pupil. FIG. 50A is a footprint diagram showing the effect of 50% Aperture Fill of 125 um micro tessellations 3 mm Eye Pupil. FIG. 50B is a MTF plot showing the effect of 50% Aperture Fill of 125 um micro tessellations 3 mm Eye Pupil. FIG. 51A is a footprint diagram showing the effect of 25% Aperture Fill of 125 um micro tessellations 3 mm Eye Pupil. FIG. 51B is a MTF plot showing the effect of 25% Aperture Fill of 125 um micro tessellations 3 mm Eye Pupil.

Figure 52A:
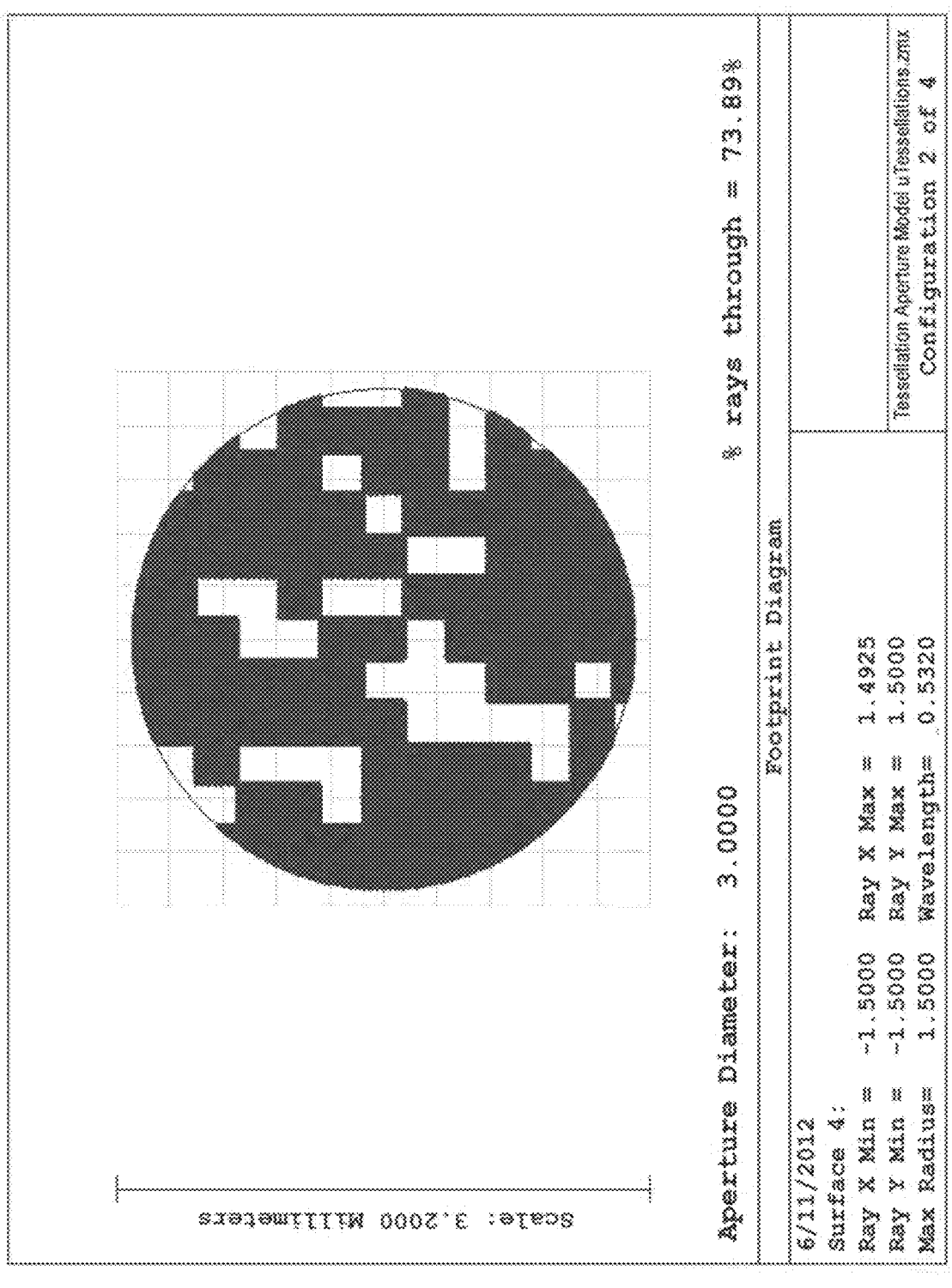
FIG. 52A is a footprint diagram showing the effect of 75% aperture fill for 250 micron micro tessellations in one embodiment.
Figure 52B:
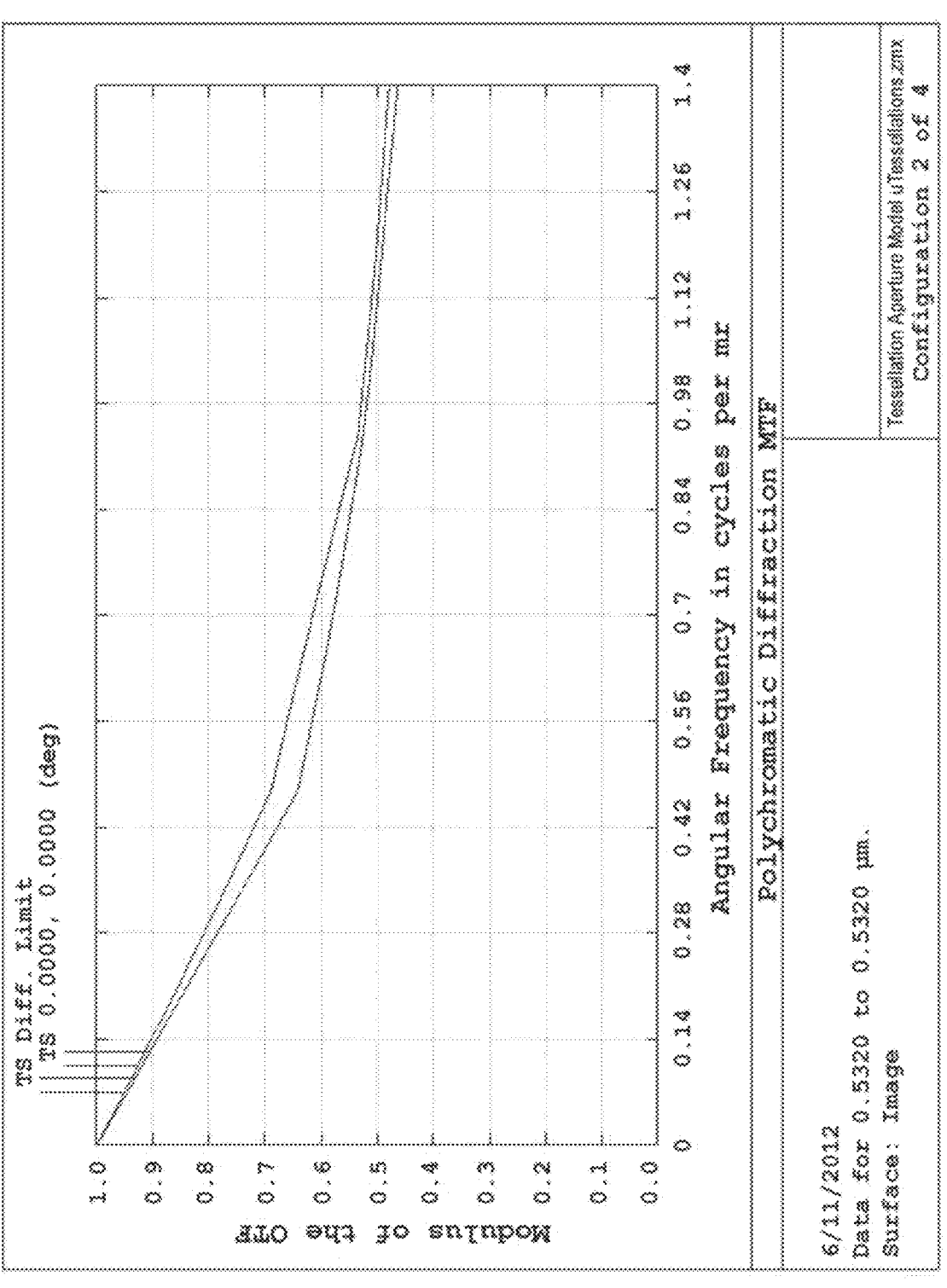
FIG. 52B is a chart showing a MTF plot illustrating the effect of 75% aperture fill for 250 micron micro tessellations in one embodiment.
Figure 53A:
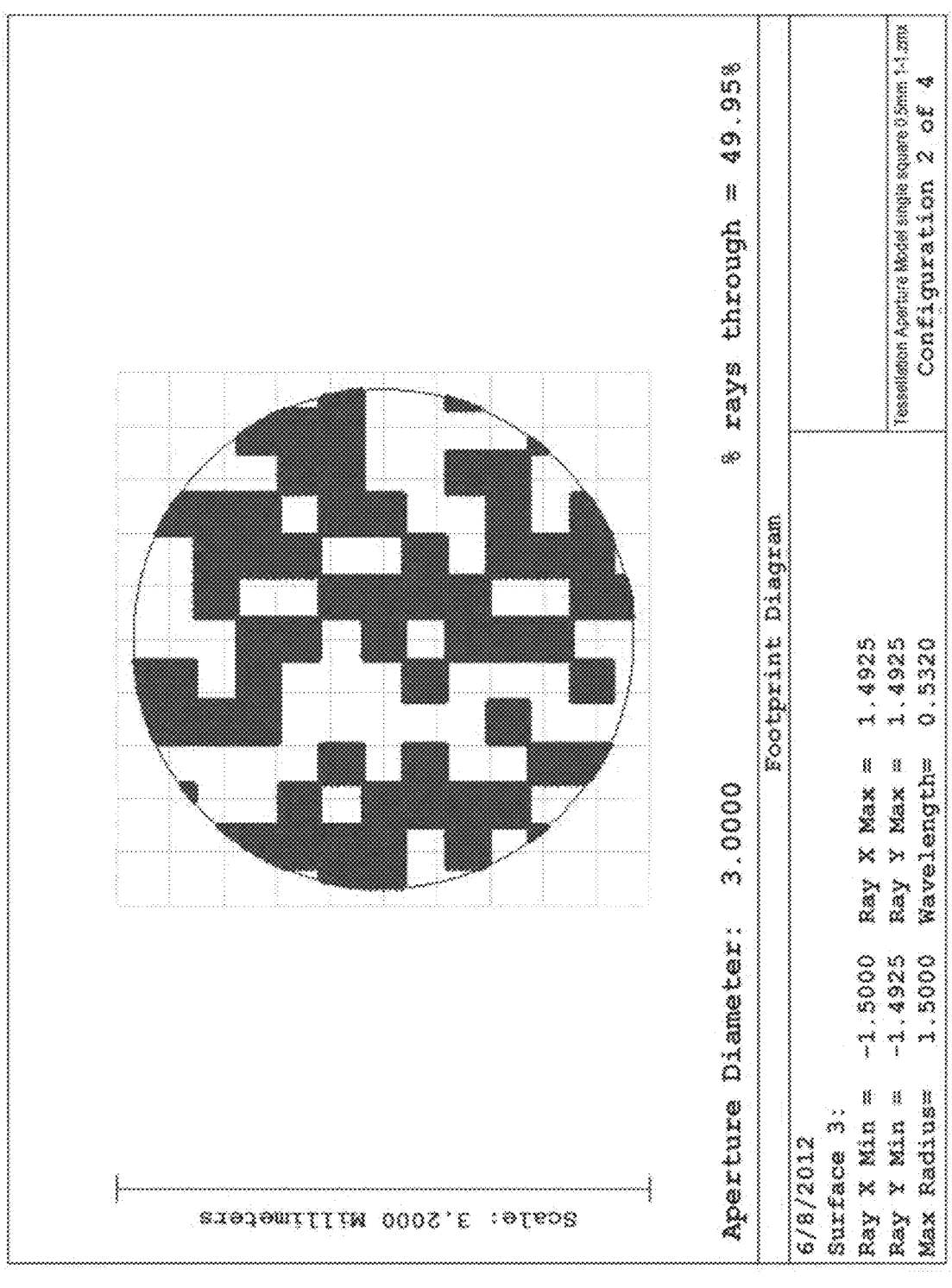
FIG. 53A is a footprint diagram showing the effect of 50% aperture fill for 250 micron micro tessellations in one embodiment.
Figure 53B:
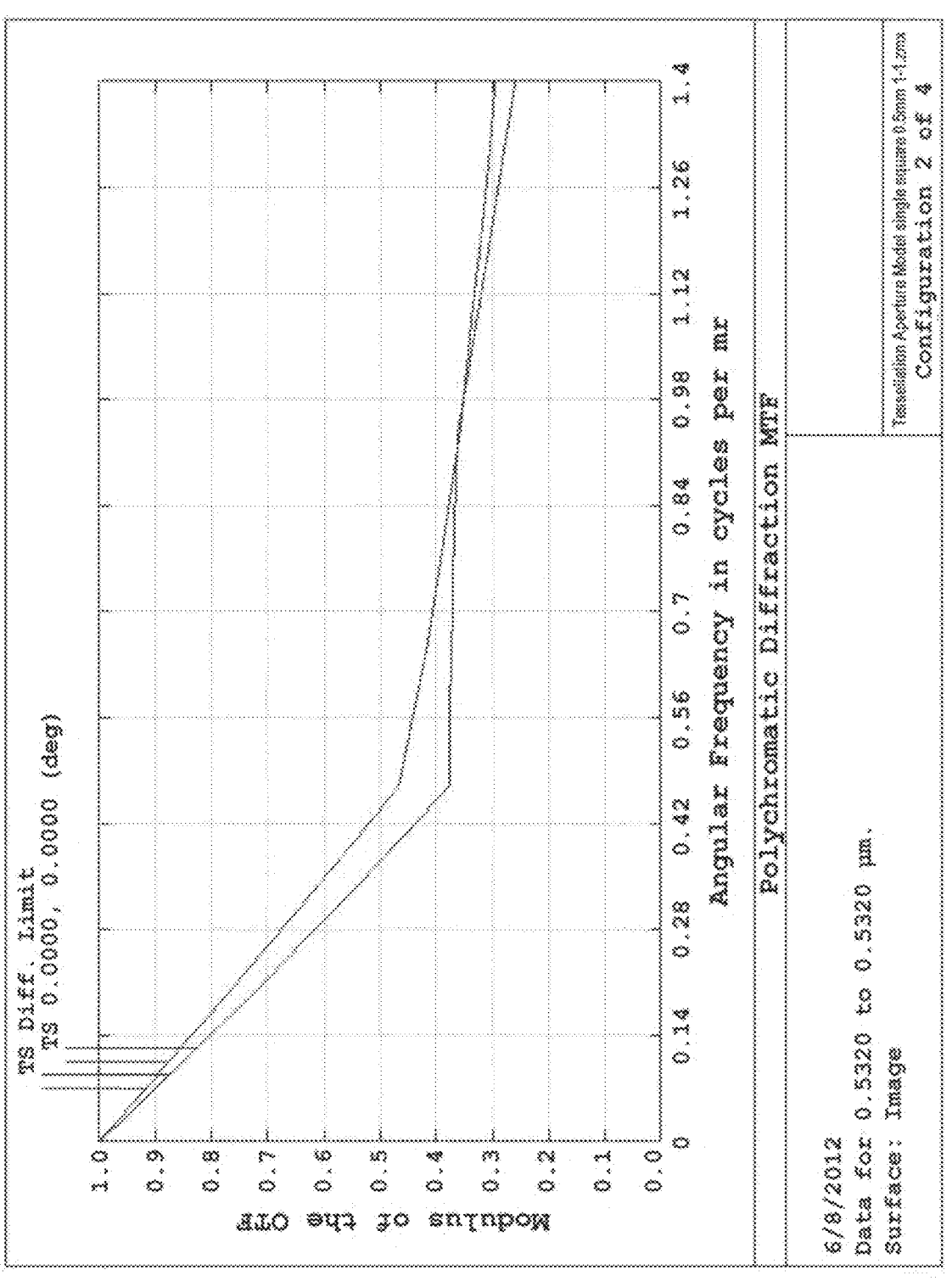
FIG. 53B is a chart showing a MTF plot illustrating the effect of 50% aperture fill for 250 micron micro tessellations in one embodiment.
Figure 54A:
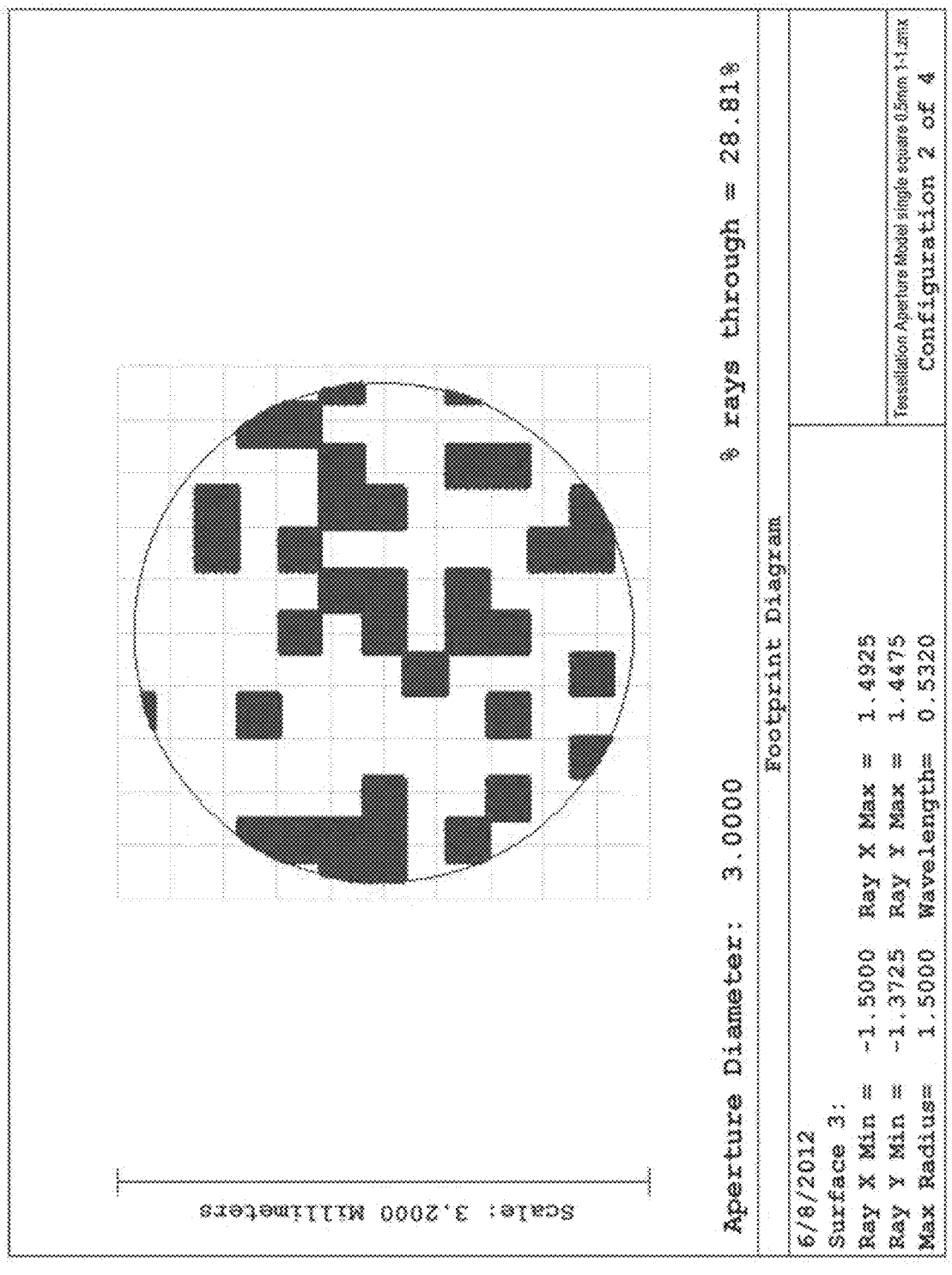
FIG. 54A is a footprint diagram showing the effect of 25% aperture fill for 250 micron micro tessellations in one embodiment.
Figure 54B:
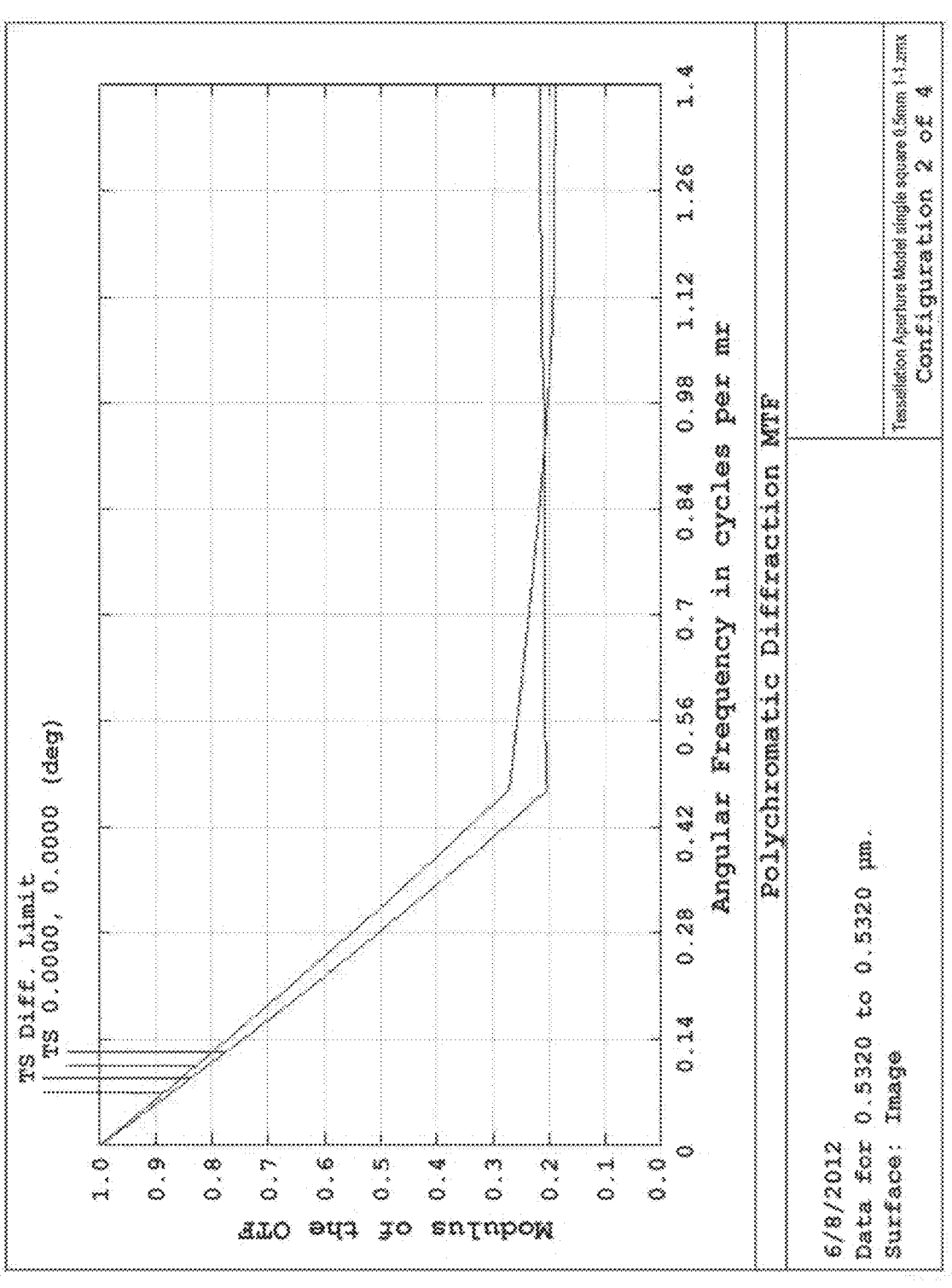
FIG. 54B is a chart showing a MTF plot illustrating the effect of 25% aperture fill for 250 micron micro tessellations in one embodiment.

250 micron micro-tessellations were investigated next. FIG. 52A is a footprint diagram showing the effect of 75% Aperture Fill of 250 um micro tessellations 3 mm Eye Pupil. FIG. 52B is a footprint diagram showing the effect of 75% Aperture Fill of 250 um micro tessellations 3 mm Eye Pupil. FIG. 53A is a footprint diagram showing the effect of 50% Aperture Fill of 250 um micro tessellations 3 mm Eye Pupil. FIG. 53B is a MTF plot showing the effect of 50% Aperture Fill of 250 um micro tessellations 3 mm Eye Pupil. FIG. 54A is a footprint diagram showing the effect of 25% Aperture Fill of 250 um micro tessellations 3 mm Eye Pupil. FIG. 54B is a MTF plot showing the effect of 25% Aperture Fill of 250 um micro tessellations 3 mm Eye Pupil.

Figure 55A:
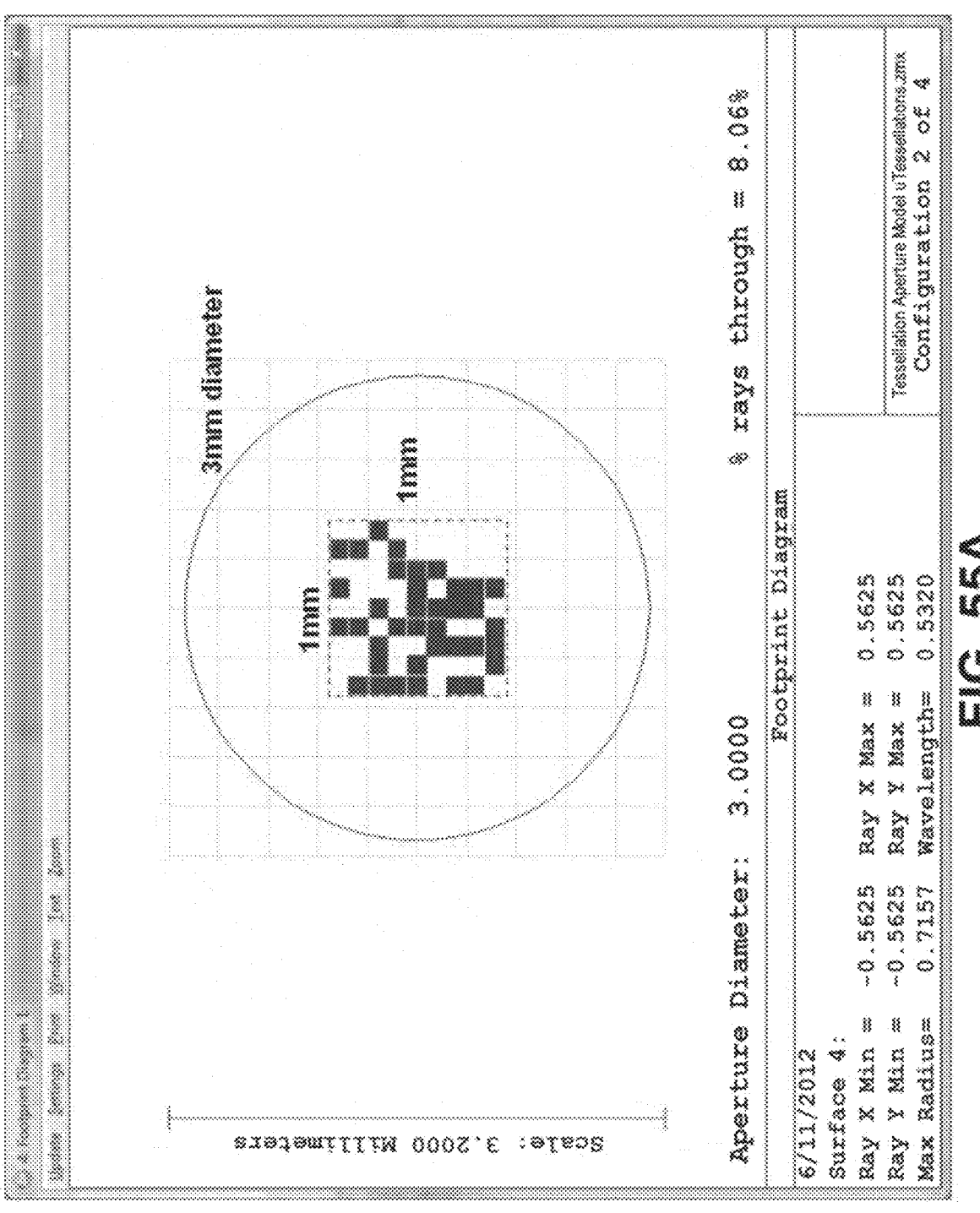
FIG. 55A is a footprint diagram showing the effect of 1 mm tessellation at 50% aperture fill for 125 micron micro tessellations for a 3 mm eye pupil diameter in one embodiment.
Figure 55B:
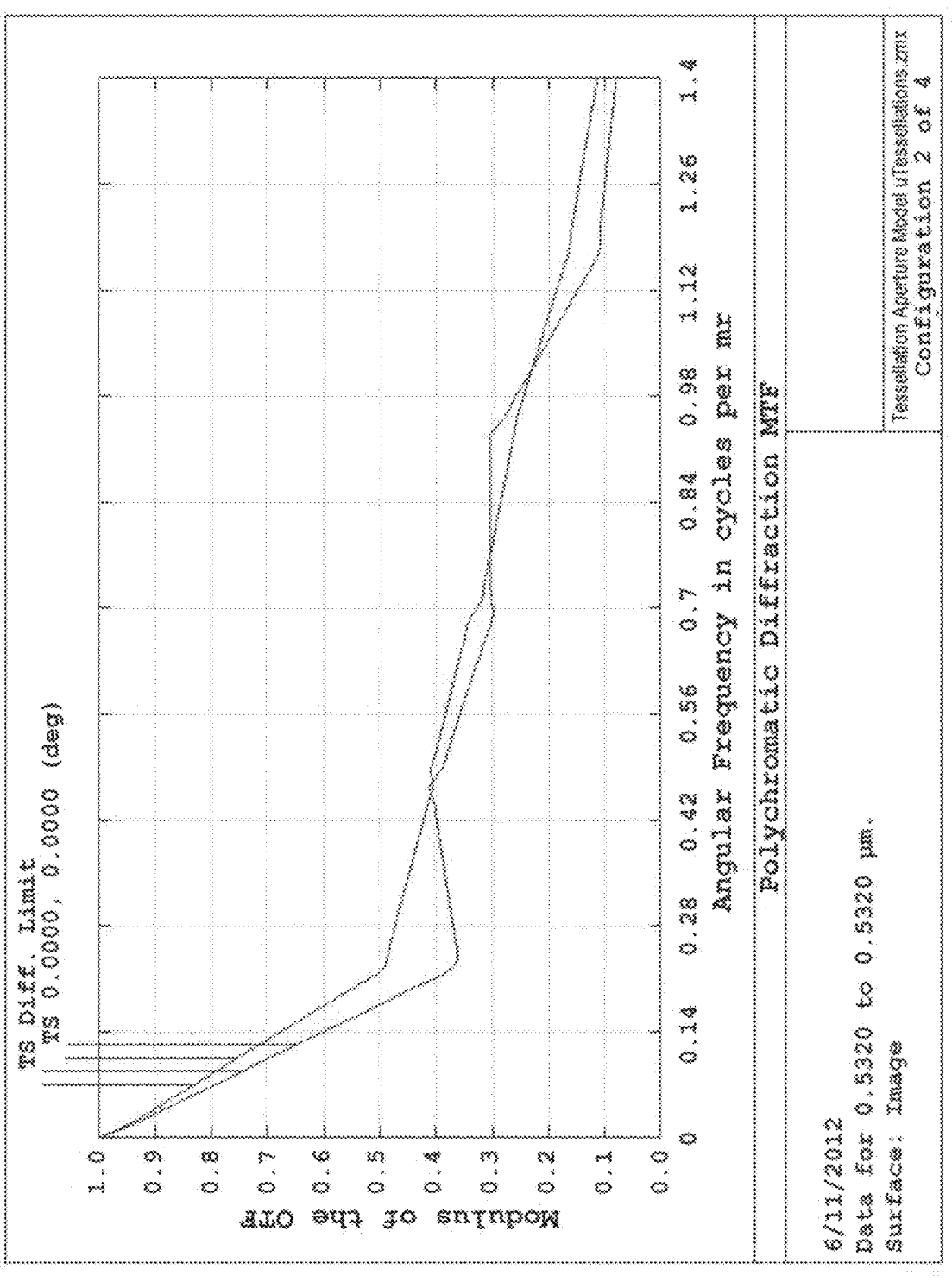
FIG. 55B is a chart showing a MTF plot illustrating the effect of 1 mm tessellation at 50% aperture fill for 125 micron micro tessellations for a 3 mm eye pupil diameter in one embodiment.
Figure 56A:
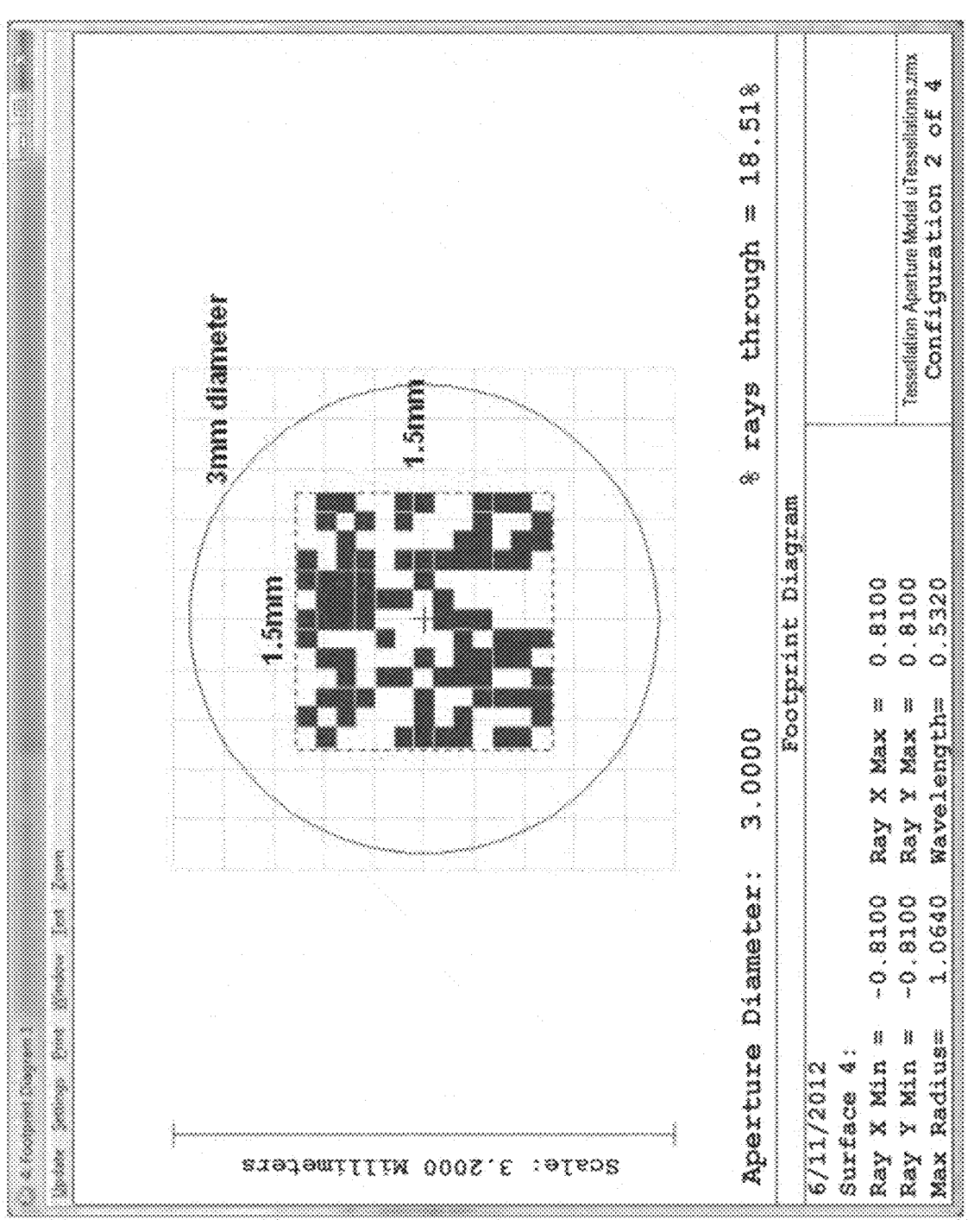
FIG. 56A is a footprint diagram showing the effect of 1.5 mm tessellation at 50% aperture fill for 125 micron micro tessellations for a 3 mm eye pupil diameter in one embodiment.
Figure 56B:
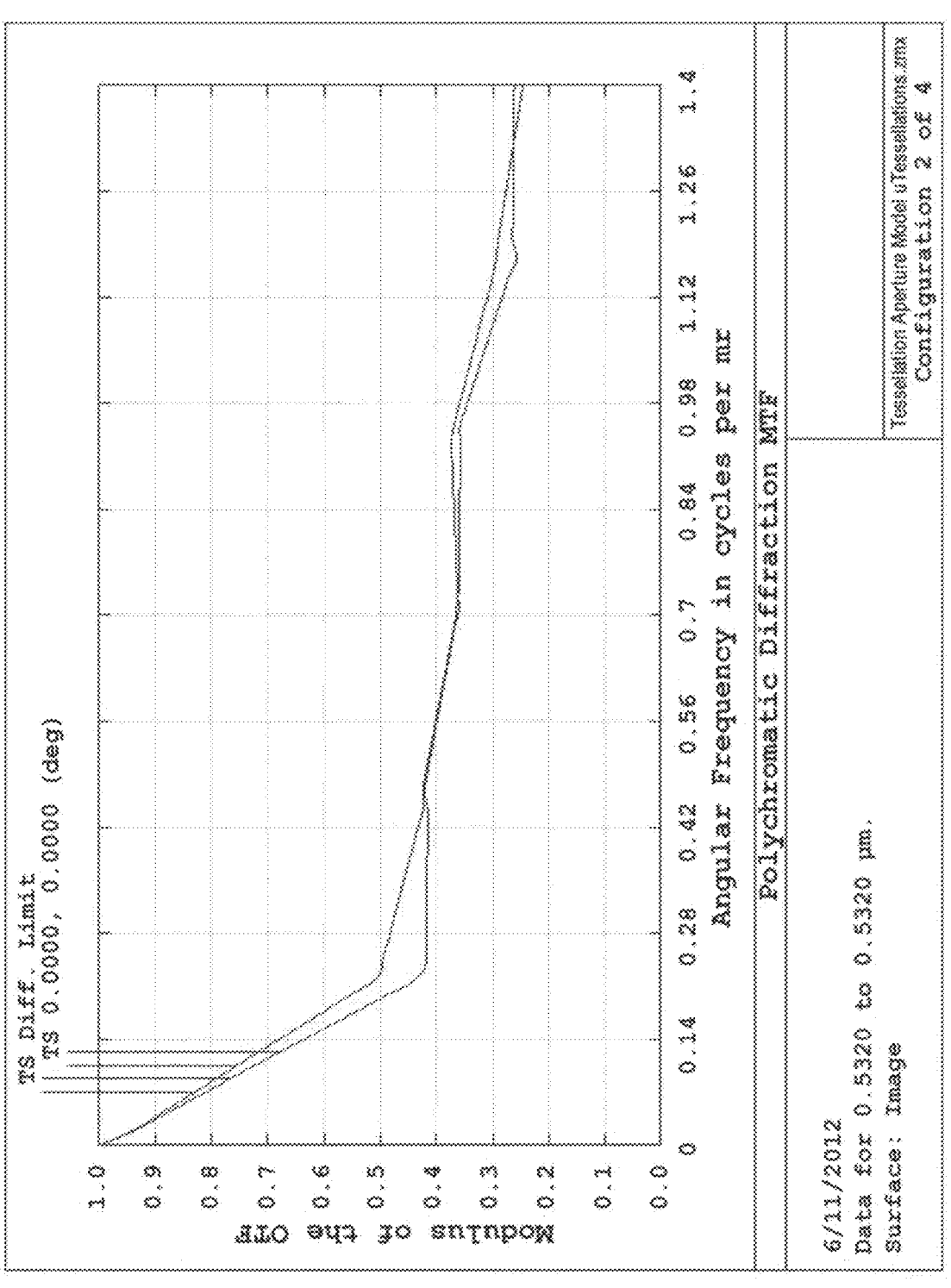
FIG. 56B is a chart showing a MTF plot illustrating the effect of 1.5 mm tessellation at 50% aperture fill for 125 micron micro tessellations for a 3 mm eye pupil diameter in one embodiment.
Figure 57A:
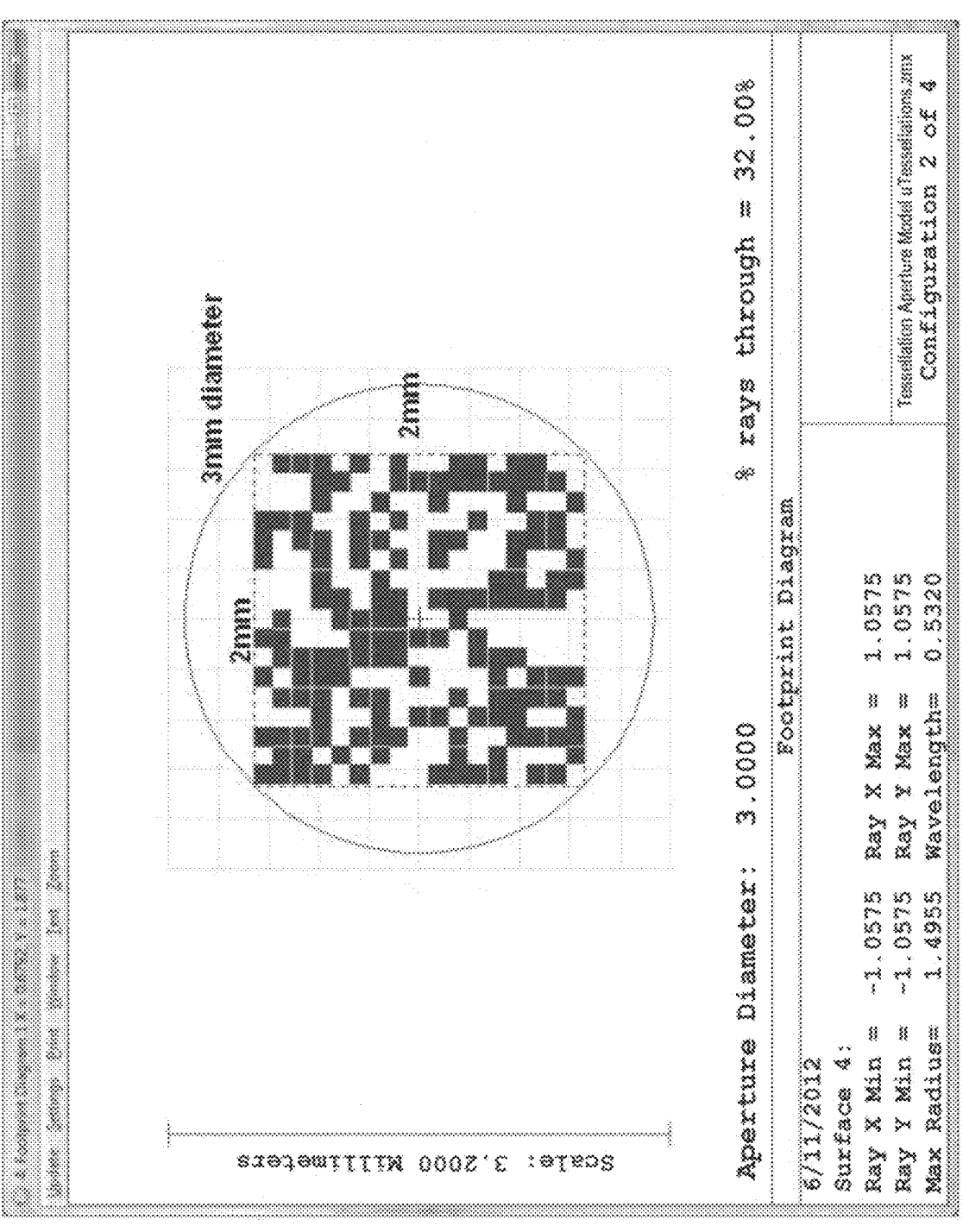
FIG. 57A is a footprint diagram showing the effect of 3 mm tessellation at 50% aperture fill for 125 micron micro tessellations for a 3 mm eye pupil diameter in one embodiment.
Figure 57B:
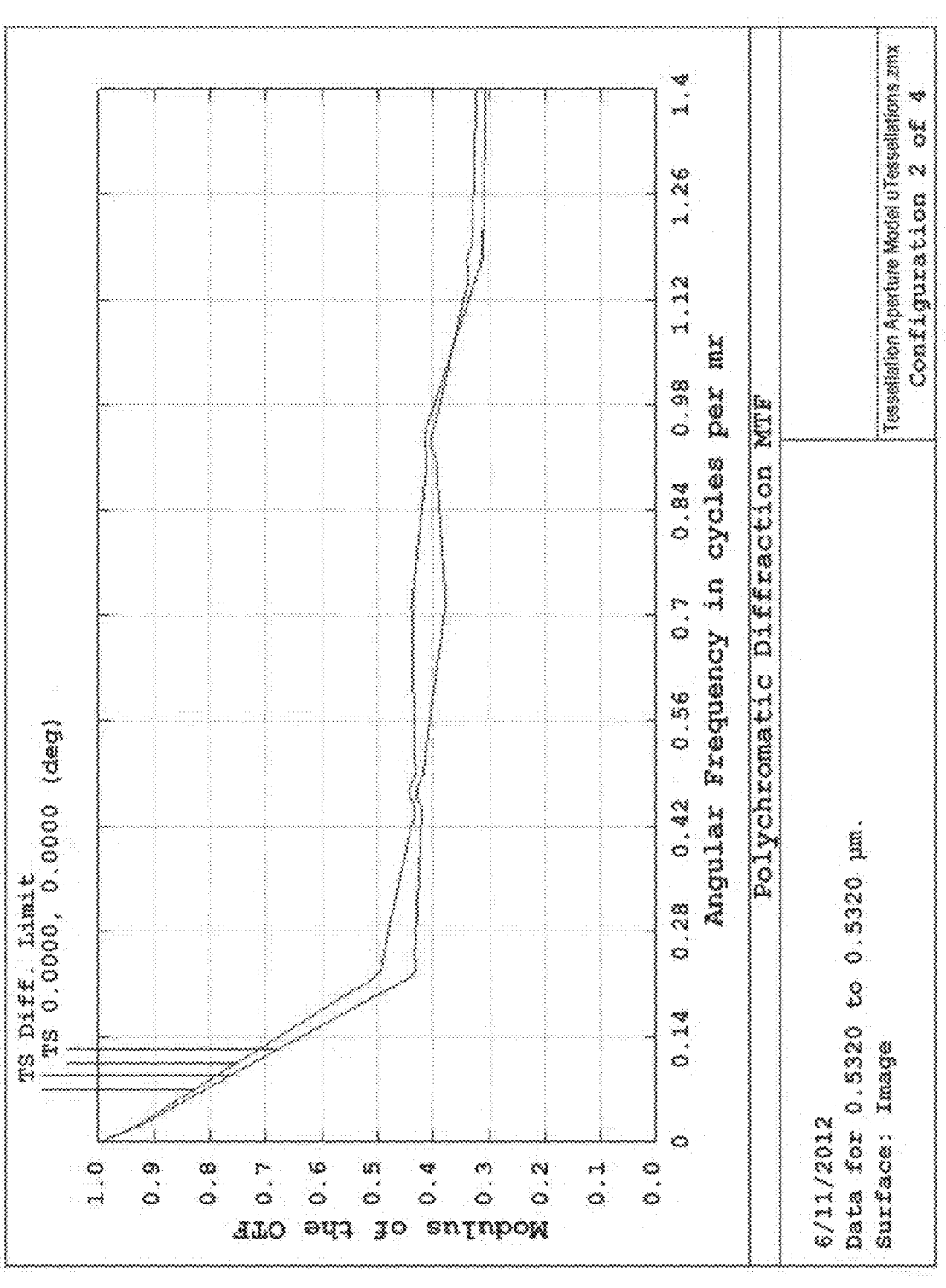
FIG. 57B is a chart showing a MTF plot illustrating the effect of 3 mm tessellation at 50% aperture fill for 125 micron micro tessellations for a 3 mm eye pupil diameter in one embodiment.

Tessellations smaller than the eye pupil diameter and micro tessellations were also investigated. FIG. 55A is a footprint diagram showing the effect of 1 mm tessellation with 50% fill of 125 um micro tessellations using 3 mm Eye Pupil Diameter. FIG. 55B is a MTF plot showing the effect of 1 mm tessellation with 50% fill of 125 um micro tessellations using 3 mm Eye Pupil Diameter. FIG. 56A is a footprint diagram showing the effect of 1.5 mm tessellation with 50% fill of 125 um micro tessellations using 3 mm eye pupil diameter. FIG. 56B is a footprint diagram showing the effect of 1 mm tessellation with 50% fill of 125 um micro tessellations using 3 mm eye pupil diameter. FIG. 57A is a footprint diagram showing the effect of 1 mm tessellation with 50% fill of 125 um micro tessellations using 3 mm eye pupil diameter. FIG. 57B is a MTF Plot showing the effect of 1 mm tessellation with 50% fill of 125 um micro tessellations using 3 mm eye pupil diameter.

Spatially randomized variable transmission apertures were investigated. The first step is checking the model validity: change from UDAs to Bitmap Greyscale Transmission Apertures. Horizontal strips over 1.5 mm aperture (125 μm μTs) in 3 mm diameter eye pupil.

Figure 58A:
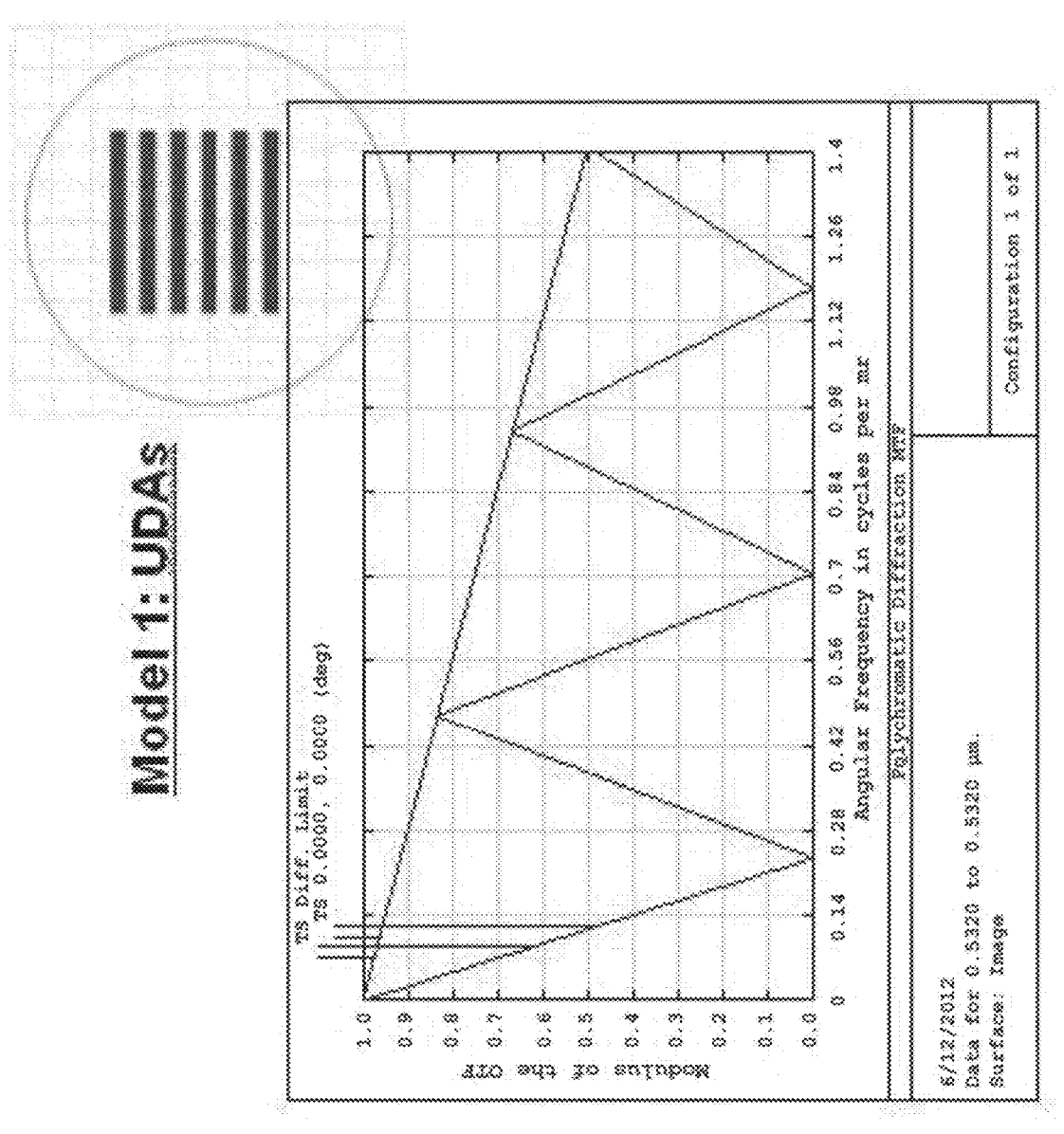
FIG. 58A is a chart showing the MTF of a User Defined Aperture in one embodiment.

The following modeling techniques were compared: Implement model as UDAs (User Defined Apertures); implement models using bitmap model as transmission aperture. Here bitmap levels are binary. The MTF results predicted are identical, so modeling tools equivalent. FIG. 58A shows a MTF plot of a UDA. FIG. 58B shows a Bitmap Aperture Function.

Figure 59B:
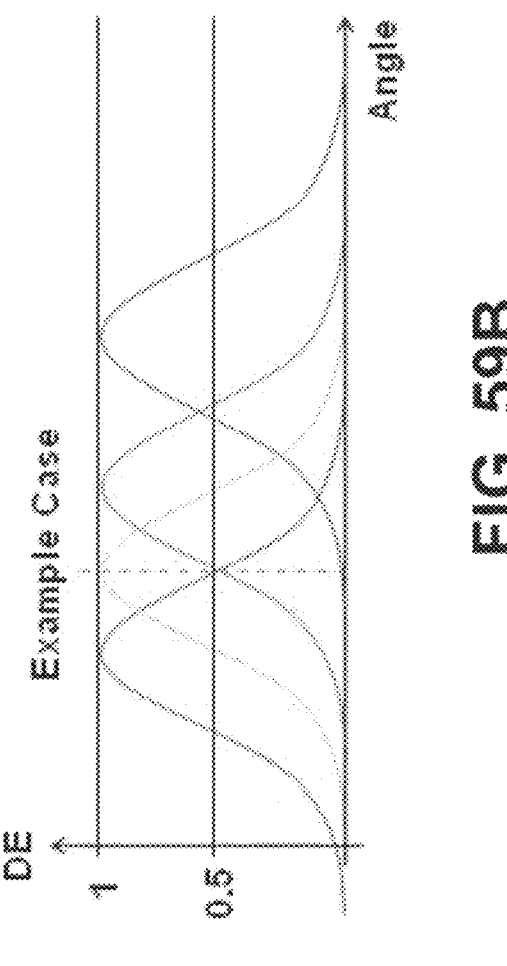
FIG. 59B is a chart showing diffraction efficiency versus angle for the embodiment of FIG. 59A in one embodiment.
Figure 59A:
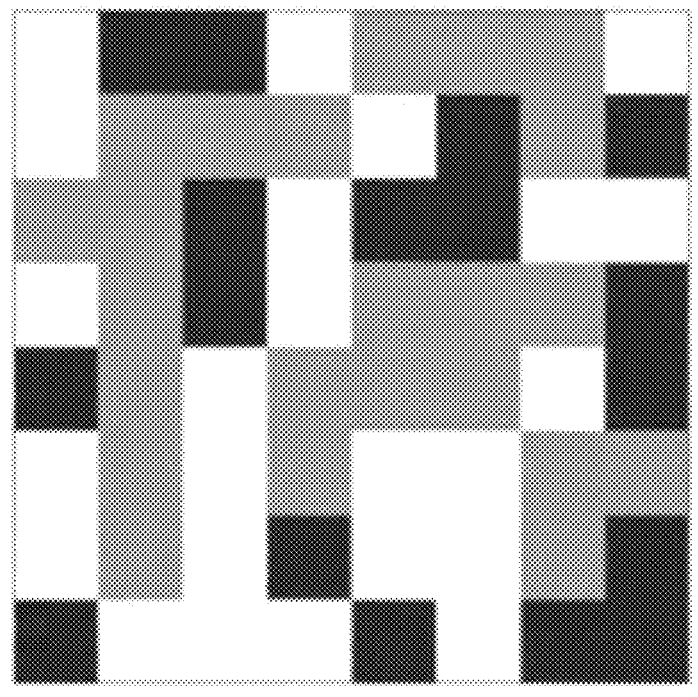
FIG. 59A is a Bitmap Aperture Function in one embodiment of the invention in one embodiment.

FIG. 59 shows 1.0 mm tessellation using 125 um micro tessellations randomly positioned with variable transmission and 3 mm eye pupil. Using a variable aperture transmissions improves the model to better represent non-top hat model cases (which are the majority of tessellations). DE values of 0%, 50% and 100% are equivalent to the field angle case shown in FIG. 59A.

It is noted that this represents the spatially broadest possible case of 3 overlapping gratings—i.e., the field angle is output by 75% of the primary tessellation area (albeit that there is a 50% contribution from two of micro-tessellations). 4 tile types are represented here. Transmission values of each were: 50%; 100%; 50%; 0%. Micro tessellation apertures are 125 um squares. The grid was 8×8 pixels, so the tessellation aperture is 1 mm×1 mm square.

Figure 60:
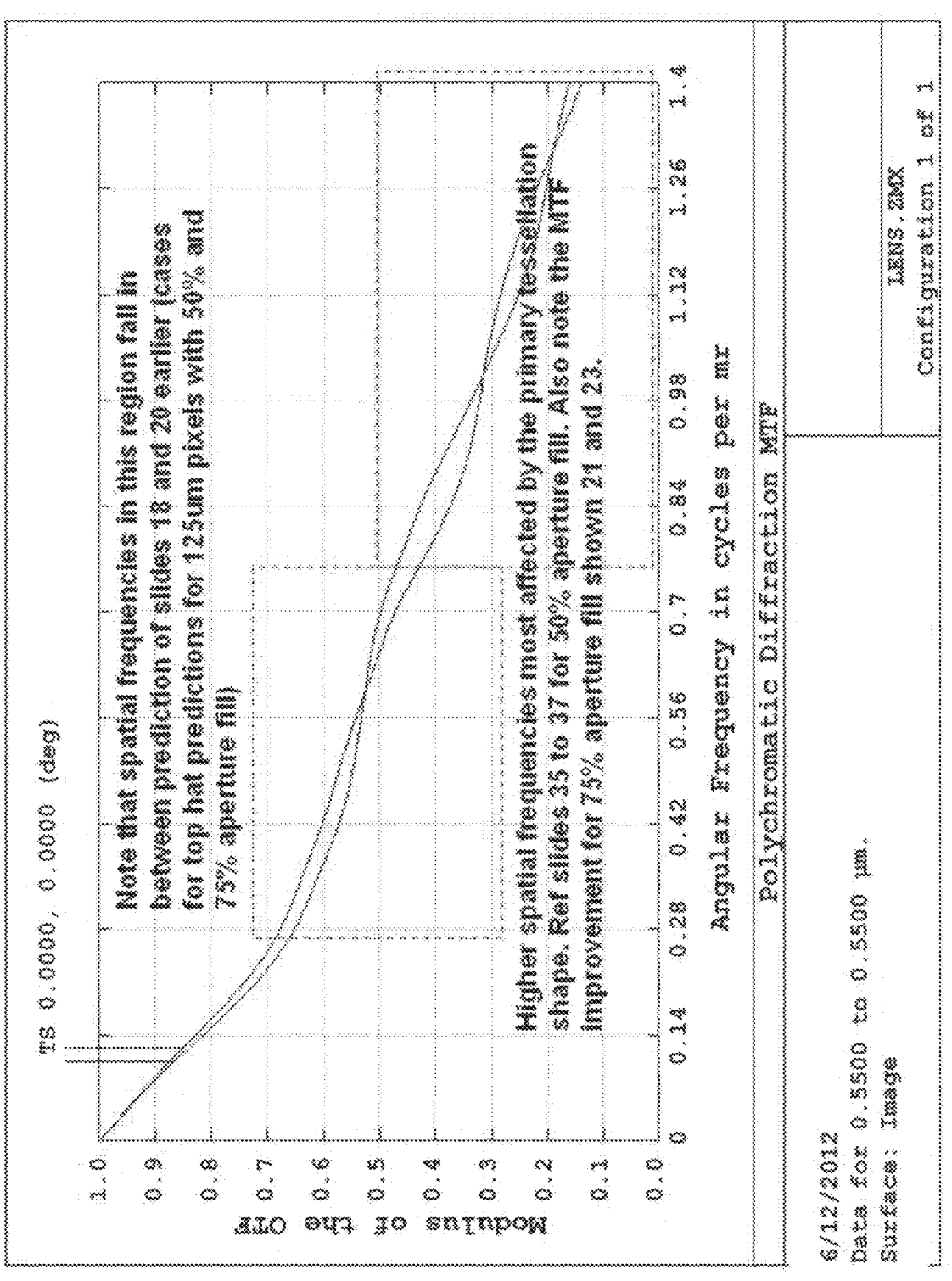
FIG. 60 is a MTF plot showing the effect of 1.0 mm tessellation using 125 um micro tessellations randomly positioned with variable transmission and a 3 mm eye pupil in one embodiment.

FIG. 60 is a MTF plot showing the effect of 1.0 mm tessellation using 125 um µTs randomly positioned with variable transmission and a 3 mm eye pupil. Note that spatial frequencies in the upper boxed region fall in between prediction shown in the figures relating to top hat predictions for 125 um pixels with 50% and 75% aperture fill). Higher spatial frequencies shown in the lower boxed region are most affected by the primary tessellation shape. The reader is referred to the figures showing for 50% aperture fill. It should also be noted that there is MTF improvement for 75% aperture fill.

Referring next to FIG. 61, a 1.5 mm tessellation using 125 um micro tessellations randomly positioned with variable transmission and 3 mm eye pupil was considered. Four different tile types are represented in FIG. 61. The transmission values of each were: 50%; 100%; 50%; 0%. The micro tessellations apertures were 125 um squares. The grid is 12×12 pixels, so the tessellation aperture is 1.5 mm×1.5 mm square.

Figure 62:
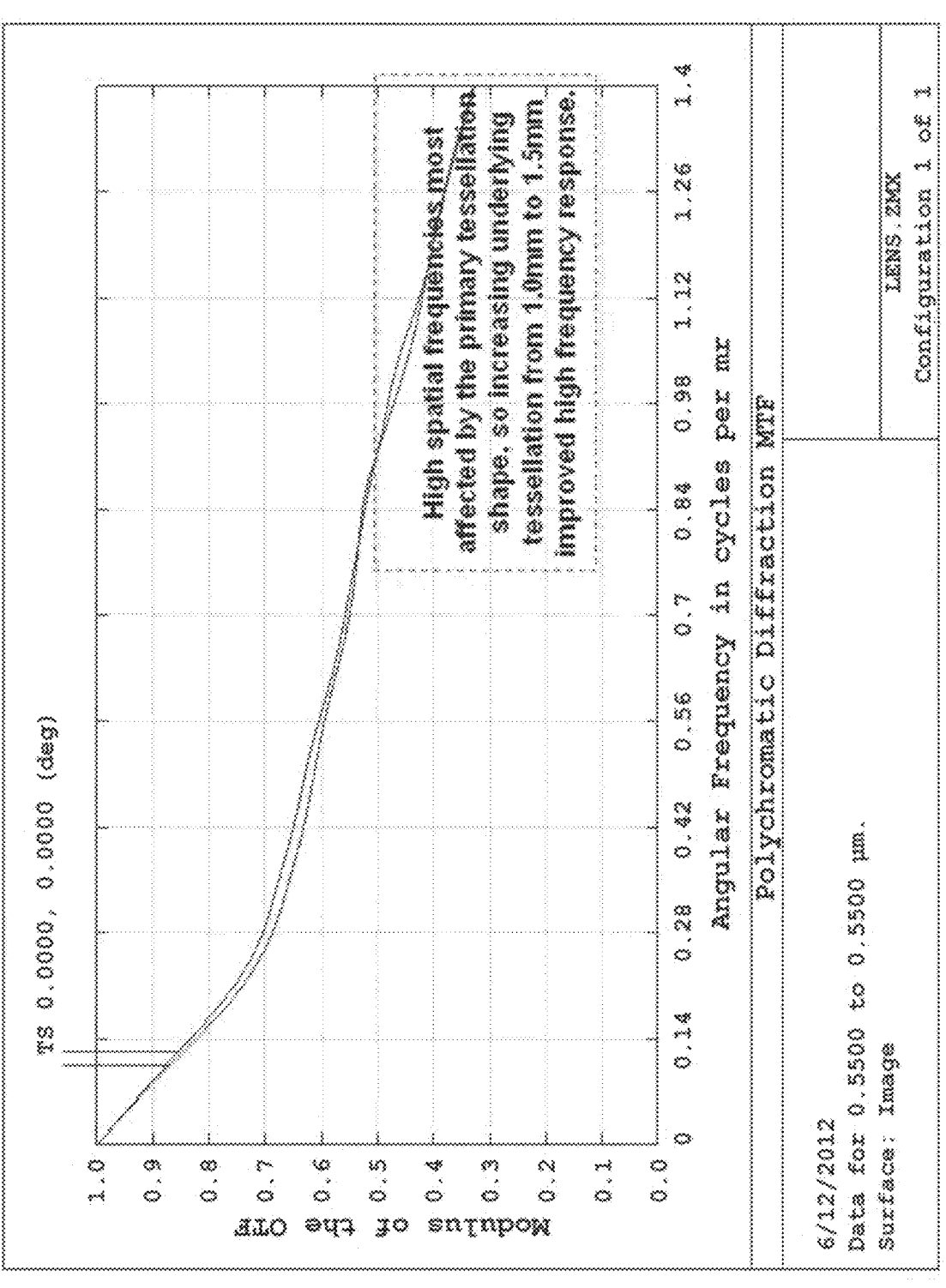
FIG. 62 is a MTF plot showing the effect of 1.5 mm tessellation using 125 um micro tessellations randomly positioned with variable transmission and a 3 mm eye pupil in one embodiment.

FIG. 62 is a MTF showing the effect of 1.5 mm tessellation using 125 um micro tessellations randomly positioned with variable transmission and 3 mm eye pupil. It should be noted that high spatial frequencies most affected by the primary tessellation shape, so increasing underlying tessellation from 1.0 mm to 1.5 mm improved high frequency response.

In summary:
a) Diffraction effects of micro tessellations need to be accounted for.
b) Diffraction effects of micro tessellations are distinct from the diffraction effects of the underlying primary tessellation pattern.
c) Use of µTs degrades MTF compared to that of an single tessellation that does not contain micro tessellations. However, micro tessellations enable the tessellation to have a larger angular bandwidth, thereby reducing the overall number of tessellations desired. In turn this permits larger tessellations.
d) A regular pattern of µTs will lead to an MTF modulation that leads to unacceptable dips in the MTF frequency response.
e) MTF dips can be averaged out by spatially randomizing the micro tessellations. Note that the µTs need to be sufficiently small to permit reasonable randomization. About an 8:1 ratio of tessellation to µT width appears to be sufficient, although this has not been explored fully.
f) The amount of angular field overlap between tessellations is crucial to the successful implementation of µTs. In cases modeled the ABW of micro tessellations is at least half of the overall tessellation ABW. Greater overlap will lead to improved MTF performance because this effectively increases the available aperture for a given field angle.
g) Tools are now established to model trade off cases for different grating configurations.

Implementation of micro-tessellation structures with spatial randomization across a tessellation provides additional design flexibility. In effect tessellation angular bandwidth (ABW) is enhanced at the expense of MTF. Results show that Randomization of micro tessellation features permits homogenization (roughly an averaging) of MTF oscillations found in non-randomized patterns. Furthermore, MTF at spatial frequencies that are of less interest can be sacrificed for improved tessellation ABW. Different cases of relevant overlapping gratings need to be considered. The MTF supported by micro-tessellation is dependent on micro-tessellation size and overlapping %. The ABW of representative cases of overlapping tessellations need to be considered in more detail, in conjunction with the fold gratings desired to support the desired architecture. Micro-tessellations with feature sizes of 50 µm, 125 µm and 250 µm have been considered in the context of a 3 mm eye pupil and 0.5 mm, 1.0 mm and <3 mm sized primarily tessellation elements. These are practical numbers to work with in the context of a near eye display. Tessellations may however be any size or shape, and micro-tessellation may be any size or shape smaller than the primary tessellation.

An Illumination Uniformity Analysis of the tessellation pattern was conducted next. Referring to FIG. 63, Case 1, which comprises 1 mm tessellations, was considered. The fill per the overlaid reference designs in the Figure. FIG. 63 represents 6 layer, 12 tile, monochrome reference design. It was assumed a single tile with 50% Aperture Fill. It was further assumed: 17 mm eye relief; 3 mm eye pupil; 6 layer monochrome reference design; 1 mm tessellations, and an offset reference design. The unit cell is 2×3. The overlay is shown in the FIG. 63 to generate the tiled overlay pattern. With 1 mm tessellations, min to max best uniformity is +/−12% with 50% aperture fill i.e. +/−12% uniformity variation=24% p-p.

FIG. 64 shows Case 1b repeated on axis for a 3 mm eye pupil at 30 mm eye relief. Eye relief impacts the spatial frequency of the variation. The larger eye relief causes higher spatial frequency ripple. Uniformity magnitude is unaffected. The maximum ripple is 56.6% of pupil fill. Minimum ripple is 43.4% of pupil fill. Uniformity is +/−13.2%, 26.4% peak-to-peak.

FIG. 65 shows Case 2: 1 mm tessellations; fill optimized. The Figures represent a 6 layer, 12 tile monochrome reference design with grating positions reoptimized. A single tile has 50% aperture fill. A 3 mm eye pupil and 1 mm tessellations were assumed. The tessellations are spatially uniform.

Figure 66:
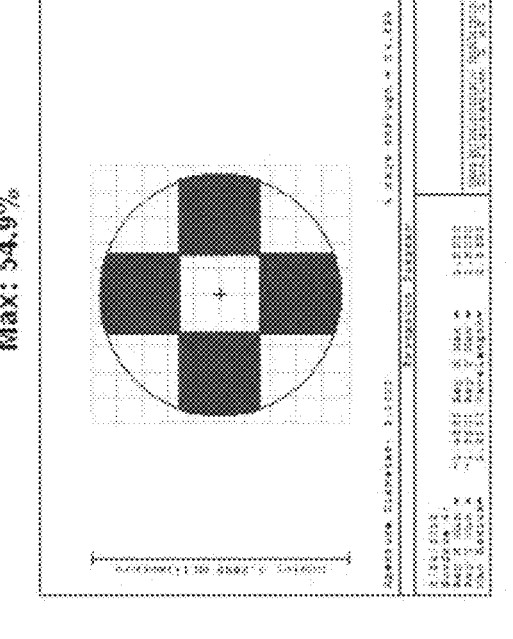
FIG. 66 is a fourth illumination uniformity analysis of a first implementation tessellation pattern in one embodiment.

FIG. 66 illustrates Case 2: consideration of maximum and minimum situations. Footprint diagrams corresponding to a minimum 45.1% and a maximum 54.9% are shown. With 1 mm tessellations, minimum to maximum best uniformity is +/−5% with 50% aperture fill, i.e., +/−10% uniformity variation (20% p-p).

FIG. 67 illustrates Case 3: 0.5 mm tessellations with 50% aperture fill, off axis. FIG. 67 represents a 6 layer, 12 tile, monochrome reference design but with 0.5 mm tessellations. A single tile: 50% aperture fill and 3 mm eye pupil are assumed. This calculation simulates 50% aperture fill with 0.5 mm wide tessellations. Ripple is calculated as: maximum=50.4; minimum=49.6. Ripple magnitude is about +/−0.8% (1.6% P-P). The field range measured was ~11deg to 24deg. Ripple frequency is ~1 cycle for 1.25deg.

FIG. 68 illustrates Case 3b: 0.5 mm tessellations with 50% aperture fill, on axis. FIG. 68 represents a 6 layer, 12 tile, monochrome reference design but with 0.5 mm tessellations. A single tile: 50% aperture fill; and 3 mm eye pupil were assumed. This simulates 50% aperture fill with 0.5 mm wide tessellations. Ripple was calculated as: maximum=50.9; minimum=49.6. Ripple magnitude is about +/−1.5% (3% P-P). The field range measured was ~+/−6.5deg. Off axis, tessellations are foreshortened, and thus uniformity improves. Ripple frequency is ~1 cycle for 1.25deg.

Figure 69:
FIG. 69 is a seventh illumination uniformity analysis of a first implementation tessellation pattern in one embodiment.

FIG. 69 illustrates a 4 mm eye pupil, 0.5 mm tessellations, 50% aperture fill. As shown in the drawings the characteristics are: maximum: 51.97%; minimum: 48.03%; and ripple: +/−2% (=4% p-p).

FIG. 70 illustrates a 3 mm eye pupil, 33% aperture fill (3 layers, 9 tile types). FIG. 70 represents 3 layer, 9 tile, monochrome reference design but with 0.5 mm tessellations. A single tile: 33% Aperture Fill; and a 3 mm eye pupil were assumed. Ripple was calculated at: maximum=36.9; minimum=30.4. Ripple magnitude is ~6.5%/33%=+/−9.75% (=19.5% P-P). Ripple frequency is ~1 cycle for 5deg.

Figure 71:
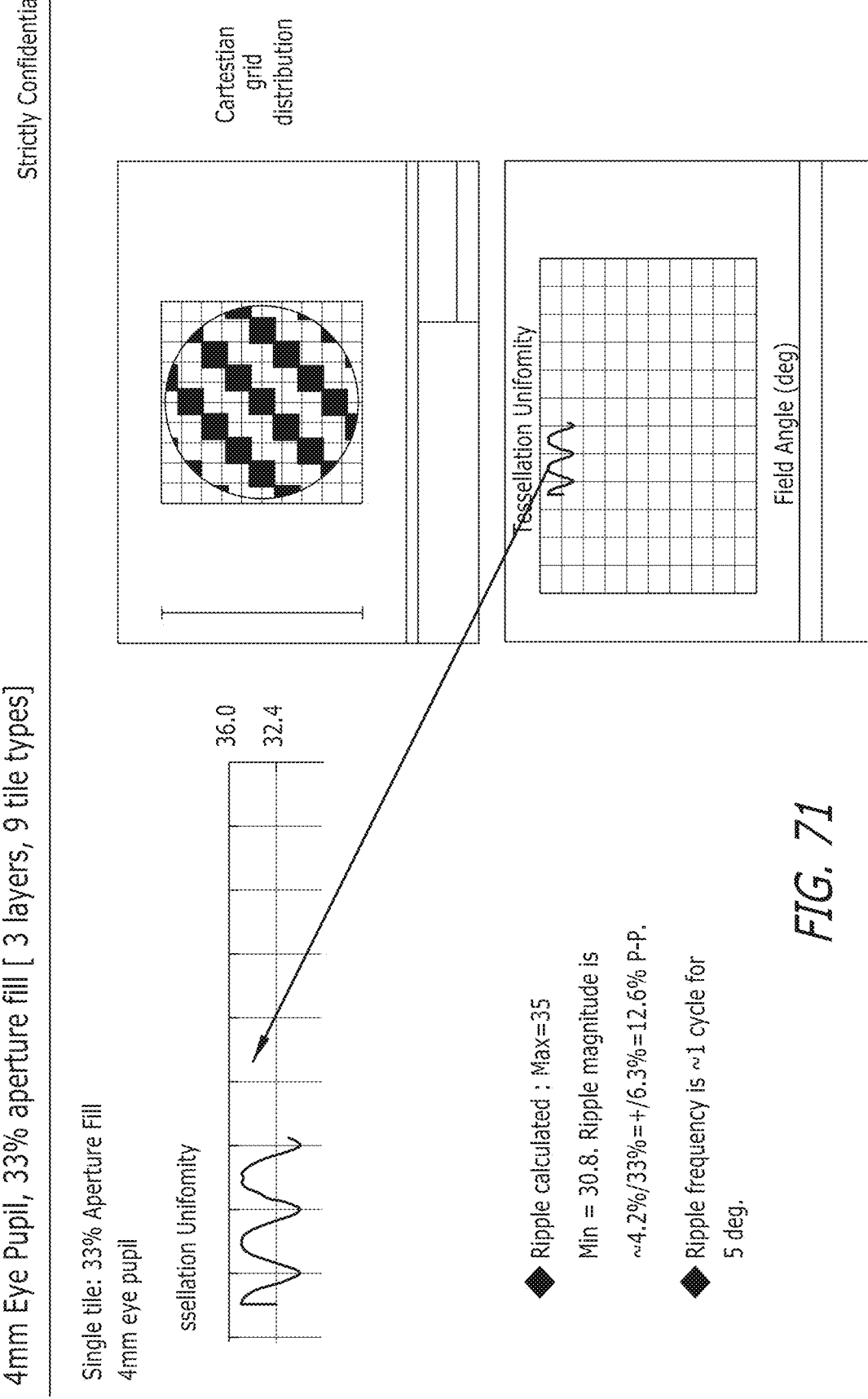
FIG. 71 is a ninth illumination uniformity analysis of a first implementation tessellation pattern in one embodiment.

FIG. 71 illustrates a 4 mm eye pupil, 33% aperture fill (3 layers, 9 tile types). A single tile: 33% Aperture Fill and 4 mm eye pupil were assumed. Ripple was calculated as: maximum=35; minimum=30.8. Ripple magnitude is ~4.2%/33%=+/−6.3%=12.6% P-P. The ripple frequency is ~1 cycle for 5deg.

Figure 72:
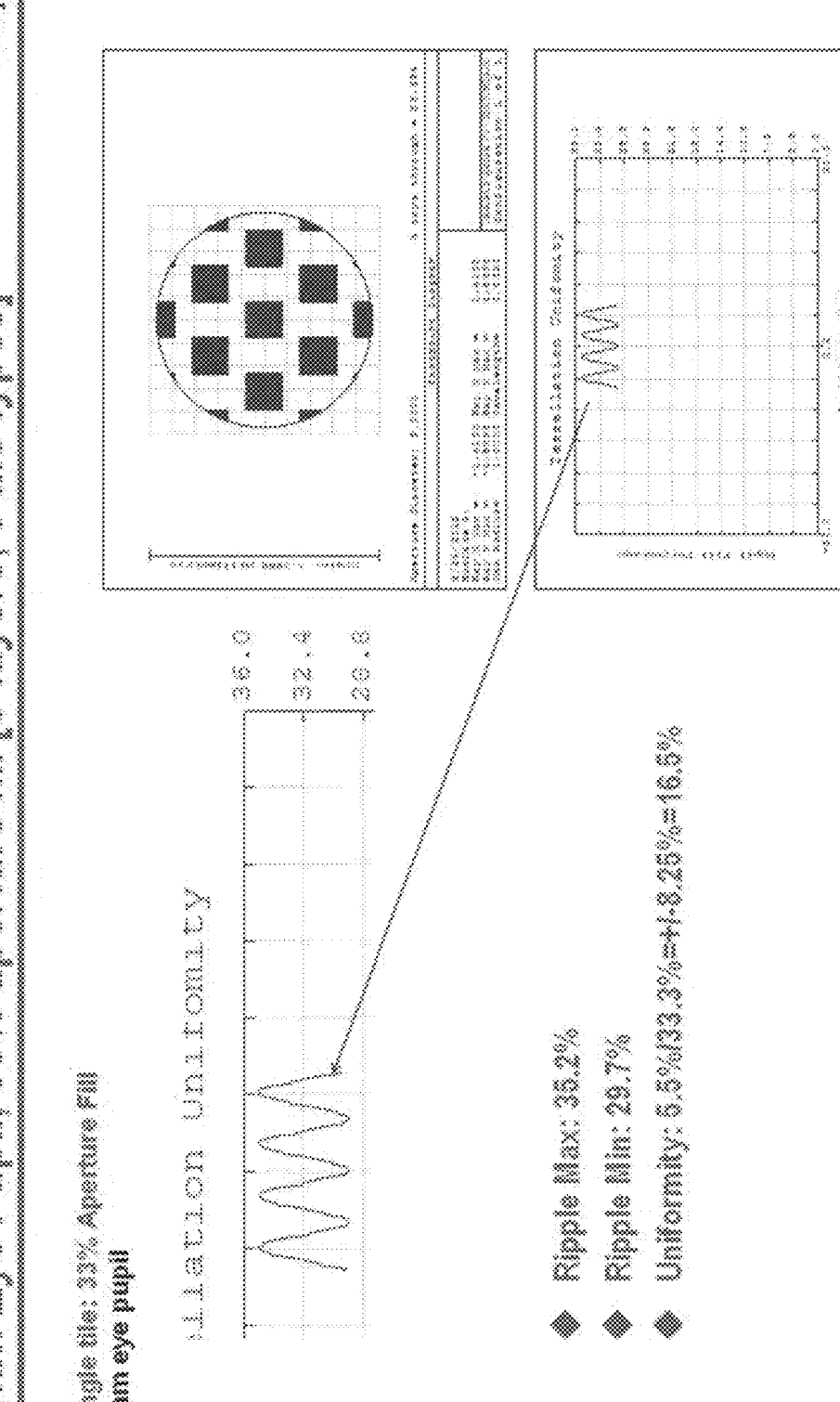
FIG. 72 is a tenth illumination uniformity analysis of a first implementation tessellation pattern in one embodiment.

FIG. 72 illustrates a 3 mm eye pupil, 33% aperture fill (3 layers, 9 tile types). A single tile: 33% aperture fill and 3 mm eye pupil were assumed. The computed characteristics are: ripple maximum: 35.2%; ripple minimum: 29.7%; uniformity: 5.5%/33.3%=+/−8.25%=16.5%.

Figure 73:
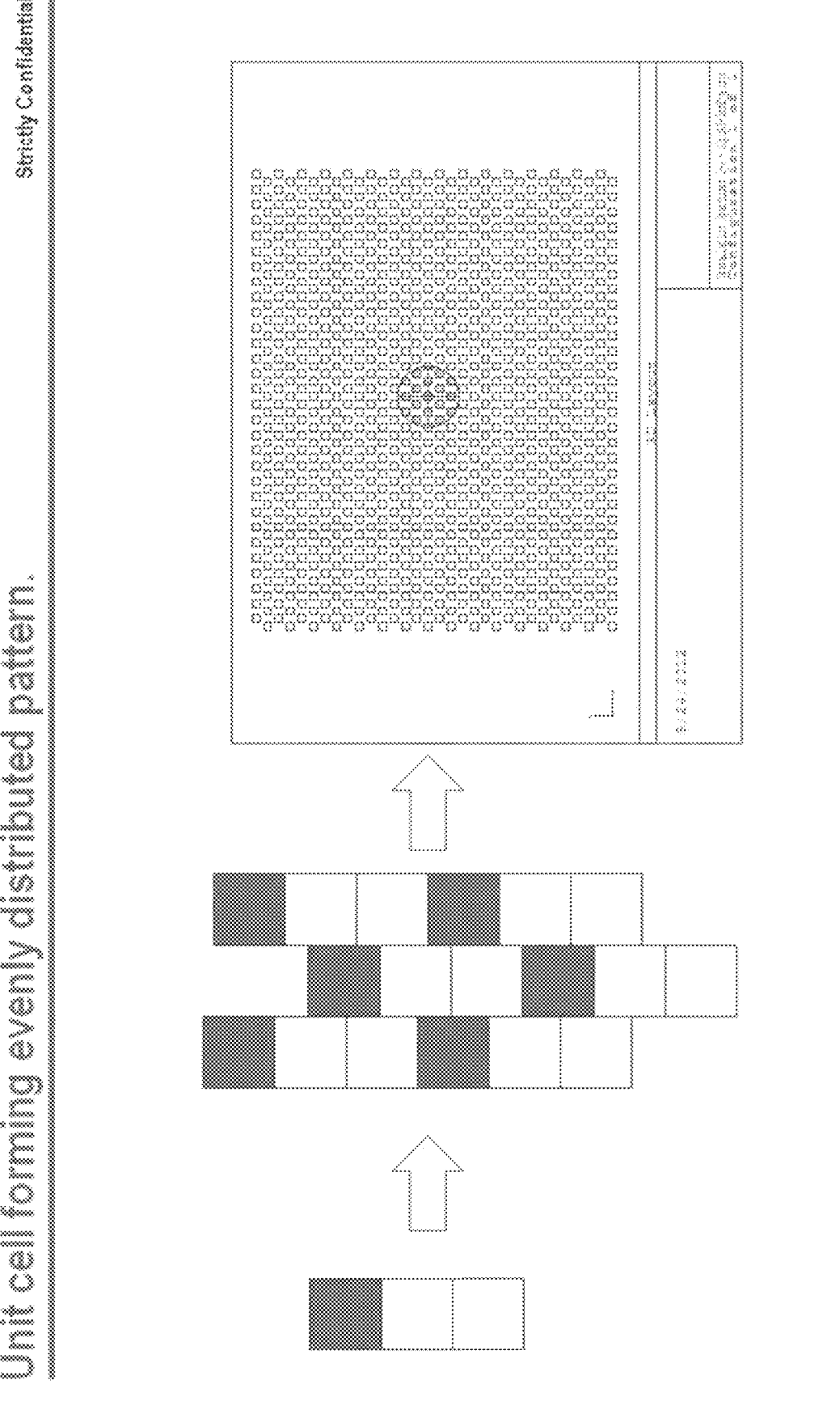
FIG. 73 is an eleventh illumination uniformity analysis of a first implementation tessellation pattern in one embodiment.

FIG. 73 illustrates how a unit cell forms an evenly distributed pattern.

FIG. 74 is a recalculation of the embodiment using a 4 mm eye pupil, 33% aperture fill (3 layers, 9 tile types). This needs the pattern to have 1×3 unit cell, with even columns offset by 0.5 pixel.

A grid distribution using even column half pixel offsets gives a more even distribution. The computed characteristics are: ripple maximum: 35.0%; ripple minimum: 31.0%; uniformity: 4.0%/33.3%=+/−6%=12%.

FIG. 75 illustrates a 4 mm eye pupil, 33% aperture fill (3 layers, 9 tile types). This embodiment needs the pattern to have 1×3 unit cell, with even columns offset by 0.5 pixel.

Grid distribution using even column half pixel offsets gives a more even distribution. The computed characteristics are: ripple maximum: 34.6%; ripple minimum: 32.7%; uniformity: 1.9%/33.3%=+/−2.85%=5.7%.

A series of reference designs based on micro-tessellation principles have been developed and are summarised below
  1. Reference design:
    Monochromatic, 6 layer, 12 tiles (50% aperture fill), 1 mm tessellations:
    3 mm eye pupil: 24% uniformity
  2. Reference design with reoptimized grating locations on different layers:
    Monochromatic, 6 layer, 12 tiles (50% aperture fill), 1 mm tessellations:
    3 mm eye pupil: 20% uniformity
  3. Reference design using 0.5 mm tessellations:
    Monochromatic, 6 layer, 12 tiles (50% aperture fill), 0.5 mm tessellations:
    3 mm eye pupil: ~3% to 2% uniformity across field.
  4. 3 mm eye pupil (Target: C AR Outdoor)
    3 layer, 9 tiles (33% aperture fill), 0.5 mm tessellations:
    Up to 16.5% uniformity
  5. 4 mm eye pupil [Target: C Movie Indoor]
    3 layer, 9 tiles (33% aperture fill), 0.5 mm tessellations:
    Up to 12% uniformity Achieving 50% aperture fill of a single tile provides significantly improved uniformity over even 33% aperture fill (~5× uniformity improvement on 3 mm eye pupil). For 50% aperture fill, 0.5 mm performs significantly better than a 1 mm tessellation: 3% vs. 20% for a 3 mm eye pupil. 50% aperture fill for 9 tiles need '4.5' (i.e., 5 layers).

Eye pupil irradiance uniformity with field angle improves with decreased primary tessellation element size and increase primary tessellation element aperture fill. It is noted that decreased tile type density on a given layer will then improve the irradiance uniformity with field angle because fewer tile types will increase the aperture fill of any single primary tessellation element type. Decreased primary tessellation element size degrades MTF (resolution). It is noted that decreased primary tessellation element size, and increased density of a primary tessellation element type permits irregular patterns. This in turn permits homogenization of MTF of primary tessellations, and the opportunity to vary the irradiance uniformity field angular ripple frequency. The use of small (micro tessellations) inside the aperture of a primary tessellation may improve the overall angular bandwidth of a primary tessellation element, thereby presenting the opportunity to reduce the number of primary tessellation element types desired.

REFERENCES

The following patent applications are incorporated by reference herein in their entireties:
U.S. Provisional Patent Application No. 61/627,202 with filing date 7 Oct. 2011 by the present inventors entitled WIDE ANGLE COLOR HEAD MOUNTED DISPLAY which is also referenced by the Applicant's docket number SBG106;
PCT Application No.: US2008/001909, with International Filing Date: 22 Jul. 2008, entitled LASER ILLUMINATION DEVICE;
PCT Application No.: US2006/043938, entitled METHOD AND APPARATUS FOR PROVIDING A TRANSPARENT DISPLAY;
PCT Application No.: PCT/GB2010/001982 entitled COMPACT EDGE ILLUMINATED EYEGLASS DISPLAY;
PCT Application No.: PCT/GB2010/000835 with International Filing Date: 26 Apr. 2010 entitled Compact holographic edge illuminated eyeglass display;
PCT Application No.: PCT/GB2010/002023 filed on 2 Nov. 2010 entitled APPARATUS FOR REDUCING LASER SPECKLE.
U.S. patent application: Ser. No. 10/555,661 filed 4 Nov. 2005 entitled SWITCHABLE VIEWFINDER DISPLAY.
U.S. Provisional Patent Application No. 61/344,748 with filing date 28 Sep. 2010 entitled Eye Tracked Holographic Edge Illuminated Eyeglass Display;
U.S. Provisional Patent Application 61/573,066 with filing date 24 Aug. 2011 by the present inventors entitled HOLOGRAPHIC POLYMER DISPERSED LIQUID CRYSTAL MATERIALS AND DEVICES;
U.S. Provisional Patent Application No. 61/457,835 with filing date 16 Jun. 2011 entitled HOLOGRAPHIC BEAM STEERING DEVICE FOR AUTOSTEREOSCOPIC DISPLAYS;
PCT Application No.: US2008/001909, with International Filing Date: 22 Jul. 2008, entitled LASER ILLUMINATION DEVICE
PCT Application No.: PCT/GB2010/002023 filed on 2 Nov. 2010 by the present inventors entitled APPARATUS FOR REDUCING LASER SPECKLE.
U.S. Provisional Patent Application No. 61/573,121 with filing date 7 Sep. 2011 by the present inventors entitled METHOD AND APPARATUS FOR SWITCHING HPDLC ARRAY DEVICES which is also referenced by the Applicant's docket number SBG105B;

PCT Application No.: PCT/GB2010/000835 with International Filing Date: 26 Apr. 2010 entitled COMPACT HOLOGRAPHIC EDGE ILLUMINATED EYE-GLASS DISPLAY (and also referenced by the Applicant's docket number SBG073PCT);

a U.S. Provisional Patent Application 61/573,082 with filing date 29 Aug. 2011 by the present inventors entitled CONTACT IMAGE SENSORS;

U.S. Provisional Patent Application No. 61/573,156 filed on 16 Sep. 2011, entitled "Holographic wide angle near eye display" (SBG Labs Reference No. SBG106A);

U.S. Provisional Patent Application No. 61/573,175 filed on 19 Sep. 2011, entitled "Holographic wide angle near eye display" (SBG Labs Reference No. SBG106B);

U.S. Provisional Patent Application No. 61/573,176 filed on 19 Sep. 2011, entitled "Holographic wide angle near eye display" (SBG Labs Reference No. SBG106C);

U.S. Provisional Patent Application No. 61/573,196 filed on 25 Sep. 2011, entitled "Further improvements to holographic wide angle near eye display" (SBG Labs Reference No. SBG106D);

U.S. Provisional Patent Application No. 61/627,202 filed on 7 Oct. 2011, entitled "Wide angle color head mounted display" (SBG Labs Reference No. SBG106);

U.S. Provisional Patent Application No. 61/687,436 filed on 25 Apr. 2012, entitled "Improvements to holographic wide angle head mounted display" (SBG Labs Reference No. SBG109);

CONCLUSION

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A waveguide display, comprising:
a substrate transparent to visible light;
a coupler configured to couple display light into the substrate such that the display light propagates within the substrate through total internal reflection;
a first grating on a first region within the substrate; and
a second grating on a second region within the substrate, wherein the second region is different from the first region, and the second grating overlaps with the first grating in at least two orthogonal directions within the substrate in at least a see-through region of the waveguide display, wherein the first grating and second grating are configured to diffract the display light in at least two different directions.

2. The waveguide display of claim 1, wherein the first grating or the second grating include at least one grating region comprising different grating prescriptions multiplexed into the same area, wherein the different grating prescriptions comprise K- vector or surface grating period.

3. The waveguide display of claim 1, wherein the first grating or the second grating include grating regions comprising different grating prescriptions multiplexed using spatially discrete grating regions, wherein the different grating prescriptions comprise K-vector or surface grating period.

4. The waveguide display of claim 1, wherein the first grating or the second grating provide beam expansion.

5. The waveguide display of claim 1, wherein the first grating or the second grating extract light into an eyebox.

6. The waveguide display of claim 1, wherein the first grating or the second grating include at least one grating region with a rolling k-vector.

7. The waveguide display of claim 1, wherein the first grating or the second grating includes at least one grating portion configured as a non-switching grating.

8. The waveguide display of claim 1, wherein the first grating or the second grating includes at least one grating portion configured as a Bragg grating.

9. The waveguide display of claim 1, wherein the first grating or the second grating includes at least one grating portion configured as a switching grating.

10. The waveguide display of claim 1, wherein the first grating or the second grating includes at least one grating portion configured as a switchable Bragg grating.

11. The waveguide display of claim 1, wherein the first grating or the second grating includes at least one grating portion including a surface grating.

12. The waveguide display of claim 1, wherein a grating portion of the first grating having a first grating prescription overlaps a grating portion of the second grating having a second grating prescription, wherein the first grating prescription and/or the second grating prescription comprises K-vector or surface grating period.

13. The waveguide display of claim 1, wherein the first grating or the second grating include at least one grating portion configured to:
provide a beam expansion of the display light;
diffract the display light in at least two different directions corresponding to at least two different field of view portions; and
provide extraction of the display light from the waveguide.

14. The waveguide display of claim 1, wherein the first grating and the second grating are configured to provide beam expansion and display light extraction into an eyebox.

\* \* \* \* \*